(12) United States Patent
Petrocy et al.

(10) Patent No.: US 9,519,278 B2
(45) Date of Patent: Dec. 13, 2016

(54) MODULARIZED SELF-ADDRESSING APPARATUS AND METHOD

(71) Applicant: Richard J. Petrocy, Carteret, NJ (US)

(72) Inventors: Richard Joel Petrocy, Carteret, NJ (US); John A. Cappelli, New Rochelle, NY (US)

(73) Assignee: Richard J. Petrocy, Carteret, NJ (US)

( * ) Notice: Subject to any disclaimer, the term of this patent is extended or adjusted under 35 U.S.C. 154(b) by 100 days.

(21) Appl. No.: 14/299,129

(22) Filed: Jun. 9, 2014

(65) Prior Publication Data

US 2015/0355610 A1  Dec. 10, 2015

(51) Int. Cl.
*G05B 11/01* (2006.01)
*G05B 19/042* (2006.01)

(52) U.S. Cl.
CPC . *G05B 19/0421* (2013.01); *G05B 2219/21031* (2013.01); *G05B 2219/25096* (2013.01)

(58) Field of Classification Search
CPC .................................................. G05B 15/02
USPC .......................................................... 700/20
See application file for complete search history.

(56) References Cited

U.S. PATENT DOCUMENTS

| | | | |
|---|---|---|---|
| 6,038,650 A * | 3/2000 | Vorbach | G06F 15/7867 711/217 |
| 6,131,119 A * | 10/2000 | Fukui | H04L 12/40078 709/224 |
| 7,307,391 B2 | 12/2007 | Shan | |
| 7,513,644 B2 | 4/2009 | Kufferath-Kassner et al. | |
| 7,630,323 B2 | 12/2009 | Bridgelell | |
| 7,815,338 B2 | 10/2010 | Siemiet et al. | |
| 7,862,195 B2 | 1/2011 | Stack et al. | |
| 7,997,770 B1 | 8/2011 | Meurer | |
| 8,214,059 B1 * | 7/2012 | Petrocy | G09F 11/22 340/3.5 |
| 8,232,724 B2 | 7/2012 | Mostoller et al. | |
| 8,296,488 B2 | 10/2012 | Westrick, Jr. et al. | |
| 8,330,362 B2 | 12/2012 | Lin | |

(Continued)

OTHER PUBLICATIONS

Huasun, "2013 Product Catalog" (2013).

(Continued)

*Primary Examiner* — Mohammad Ali
*Assistant Examiner* — Yuhui R Pan
(74) *Attorney, Agent, or Firm* — Weitzman Law Offices, LLC

(57) ABSTRACT

A method performed by a control unit in an array of multiple self-addressable control units arranged in at least two dimensions involves obtaining information to be used to determine a self-address, determining a self-address value based upon the information, storing the determined self-address value, based upon the self-address value, specifying first data to be provided to a next self-addressable control unit in a first group of self-addressable control units for a first dimension of the array, providing the first data to the next self-addressable control unit in the first group, based upon the self-address value, specifying second data to be provided to a different self-addressable control unit in a second group of self-addressable control units for a second dimension of the array different from the first dimension of the array, and providing the second data to the different self-addressable control unit in the second group.

19 Claims, 70 Drawing Sheets

(56) References Cited

U.S. PATENT DOCUMENTS

| | | | |
|---|---|---|---|
| 8,376,581 B2 | 2/2013 | Auld et al. | |
| 8,419,209 B2 | 4/2013 | Mai | |
| 2002/0114155 A1* | 8/2002 | Katogi | F21S 2/00 |
| | | | 362/219 |
| 2006/0035676 A1* | 2/2006 | Sayers | H01Q 1/246 |
| | | | 455/562.1 |
| 2008/0055106 A1 | 3/2008 | Zhang | |
| 2012/0099302 A1 | 4/2012 | Kim | |
| 2012/0176491 A1 | 7/2012 | Garin et al. | |
| 2012/0212953 A1 | 8/2012 | Bloom et al. | |
| 2012/0319926 A1* | 12/2012 | Koebrich | G09G 5/00 |
| | | | 345/1.3 |
| 2013/0051000 A1 | 2/2013 | Yu et al. | |

OTHER PUBLICATIONS

Huasun, "Zeus-18 Features." (2013).

Huasun, "Zeus-18 Product Specification" (2013).

Huasun, "Zeus-37 Product Specification" (2013).

Metts, BlinkyTape:The LED Strip Reinvented (www.kickstarter.com/projects/740956622/blinkytape-the-led-strip-reinvented?ref=search (approx. May 2013).

Holmes, "The World's Largest Real-time Interactive Light Sculpture" (thecreatorsproject.vice.com/blog/sydney-harbour-bridge-light-sculpture) (May 2013).

B. Muset, et al., "Distance Measuring Using Accelerometer and Gyroscope Sensors", Carpathian Journal of Electronic & Computer Engineering, vol. 5, pp. 83-86 (2012).

Kionix, Using Two Tri-Axis Accelerometers for Rotational Measurements, Application Note AN 19 (2008).

M. Bouet, et al.., "RFID tags: Positioning principles and localization techniques," Wireless Days '08, 1st IFIP, pp. 1-5 (Nov. 2008).

Tuck, "Tilt Sensing Using Linear Accelerometers", Freescale Semiconductor Application Note AN3461, Rev. 2, (Jun. 2007).

Fasinternational s.r.l., "Monitoring of Power Transformer Winding Temperature Using Robust Fiber Optic Sensing System" Luxtron Paper WTS03-01 (available at www.fasint.it/pdf_formazione/Monitoring_HV_Power_T_using_Fibreoptics.pdf) (approx 2006).

P. Cignoni et al., "DeWall: A fast divide and conquer Delaunay triangulation algorithm in Ed", Computer-Aided Design, vol. 30, Issue 5, pp. 333-341 (Apr. 1998).

L. P. Chew, "Constrained Delaunay Triangulations", Algorithmica vol. 4, pp. 97-108 (1989).

D.T. Lee et al., Two Algorithms for Constructing a Delaunay Triangulation, International Journal of Computer and Information Sciences, vol. 9, No. 3 (1980).

\* cited by examiner

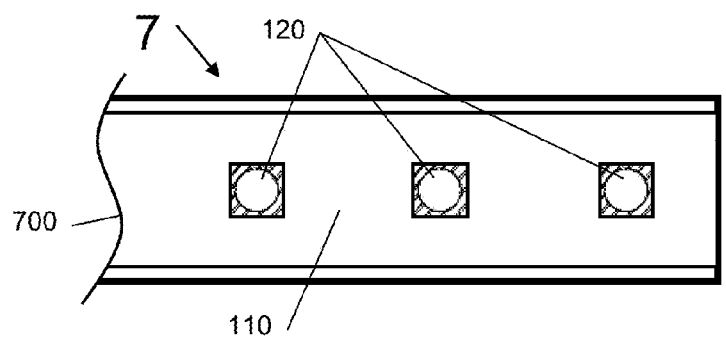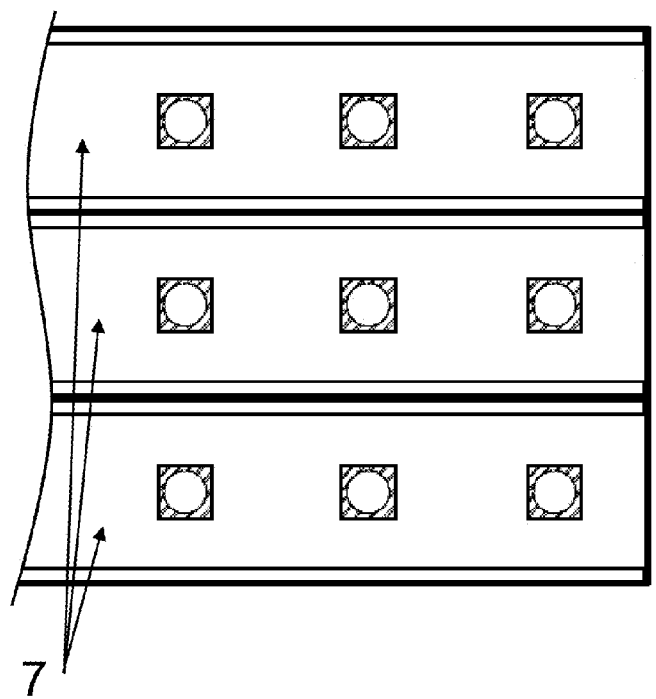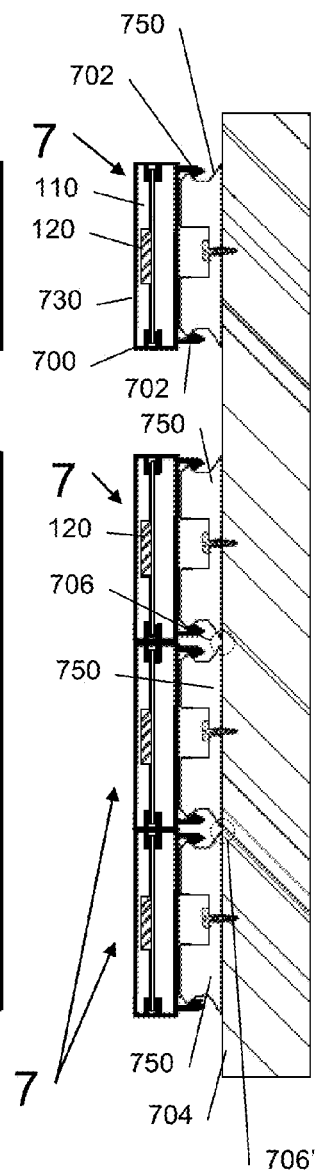
Fig 7A  Fig 7B

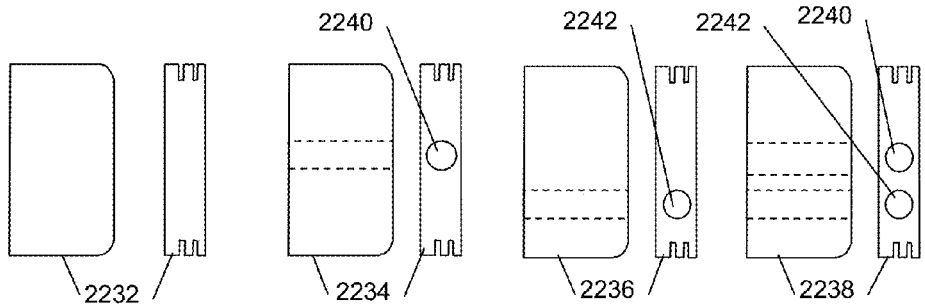
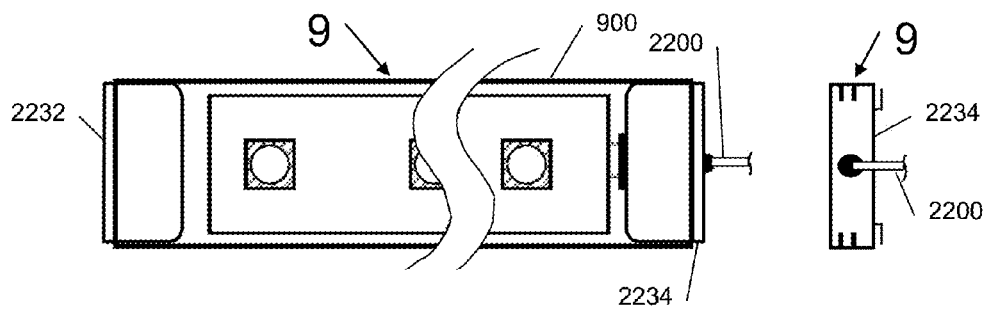
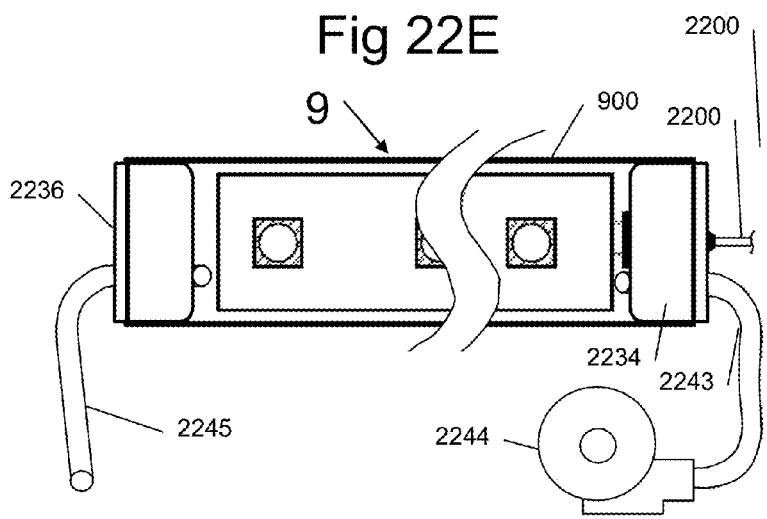

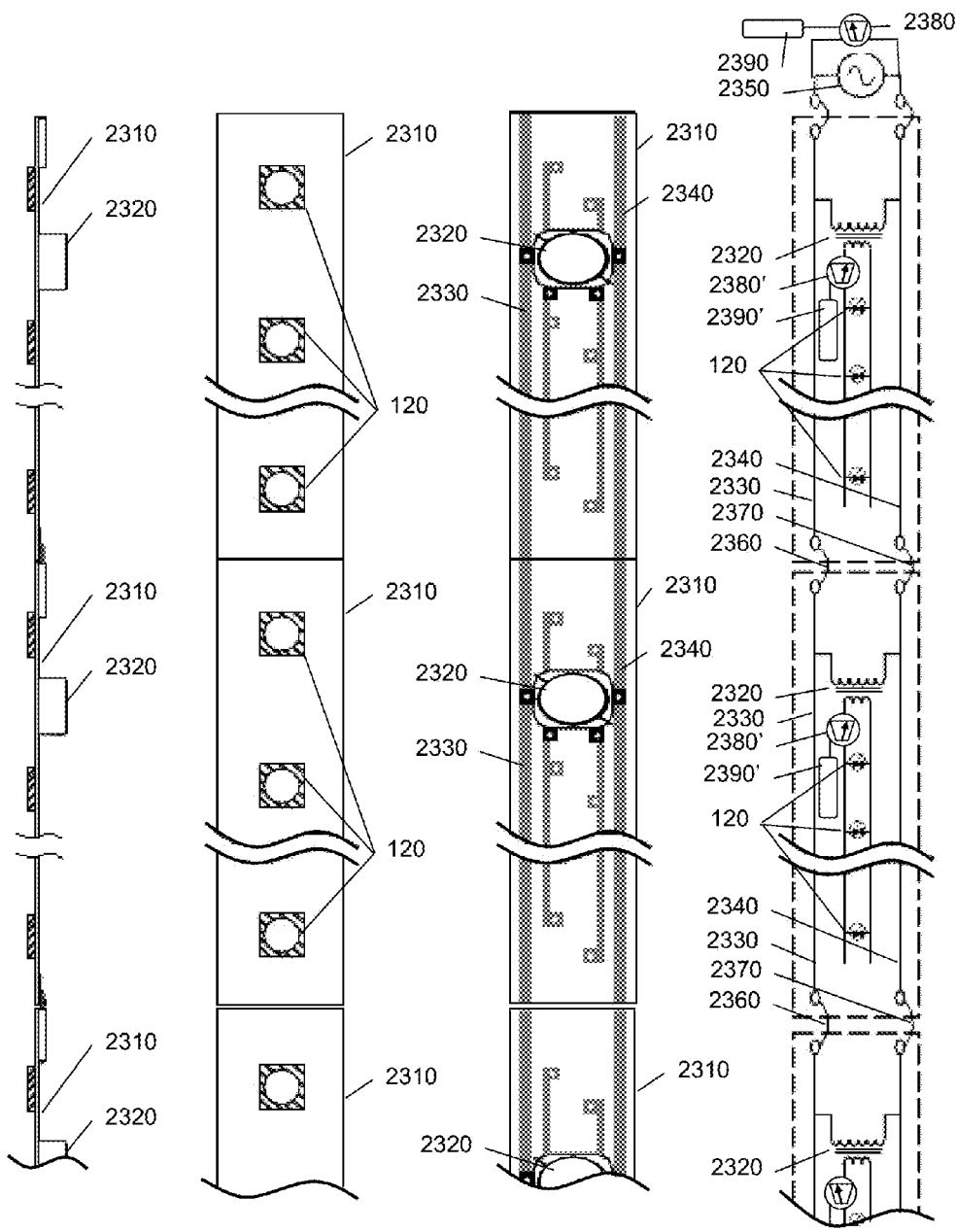

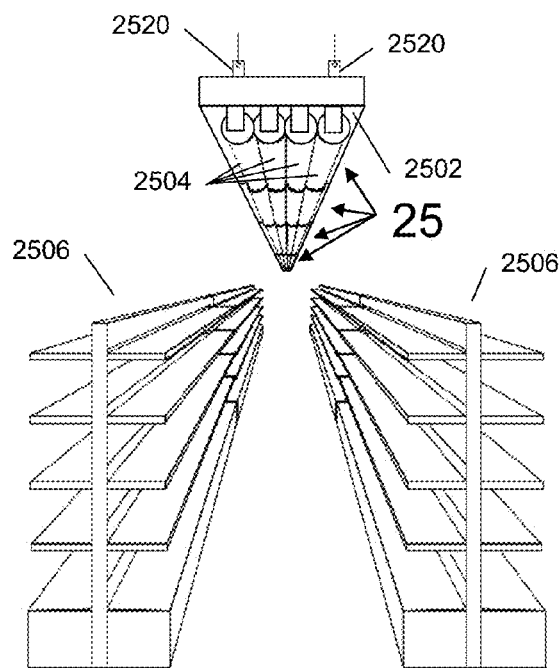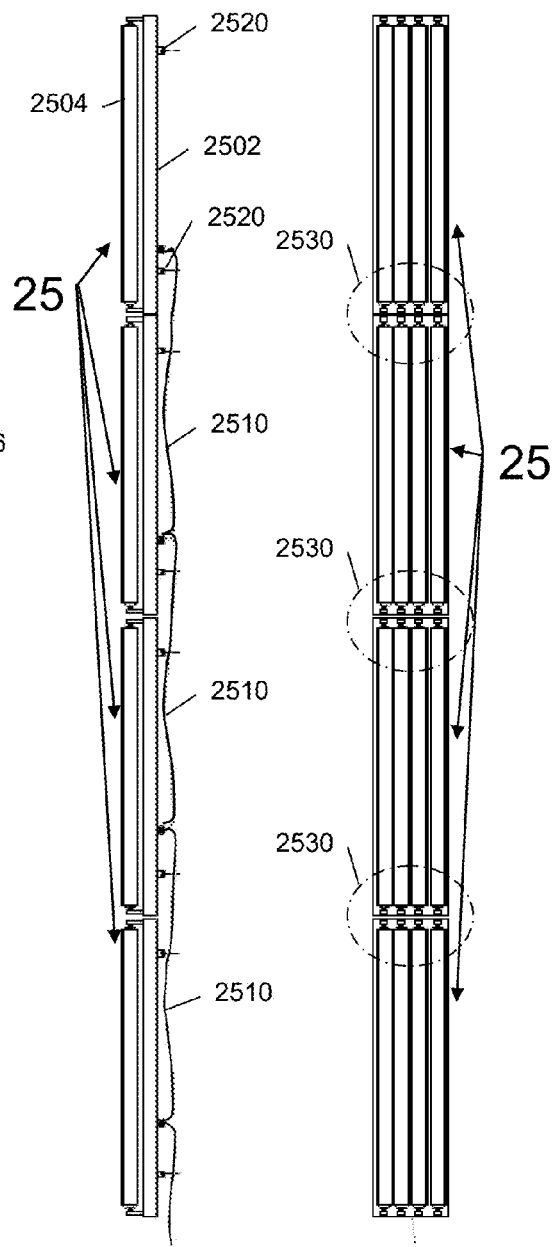
Fig 25A (Prior Art)
Fig 25B (Prior Art)    Fig 25C (Prior Art)

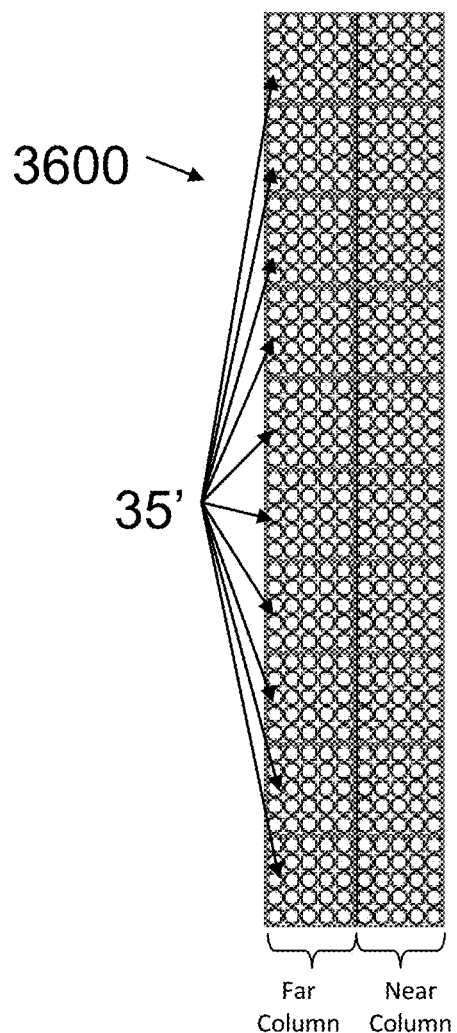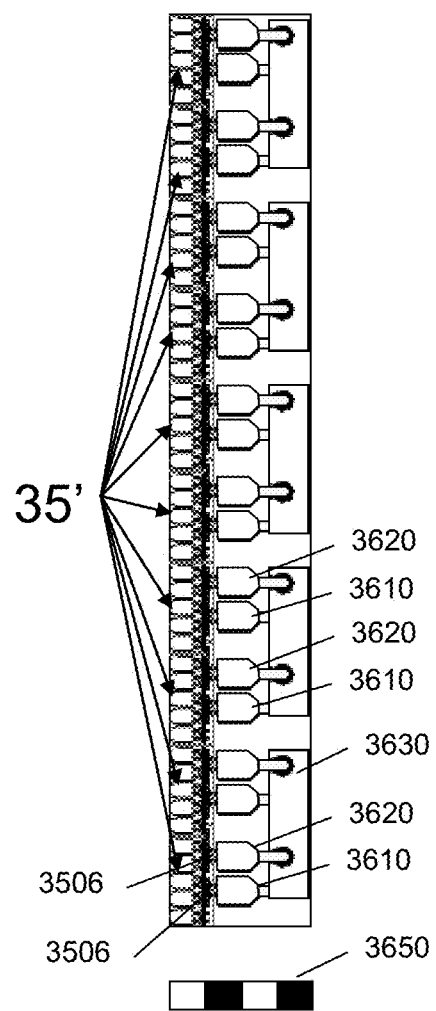
Fig 36A (Prior Art)
Fig 36B (Prior Art)

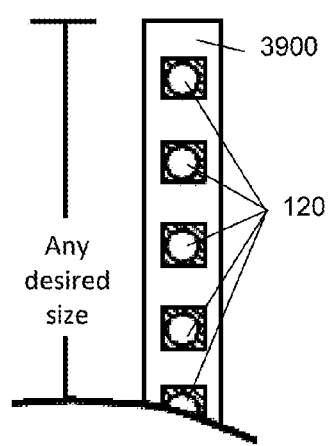
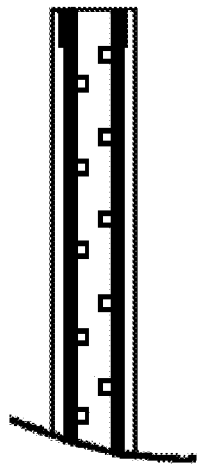
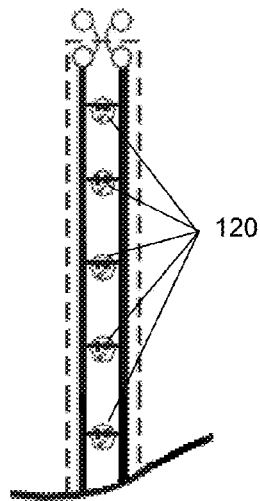
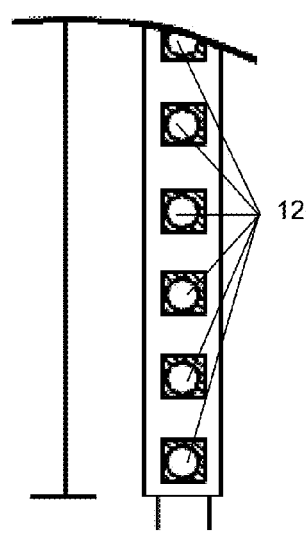
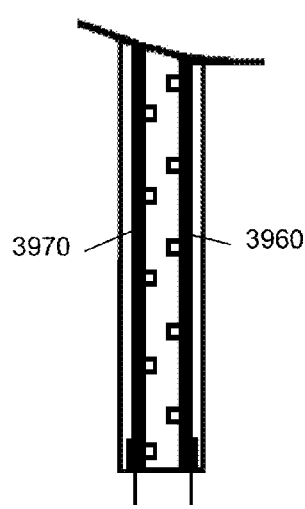
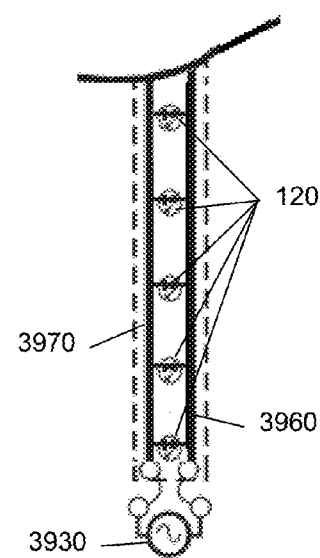
Fig 39A    Fig 39B    Fig 39C

Prior Art

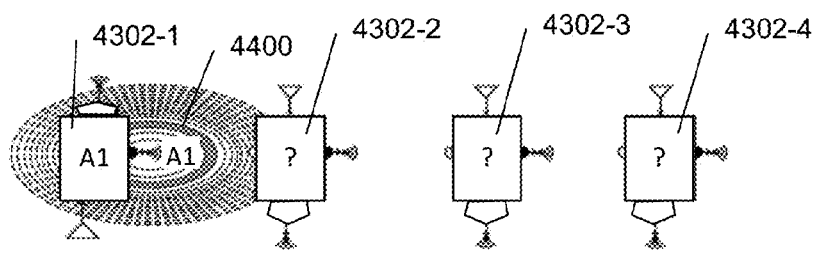
Fig 44A
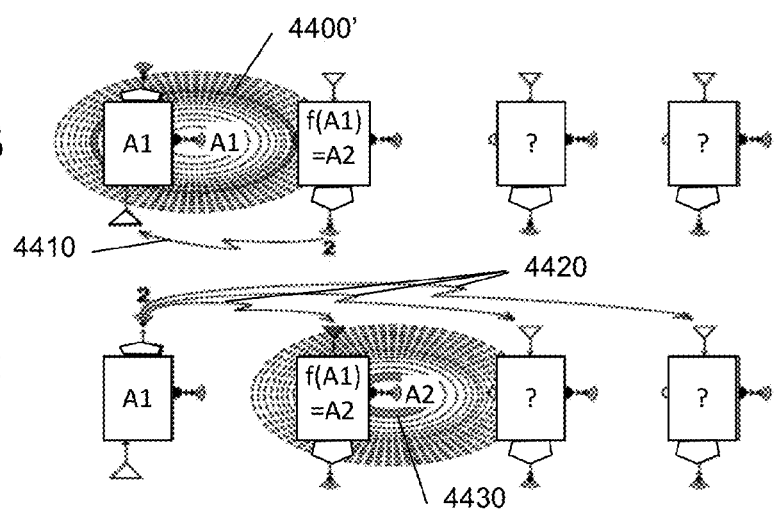
Fig 44B
Fig 44C
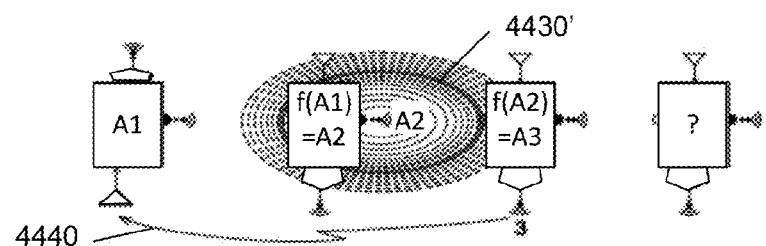
Fig 44D
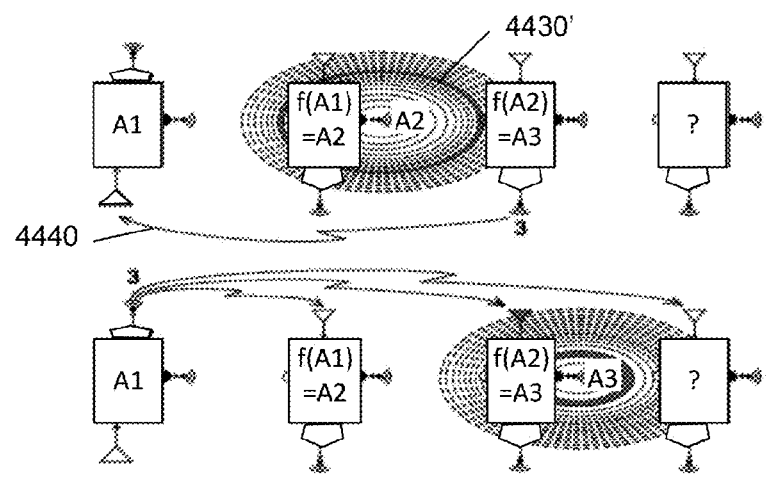
Fig 44E
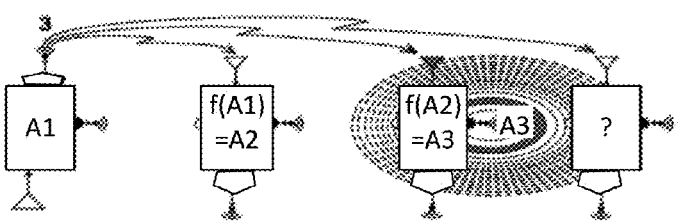
Fig 44F
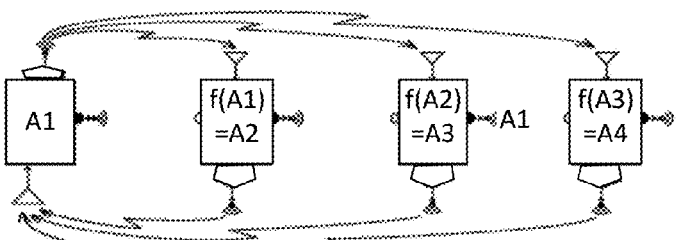

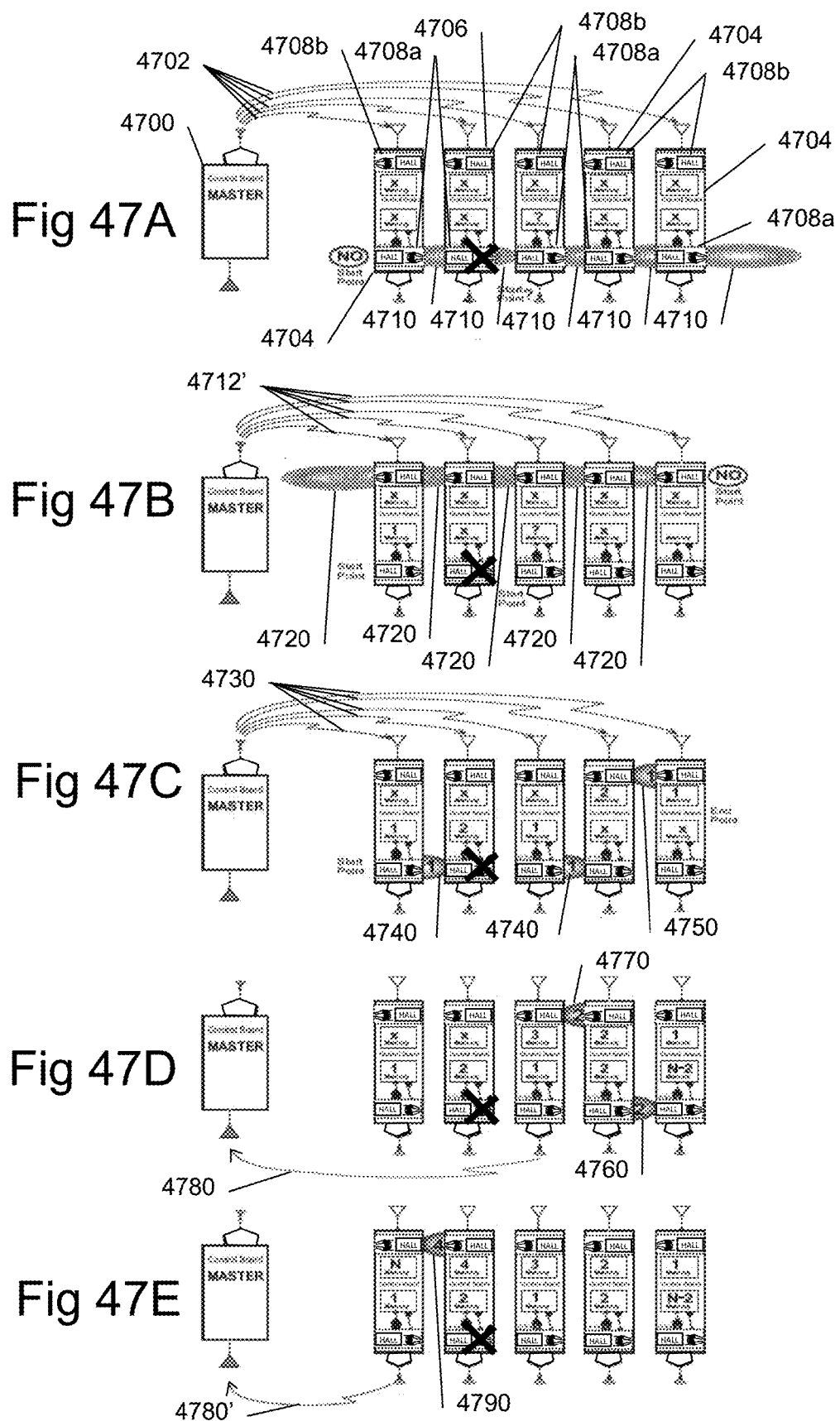

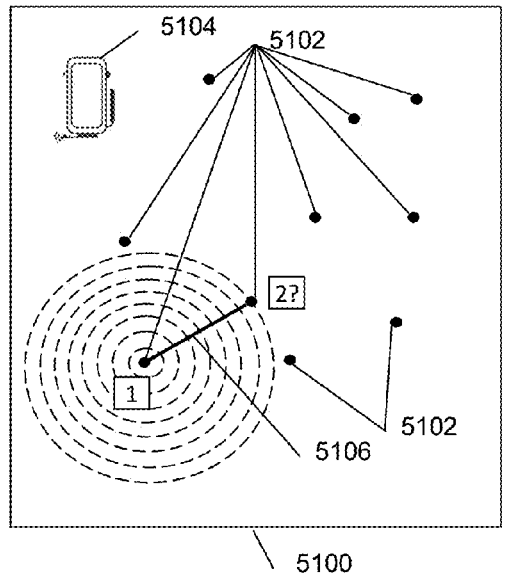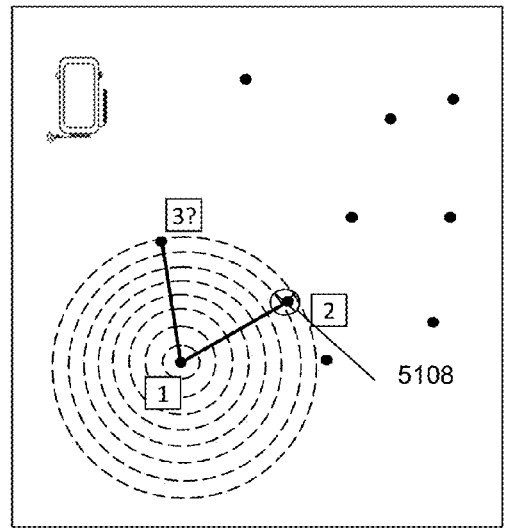
Fig 51C　　　　　　　　Fig 51D
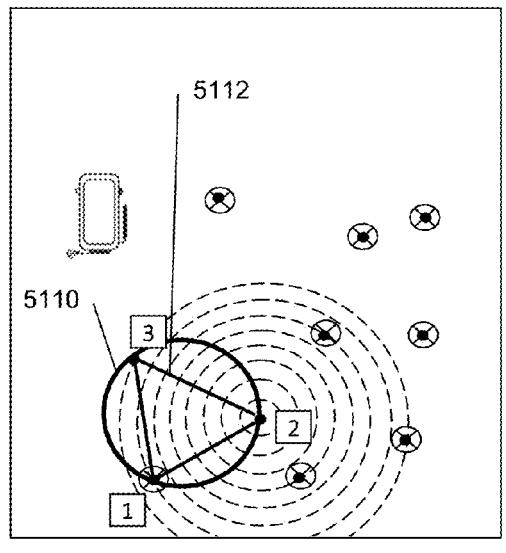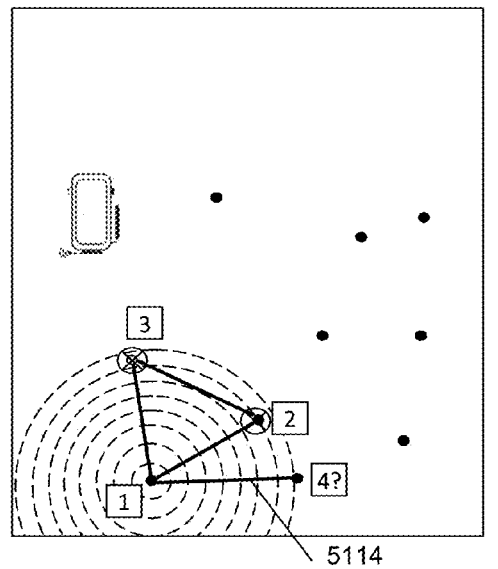
Fig 51E　　　　　　　　Fig 51F

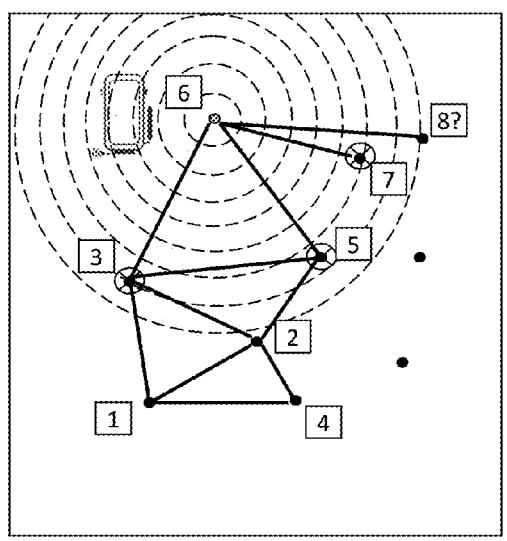 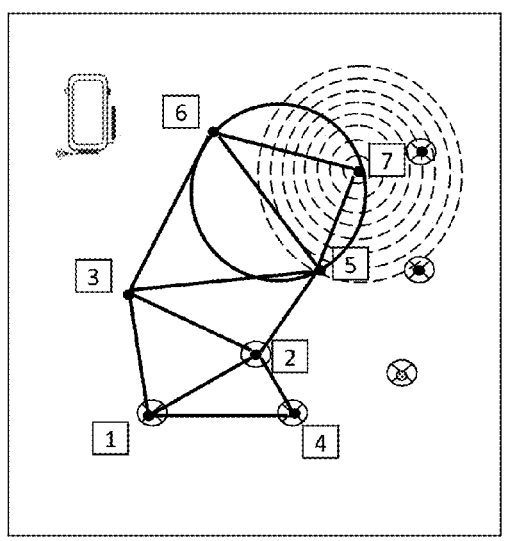
Fig 51WFig 51X

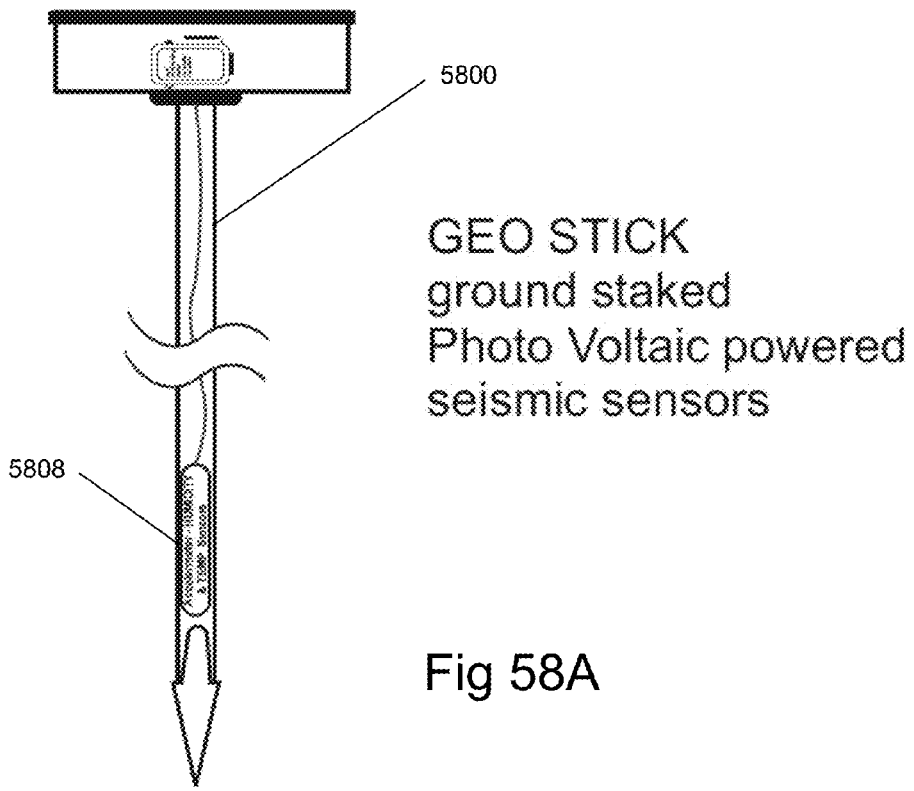
GEO STICK
ground staked
Photo Voltaic powered
seismic sensors
Fig 58A
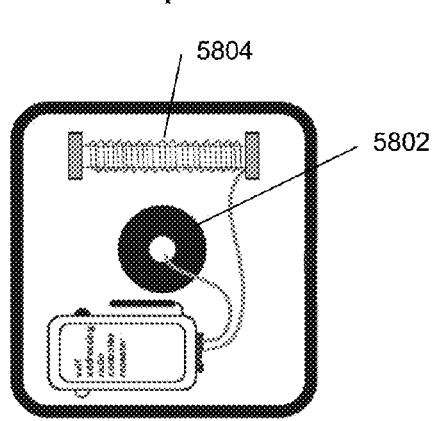
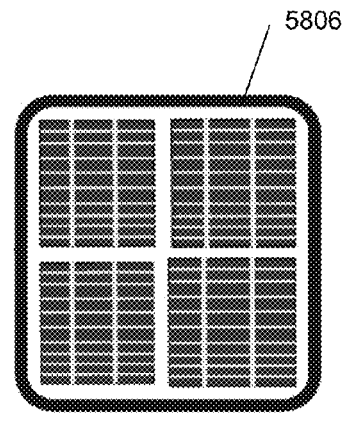
Fig 58B  Fig 58C

MODULARIZED SELF-ADDRESSING APPARATUS AND METHOD

FIELD

The present application relates to lighting displays and, more particularly, to signs capable of displaying graphics.

BACKGROUND

During the 1964-65 New York World's Fair, at the General Electric pavilion "Carousel of Progress", they simulated the dream home of the future in an exhibit called, "The glories of today". The dream home featured: a glass-enclosed and electrically heated patio; a central "weather-tron" cooling system (a predecessor to today's air conditioning); a kitchen that all but runs itself, with a dishwashing machine; a washer/dryer that actually folds up the clothes; a central home vacuum system; a TV with a hand control unit and the ability record video built in; and special broadcast where people would be learning Greek and Latin over the air (a predecessor to today's internet).

However, not only did the home have special appliances and features but they envisioned special lighting and display systems built right into the walls and windows that they simulated including: translucent walls that changed colors to set moods, entire walls that would evenly light up the room, and high tech windows that would show beautiful outdoor scenery, even if it was raining outside.

While many of the speculated special appliances and features are now in our modern homes (excluding the washer/dryer that also folds clothes), the passage of time has failed to achieve the house of the future related to lightweight, thin, uniform, wall lighting and large, thin, affordable, scenic windows.

Instead, over 50 years later, what the passage of time has brought us is not thin, light, affordable lighting, but instead, large print billboards that are being replaced by even larger and complicated graphical LED displays.

As a result, large screen graphical displays are becoming increasing popular. As they become increasingly popular, in order to standout, advertisers want bigger and bigger graphical displays. However, those displays are made up of individual frames so that, as the scale increases so do the number of frames and the time required to calibrate the frames. In addition, those frames must be serviced from either the front or the back and, given the size, often require a huge bucket truck to do so. In order to decrease calibration time, the frame sizes have been increased; however, this increases the cost of replacement parts and also requires additional wiring, adding significant weight. Another big factor to the use of larger frames becomes display thickness. Larger frames require bigger power supplies mounted directly behind them and these bigger power supplies not only force the display thickness to be bigger but also require additional space for cooling and maintenance, and in some cases forced air-cooling or air conditioning as well.

Simply scaling current sign technology makes the sign so heavy that it typically cannot be supported without either building an extensive external support structure or significantly affecting the quality of the display.

Therefore, there continues to be a need for lighting and graphical displays that do not suffer from one or more of: being limited in length or width, added display thickness, requiring extensive and/or extra wiring to meet power needs, requiring heat sinks or air conditioning to dissipate excess heat when the displays run at peak power, requiring service from either the front or the back, requiring complex lensing or tedious calibration in order to provide a uniform display, having excessive weight that requires adding extra support, being subject to localized effects of expansion and contraction and/or display density/resolution issues.

SUMMARY

One aspect of the claimed invention involves a longitudinally alignable system of tubes configured to allow printed circuit boards to be slidably inserted into them with the orthogonal orientation maintained by board supports.

Additional aspects may involve one or more of the foregoing combined with one or more of the following optional additional aspects: the translucent face being substantially perpendicular to the anticipated viewing angle of a viewer; the transparent face being angled to prevent the reflection of the light being emitted from a vehicles headlights from being reflected back at a driver; the entire tube being translucent; the tube along its length is waterproof; the tube along its length is still waterproof even after it has been attached using one or more attachment extensions; the tube is sealable at one or both of its ends; a seal at the end of a tube allows one or more of the following: data, electrical connection, or coolant to pass into (and as appropriate out) of the tube; a coolant exchange system for cooling the interior of the tube; the attachment extension being configured to allow two tubes to be longitudinally adjacent to each other with any one or more of: a known gap, a minimized gap or an articulating connection; an attachment extension configured to allow an unobstructed view through the transparent face of the tube; a support structure that facilitates mounting to another structure with one or more of: a known gap, a minimized gap, an angled orientation, or while providing an unobstructed view through the transparent face of the tube; one or more louvers on a tube that are any one of: integral, permanently affixed, or removably affixed; louvers that include electrically connected photovoltaic cells (and/or power storage) for the collection (and/or storage) of energy; one or more base units slidably inserted into a tube from one end; a base unit including one or more luminaire; luminaire having one or more of the following: a single LED; a incandescent bulb; a halogen bulb; a fluorescent bulb; the LED, incandescent bulb, halogen bulb and/or fluorescent bulb being colored red, green, or blue; an array of LEDs; an array of LEDs further comprising at least one red, one green, and one blue colored LED; or an array of LEDs further comprising multiple red, green, and blue colored LEDs; the base units are able to pass electrical energy between adjacent base units: directly, by capacitive coupling or inductive coupling; base units include components that convert and/or store energy transmitted from another base unit for later use by a luminaire; one or more solar cells within a tube or on a louver and configured capture energy from light for use by a luminaire; the base unit can further include an energy storage device; the energy storage device is configured to store energy during non-peak hours for use during peak hours; the energy storage device is configured to store energy from photovoltaic cells for later use; the base units are configured to be connectable to adjacent base units; the connection between adjacent base units comprises one or more of the following: a mechanical interconnection, an electrical interconnection, a connection through matingly interconnectable components, a connection through which data can be passed, wired interconnection or a wireless interconnection; the base units are configured to transmit data, receive data or both transmit and receive data through one or more of a wired or wireless channel; a wireless channel including a wireless transmitter receiver pair; the wireless transmitter receiver pair can be a Hall effect transmitter receiver pair; base units include memory storage configured to store video information; the memory has sufficient capacity to store an entire video; the base unit is configured to implement the technique of synchronized stored video; a base unit can further comprise a control unit that is addressable; the control unit can be addressable through one or more of: fixed addressing, independent addressing, location-based independent addressing; location-based independent addressing can be based upon one or more of: physical location, relative location, coordinates obtained by a GPS or similar technique, information obtained through the use of radio bubbles, or computational techniques; the computational technique can be a triangulation technique; the triangulation technique can include a Delaunay triangulation algorithm; the triangulation technique can involve two or more dimensions; the addressable control unit can be configured to receive instructions broadcast to it; the addressable control unit can be configured to act only on instructions specifically addressed to it; the addressable control unit can be configured to control the illumination displayed by one or more of the luminaire; the addressable control unit can be addressable as part of a multidimensional system; the multidimensional system a multidimensional in system, a multidimensional out system, or both a multidimensional in and multidimensional out system; the addressable control unit can be configured to monitor for changes in its location; the addressable control unit can be specifically configured to monitor for changes in at least one of its physical or its relative location, the addressable control unit can be configured to monitor for changes in its location in one or more dimensions; the addressable control unit can be configured to dynamically readdress itself based upon a location change; the addressable control unit can be configured to determine if it is the first control unit in a group; the addressable control unit can be configured to determine if it is the last control unit in a group; the addressable control unit can be configured to temporarily self-address through a predetermined algorithm, when it does not receive address information that meets a pre-defined criteria; the temporary self address can include parameters related to address information that the addressable control unit did receive.

Another aspect involves a display including multiple co-aligned longitudinal tubes, each having a translucent face, and multiple sequentially interconnected base units; where each base unit has at least one self-addressing control unit and at least one luminaire and at least one base of the sequentially interconnected base units per tube is configured to be self-addressed both within each tube and among the co-aligned longitudinal tubes.

Additional aspects may involve one or more of the foregoing combined with one or more of the following optional additional aspects: at least one master/slave unit in each tube; at least one of the control units can be the master/slave; the multiple sequentially interconnected base units within each tube can move slidably within their tube; multiple base units within an individual tube can be configured to allow them to slidably move longitudinally as unit; at least two of the multiple co-aligned longitudinal tubes can be interconnected to allow for articulation between those tubes; at least one of the control units in the tubes is configured to communicate with a master control unit; at least one power supply configured to supply power, as part of a parallel circuit, to two or more of the multiple sequentially interconnected base units; a transformer configured to convert power supply power into a power level appropriate for a luminaire; one or more louvers on a tube that are any one of: integral, permanently affixed, or removably affixed; the louvers can include electrically connected photovoltaic cells (and/or power storage) for the collection (and/or storage) of energy.

Another aspect involves a method performed by a control unit that self-addresses based upon information that it receives and then transmits data to other control units that are part of a multidimensional array of control units.

Additional aspects may involve one or more of the foregoing combined with one or more of the following optional additional aspects: at least two of the dimensions of the array are orthogonal; the receiving of information is through one or more of a wired or wireless channel; the transmitting of data is through one or more of a wired or wireless channel, the transmitting of information it to at least two separate control units and in at least two separate dimensions; the data transmitted is one or more of the same data in each dimension; different data in each dimension; the self-address of the control unit; a mathematical manipulation of the self-address of the control unit; or based on other information that the control unit has access to such as its location; location being one or more of either actual or relative location; the self-address of the control unit is generated based on one or more of a mathematical function or lookup table using the information received; the information received includes one or more one or more of: physical location, relative location, coordinates obtained by a GPS or similar technique, information obtained through the use of radio bubbles, or computational techniques; the computational technique can be a triangulation technique; the triangulation technique can include a Delaunay triangulation algorithm; the triangulation technique can involve two or more dimensions; the information received is from one or more dimension, the self-address has one or more dimensions; further including triggering the self-addressing of the control unit based upon one or more of the control units startup routine, signals received from another control unit, or signals received from a master controller; and further including receiving a data stream and parsing specific records addressed to the control unit and generating a response based on those records.

A further aspect involves a method performed in a system including multiple individually controllable luminaires arranged to form a two dimensional display, with illumination of the luminaires of the display being controlled by self-addressable control units arranged in an array of at least two dimensions. The method involves providing information to a first of the self-addressable control units in a first of the at least two dimensions which will result in the first of the self-addressable control units determining an address value for itself and providing the determined address to a next control unit in a series of self-addressable control units in the first of the at least two dimensions so that the next control unit in the series can use the address value use in determining its address and pass its determined address to a next subsequent control unit in the series; receiving an indication that self-addressing along the series of self-addressable control units of the first of the at least two dimensions is complete; initiating a self-addressing sequence among a series of self-addressable control units in a second of the at least two dimensions; receiving an indication that all self-addressable control units in the array have self-addressed; and providing a stream of addressed data to the array such that, when an individual controller identifies an address in the stream that corresponds to the individual controller's self-address, the individual controller will use data associated with the address to effect controlled illumination of the luminaires the individual controller controls.

Another aspect involves a method performed by control unit that self-addresses itself based upon its location within a system and then listens to a data stream for information addressed to it and generates a response.

Additional aspects may involve one or more of the foregoing combined with one or more of the following optional additional aspects: the location based information includes one or more one or more of: physical location, relative location, coordinates obtained by a GPS or similar technique, information obtained through the use of radio bubbles, or computational techniques; the computational technique can be a triangulation technique; the triangulation technique can include a Delaunay triangulation algorithm; the triangulation technique can involve two or more dimensions; the location based information to be used to determine a self-address value includes a relative location in reference to one or more of a physical target, another control unit or a master control unit; further including tracking changes in location of the control unit and re-addressing the control unit based upon its new location; the control unit is a smart phone and the system is a concert venue; the response being the displaying information using the technique of synchronized stored video; the control unit is a geo stick and the system is a geographic area over which it is desired to monitor naturally occurring phenomena; the control unit is systems monitoring unit and the system is part of a grouping of related devices; the control unit is camera control unit and the system is part of a grouping of cameras; and the control unit is systems display control unit and the system is part of a grouping of display devices.

These and other aspects described herein present in the claims result in features and/or can provide advantages over current technology.

The aspects, advantages and features described herein are a few of the many aspects, advantages and features available from representative embodiments and are presented only to assist in understanding the invention. It should be understood that they are not to be considered limitations on the invention as defined by the claims, or limitations on equivalents to the claims. For instance, some of these aspects, advantages or features are mutually exclusive or contradictory, in that they cannot be simultaneously present in a single embodiment. Similarly, some aspects, advantages are applicable to one aspect of the invention, and inapplicable to others. Thus, the elaborated aspects, features and advantages should not be considered dispositive in determining equivalence. Additional aspects, features and advantages of the invention will become apparent in the following description, from the drawings, and from the claims.

BRIEF DESCRIPTION OF THE DRAWINGS

FIGS. 7A-7B are a front and side view, respectively, of a set of alternative variant lighting assembly implementations similar to the lighting assembly of FIGS. 2A and 2B;

FIGS. 22A-22D respectively illustrate, in simplified form, both a front and side view, respectively, of four different variant plugs that can be used as an alternative variant seal;

FIGS. 22E-22F respectively illustrate, in simplified form, a front and side view of the lighting assembly of FIG. 9 with one of the plugs inserted into each of the ends of the tube;

FIGS. 22G-22H respectively illustrate, in simplified form, a front and side view of the lighting assembly of FIG. 9 with the variant plug of FIG. 22C inserted into one end of the tube and the plug variant of FIG. 22D inserted into the other end of the tube;

FIGS. 23A-23D respectively illustrate, in simplified form, a side, front, back, and schematic representation of a series of printed circuit boards 2310 suitable for use as base units as described herein;

FIGS. 25A-25C illustrate, in simplified form, a typical prior art fluorescent lighting configuration used to illuminate inventory in a typical store aisle;

FIGS. 36A-36B illustrate, in simplified form, a prior art attempt to make a uniform 10×50 element lighting display using a standard display matrix, such as the matrix of FIG. 35B;

FIGS. 39A-39C each illustrate a tube with different length base units having different numbers of luminaires that share a common set of power rails through which a transformer can supply power;

FIGS. 44A-44F illustrate, in simplified form, a functional example of a sequence of actions making up one method of wireless self-addressing;

FIGS. 47A-47E illustrate, in simplified form, a representative example of a configuration of base units implementing multi-dimensional address reception;

FIG. 54B illustrates, in simplified form, how, by using self-addressing that inherently includes an address gap, positional changes can be accounted for;

FIG. 58A-58C illustrate, in simplified form, an independent self-addressing "geo" stick configured for self-addressing, and communicating with a master control unit, according to teachings herein;

DETAILED DESCRIPTION

Figure 1:
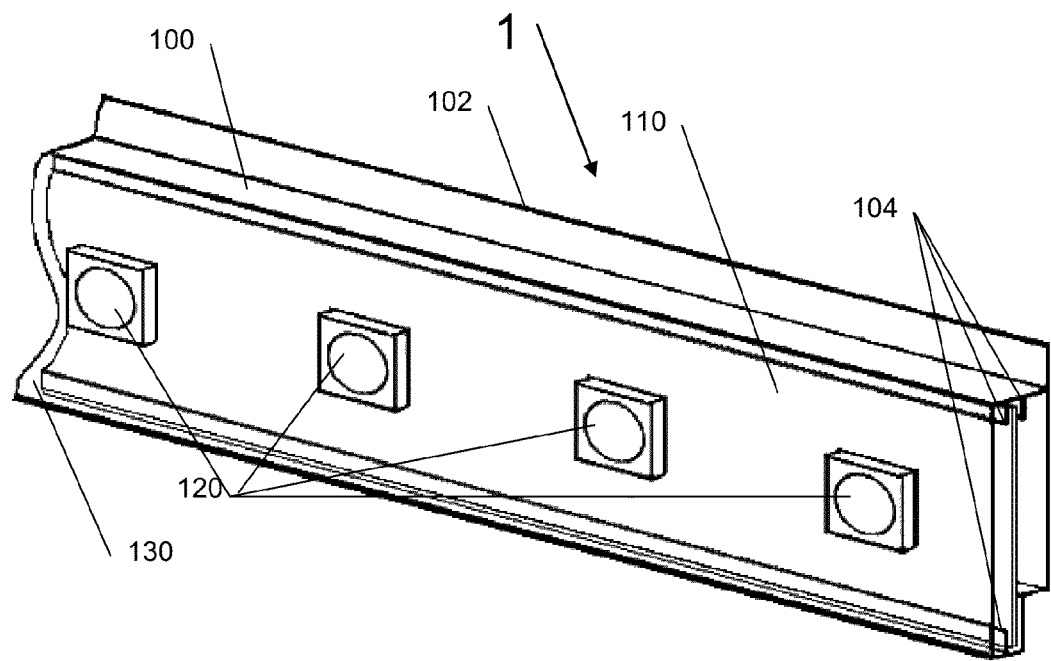
FIG. 1 is a simplified illustration of a front perspective view of one example implementation.

The instant devices and approach provide a way to build large displays from multiple luminaires in different configurations that, depending upon the particular implementation, are lighter than their corresponding-sized counterparts, are more easily configured, more easily serviced, and, as size increases, retains its image quality relative to current conventional counterparts. In addition, various self-addressing approaches are described that allow for multiple luminaires or other devices to operate in a coordinated fashion without the need for establishing and setting an address for each based upon knowledge of other devices that will also be part of the coordinated operation.

Various implementations which may contain one or more inventions, as claimed, will now be described with reference to the figures in which the same reference numeral in different views indicates the same aspect.

FIG. 1 is a simplified illustration of a front perspective view of one example implementation. Lighting Assembly 1 is made up of a tube 100 having one or more attachment extensions 102 and multiple board supports 104. Within the translucent tube 100, there are multiple base units 110, typically, printed circuit boards and mounted on the printed circuit board base units 110 s are multiple luminaires 120. Depending upon the particular type of luminaires used, the base units can merely be supporting structures for the luminaires with no electronic circuitry or wiring thereon at all, they can be supporting structures that carry physical wires or circuit boards of some type (e.g. multi-layer, multi-wire or printed). As used herein, the terms "base unit", "circuit board", and "printed circuit board" are intended to encompass all of these configurations interchangeably and have the meaning appropriate for the particular luminaires with which it is used. The luminaires 120 are lighting elements which, depending upon the particular implementation are made up of, for example, one or more individual light bulbs (incandescent, excited gas, halogen, fluorescent, electro-luminescent, or light emitting diodes (LEDs)), individual LEDs, LED arrays (single color or multiple color, including red/green/blue ("RGB") arrays), along with their associated drive or power connections or electronics. Depending upon the particular implementation, some variant luminaires may be dimmable or have selectable/variable brightness. As a result, it should be understood that, with different variants, the luminaires 120 can merely serve as lights or can act as individual pixels on a static or dynamic display.

The tube 100 is used to protect the luminaires 120 from physical damage from the exterior and/or from the elements, depending upon where the Lighting Assembly 1 may be used. The board supports 104 are used to constrain the circuit boards 110 in a fixed position within the Lighting Assembly 1 during use, and the attachment extensions 102 are used to maintain a desired orientation and spacing between, in this configuration, the front face 130 of the tube 100 and the luminaires 120.

At least the front face 130 of the tube 100 is translucent so that light emitted by the luminaires 120 can be viewed from external to the tube 100. Depending upon the particular implementation, for ease of manufacture, some implementations can be made so that more than just the face, right up to the entire tube 100 is translucent. The translucent face of the tube 100 (and some or all of the overall tube 100 itself) can be made of any translucent material, for example, glass, crystal, or translucent plastic such as an acrylic. Ideally, if an acrylic is used and the Lighting Assembly 1 will have significant exposure to ultraviolet ("UV") light like from sunlight, it is desirable that the face (and possibly the entire tube 100 have appropriate UV stability so as to not degrade to a detrimental extent from that UV exposure, which could diminish the light passing quality of the face and/or the structural integrity of the tube 100. Other suitable plastic materials that can be used for some implementations include polycarbonate and polyethylene, the important aspect of the tube 100 being the translucent nature and structural capability, rather than the particular material used for the tube. As shown in the implementation of FIG. 1, the entire tube 100 is translucent. Additionally, the body and/or face of the tube 100 maybe clear, frosted, tinted or colored as desired. In the case where the front face and body are made of separate pieces, the body need not be translucent at all and could be made of a plastic, a metal or virtually any other material, the important aspect being that the part of the tube other than the front face needs to be large enough to accommodate one or more base units slidably inserted therein such that the luminaires will be properly positioned behind the front face and appropriate clearance is available for cooling or to allow for appropriate heat dissipation.

Depending upon the particular implementation and end use, and as is the case for the translucent tube 100 of FIG. 1, the body and/or front face of the tube 100 can be manufactured as a continuous extrusion or formed using other methods such as machining, poured epoxy and/or 3-D printing, to name a few. In other cases, the face and body of the tube 100 can be made using different processes and joined together thereafter using a joining technique appropriate to the particular materials. Advantageously, using continuous extrusion, tubes of almost any length can be readily manufactured.

In many cases, attachment extension 102 and front face will be part of the continuous extruded translucent tube 100. Where this is the case for the attachment extension 102, they may run the entire length of the tube 100. However, in some cases and like the front face, the attachment extension 102 can be created via a secondary processes such as machining, or may be created separately and then joined to the main part of the tube 100, for example by gluing, melting, sonic welding, or any other joining technique suitable for the particular materials involved. Moreover, it should be understood that the attachment extension 102 need not be uniform or even present along the entire length of the tube in some implementations. Rather, it can vary or be intermittently present so long as its attachment function is preserved.

As shown in the implementation of FIG. 1, the board supports 104 rotationally maintain the position of the plurality of printed circuit boards 110 within the translucent tube 100 while still allowing the printed circuit boards 110 to move slidably so that they can be inserted and/or removed via the end of the translucent tube 100.

The ability of the plurality of printed circuit boards 110 to move slidably and to be inserted and subsequently removed from the end of the translucent tube 100 is an advantageous design feature. Traditional building mounted billboard displays must be serviced from either the front or the back of the display, which means either the display must be built out from the building façade, to allow access from the back, or, if it is to be serviced from the front, a bucket truck, gantry or carriage lowerable using davits must be available. Moreover, using a one of the variant approaches herein, digital billboards and wallscape displays can be created in sizes up to and beyond the largest common digital billboard size of 14' high×48' wide because each tube can readily exceed that width and/or height. Advantageously, being able to service such a display from the end of each tube potentially eliminates or reduces the need for such equipment and provides a more servicer-safe and/or more cost effective means of servicing the billboard display since, depending upon the orientation with which the tubes are mounted to create the billboard, they can be serviced from the top, bottom, or side(s).

Figures 2A, 2B:
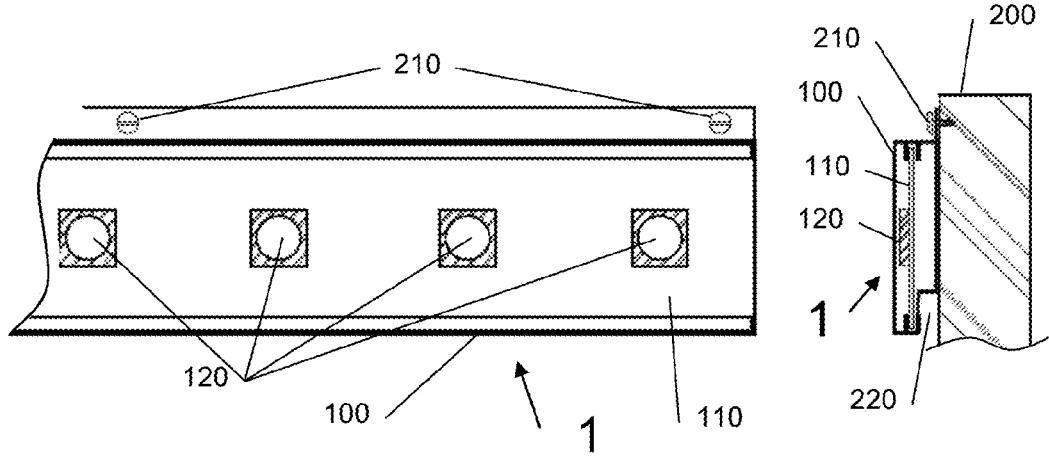
FIGS. 2A-2B illustrate, in simplified form, a front and side view, respectively, of the lighting assembly of FIG. 1, now mounted on a structure.

FIGS. 2A-2B illustrate, in simplified form, a front and side view, respectively, of the lighting assembly 1 of FIG. 1, now mounted on a structure 200 using multiple attachment aids 210. Notably, the specific configuration of the lighting assembly 1 results in an attachment gap 220, which will be described later. As shown, the attachment aids 210 are depicted as screws. However, it should be understood that any standard attachment aids appropriate to the particular intended use and support 200 to which it will be mounted can be used, such as, for example, bolts, rivets, clips, and/or adhesives, the important aspect being that the attachment aids 210 provide an appropriate type and degree of attachment, not the type or character of the attachment aids 210 used.

Figures 3A, 3B:
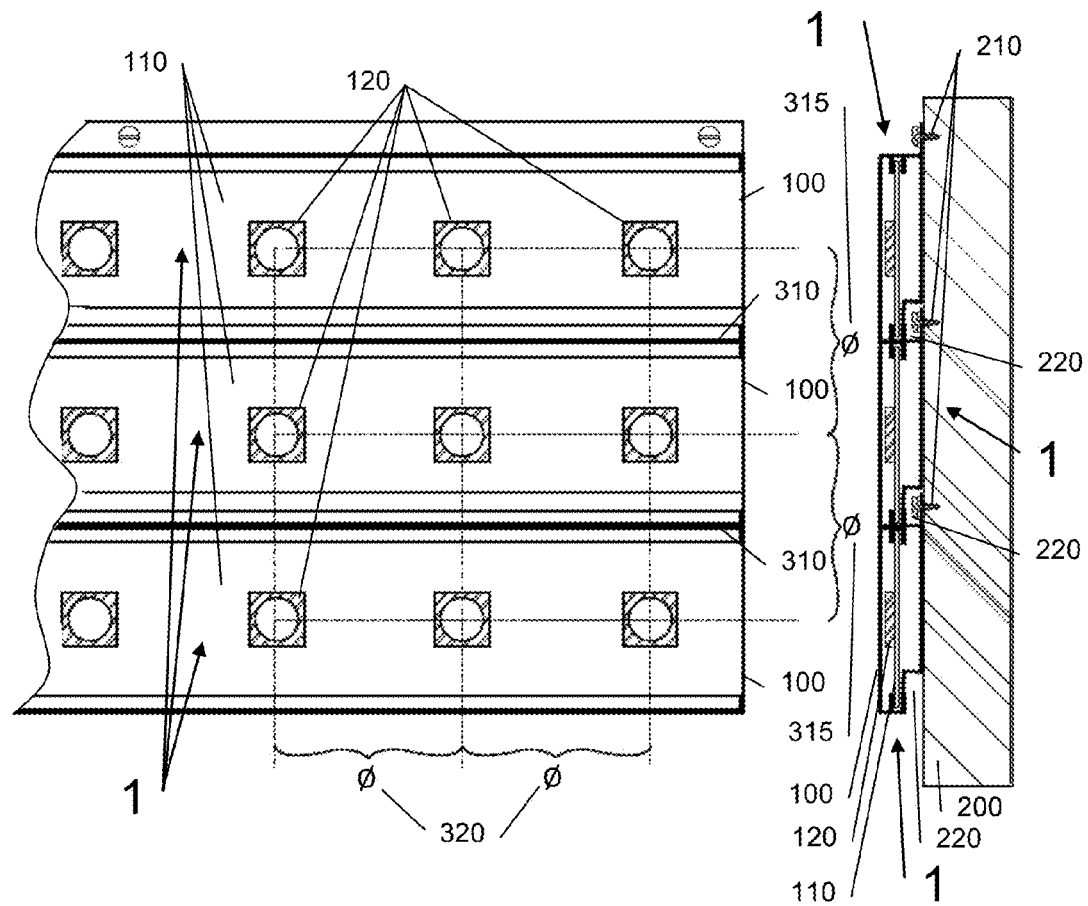
FIGS. 3A-3B illustrate, in simplified form, a front and side view respectively of the structure of FIG. 2 onto which additional lighting assemblies from FIG. 1 have been mounted.

FIGS. 3A-3B illustrate, in simplified form, a front and side view respectively of the structure 200 of FIG. 2 onto which additional lighting assemblies 1 from FIG. 1 have been mounted using attachment aids 210.

As can be seen in FIG. 3, there is a single row of luminaire per tube 100. In some implementations, the width of the tube 100 is specified such that, when mounted adjacent to another tube 100, the spacing 320 between adjacent luminaires 120 therein will advantageously be matched between the luminaires 120 in one tube 100 and the corresponding luminaires 120 of each adjacent tube 100. In other words, the center-to-center distance 320 established as "Ø" between luminaires 120 within a given tube 100 can also easily be established as a center-to-center distance 315 of "Ø" between luminaires 120 in two adjacent tubes 100 and advantageously producing a standard spacing unit. Once established this standard spacing unit can be used to produce a display that is uniformly spaced at this standard spacing unit, or at a greater spacing by simply increasing the center-to-center distance 320 and creating a corresponding mounting gap 310 such that the center-to-center distance 315 will always be equal to the center-to-center distance 320.

Additionally, in some implementations there is at least one row of luminaire 120 on the printed circuit boards 110 and the center-to-center distance 315 of "Ø" between luminaires 120 in two adjacent tubes 100 is optimized such that it the spacing between the nearest luminaire 120 in adjacent tubes 100 is minimized. In some cases, this may involve adding additional rows of luminaires 120. Once the optimally minimized spacing between adjacent tubes is established, for uniformity, the center-to-center distance 320 between luminaire 120 within a tube 100 is set so that it is equal to the optimized center-to-center distance 315 between the adjacent tubes. In other words, the maximum uniform density of luminaires 120 for a display is created by minimizing the center-to-center distance 315 between the nearest the luminaires 120 in adjacent tubes 100. One of the advantages of creating a maximum uniform density of luminaire 120 is that higher resolution displays can be created. An additional advantage is that, as the density of the luminaires is increased, the power that the luminaires 120 are run at can be reduced, while still producing the same display brightness. The ability to run the luminaires 120 at reduced power is advantageous because a reduction in power generally translates to, for example, reduced energy cost, reduced heat generation (potentially reducing or eliminating the need for ancillary cooling measures and/or equipment and heat-related degradation, failures and maintenance, again saving cost), and also it can significantly prolong bulb life which may likewise translate into reduced service requirements and cost savings.

As can now be seen in FIG. 3, attachment gap 220 advantageously provides a space for, and can obscure, the attachment aids 210 of the adjacent tube 100. Thus, due to fact that attachment gap 220 exists, it is possible to minimize the spacing 310 between tubes 100 to match the in-tube 100 spacing Ø between adjacent luminaires 120 and allows for use of techniques such as the edge-butting technique shown. An additional advantage that can be achieved by some implementations of this approach is that the center-to-center distance between luminaires of adjacent tubes 120 resulting from accommodating the size of each luminaire 120 within a tube 120 can be minimized and used to establish the inter-luminaire 120 spacing within each tube 120. An advantageous byproduct of this approach is that a denser/richer display can be created than can be created conventionally. A further advantage of this approach, as well as others that will be discussed, is that the way it can be mounted allows for an unobstructed view through the front face of the tube.

Figure 4A:
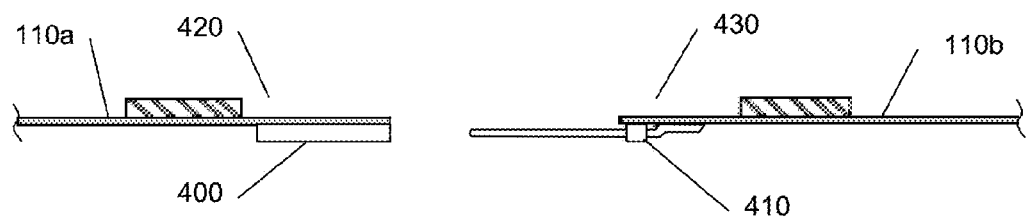
FIGS. 4A-4B respectively illustrate, in simplified form, side views of adjacent ends of two printed circuit boards which would be installed, for example, in a tube as described herein.
Figure 4B:
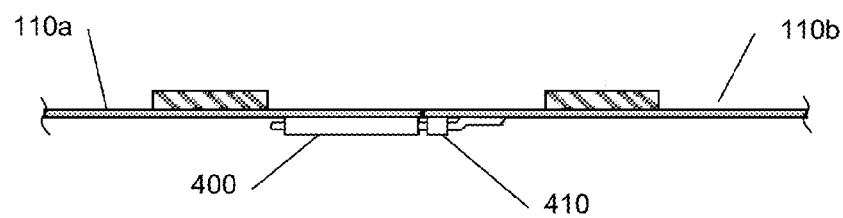
Figure 4C:
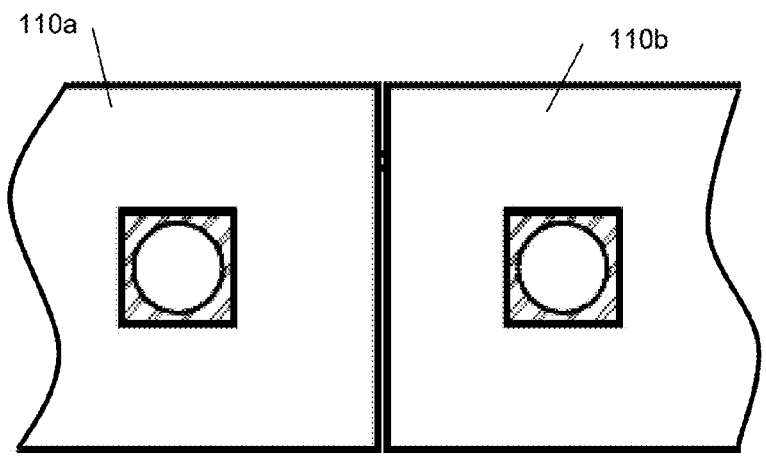
FIG. 4C illustrates, in simplified form, a top view of the boards of FIG. 4B.

FIGS. 4A-4B respectively illustrate, in simplified form, side views of adjacent ends 420, 430 of two printed circuit boards 110a, 110b, which would be installed, for example, in a tube as described herein, such as the tube 100 of FIG. 1. As shown, the end 420 of one printed circuit board 110a contains an electrical connector 400 and the end 430 of the other adjacent printed circuit board 110b contains a correspondingly mating electrical connector 410. The connectors 400 and 410 provide electrical (and optionally optical and/or other forms of) connectivity between the adjacent circuit boards 110a, 110b to allow for passage of, for example, address and data signals and power therebetween. FIG. 4A shows these two circuit boards 110a, 110b immediately before they are connected to each other and FIG. 4B shows the same boards 110a, 110b after they have been connected to each other by mating the connectors 400, 410. FIG. 4C illustrates, in simplified form, a top view of the boards 110a, 110b of FIG. 4B (i.e. after they have been connected together using the connectors 400, 410).

As shown in FIG. 4A, the connector 400 is a female connector and the connector 410 is a male connector. Of course, it should be recognized that this is not critical. Just as readily, the connector 400 could have been a male connector and the connector 410 could have matingly then been a female connector. Moreover, it should be understood that the boards 110a, 110b need not be connected by mating connectors or physical inter-connectors at all. The boards 110a, 110b could be connected by any other approach or technique that allows for electrical board-to-board interconnection. For example, with some implementations, the boards could be connected for signal passage purposes, using capacitive or inductive coupling, and maintained in proximity by the board sizing or, for example, one or more appropriate sized magnets on the end 420 of one circuit board 110a and one or more opposite poles of similarly sized magnets on the opposite end 430 of the adjacent board 110b. Likewise, signals can be passed and/or the boards could be connected for signal passage purposes, by any other types of connections including those used to pass optical signals.

Indeed, throughout the description herein, it is to be understood that any reference to a wired connection or signal passage should be understood to encompass any type of connection over which such power or signals can be passed, which shall include, but not be limited to optical signals via air or optical fiber, and any way used to pass signals, including using any wavelength signal in the electromagnetic spectrum appropriate for the application and any transmission medium or media.

One advantage to the use of female and male connectors 400, 410 is that they not only provide an electrical interconnection between the printed circuit boards 110a, 110b but also concurrently provide a mechanical connection between them as well.

At this point, it should be understood that the terms "male" and "female" used in conjunction with reference to connectors are not intended to represent a specific connector configuration, but rather are merely used to specify a general class of connectors in which mating parts are joined together such that at least a portion of one is constrained within at least a portion of another.

Figure 5A:
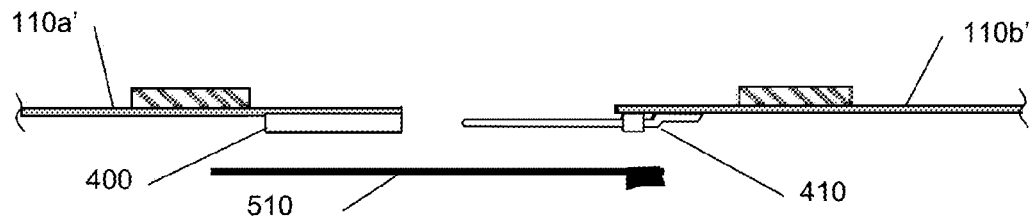
FIGS. 5A-5B respectively illustrate, in simplified side view, two printed circuit boards that are similar to the circuit boards 110a, 110b of FIG. 4 but differ in that they have one or more optional physical connection receptacles at each end.
Figure 5B:
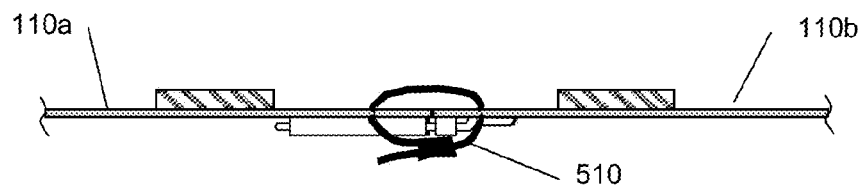

One advantage to providing a mechanical connection between the printed circuit boards 110a, 110b, whether or not it is integral with the electrical connection between boards 110a, 110b, is that the boards 110a, 110b are able to expand and contract as a unit and therefore still maintain uniform board-to-board spacing. This highlights a further advantage that can be achieved by using board supports 104 that are channel-shaped as in FIG. 1. By using channel-shaped board supports 104, the printed circuit boards 110a, 110b are not constrained in their longitudinal direction, so they are able to move slidably, both when inserted into the tube 100 and during expansion and contraction. This is a valuable advantage because current display approaches produce localized distortions due to non-uniform expansion and contraction. Additionally, the under board placement of the connectors 400, 410 shown and afforded by this approach allows for full engagement of the connectors 400, 410 that minimizes or eliminates any visible gap between the boards 110a, 110b, which can help approach or obtain maximum optical balance, regardless of how many boards or are inserted into a given tube 100. A further valuable advantage to this approach is that it minimizes or eliminates the dark shadows normally present with standard display units and, in particular, those requiring heat sinks. FIGS. 5A-5B respectively illustrate, in simplified side view, two printed circuit boards 110a', 110b' that are similar to the circuit boards 110a, 110b of FIG. 4 but differ in that they have one or more optional physical connection receptacles 500 at each end. These optional physical connection receptacles 500 provide for an alternative or additional way of mechanically connecting the two circuit boards 110a', 110b' when, for example either, the electrical connectors do not provide any or adequate mechanical connection between boards, for example, when using capacitive or inductive coupling, or wire connections such as wiring harnesses and flexible circuit connections. Alternatively, the receptacles 500 can be electrically wired so that, in addition to forming a mechanical connection between adjacent boards, with a suitable conductive clip or jumper, they can be used to transfer power or signals from board to board instead of, or in addition to, any electrical connector that might be used.

Figure 5C:
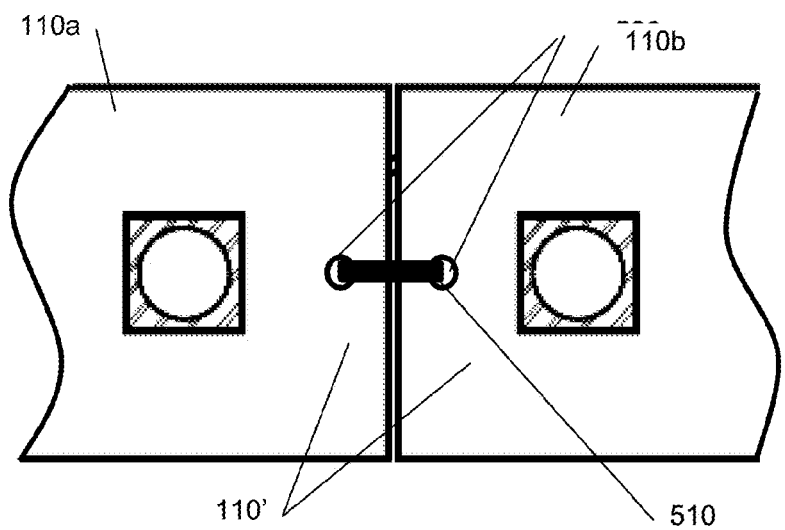
FIG. 5C illustrates, in simplified form, a front view of the boards of FIGS. 5A and 5B.
Figure 6A:
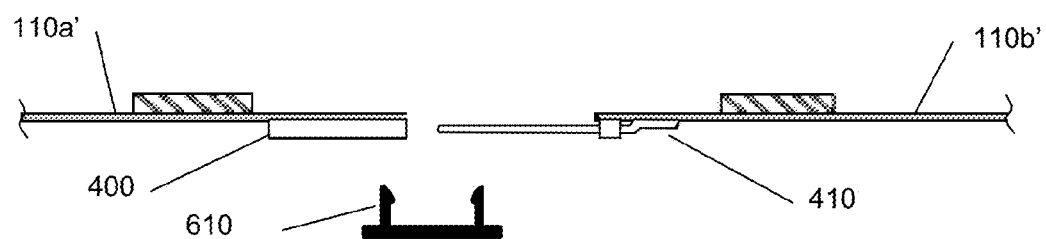
FIGS. 6A-6B illustrate, in simplified form, a side view.
Figure 6B:
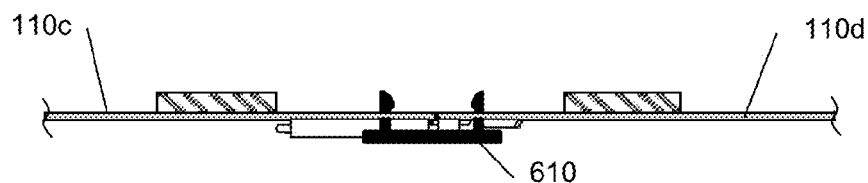
Figure 6C:
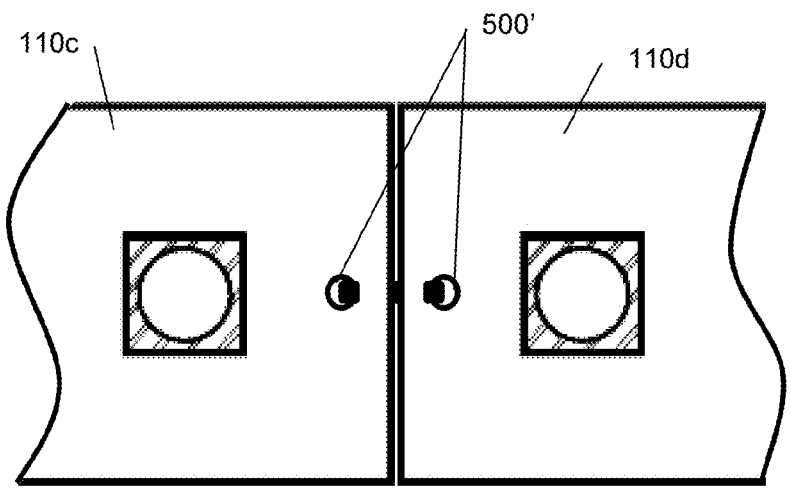
FIG. 6C illustrates a front view, of boards which are similar to the boards of FIGS. 5A-5C.

FIG. 5A shows these boards pre-connection and FIG. 5B shows these boards post-connection. FIG. 5C illustrates, in simplified form, a front view of the boards 110a', 110b' of FIGS. 5A and 5B. As shown in FIGS. 5B and 5C, the mechanical connection between the boards 110a', 110b' is provided by a wire tie 510 inserted through a receptacle 500 on two adjacent boards and tightened until the desired degree of spacing and rigidity of connection is achieved. FIGS. 6A-6B illustrate, in simplified form, a side view, and FIG. 6C illustrates a front view, of boards 110c, 110d, which are similar to the boards 110a', 110b' of FIGS. 5A-5C, but these boards 110c, 110d have two or more receptacles 500' in each board and the boards 110c, 110d of FIGS. 6A and 6B are connected with a "U"-shaped clip or connector 610 that can be inserted into two or more of the holes on one board 110c and, correspondingly, two or more holes on an adjacent board 110d to physically hold the two together.

It is important to note at this point that the particular type of mechanical interconnection, if any, used is not critical to the operation or understanding of the instant approach. The wire tie 510 and "U"-shaped clip or connector 610 are intended to merely be representative of some type of secondary mechanical connector that may be used to provide a physical board-to-board connection, and other forms of secondary mechanical board-to-board connections can likewise be used, such as a hinged connections, hook and eye connections, spring clips, and even a slot into which a part of an adjacent circuit board can be inserted and maintained with a locking tab or catch. Moreover, although the receptacles 500, 500' have been shown as round holes, depending upon the particular interconnection, the receptacles 500, 500' could have any shape, circular, oval, slotted, rectangular, triangular, regular or complex, and, in some implementations, they might not be present at all, for example, slot/tab or slot/catch approach or by providing one or more posts on each circuit board that can be coupled together by one or more bands, clips, etc. Likewise, any number of receptacles can be used, from one to as many as would reasonably fit and be needed to accomplish the desired joinder of the two boards for a particular use.

The use of a mechanical connection between adjacent boards allows for simplified serviceability from, for example, the side of the display, particularly when the display is made up of many multi-luminaire boards within each individual tube 110 thus eliminating the need to deploy bucket trucks or cranes to service the display of luminaires, irrespective of the length of an individual tube and the number of boards longitudinally contained therein. Alternately, in some implementations that do not include mechanical connection between boards, it may not be possible to pull the boards out for service from one end of a tube. Advantageously, in many cases, advantages achieved by the instant approach are not lost, although it may be necessary to push the boards from one end of a tube to cause them to slide out the opposite end to service them using some form of pole or other auxiliary means.

FIGS. 7A-7B are a front and side view, respectively, of a set of alternative variant lighting assembly implementations similar to the lighting assembly 1 of FIGS. 2A and 2B except that, as shown in FIGS. 7A and 7B, the lighting assembly 7 lacks attachment extension 102 and attachment gap 220. Instead, tube 700 of FIGS. 7A and 7B have one or more alternative attachment extensions 702 configured to allow attachment of the tube 700 to structure support hardware 750. In all other respects, the tube 700 and the tube 100 can be formed in the same manner. Note here that, as with tube 100, the front face 730 is shown as flat. This is merely for simplicity of explanation. As will be seen below, and should be understood, the particular shape used for the translucent front face is irrelevant, it could advantageously therefore be flat, curved, undulating, concave, convex, etc. or any other shape as desired or dictated by other factors such as the particular intended use, manufacturability, the internal components, the material(s) being used, cost, etc.

Returning to FIGS. 7A and 7B, in contrast to the lighting assembly 1 of FIGS. 2A and 2B, rather than mounting directly to a supporting structure by attachment extensions, the tube 700 is indirectly attached to a supporting structure 704 via structure support hardware 750. In this regard, the lighting assembly 7 includes attachment extensions 702 on the tube 700 that are configured to connect to the structure support hardware 750 after the structure support hardware 750 has first been attached to an underlying structure 704 by, in the particular implementation shown, snapping the tube 700 into place using the attachment extensions 702. Advantageously, the structure support hardware 750, being separate from the tube 700, can be made of any appropriate material, can be longer of shorter than the corresponding tube(s) 700 with which it/they will be used, designed to be affixed to an underlying structure 704 by any affixation approach appropriate to the particular use including, for example, screws, bolts, nails, hooks, clips, adhesive, channels formed in the underlying structure, etc. Additionally, the structure support hardware 750 may further be designed with corresponding straight or mating edges so that rows of the structure support hardware 750 can be installed such that they butt against one another to thereby automatically act as a form of display registration for row of tubes 700 by ensuring a known and/or pre-established spacing between successive rows. A further advantage to using a configuration of attachment extensions 702 and structure support hardware 750 such as shown, is that it allows the tubes 700 to be installed directly from the front or, in some cases, longitudinally, by engaging the two at one end and sliding one of the tubes relative to the other in a longitudinal direction.

Figure 8:
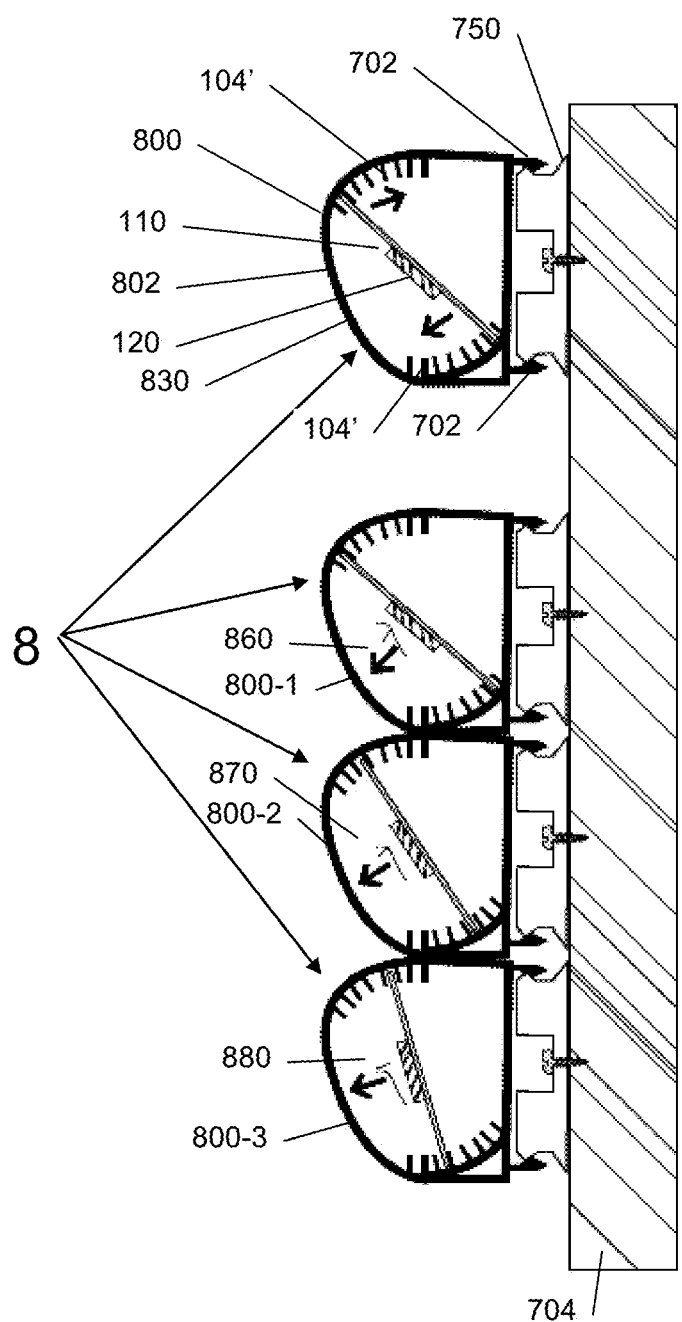
FIG. 8 illustrates, in simplified form, a side view of yet another alternative lighting assembly variant similar to the variant of FIGS. 7A and 7B except that the tube of FIG. 8 has a front face that is curved and optionally includes at least two corresponding pairs of board supports.

FIG. 8 illustrates, in simplified form, a side view of yet another alternative lighting assembly 8 variant similar to the variant of FIGS. 7A and 7B except that the tube 800 of FIG. 8 has a front face 802 that is curved and optionally includes at least two corresponding pairs of board supports 104' that allow the printed circuit boards 110 containing the luminaires 120 to be inserted therein in a stable manner as described above. The optional different pairs of board supports 104' also advantageously allows the printed circuit boards 110 to be inserted into a tube 800, or different tubes 800, at different orientations relative to the underlying structure 704, thereby providing an easy way to produce differing viewing angles 860, 870, and 880 either within a tube 800 and/or between rows of tubes 800-1, 800-2, 800-3. At this point, it should be noted that, most implementations will include multiple pairs of opposing board supports, with each pair of board supports 104' will be oriented within the tube such that they run parallel to the longitudinal axis of the tube. However, this is not a requirement. With some implementation variants, one side of the tube may have multiple board supports while the opposite side will have, for example, a lesser number or even a single board support that can accommodate different tilt angles of an inserted base unit inserted into any one or more of the multiple board supports on the opposite side. Likewise, with some implementation variants, it may be desirable to form board supports within a given tube at an angle relative to the tube's longitudinal axis. In this manner, for example, tubes of a display can be mounted on the wall (or ceiling) of a hallway parallel to the wall (or ceiling) for aesthetics, but the displays within the tube can be angled for better viewing by persons traversing the hallway.

The ability to adjust viewing angle is advantageous and particularly useful as displays get larger and larger because, due to the optical characteristics, it may be very desirable to adjust the viewing angle so that it is optimized along some or all of the length and/or height to avoid a phenomena known as "display wash-out", in which a viewer is unable to clearly see the edges of a display.

Figures 9A, 9B:
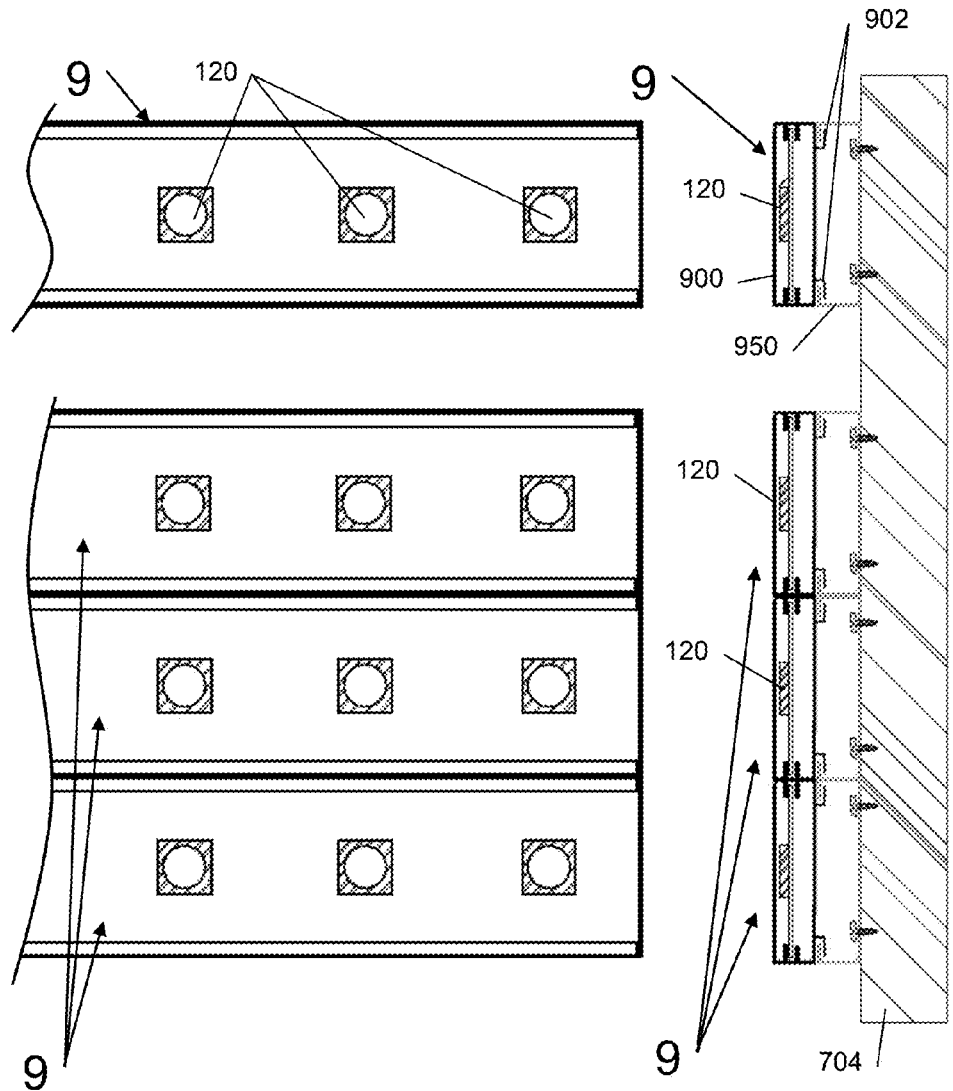
FIGS. 9A-9B are a front and side view, respectively, of still another alternative variant lighting assembly.

FIGS. 9A-9B are a front and side view, respectively, of still another alternative variant lighting assembly 9 similar to those discussed above made up of a tube 900 having one or more attachment extensions 902 configured to attach to structure support hardware 950 that, like the structure support hardware 750 can be separately attached to an underlying structure 704. However, as shown, the attachment extensions 902 are configured to slidably engage a corresponding portion of the structure support hardware 950 using, for example, a longitudinal tab on one and a longitudinal channel on the other or vice versa. As with the configuration of FIGS. 7A and 7B, this configuration allows for installation of a tube 900 by longitudinally sliding it onto the structure support hardware 950 from an end, but it does not allow for insertion or removal from the front.

Likewise, with this variant, the structure support hardware 950 is configured to butt against each other for purposes of registration as with FIG. 7B and FIG. 8.

Up to now, with each of the variants, the structure support hardware 750, 950 has been configured such that the orientation of the respective tube(s) would be generally parallel to the underlying structure 704. However, it should be understood that this need not be the case. For example, the tube 100 of FIGS. 1, 2A, 2B, 3A, and 3B could have been formed at an angle that allowed the tube 100 to be attached to an underlying structure 200 while orienting an inserted printed circuit board at an angle to that structure 200, either longitudinally, orthogonally or in some combination thereof.

Figure 10:
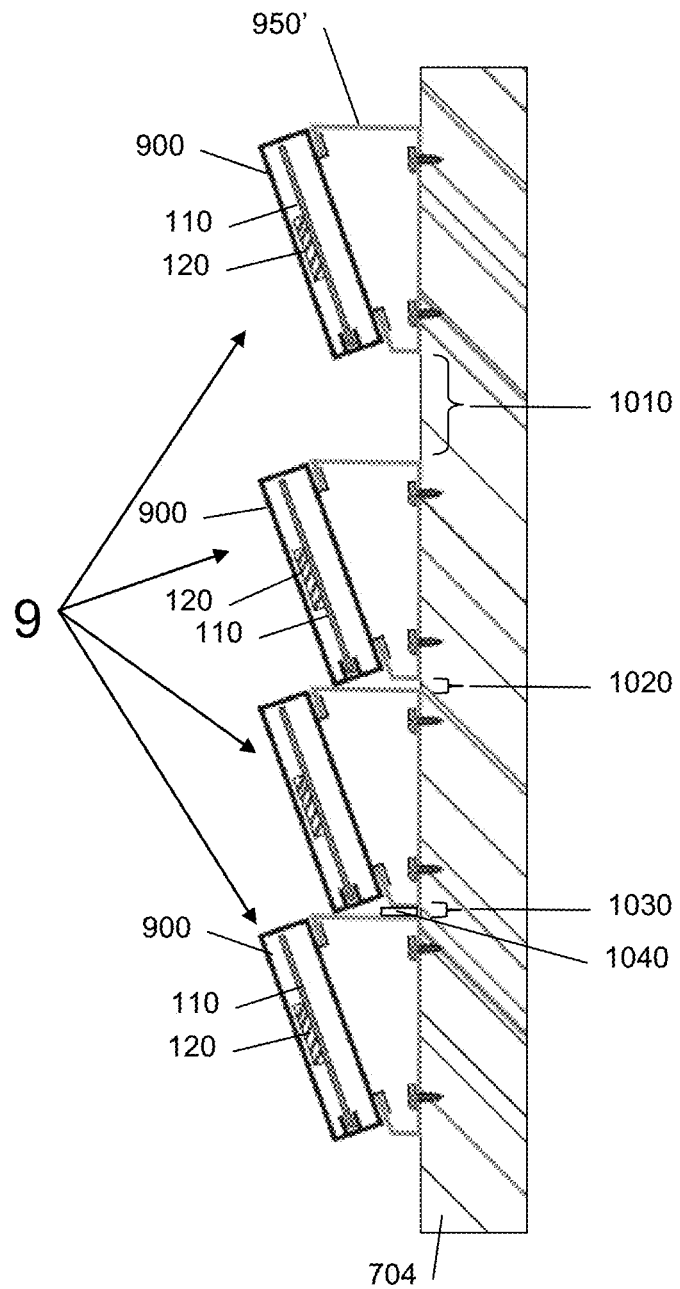
FIG. 10 illustrates, in simplified form, a side view of the lighting assembly of FIGS. 9A and 9B mounted to an underlying structure.

FIG. 10 illustrates, in simplified form, a side view of the lighting assembly 9 of FIGS. 9A and 9B mounted to an underlying structure 704 by alternative variant structure support hardware 950' that is similar to structure support hardware 950 except, rather than mounting a lighting assembly 9 parallel to the underlying structure 704, the variant structure support hardware 950' of FIG. 10 allows the tubes 900 to be mounted at an angle offset from parallel to the surface of the underlying structure 704. Thus, it should be understood that this variant configuration could be used as an alternate way of preventing "display wash-out" because, by varying the dimensions of the structure support hardware 950' various orientation angles for the boards 110 can likewise be produced.

In contrast with the structure support hardware 950 of FIG. 9, as can be seen in FIG. 10, successive rows of structure support hardware 950' may not be able to be abutted against each other, resulting in, for example, mounting gaps 1010, 1020, 1030. In this particular case, as shown in FIG. 10 the mounting gaps 1010, 1020, 1030 are due to interference between tubes 900 of successive lighting assemblies 9. In this particular case, registration can also be accomplished by using a spacer 1040 (only one of which is shown) of appropriate size that can be temporarily or permanently inserted between adjacent structure support hardware 950' units to establish proper spacing between them and, consequently the rows of tubes 900. Advantageously, in this way, by using the same or different sized spacers within the gaps 1010, 1020, 1030 issues like display washout can be addressed for a particular location or configuration without requiring manufacturing of different size or shape structure support hardware. Similarly, with some variants, spacers can be integrally formed on the structure support hardware, although that provides less flexibility than separate spacers allow. As an intermediate approach, different protruding tabs can be separately formed on the external surface of the structure support hardware as spacers such that an installer can have the option among different standard spacings by merely removing the tabs for the undesired spacing. Moreover, for installer convenience, a set of standard separate spacers could be made available as a tool along with a short length of untabbed structure support hardware to allow an installer to determine the desired spacing prior to removing any tabs from the actual structure support hardware to be installed.

Figure 11:
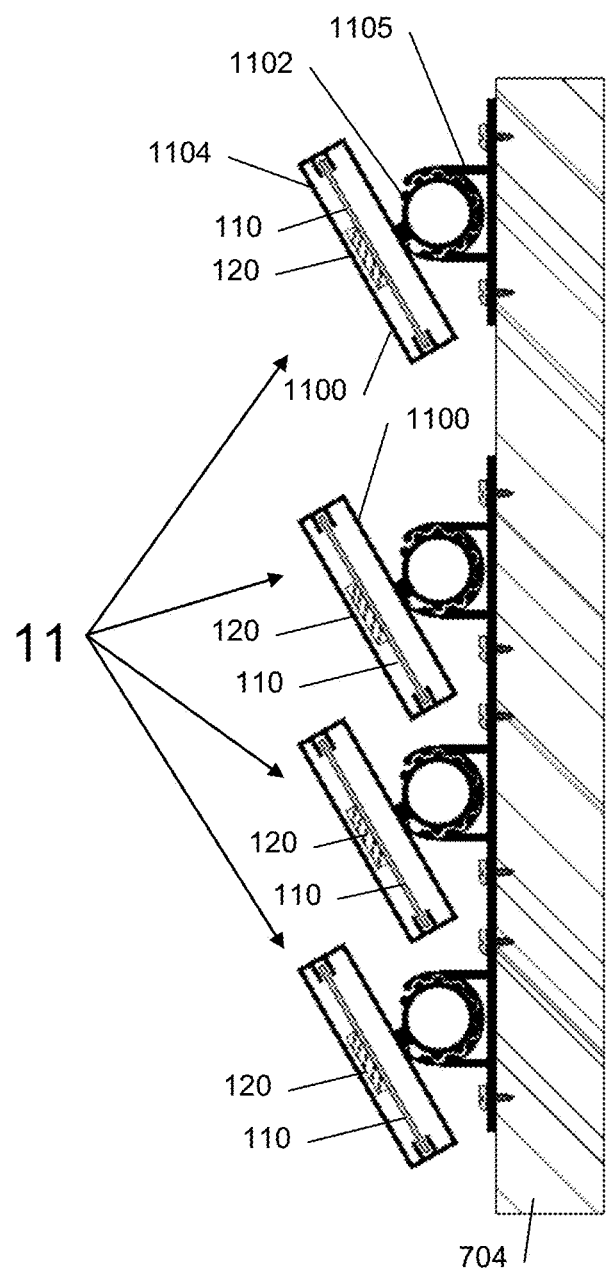
FIG. 11 illustrates, in simplified form, a side view of an additional variant implementation.

FIG. 11 illustrates, in simplified form, a side view of an additional variant implementation. As shown in FIG. 11, the lighting assembly 11 is made of a translucent face 1104 of a tube 1100 configured to accept a base unit 110 having one or more luminaires 120 thereon longitudinally inserted therein. The tube 1100 further includes one or more variant attachment extensions 1102 that are configured to matingly couple to alternative variant structure support hardware 1105.

As shown, the attachment extension 1102 is configured as a cog with an exterior surface having knurling, protrusions, rounded bumps or teeth thereon. The structure support hardware 1105 is configured with a mating formation on its inner surface such that the attachment extension 1102 part of the tube 1100 can be slid into structure support hardware 1105 at any one of various orientations. In a slightly different variant of this particular configuration, the attachment extension and structure support hardware could be configured using a "ball and socket" type design as well. Alternately, with some implementation the attachment extension 1102 may be pressed into place in the structure support hardware 1105 from the front, if the structure hardware 1105 is sufficiently flexible and resilient to allow doing so. Likewise, if the support structure hardware is appropriately flexible and resilient, this variant can allow for the tube 1105 to be attached to the underlying structure 704 in one position and later be replaced, or reoriented to a different position, at a later time without altering the position of the support structure hardware. Additionally, depending upon the particular implementation, with some variants, the positioning and fit between the two can be merely maintained by their geometry and/or friction, with other variants, positioning and fit may involve use of some form of known pinning, locking or clamping mechanism, the important aspect being that the attachment extension and structure support hardware, in combination, allow for variability of placement of the tube 1100 even after the structure support hardware has been mounted to a supporting surface.

As should now be appreciated FIGS. 8, 10, and 11 represent a few example techniques by which the same luminaires can easily be oriented at any of various different viewing angles through use of different configuration tubes or tube-mounting hardware. However, it should be understood that, by no means are they the only way that such angles can be achieved. For example, varying the angle of the luminaire and/or its mounting on a base unit may be used as well, as can changing the placement of a single set of board supports within the tube.

Figure 12A:
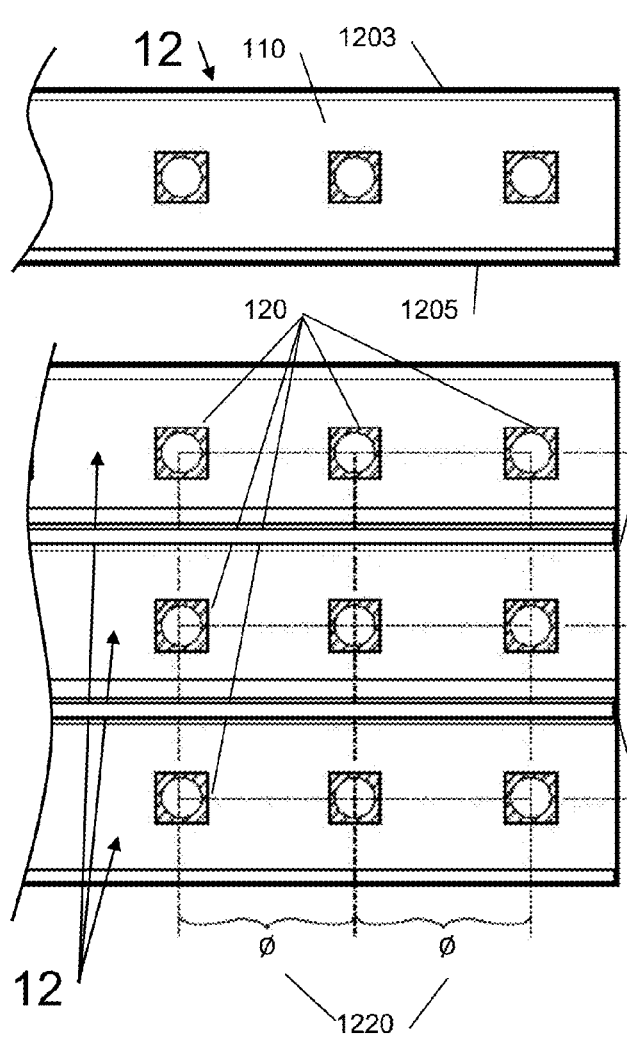
FIGS. 12A-12B illustrate, in simplified form, are a front and side view, respectively, of yet an additional variant implementation.
Figure 12B:
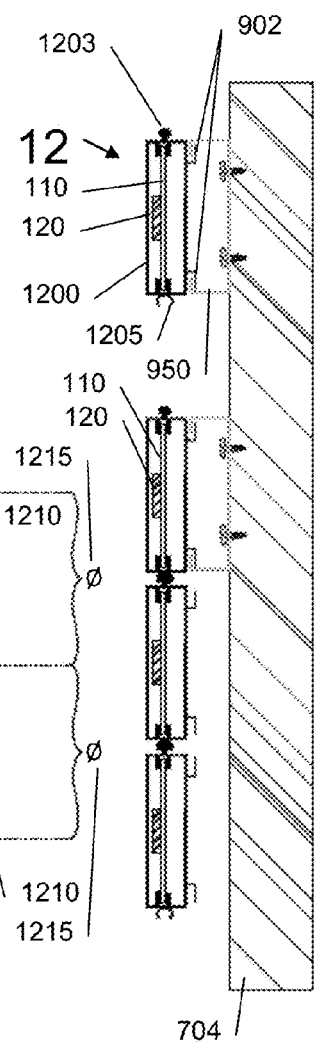

FIGS. 12A-12B illustrate, in simplified form, are a front and side view, respectively, of yet an additional variant implementation in which a lighting assembly 12, comprised of one or more luminaire 120 and its associated base unit 110 are housed in an associated translucent-faced tube 1200. With this variant, the tube 1200 further includes two or more attachment extensions 902, 1203, and 1205 located on different parts of the tube.

As shown, the tubes 1200 of FIG. 12B are configured with one set of attachment extensions 902 that can be used to attach that tube to an underlying structure 704 by, for example, the structure support hardware 950 of FIG. 9B.

Advantageously, with this variant, subsequent adjacent rows need not connect to the underlying structure 704 by their own structure support hardware, they can be interconnected to an adjacent tube using one of attachment extensions 1203 and 1205. In this particular case, attachment extensions 902 and structure hardware 950 are illustrated as a round bar and cylindrical sleeve that allows the bar on one tube to be longitudinally slid into the sleeve of another tube, but it should be understood they are simply representative of one particular type of attachment extension pairing that can be used to indirectly attach a tube to an underlying structure 704. It should be understood and appreciated that any form of mating geometry that allows for longitudinal sliding attachment can be used. Likewise, with some variants of this configuration, the attachment extensions can be configured such that they can be matingly connected from a direction orthogonal to the longitudinal direction, for example, in the case of FIG. 12B, from the bottom in a snap-in-place manner or from the front, using, for example, a hook and catch, interlocking hanging channels or other hanger mechanisms. However, it should be noted that where such hanging type connection is to be used, the attachment extensions must be configured such that they can support the weight of whatever number of tubes will hang form them. In this regard, it should be noted that one way to mitigate the need for overly large attachment extensions which, for some intended uses, might result in detrimentally large spacing between tubes, is through use of a hybrid combination in which a first tube is attached to an underlying structure by structure support hardware, and one or more tubes are suspended directly or indirectly from that first tube until a certain number of tubes have been attached, at which point new structure support hardware is attached to the underlying structure and the next tube is connected to both the structure support hardware and the adjacent suspended tube above it using the attachment extensions as well. Advantageously, in this manner, the weight can be managed and the tubes can be stabilized from potentially swinging into the underlying structure.

As further advantage to the type of variant approach of FIGS. 12A and 12B is that this approach allows a degree of articulation at the interconnection, so that for example, partially or completely assembled displays of these lighting assemblies can be rolled up for ease of transportation and installation at a desired location.

Again, it bears repeating that, with some implementations, using the attachment extensions 1203 and 1205, a mounting gap 1210 is produced between the two adjacent lighting assemblies 12. Advantageously, since it is desirable to minimize the center-to-center spacing Ø between luminaires 120 in adjacent tubes, once that minimum distance is established, board units with luminaires 120 spaced apart on a given board and/or between boards at the same center-to-center spacing Ø can be used.

Figure 13A:
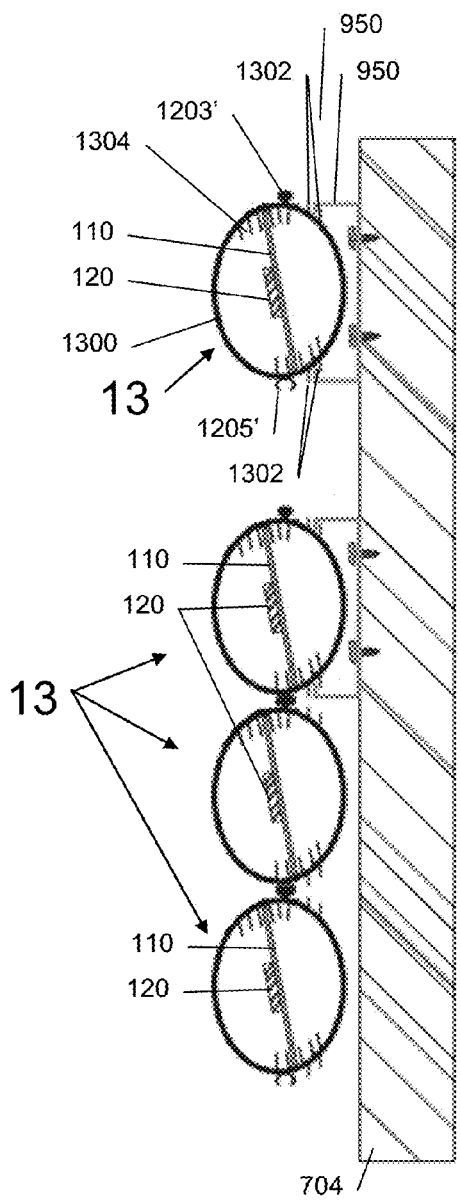
FIGS. 13A-13B illustrate, in simplified form, side views of two further alternative variant implementations.
Figure 13B:
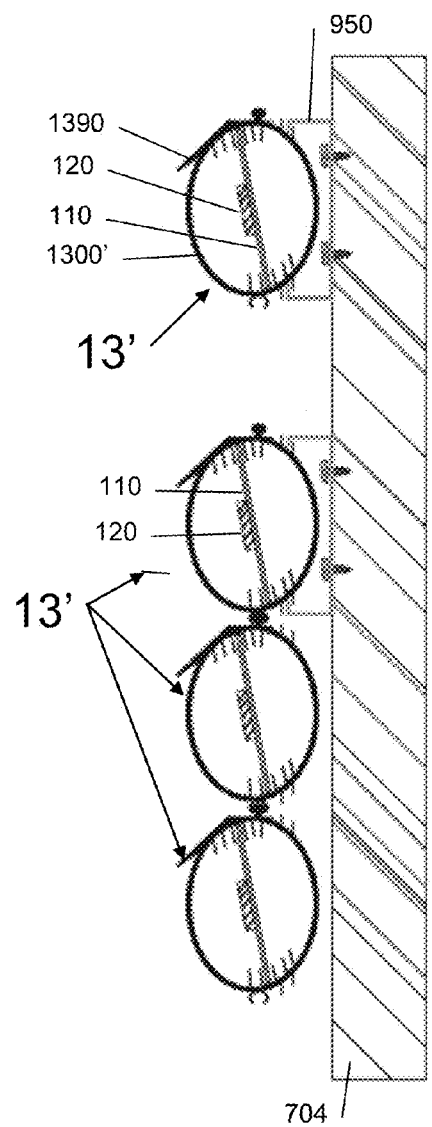

FIGS. 13A-13B illustrate, in simplified form, side views of two further alternative variant implementations. In FIG. 13A, the lighting assembly 13 is made up of luminaires 120 mounted on a printed circuit board 110 that is inserted in an associated translucent-faced tube 1300 that is oval in shape. As in FIG. 8, the tube 1300 includes multiple board supports 1304 that allow for the printed circuit board to be oriented in a variety of angles within the tube 1300. As with FIGS. 12A and 12B, this variant configuration tube includes attachment extensions 1203', 1205' that allow for direct connection of adjacent tubes to each other, and an attachment extension 1302 configured for connecting the tube 1300 to an underlying structure 704 by structure support hardware 950 such as described above.

FIG. 13B is identical to FIG. 13A except, since, in some applications, the oval configuration allows external light to enter from a variety of angles, which for some implementations can result in undesirable glare. The tube 1300' of FIG. 13B includes a louver 1390 to block the light from certain directions while allowing the luminaire to still be viewed from the desired direction. Advantageously, the addition of a louver can involve using a separately louver that can be, for example, attached to the tube 1300', attached to an attachment extension 1203', 1205' or it can be co-extruded with the tube. As shown, the louver 1390 is a co-extruded louver.

Co-extrusion is the process of combining different materials simultaneously (or different colors of the same material) into a single part. Co-extrusion utilizes two or more extruders to melt and deliver a steady volume of different viscous plastics to a single extrusion head (die), which will extrude the materials in the desired form as a single part. The thicknesses of each material in the combined part are controlled by the relative speeds and sizes of the individual extruders delivering the materials.

The use of co-extrusion can be advantageous when the tube is to be a translucent tube, because through co-extrusion, a translucent material can be used for the tube while an opaque material is co-extruded as the louver. A further advantage to the configuration of FIG. 13B is that, not only do louvers block light from entering the display, louvers prevent "light pollution". Thus, the louvers will not only prevent reflected light from bouncing off the translucent tube, potentially causing glare to those opposite and above the display, they can also prevent the display light from being projected upward, avoiding a common complaint from people living in floors opposite and above a lighting display.

Figure 14:
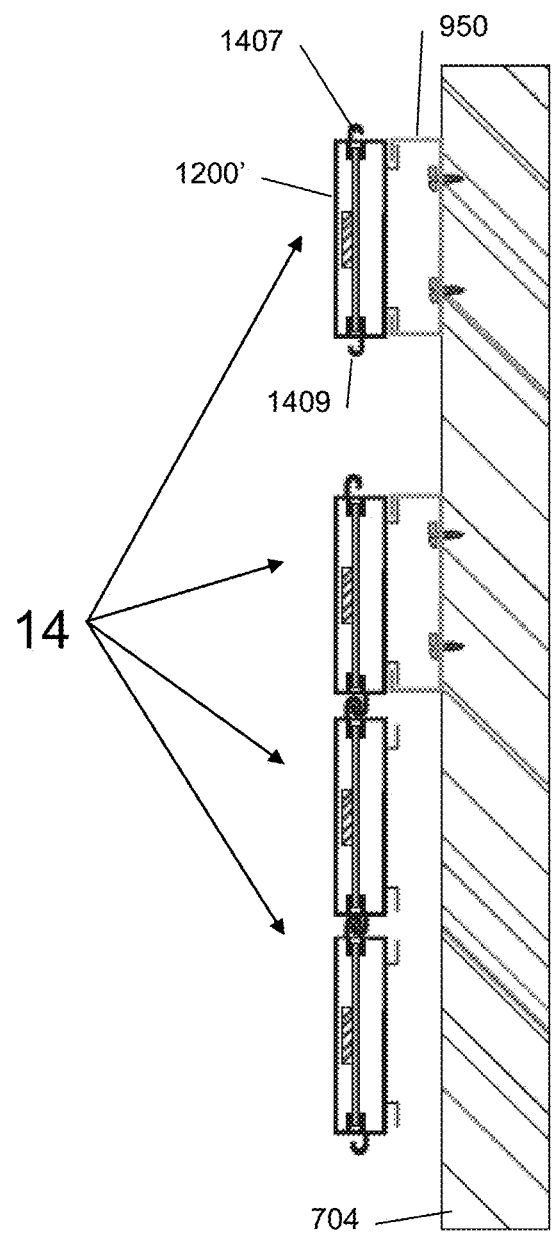
FIG. 14 illustrates, in simplified form, a side view of an alternative variant to the variant of FIG. 12B.

FIG. 14 illustrates, in simplified form, a side view of an alternative variant identical to the variant of FIG. 12B except that the attachment extensions 1407 and 1408 are matching hooks.

Thus, it should now be appreciated that the tube-to-tube interconnections displayed in FIGS. 12 through 14 are representative of a class of interconnections, namely a class that allows a degree of articulation between adjacent lighting assemblies to advantageous effect. However, it should also be appreciated that the advantageous articulation is optional and other non-articulating configurations such as a dovetail joint and tongue and groove joints, snap fasteners or other solid mechanical connections can equally be used.

Figure 15A:
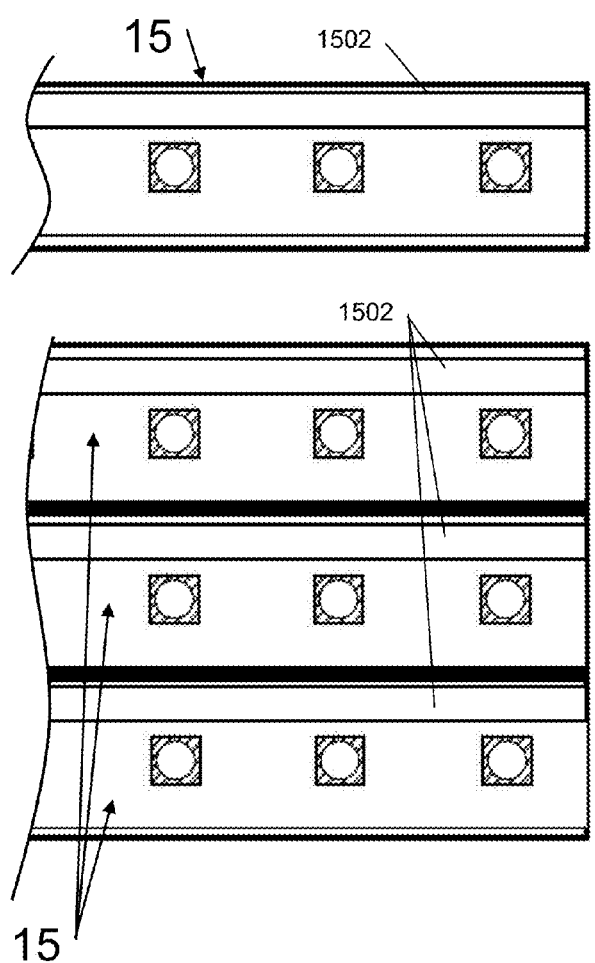
FIGS. 15A-15B illustrate, in simplified form, front and side views, respectively, of a further alternative variant.
Figure 15B:
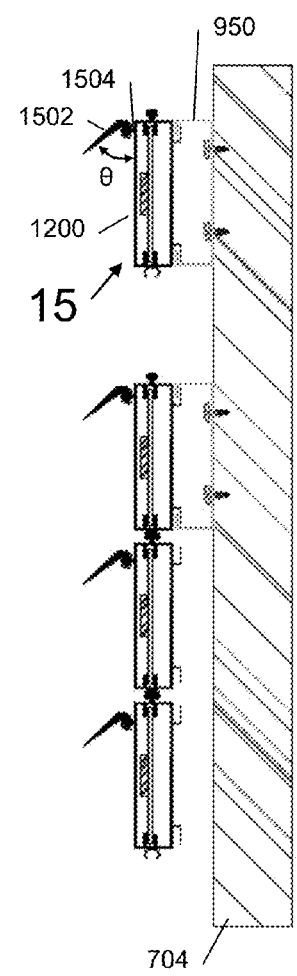

FIGS. 15A-15B illustrate, in simplified form, front and side views, respectively, of a further alternative variant that is identical to the variant of FIGS. 12A and 12B except that the tube 1200 includes an optional detachable louver 1502 and louver attachment 1504. As shown, the detachable louver 1502 and louver attachment 1504 are shown as a cylinder and socket type connection, which would advantageously allow detachable louver 1592 to be snapped into place and articulated through an angular arc "θ". However, other configuration such as, for example, a dovetail joint or tongue and groove joint, as well as a configuration where the louver 1502 and louver attachment 1504 are formed as a unitary piece can also be used, as can (as noted above) a louver that is formed as part of the tube 1200.

Figure 16A:
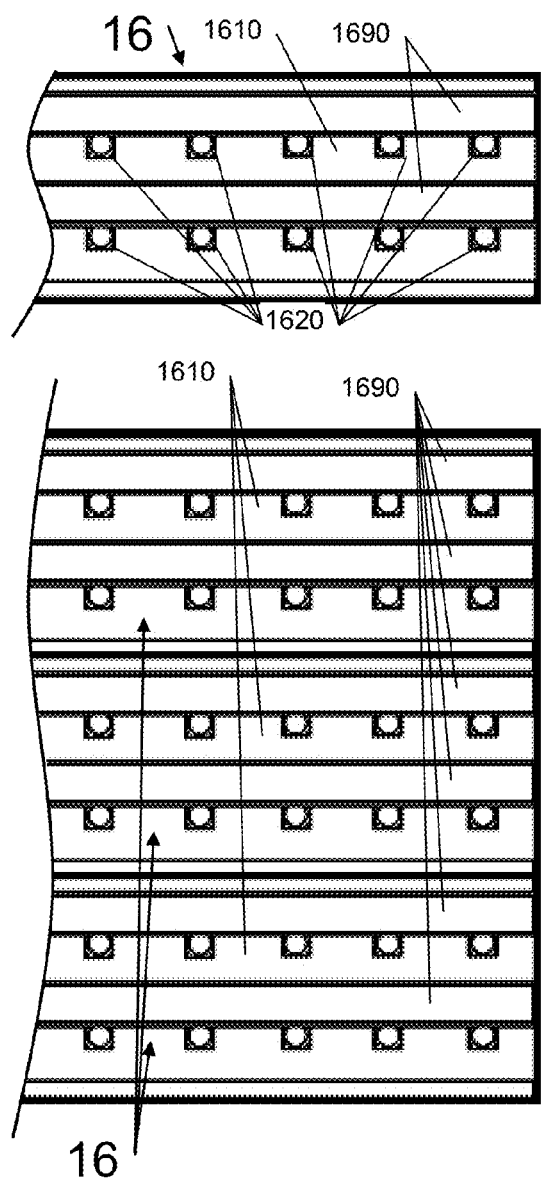
FIGS. 16A-16B illustrate, in simplified form, a top and side view, respectively, of still another alternative implementation variant.
Figure 16B:
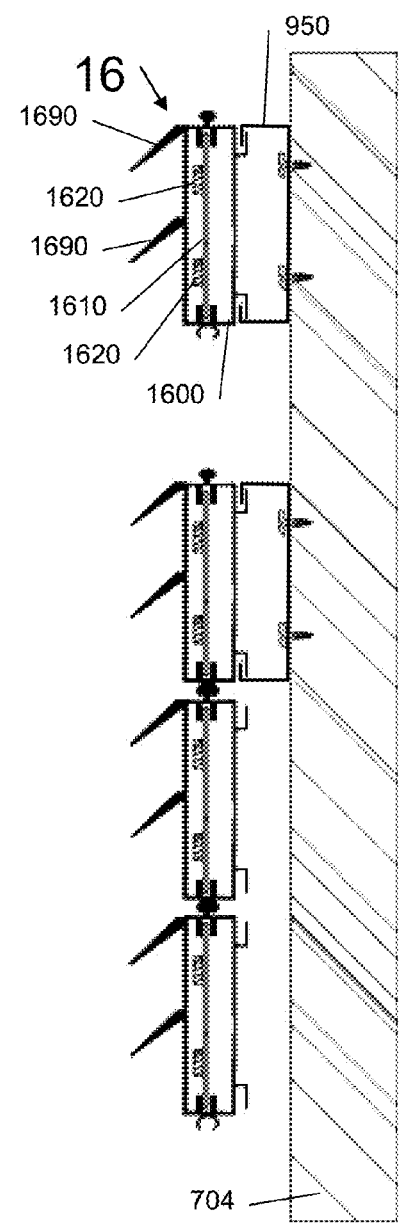

FIGS. 16A-16B illustrate, in simplified form, a top and side view, respectively, of still another alternative implementation variant wherein the lighting assembly 16 similar to the lighting assembly 15 of FIGS. 15A and 15B except that each inserted printed circuit board 1610 includes multiple rows of two or more luminaires 1620, in this specific example, two rows of at least six luminaires per row. Additionally, in order to block external overhead light, each tube 1600 includes louvers 1690, in this example, one for each row of luminaires 1620.

Figure 17A:
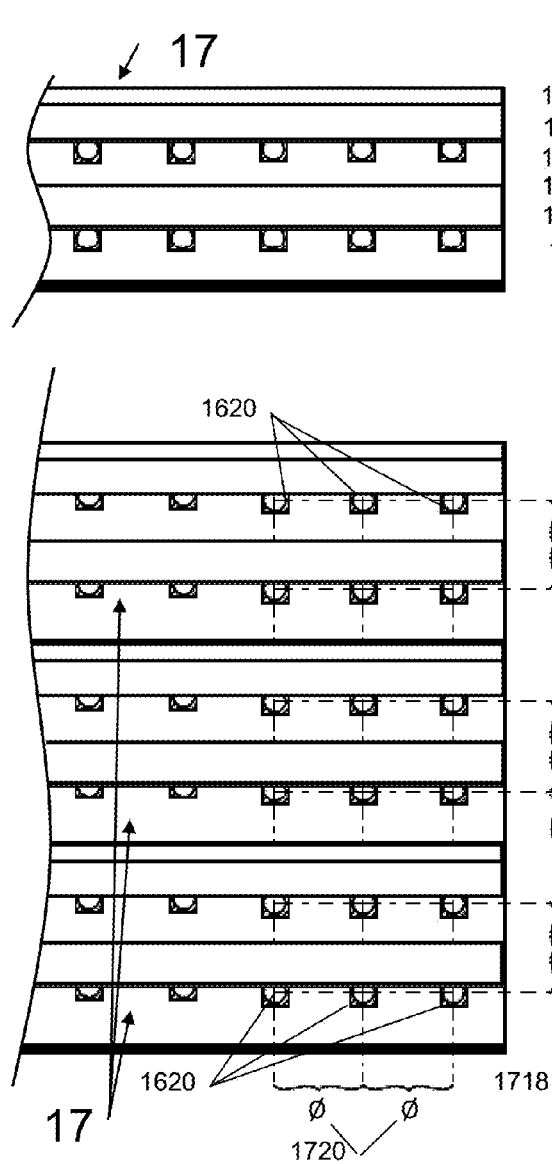
FIGS. 17A-17B illustrate, in simplified form, front and side views, respectively, of an additional alternative implementation variant.
Figure 17B:
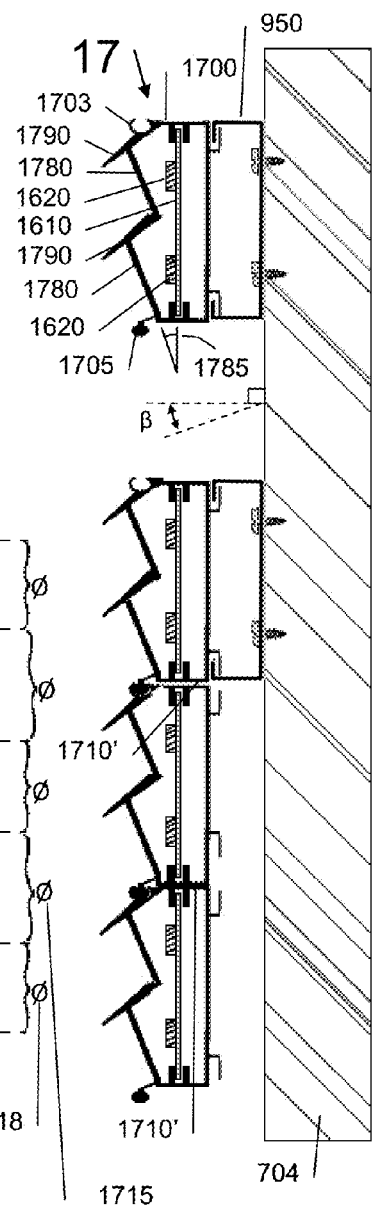

FIGS. 17A-17B illustrate, in simplified form, front and side views, respectively, of an additional alternative implementation variant. With this variant, the lighting assembly 17 is similar to the lighting assembly 16 in that it includes a printed circuit board 1610 with rows of luminaires 1620 an associated tube 1700 having attachment extensions 1703, 1705. With this variant however, there are two rows of opaque louvers 1790 co-extruded with two planar translucent front faces 1780. Since the expected viewing angle relative to the vertical underlying support 704 is "β" plus 90 degrees, the translucent front faces are formed so that they are canted 1785 at about the same angle of β such that the two planar translucent front faces 1780 are about perpendicular to the expected viewing angle. Alternately, when the expected viewing angle is perpendicular to the mounting surface and a viewer may have a lighting source associated with them, such as an individual driving a car with their headlights turned on, then canting the translucent front faces 1785 at an angle of β can advantageously direct reflected light away from the viewer, while still allowing the viewer to view the display.

Similar to attachment extensions 1203, 1205 of FIG. 12B, attachment extension 1703 is of cylindrical design and mates with matching attachment extension 1705, which is a designed as a socket thus allowing a degree of articulation at the interconnection. However, attachment 1703 and 1705 are offset such that the gap produced when two adjacent lighting assemblies 17 are interconnected using the attachment extensions 1703, 1705 can be minimized.

Again, it is worth noting that, by minimizing the mounting gap 1710, the subsequent center-to-center distance 1715 between the two closest luminaires 1620 in adjacent tubes 1700 is also minimized. When there are at least two rows of luminaires, then in order to produce a display where the luminaires 1620 are uniformly spaced at the center-to-center distance 1718 of "Ø" between rows, the center-to-center distance 1715 of "Ø between the closest luminaires 1620 in adjacent tubes and the center-to-center distance 1720 of "Ø" between the luminaires 1620 within a row all need to be equal.

Figure 18:
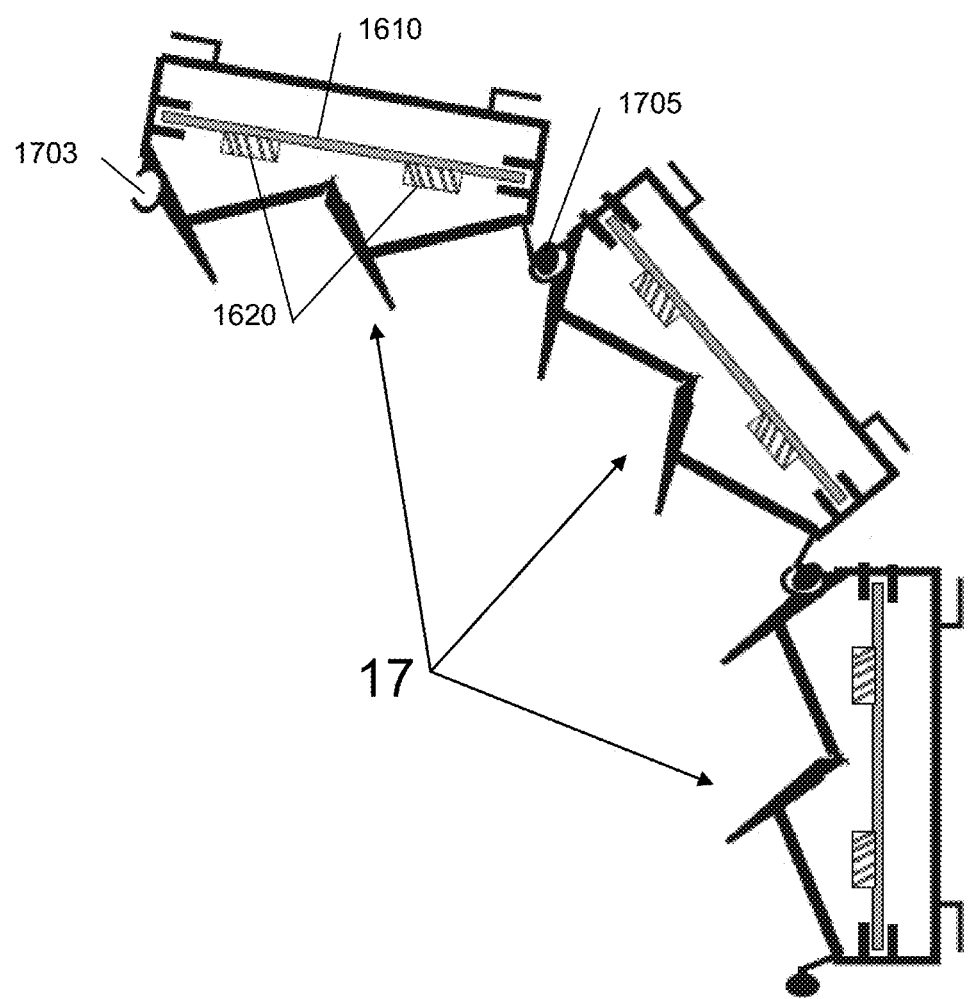
FIG. 18 illustrates, in simplified form, a side view of the variant of FIG. 17B.

FIG. 18 illustrates, in simplified form, a side view of the variant of FIG. 17B showing the advantageous articulation of the lighting assembly 17 made possible by the particular type of attachment extensions 1703, 1705 such that it can be put together, in whole or part, away from the installation site and rolled up in order to aide in transportation to the installation site and speed up installation. Likewise, it is to be understood that the articulation ability of some variants also makes it possible to more easily connect the lighting display to some curved surfaces.

Figure 19A:
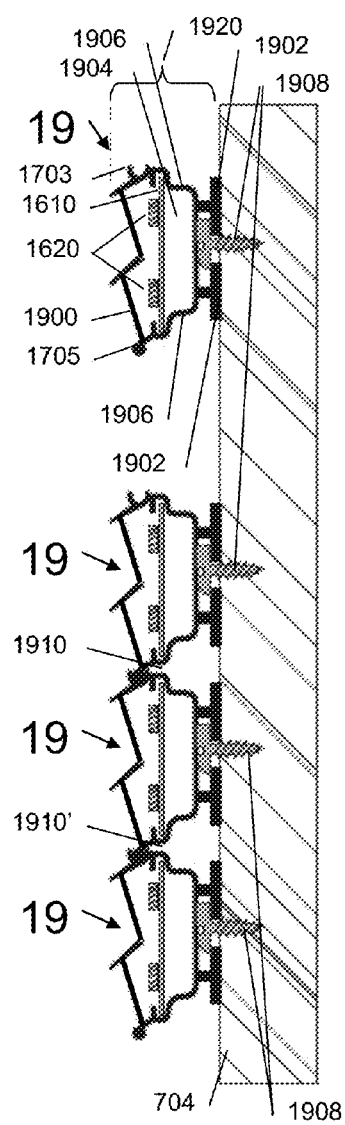
FIG. 19A illustrates, in simplified form, a side view of another alternative variant implementation.
Figure 20:
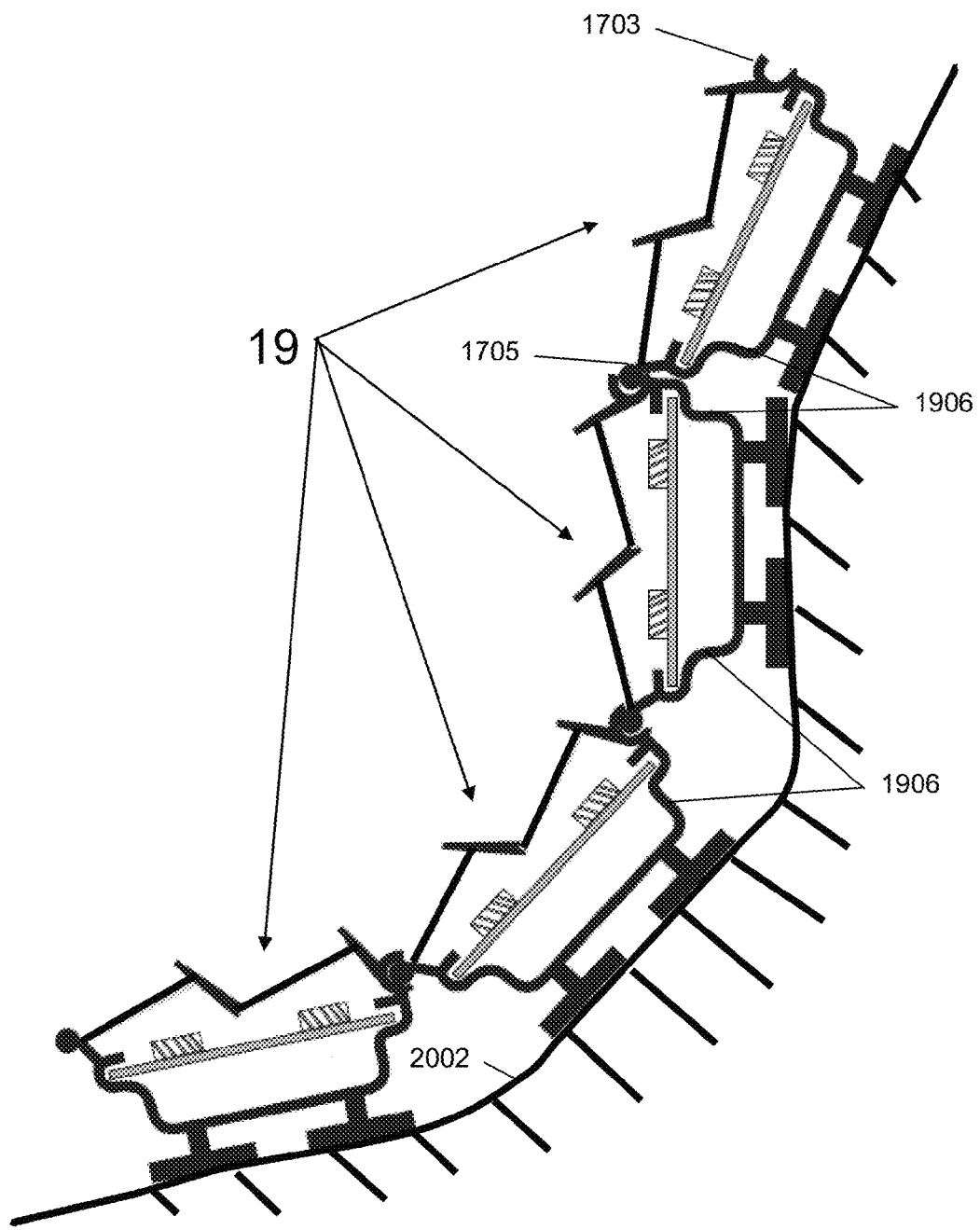
FIG. 20 illustrates, in simplified form how undercuts and attachment extensions allow multiple lighting assemblies to be interconnected to accommodate an undulating underlying structure.

FIG. 19A illustrates, in simplified form, a side view of another alternative variant implementation similar to those previously described except that it provides additional space underneath the board, thereby allowing for greater air circulation, which results in greater heat dissipation and reduced expansion and contraction pinching. Additionally, it has optionally also been designed with a shape such that it can roll both inward and outward, as seen in FIG. 20, while still allowing the mounting gaps 1910, 1910' to be minimized. Advantageously, the ability to roll both inward and outward allows for installation on an undulating surface.

With the variant of FIG. 19A, as shown, the attachment extensions 1902 allow the lighting assembly 19 to engage a mounting element, shown in FIG. 19A as a screw 1908, although any known mounting element that can engage the particular attachment extensions 1902 and removably affix it to the underlying support 704 can be substituted or used. Alternatively, in some cases, an adhesive material, like construction adhesive or epoxy, can be substituted and used to attach the attachment extensions 1902 to the underlying support 704. Alternatively, in some cases, an adhesive material, like construction adhesive or epoxy, can be used to directly attach the structure support hardware 1902 to the underlying support 704, but that would result in permanent affixation of the lighting assembly 19 to the underlying support 704.

Figure 19B:
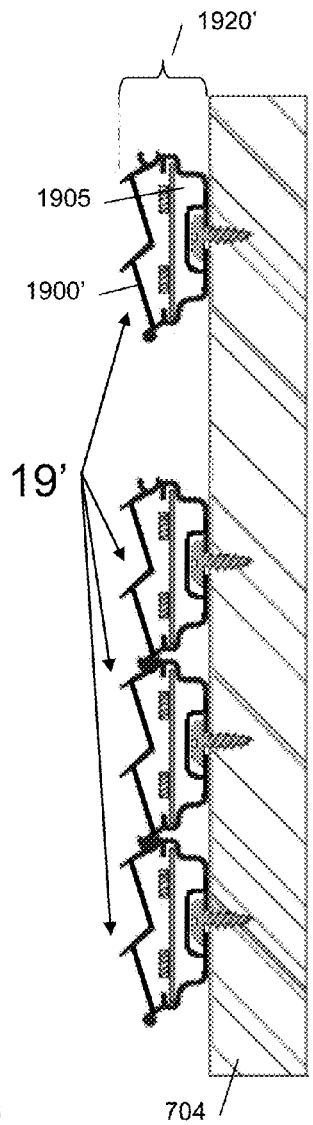
FIG. 19B illustrates, in simplified form, a side view of an alternative variant.

FIG. 19B illustrates, in simplified form, a side view of an alternative variant lighting assembly 19' that is similar to the lighting assembly 19 variant of FIG. 19 except that the attachment extension 1902 of FIG. 19A is replaced by an internal cavity 1905 that reduces the additional space 1904, but consequently can reduce the overall thickness of the lighting assembly from a first overall thickness 1920 for the lighting assembly 19 of FIG. 19A to a reduced overall thickness 1920" for the lighting assembly 19' of FIG. 19B.

Figure 19C:
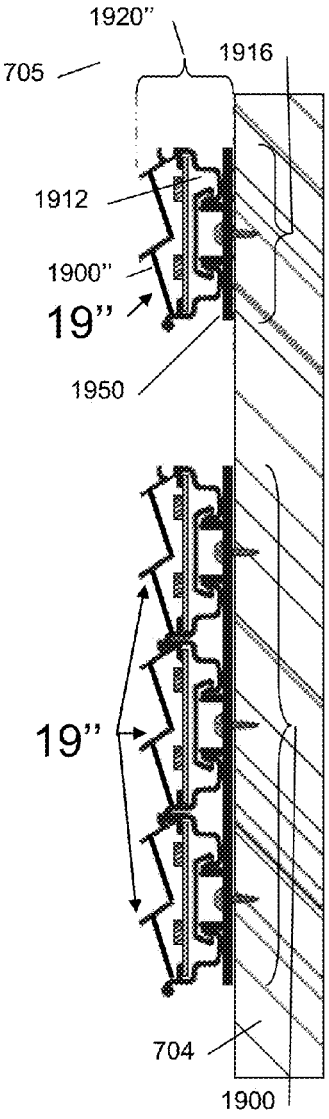
FIG. 19C illustrates, in simplified form, a side view of a second alternative variant.

FIG. 19C illustrates, in simplified form, a side view of a second alternative variant of the lighting assembly 19 of FIG. 19A.

With this variant, the lighting assembly 19" is similar to the lighting assembly 19' of FIG. 19B; however, the geometry of the internal cavity 1912 in this figure is slightly different from that of the internal cavity 1905 of FIG. 19B, in that is designed to snap onto a type of separate structure support hardware 1950 rather than slide in place, which is particularly desirable as display length increases. As a result, of the addition of this type of structure support hardware 1950 results in an overall thickness 1920" that is greater than the thickness 1920' of FIG. 19B but still less than the thickness 1920 of FIG. 19A.

In addition, as shown, with this configuration variant, the structure support hardware 1950 could be formed in a single row configuration 1916 or as a structure support hardware unit 1918 to which multiple rows of tubes 1900" can be attached.

At this point, it should be understood that, in many cases, the previously described structure support hardware 750, 950, 950', 1105, could also be straightforwardly manufactured as a unit that accepts multiple rows of tubes.

While lighting assemblies 19, 19', and 19" are all designed to interconnect together as a form of display registration, advantageously, the single row hardware support structure 1950 can be designed such that display registration is accomplished by edge butting successive hardware support structures 1950 together as can be seen in, for example, FIGS. 7B, 8, 9B, and 11.

FIG. 20 illustrates, in simplified form, how undercuts 1906 and attachment extensions 1703, 1705 allow multiple lighting assemblies to be interconnected to accommodate an undulating underlying structure 2002, the undulating shape of which has been exaggerated in FIG. 20 to highlight this advantage.

Thus, it should now be understood that, incorporating undercuts into any of the variants described herein may provide a similar advantage for some applications, irrespective of whether attachment extensions near the translucent front face are used.

As noted above, one of the advantageous features of some implementations is the element impervious nature of some variant tubes along their length. For many applications, it may optionally be similarly desirable to ensure that the ends of the tubes are also sealed from the elements in some manner.

Figures 21A, 21B:
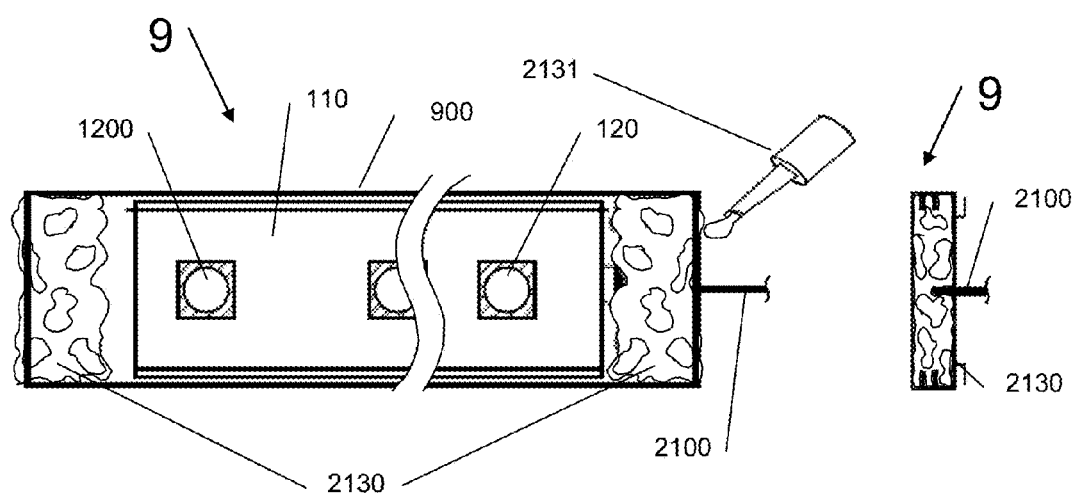
FIGS. 21A-21B illustrate, in simplified form, a front and side view, respectively, of a simple manner for sealing the ends of a tube from the elements.

FIGS. 21A-21B illustrate, in simplified form, a front and side view, respectively, of a simple manner for sealing the ends of a tube from the elements. For purposes of example only, this approach is described with reference to the lighting assembly 9 of FIG. 9, however it should be understood that this sealing approach, as well as other sealing approaches described herein are equally applicable to all the described variants, as well a permutations and combinations thereof. In this regard, FIGS. 21A and 21B show a sealing approach that, depending upon the particular sealing material may result in permanent sealing of a tube, potentially rendering service of the tube from such a sealed end thereafter impossible. With this sealing approach, at least one end of the tube 900 is filled with a fill material 2130, which has the appropriate properties needed to impede or keep undesired matter from entering the tube, permanently or temporarily. Depending upon the particular implementation, the fill material 2130 can be a potting material, a putty, a viscous conformal coating material, a silicone rubber, an expanding foam, a curable material like an epoxy or other curable resin or sealant, etc. Thus, it should be understood that the particular material used is not important, what is important is that the material be selected such that, for the particular application, it does not allow undesirable material (e.g. external air, moisture, dust, bugs, animals, etc.) to enter the tube.

As shown in FIG. 21A, both ends of the tube 900 have been filled with a fill 2130 that was applied using a fill applicator 2131 such that the ends are completely sealed, in the case where the fill 2130 was a curable epoxy in a permanent manner, with, as also shown in FIG. 21B, only a conduit, wire or cable 2100 (to allow, for example, power or signals to be provided to the base unit 110 and/or luminaires 120), being allowed to pass through the seal created by the fill 2130. Alternatively, if for example, the fill 2130 was a non-hardening putty, a similar but more temporary seal would be created, allowing the base unit 110 to potentially be removed by removing the fill 2130 to provide access. Notably, a common characteristic of all of these end-sealing approaches is the use of a material that can conform to the shape of the tube in application. However, this is not a requirement. Instead, for example, a plug that substantially conforms to the external end shape of the tube can be used that, depending upon the particular implementation will closely conform to and seal against at least one of the exterior periphery or end of the lighting assembly, or a plug that can be inserted into and will closely conform to the interior end shape of the tube. In order to form a tight seal, it is expected that the plug will be made of a material that is deformable to some degree such that it must be deformed when initially applied to an end of a tube and, in returning towards its un-deformed shape, will abut against a surface of the tube to create the desired seal.

FIGS. 22A-22D respectively illustrate, in simplified form, both a front and side view, respectively, of four different variant plugs 2232, 2234, 2236, 2238 that can be used as an alternative variant seal. Specifically, FIG. 22A shows the front and side views of a solid plug 2232, FIG. 22B shows the front and side views of a plug 2234 with a central through-hole 2240 to allow for a limited connection between the interior of a tube and the exterior end, for example to accommodate through-passage of a conduit, wire or cable or to allow for ventilation or coolant circulation, FIG. 22C shows the front and side views of a plug 2236 similar to FIG. 22B except that it has a through-hole 2242 that is offset from the center, and FIG. 22D shows the front and side views of a plug 2238 containing two through-holes 2240, 2242 to, for example, provide for both through-passage of a conduit, wire or cable and for ventilation or coolant circulation.

FIGS. 22E-22F respectively illustrate, in simplified form, a front and side view of the lighting assembly 9 of FIG. 9 with one of the plugs 2232, 2234 inserted into each of the ends of the tube 900.

FIGS. 22G-22H respectively illustrate, in simplified form, a front and side view of the lighting assembly 9 of FIG. 9 with the variant plug 2236 of FIG. 22C inserted into one end of the tube 900 and the plug variant 2238 of FIG. 22D inserted into the other end of the tube 900. As shown in FIG. 22G, the plug 2238 allows for passage of wiring through the central through-hole 2240 and additionally allows for passage of coolant from a coolant supply 2244 into the tube 900 via one hose 2243 via the second through-hole 2242 so that it can pass through the length of the tube 900 and exit via a second tube 2245 via the through-hole 2242 in the plug 2232 at the other end.

As shown, it should be understood that the coolant provided by the coolant supply 2244 would be part of a coolant exchange system, only part of which is shown, that could be either a closed or an open system. Depending upon the particular implementation, the coolant could either pass through the tube(s) by being pushed or drawn through the system. In addition, depending upon the particular implementation, the type of coolant could be any of: environmental air, conditioned air, liquid coolants used in electronics such as, for example, synthetic hydrocarbons (i.e., diethyl benzene [DEB], dibenzyl toluene, diaryl alkyl, partially hydrogenated terphenyl); silicate-ester; aliphatics: aliphatic hydrocarbons of paraffinic and iso-paraffinic type (including mineral oils); Silicones; Fluorocarbons: such as perfluorocarbons (i.e., FC-72, FC-77) hydrofluoroethers (HFE) and perfluorocarbon ethers (PFE); and Non-Dielectric Liquid Coolants: such as Ethylene Glycol (EG), Propylene Glycol (PG), Methanol/Water, Ethanol/Water, Calcium Chloride Solution, Potassium Formate/Acetate Solution, and even Liquid Metals (e.g. Ga—In—Sn).

At this point it should be further noted that, although up to two round through-holes have been shown in a single plug, additional holes of any shape could be provided without departing from the concepts disclosed herein. Likewise, a single through-hole could be used for multiple purposes, for example to allow for passage of both electrical connection(s) and coolant.

Having discussed a few of the numerous lighting assemblies that can be created by applying the teachings herein in various permutations and combinations, some details of the internal components of the lighting assemblies will now be discussed.

As the number of boards that are daisy chained together increase, power management running through the boards on the power rails can become an issue, even with as little as a combined total of 10 linear feet per rail. In such a case, the cumulative voltage drop across the boards can result in a situation where the rail voltage at the initial board(s) is significantly more than that at the hundredth, and with the huge displays creatable using the techniques herein, even the thousandth, or ten thousandth board, which can result in varying levels of illumination. One solution to this issue would be to add a regulator to each board. However, regulators give off heat and the greater the voltage difference that the regulator is trying to manage the more heat that will be generated. While the level of that heat generation may be acceptable in some cases, it could be problematic in others. Thus, it should be understood that, in some implementations, the rail current and/or the heat generated by the use of regulators can limit the number of boards than can effectively be daisy chained together.

Another consideration when creating a long daisy chain of boards, is the current required to power all the luminaires on all the boards. Moreover, if regulators are used, the heat they dissipate could cause the rails running between the boards to exceed their power capacity. One potential way to reduce the power on the rails is to increase the rail voltage, since the equations for power (P) are $P=I \times V = R \times I^2 = V^2/R$. However, this may not work in all cases because it could also result in the regulators generating more heat and could ultimately overwhelm the system.

Another potential solution is to power the boards at higher a voltage while using step down transformers, which are often 98-99% efficient, to convert the power at the board(s) down to the desired level. Not only does this approach advantageously allow more boards to be daisy chained together then might otherwise be possible, it allows the boards to be run more efficiently and at power levels that are less taxing to their individual components. Moreover, although this approach can result in higher manufacturing cost, in many cases, this solution advantageously reduces the cost of running the boards and provides a level of increased longevity sufficient to more than make up for that higher manufacturing cost.

Likewise, for some implementations, other types of converters, such as "buck" converters, which can have efficiencies of 95% or more with for integrated circuits, or other highly efficient voltage conversion systems, including AC to DC converters can alternatively be used. The important aspect to this solution being the conversion, its efficiency and its compatibility with the particular implementation, not the particular type of converter that may be used.

FIGS. 23A-23D respectively illustrate, in simplified form, a side, front, back, and schematic representation of a series of printed circuit boards 2310 suitable for use as base units as described herein. As shown, the printed circuit boards 2310 each include multiple luminaires 120, at least one step down transformer 2320, and power rails 2330 and 2340 that are used to distribute power from a power supply 2350 (shown only in the schematic of FIG. 23D) to the luminaires 120. Also as shown in the schematic of FIG. 23D, all of the printed circuit boards 2310 are electrically daisy chained together by board-to board interconnections 2360, 2370 so that each of the luminaires 120 are powered in a parallel circuit fashion via the rails 2330, 2340, depending upon the particular luminaires and associated circuitry, either directly or indirectly. As shown, in this variant implementation, the luminaires 120 are not powered directly from the rails 2330, 2340 so one or more step down transformers 2320 are mounted on the underside of each printed circuit board 2310 and used to convert the voltage of the rails 2330 and 2340 to the appropriate voltage for luminaires 120. As a result, with an appropriate source of power (for example, a power supply 2350) from one to a large (essentially unlimited) number of printed circuit boards 2310 could be electrically daisy chained together for insertion into or within a single tube, two or more end-butted tubes, or a series of longitudinally aligned adjacent tubes.

Alternatively, as long as the previously discussed issues related to power drop are not a significant factor and the power requirements of the total number of luminaires 120 is known, then by selecting an appropriate power supply 2350, the use of step down transformers 2320 or other conversion approach could be unnecessary and the rails 2330, 2340 could supply power directly to the parallel-connected luminaires 120. Advantageously, the approach that uses one or more step down transformer(s) 2320 allows varying numbers of printed circuit boards 2310 to be connected together in a single implementation configuration, without potentially having to replace or adjust the power supply 2350 for each.

Alternatively, with some variant implementations, the power rails or signal lines could be formed as one or more metallic strips running the length of a tube on an interior surface thereof, for example, within the support channel. Appropriate placed contacts on each base unit board could then contact the necessary strip and form a connection thereby. Advantageously, this variant approach provides another way that different board sizes and board changes in position can be accommodated.

Although there are numerous possibilities for appropriate selection of the particular step down transformer(s) 2320, for example, by limiting the number of luminaires 120 per individual board and the number of boards that are daisy chained together. With some alternative variants, simple regulators can be mounted directly on the individual printed circuit boards, without compromising a board's ability to move slidably within a tube. Additionally, in some instances it may be desirable to combine the use of a step down transformer and voltage regulator such that the step-down transformer handles gross power management and the voltage regulator handles fine power management. This pairing advantageously can result in lower voltage conversion, and consequently less heat, and as a byproduct, can also prolong component life.

Advantageously for some implementations, this type variant can provide savings in terms of one or more of: cost, power, heat generation, and thickness relative to current technology, which requires bulky expensive heat generating switching power supplies to be mounted behind each display or display matrix.

Within current technology, as displays get larger and larger, in order to reduce the time spent performing calibration, the size of the display matrix and associated switching power suppl(y/ies) increase commensurately with display size. However, with implementations created using the teachings herein successive lighting assemblies are registered through mounting/assembly and the boards are able to move slidably within a lighting assembly. As a result, they expand and contract as a unit and it is not necessary to expand the board size beyond that which can be controlled by a simple regulator. Thus, in contrast to current technology, board size (length and width) is, for practical purposes, advantageously independent of display size.

Additionally, a further advantage can be achieved in some implementations if a step down transformer 2320 is a constant current (or voltage) supply. Where this is the case, optionally, the current (or voltage) could be monitored through the use of known current (or voltage) monitoring capabilities using an external monitor 2380 or an on-board monitor 2380' to detect luminaire 120 failures and report any such failures to an on-board processing unit 2390 or external processing unit 2390', which can be configured for automatically reporting status or periodically polled to obtain status information. The methods of communicating status beyond the tube could, depending upon the particular implementation, occur through a separate connection, for example a data or feedback line (not shown), or potentially wirelessly through separate communication capabilities internal to, or associated with one or more of the tubes.

Figure 24A:
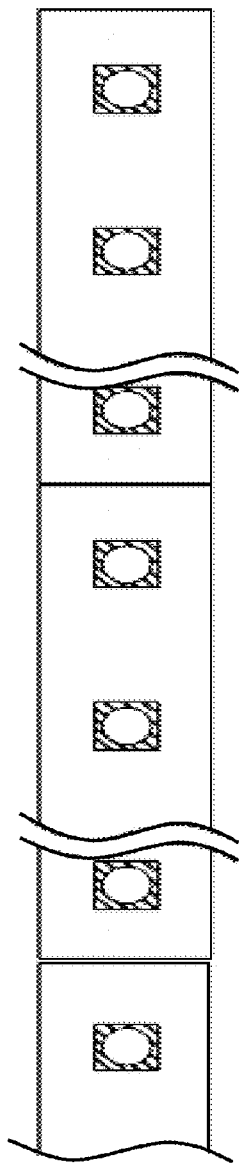
FIGS. 24A-24C illustrate an alternative variant to that shown in FIGS. 23B-23D.
Figure 24B:
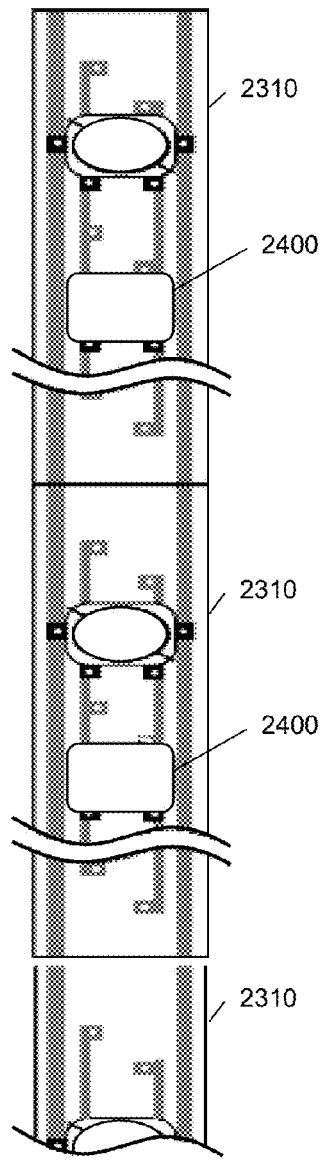
Figure 24C:
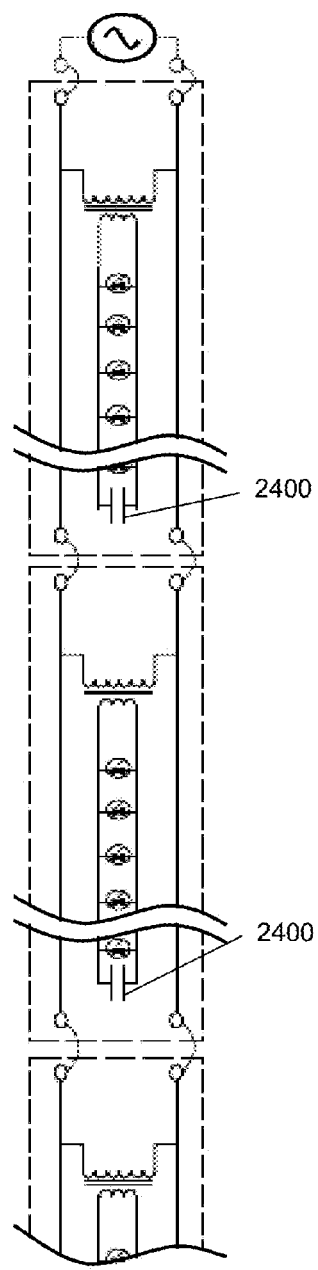

FIGS. 24A-24C illustrate an alternative variant to that shown in FIGS. 23B-23D. As shown, FIGS. 24A-24C are respectively identical to FIGS. 23B-23D except that each board further includes an optional back-up power supply 2400 which could be any means of energy storage such as a battery or a capacitor, typically a supercapacitor (also called an electric double-layer capacitor, a super cap or ultracapacitor). Supercapacitors bridge the gap between conventional capacitors and rechargeable batteries because they store the most energy per unit volume or mass (energy density) among capacitors. The addition of the optional back-up power supply 2400 can allow the display to continue to run for some period of time during a power failure and can also smooth out power demand by handling burst-mode power delivery demands, such as when more than a certain amount of luminaires are concurrently or suddenly turned on.

FIGS. 25A-25C illustrate, in simplified form, a typical prior art fluorescent lighting configuration used to illuminate inventory in a typical store aisle. The lighting is made up of multiple fluorescent lighting fixtures 25 made up of a display support structure 2502 configured to accept multiple tube style fluorescent light bulbs 2504, a external power wire 2510 through which each fixture 25 receives power, hangers 2520 via which the fixture 25 can be attached to some overhead structure (not shown) and suspended at a specified distance from the shelves 2506. Since the lighting is made up of multiple individual fixtures 25, there is a dark spot (or lighting non-uniformity) created at the locations 2530, where each of the light fixtures 25 are end butted together.

Figure 26A:
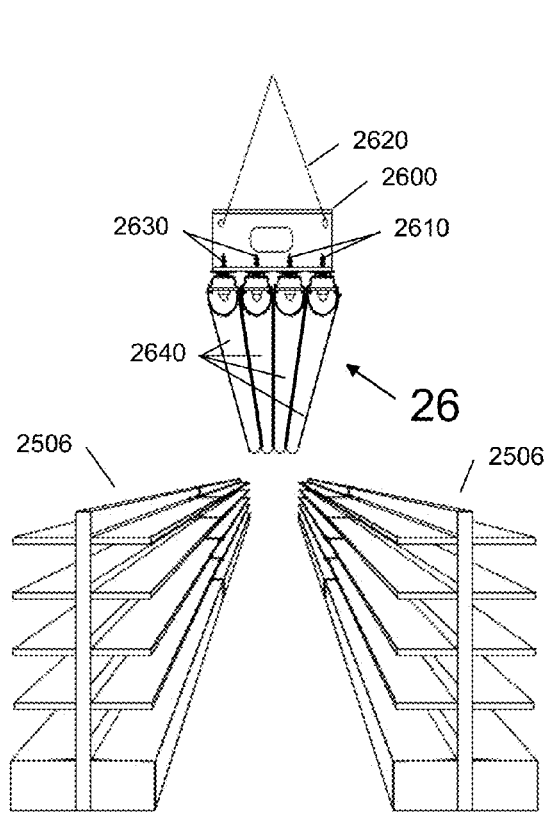
FIGS. 26A-26C illustrate, in simplified form, a lighting assembly employing the teachings herein for illuminating the shelves of the typical store aisle of FIG. 25A.
Figures 26B, 26C:
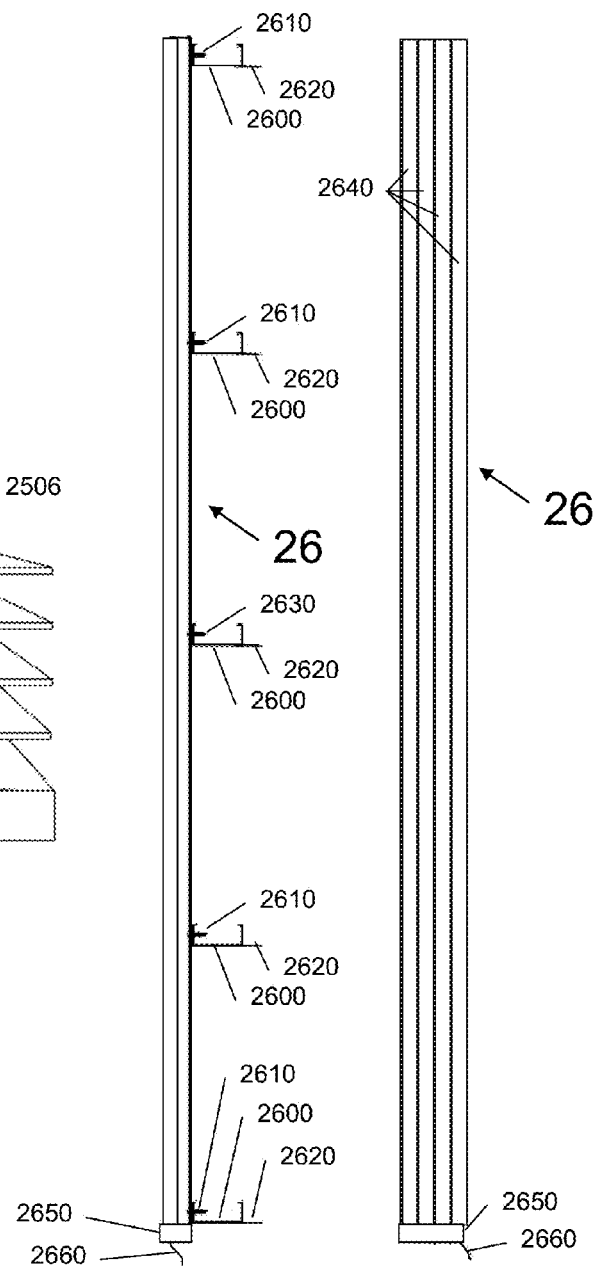

FIGS. 26A-26C illustrate, in simplified form, a lighting assembly 26 employing the teachings herein for illuminating the shelves 2506 of the typical store aisle of FIG. 25A. As with the fixture of FIG. 25, the lighting display is configured to be suspended from an overhead structure (not shown) at a specified distance from the shelves by hangers 2620 on one or more supporting structures 2600 to which tubes 2640 of the lighting assembly 26 are attached via some form of attachment aid 2610. As shown, the lighting assembly 26 is made up of multiple continuous tubes as described herein with adjacent tubes 2640 being interconnected such that, together, they have enough structural rigidity to significantly support themselves. Advantageously, and in sharp contrast to the fixtures 25 of FIGS. 25A-25C, the support structures 2600 used with the lighting assembly constructed according to the teachings herein do not need to cover the length of the entire lighting assembly 26, they need only be placed at sufficient locations as is necessary to provide overall support for the weight of the lighting assembly 26 and avoid undesirable sagging at intermediate points that could result from the extended length. Additionally, and advantageously, it should be evident that, through use of the teachings herein, the lighting assembly 26 does not have the dark spot (or lighting non-uniformity) locations 2530 present with the fixtures of FIG. 25. In addition, instead of having exposed power wires 2510 interconnected on the back of each fixture, the lighting assembly 26 daisy chains the power connection on the end of each tube which can easily be covered by a nominal cap 2650 and, thereby, merely has a single exposed power wire 2660 for the entire lighting assembly 26 at the end of one of the tubes 2640.

Figure 27A:
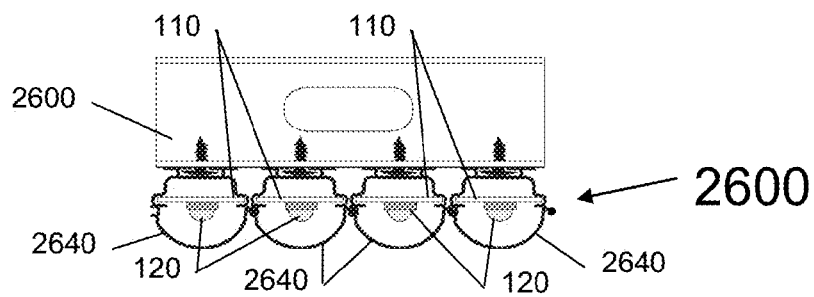
FIG. 27A-27D illustrate, in simplified form, end views of a few different configuration lighting fixtures that can be created using the teachings herein.
Figure 27B:
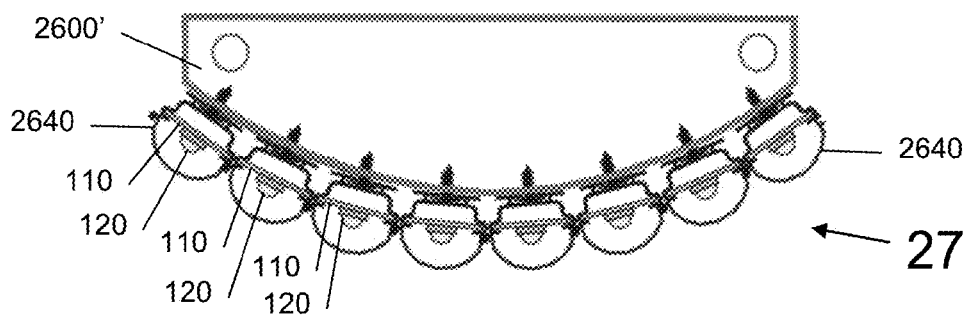
Figure 27C:
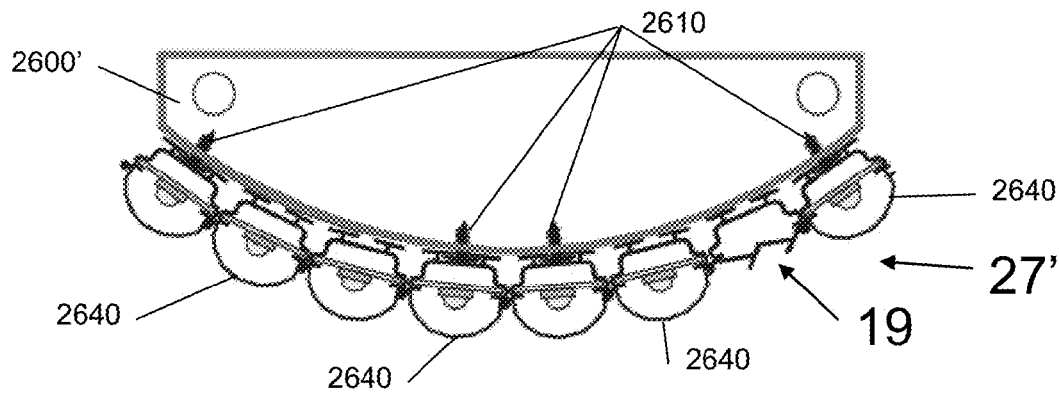

FIG. 27A-27D illustrate, in simplified form, end views of a few different configuration lighting fixtures that can be created using the teachings herein. In that regard, FIG. 27A is an end view of the lighting assembly 26 of FIGS. 26A-26C showing that the four identical tubes 2640 are connected to a support structure 2600 such that they form a planar fixture configuration. FIG. 27B illustrates, in simplified form, an end view of a lighting assembly 27 made up of two sets of tubes (i.e. eight tubes) from the fixture of FIG. 27A that are interconnected to each other and, by virtue of the shape of the support structure 2600' to which they are attached, they form a convex lighting configuration. FIG. 27C illustrates, in simplified form, a fixture 27' that is substantially identical to the fixture of FIG. 27B except that, due to the structural support provided by the interconnection between adjacent units, it is not necessary to use an attachment aid 2610 with every tube 2640, and one tube 2640 has been replaced with a light assembly 19 as described in connection with FIG. 19 to show that, applying the teachings described herein, it is advantageously possible to mix and match lighting assemblies that have matching interconnections. Likewise, although not shown in this figure, it is possible to mix and match different configuration base units 110 among any tube configurations dimensionally capable of accepting them.

Figure 27D:
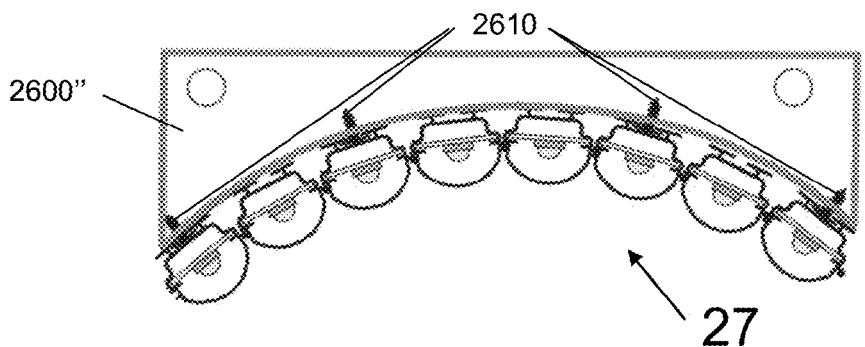

FIG. 27D illustrates, in simplified form, the light assembly 27 of FIG. 27B coupled to a different support structure 2600" so as to now form a concave lighting configuration. In addition, and similar to the configuration of FIG. 27C, due to the structural support provided by the interconnection between adjacent units, it is not necessary to use and attachment aid 2610 with every tube 2640.

Of course, it should be understood that the tubes 2640 could have alternatively been connected directly to the ceiling or to a support structure mounted to the ceiling. Advantageously it should be appreciated that, using the teachings herein, such a configuration (particularly a direct-to-ceiling connection) is made easier by the fact that there is no need to run power connections to particular parts of the ceiling, there is no multitude of external wires to be accommodated, and a more aesthetically appealing appearance can be created because the tubes can extend, without a break, over the entire length or width of the room of desired.

Figure 28:
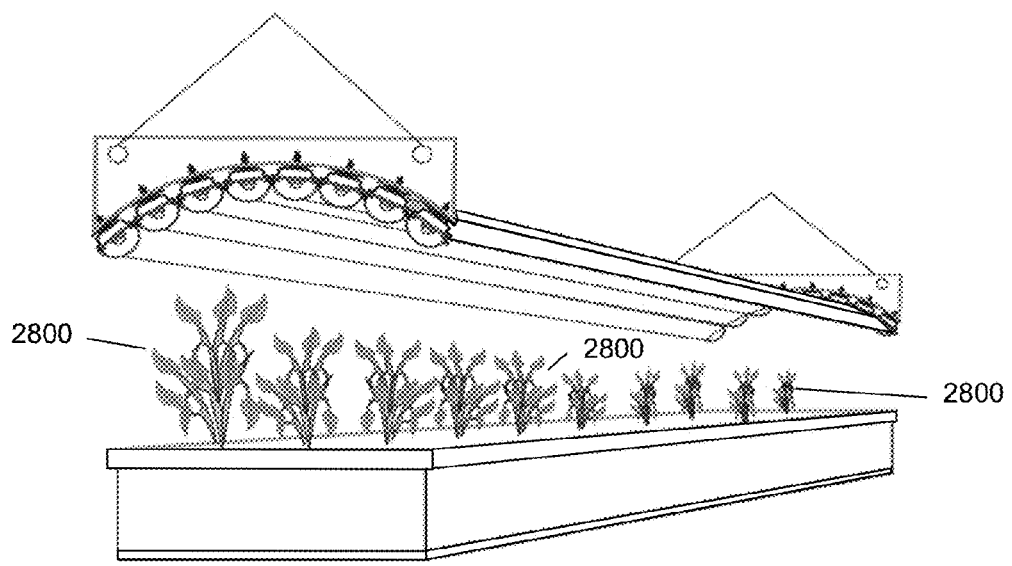
FIG. 28 illustrates, in simplified form, an example use for the lighting assembly of FIG. 27D.

FIG. 28 illustrates, in simplified form, an example use for the lighting assembly 27 of FIG. 27D, namely to provide uniform artificial lighting for plants 2800 in a greenhouse.

Up to now, all of the tube configurations have been shown longitudinally arranged horizontally on a vertical support. However, this is not a requirement at all. As noted above, by employing the teachings contained herein, billboards can be created with vertically aligned tubes, allowing them to be serviced from the bottom, the top or both, depending upon the particular implementation. However, it should be appreciated that tubes implemented according to the teachings herein can likewise be used to create an illuminated wall and, advantageously, by orienting the tubes vertically, ones with curved or undulating shapes. Similarly, since the tubes can be formed in virtually any length, even though they may be oriented vertically, they can more easily accommodate unusual, or non-standard changes in, ceiling heights. As such, illuminated vertical walls or displays can be constructed for a particular application, potentially faster and at lower cost than could be done using current technology.

Figure 29A:
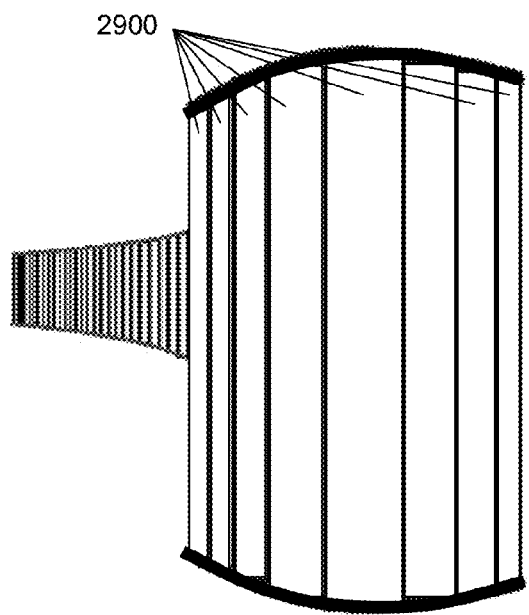
FIGS. 29A-29B illustrates, in simplified form, a representative example multi-curved vertical structure formed using multiple tubes constructed according to the teachings herein.
Figure 29B:
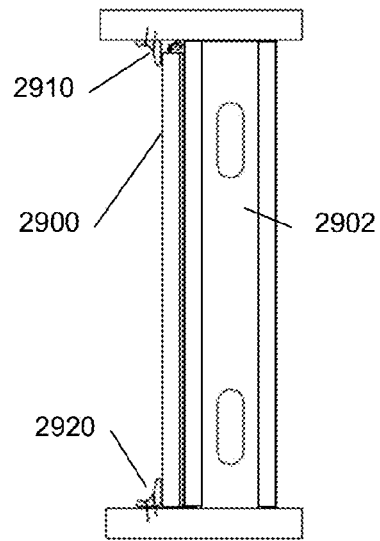

FIGS. 29A-29B illustrates, in simplified form, a representative example multi-curved vertical structure formed using multiple tubes 2900 constructed according to the teachings herein. As shown in FIG. 29B, depending upon the particular implementation and in sharp contrast to conventional current technology, the tubes 2900 can advantageously be maintained in place merely by moulding or trim 2910, 2920 on the upper and lower ends of the tubes 2900 or, alternatively, to an underlying support 2902 using one of the approaches described herein or, owing to the nature of this approach (and again in sharp contrast to conventional technology), something as simple as double sided tape or magnetic attachments. Moreover, in contrast to conventional technology, with this approach, an illuminating wall created using tubes according to the teachings herein need not rely upon a power connection being in any particular location because the daisy chain interconnection can allow for a power connection to be located virtually any where, providing greater freedom of placement, while avoiding the need to potentially obscure unsightly power cords running between a power outlet and the desired location of the illuminating wall. This makes illuminating walls constructed according to the teachings herein much more usable for constructing displays in large open areas like convention centers and hotel ballrooms than can be done using conventional technology.

To further show the application versatility obtainable by using the teachings herein over and above the previously described applications, some other applications will now be described, bearing in mind that these applications are only representative examples of the potentially limitless ways that the instant teachings can be employed.

Figure 30A:
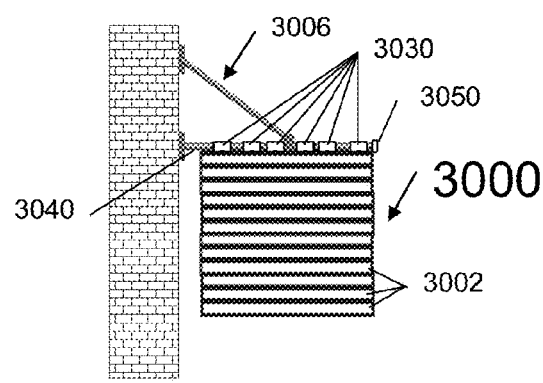
FIG. 30A illustrates, in simplified form, another example application employing the teachings herein.
Figure 30B:
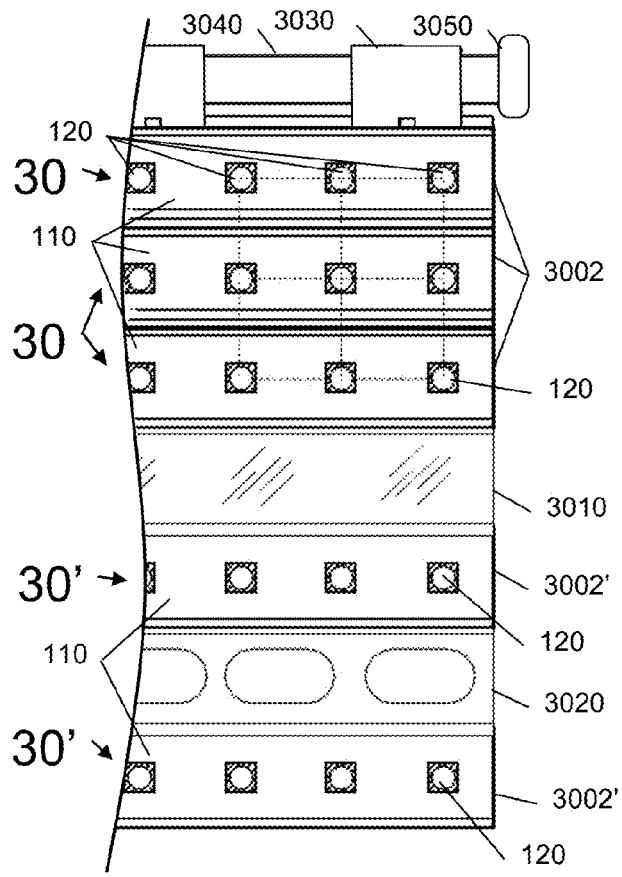
FIGS. 30B-30C respectively illustrate, in greater detail, aspects of the signage or display of FIG. 30A from the front and one side.
Figure 30C:
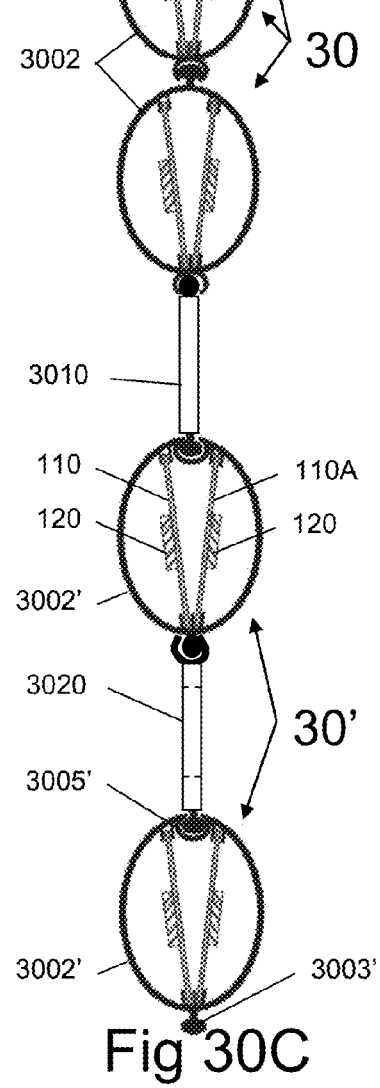

FIG. 30A illustrates, in simplified form, another example application employing the teachings herein, as flag type signage or display 3000. As shown, the signage or display 3000 is made up of multiple tubes 3002, constructed as described herein hanging from a support structure 3006. FIGS. 30B-30C respectively illustrate, in greater detail, aspects of the signage or display 3000 of FIG. 30A from the front and one side. As shown in FIG. 30B, some of the tubes 3002, 3002' contain printed circuit boards 110, 110A (only one of which is visible in this view) with luminaires 120 arranged such that they are equally spaced, on-center, within each tube 3002 and between adjacent tubes 3002. The uppermost tube 3002 is attached to a pole 3040 of the support structure 3006 by pole hangers 3030 that interconnect with one of the attachment extensions 3003, 3005 on the tube 3002. The next tube 3002 is connected to the first tube 3002 in a hanging manner using the mating attachment extension 3003, 3005, and subsequent tubes 3002 are interconnected in a similar manner. Additionally, as shown in FIGS. 30B-30C, the signage or display 3000 is not limited to incorporating tubes as described herein. Specifically, in this case, the signage or display 3000 includes other connector panels 3010, 3020. These connector panels 3010, 3020 interconnect to adjacent tubes using the attachment extensions and can be used for other purposes, for example, they can be partly or wholly opaque to contain non-changing printed information like a phone number, they can be transparent 3010, which might be useful in instances where it is desirable to allow through-viewing, such as when the signage or display 3000 is outside of a windowed building, they can be constructed as panels 3020 with through holes, which might be useful in instances where it is desirable to allow air to pass through, such as when the signage or display 3000 will be subject to significant winds such as a large flag display or when placed on the outside of an open air parking deck or spanning a gap between buildings, they could also be constructed to contain photovoltaic cells, also commonly interchangeably referred to as solar cells that are used to power some or all of the signage or display 3000.

Normally connector panels would have the same attachment extensions male and female (for example, as shown on one connector panel 3020) as whatever lighting assembly tubes they were interconnecting with. However, it should be understood that same type attachment extensions are also anticipated, on the tubes or connector panels (for example, as shown on another connector panel 3010, which has two male attachment extensions), such that direction of subsequent lighting assemblies will be reversed. Likewise, tubes and adapter connector panels can be used that have one form of attachment extension on one side and a different, non-compatible version on the other side, in order to allow typically non-compatible lighting assemblies to be interconnected. Thus, it should be appreciated that the use of attachment extensions can provide enhanced flexibility in the way tubes are attached to each other or other elements.

In FIG. 30C it can also be seen that connector panels can also serve as a way to change the lighting assembly components of a display from one lighting assembly type to another. For example, as shown one connector panel 3010 is connected to one lighting assembly 30 on one side and to another lighting assembly 30' on the other, which can be the same type of assembly, a different type of assembly, or some other element entirely, including, for example, another connector panel or a conventional sign. Connector panel 3020 is connected to lighting assembly 30' on both sides.

As shown, the lighting assemblies 30, 30' are similar except that the tube 3002 of one lighting assembly 30 has two attachment extensions 3003, 3005 and the tube 3002' of the other lighting assembly 30' has a single attachment extension 3003' and an internal cavity 3005'.

Using one or more internal cavities in combination with one or more attachment extensions is advantageous in that it enables adjacent tubes to be interconnected closer together. Alternatively, a given tube could be constructed to only have internal cavities and an appropriate connector panel could be used connect that tube to something else.

Additionally, as can be seen in FIG. 30C, the tubes 3002 of this implementation are configured for creating a two-sided display with two printed circuit boards 110, 110A inserted so that they are facing in opposite directions. Other options for a two-sided display can involve having double-sided base units or alternating the direction of every other base unit or lighting assembly.

While it is anticipated that external line power (not shown) may be supplied to the flag type display, in some cases, the pole 3040 could house battery storage or the display can be equipped with an external solar panel (not shown) in order to be self-contained.

Figure 31A:
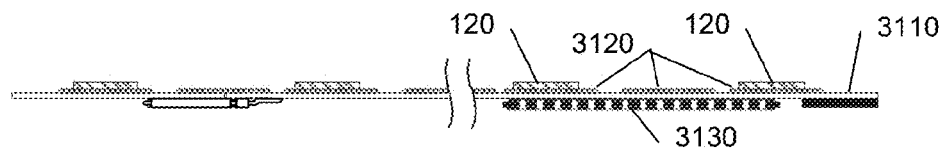
FIGS. 31A-31C illustrate, in simplified form, an edge and two front views, respectively, of multiple iterations of another variant type base unit.
Figure 31B:
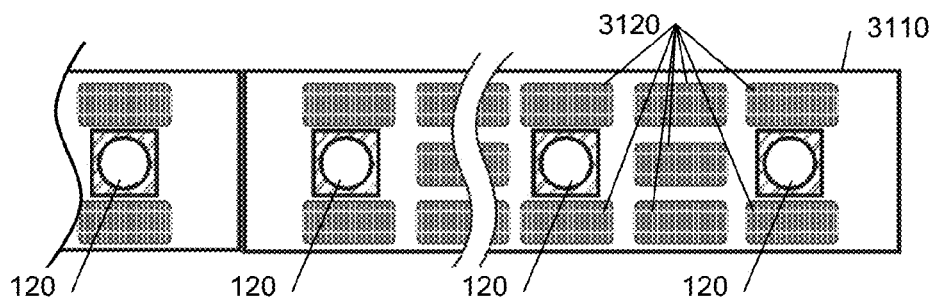
Figure 31C:
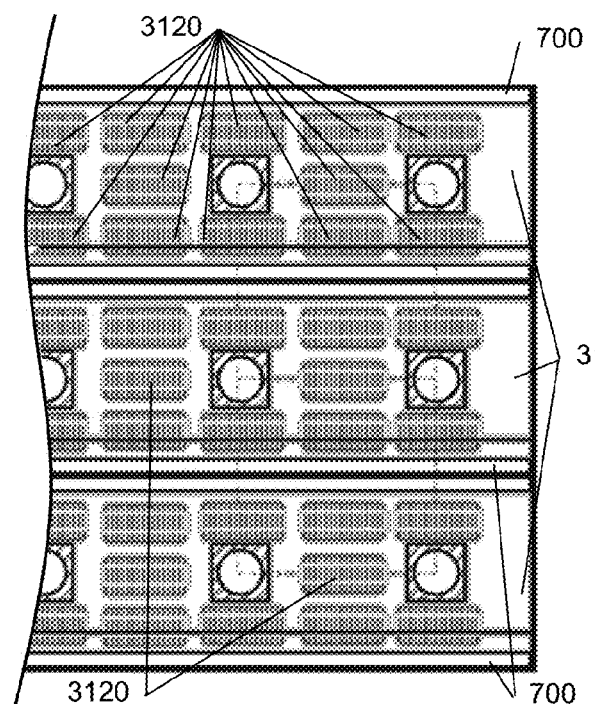
Figure 31D:
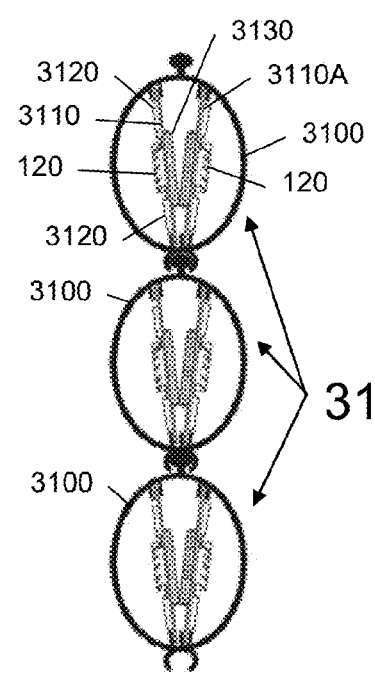
FIG. 31D illustrates, in simplified form, an alternative lighting assembly incorporating the base units of FIGS. 31A-31B.

FIGS. 31A-31C illustrate, in simplified form, an edge and two front views, respectively, of multiple iterations of another variant type base unit 3110 that, in addition to the luminaires 120, include multiple solar cells 3120 on the front face of the unit 3110 and a rechargeable power storage unit 3130 on the opposite face of the unit 3110. Advantageously, with this configuration the solar cells 3120 can supply power to the luminaires 120, in whole or part, and/or to the rechargeable storage unit 3130 to reduce or eliminate the need for an external power source for the display. FIG. 31C illustrates, in simplified form, the base units 3110 of FIGS. 31A-31B mounted in the tubes 700 of FIG. 7. FIG. 31D illustrates, in simplified form, an alternative lighting assembly 31 incorporating the base units 3110 of FIGS. 31A-31B. As shown in FIG. 31D, each tube 3100 includes two printed circuit board base units 3110, 3110A, which, depending upon the particular implementation could be identical to each other or mirror images of each other.

At this point, it should be understood that, although up to now the base units have all been described as having at least one luminaire 120 thereon, this need not be the case for all base units. In some implementations, it may be desirable to have one or more base units that do not have any luminaires 120 on them at all. Rather, for those implementations, it may be beneficial to have base units that contain, for example, one or more of: solar cells, batteries or other storage, wireless transmitter circuitry, wireless receiver circuitry, processing capability (e.g. one or more microprocessors or state machines) and associated program and/or data storage in the form of RAM or ROM, or simply additional electrical circuitry.

Figures 32A, 32B:
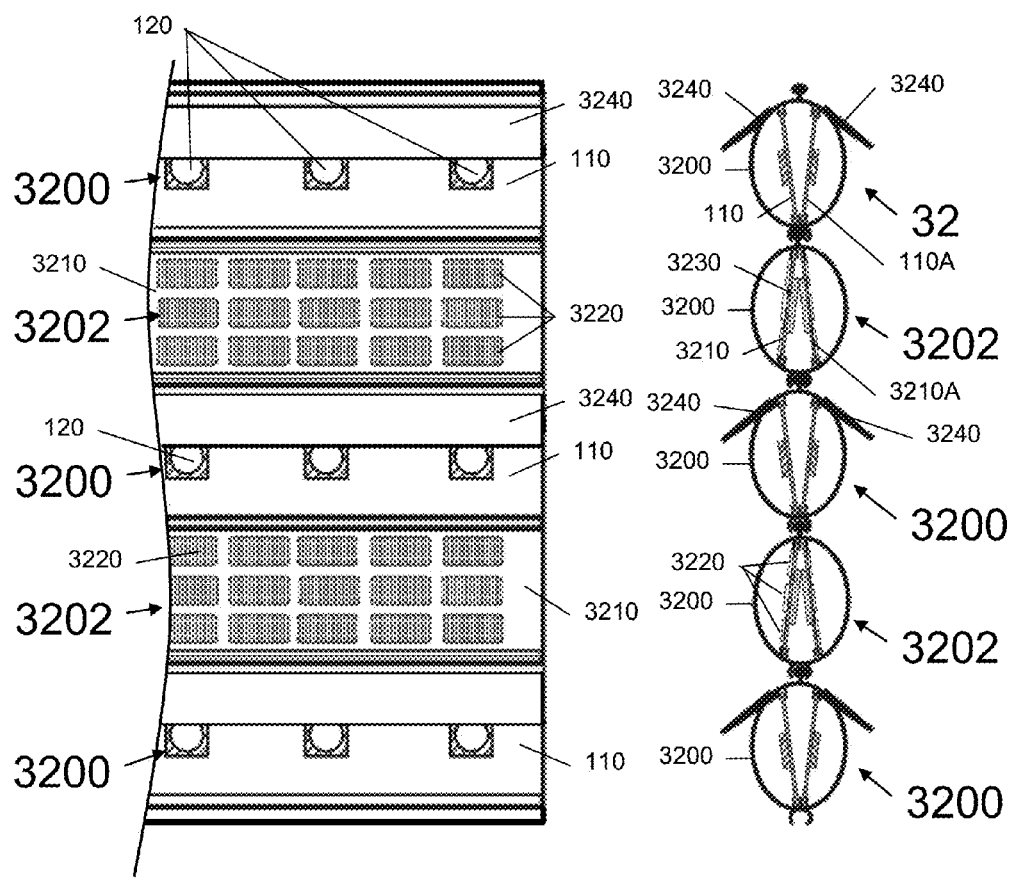
FIGS. 32A-32B, illustrate, in simplified form, a front and side view, respectively, of one example implementation of a lighting assembly.

FIGS. 32A-32B, illustrate, in simplified form, a front and side view, respectively, of one such example implementation of a lighting assembly 32 using such an approach. As shown in FIGS. 32A-32B, the alternating tubes 3200, 3202 respectively contain a base unit 110 having luminaires 120 thereon and a base unit 3210 that lacks luminaires but includes solar cells 3220 on one side and some form of rechargeable storage 3230 on the other. In addition, two different tubes 3200, 3202 are used with one tube 3200 formed so that it has a louver 3240 on each side designed to block the sun from hitting the luminaires 120, while the tubes 3202 containing the base units 3210 containing the solar cells 3220 lack any louvers because they would reduce or block light from impinging on the solar cells 3220.

Additionally, assuming some power storage is provided either separately or on the boards themselves, that storage could be utilized to collect and store power during off peak hours for use during peak hours. Since the cost of energy is much cheaper during off peak hours, this could greatly reduce the cost of operating a system incorporating teachings contained herein.

Figure 33A:
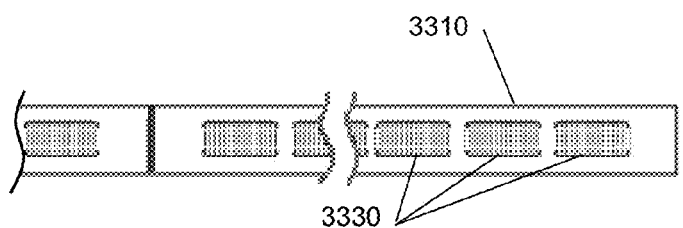
FIGS. 33A-33C, illustrate, in simplified form, a representative example of an approach that incorporates solar cells into the louvers.
Figure 33B:
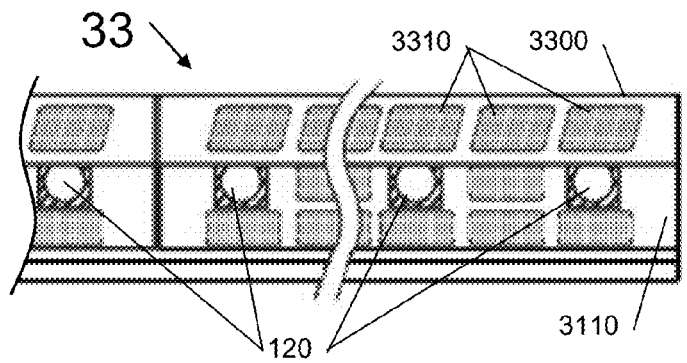
Figure 33C:
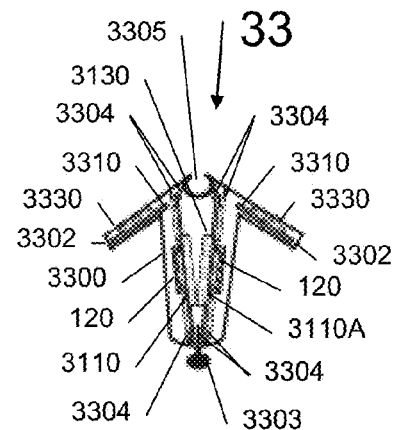

FIGS. 33A-33C, illustrate, in simplified form, a representative example of the foregoing approach that incorporates solar cells into the louvers. A tube 3300 is created with hollow louvers 3302 with interior dimensions sufficient to slidingly accept base units 3310 having solar cells 3330 thereon (FIG. 33A) into the interior, such as shown in FIG. 33C. The remainder of the tube is configured in a manner described herein so that it can accept, as shown in FIGS. 33B and 33C, multiple interconnected printed circuit boards 3110 and 3110A having multiple luminaires 120 thereon, in addition to the interconnected solar cell-bearing circuit boards 3310 inserted into translucent tube 3300. In this manner, the opacity of the base units 3310 perform the light blocking louver function while additionally collecting energy from impinging light. A further advantage to using tubes constructed according to the teachings herein is that inserted base unit(s) will render the louver opaque relative to the luminaires while being able to collect energy from impinging light. Depending upon the particular implementation, such an approach might mean that there would be no need for separate tubes to house solar cell containing base units (such as in FIGS. 32A and 32B).

For purposes of this example, the printed circuit boards 3110, 3110A optionally contain rechargeable storage units 3130; however, this is not a requirement. Nevertheless, in this particular case, such storage units 3130 can advantageously be connected to the solar cells in the louvers for additional charging power or the output of the interconnected circuit boards 3310 could feed directly into the power supply lines of the luminaire-containing printed circuit boards 3110, 3110A. Consequently, for implementations where solar cells on the printed circuit boards 3110, 3110A cannot themselves supply sufficient power for the particular application, the additional solar cells 3330 on the louvers 3302 can be used to augment that power and, in cases where the boards 3110, 3110A have their own rechargeable storage units 3130 and the combined power that can be collected using the solar cells can satisfy the luminaires' 120 requirements, no external energy source would be needed.

As briefly discussed previously, conventional lighting configurations are not very good at creating displays of uniform brightness. In contrast, by employing the teachings, displays having superior uniformity in brightness can readily be constructed. This aspect will now be discussed in greater detail.

Figure 34:
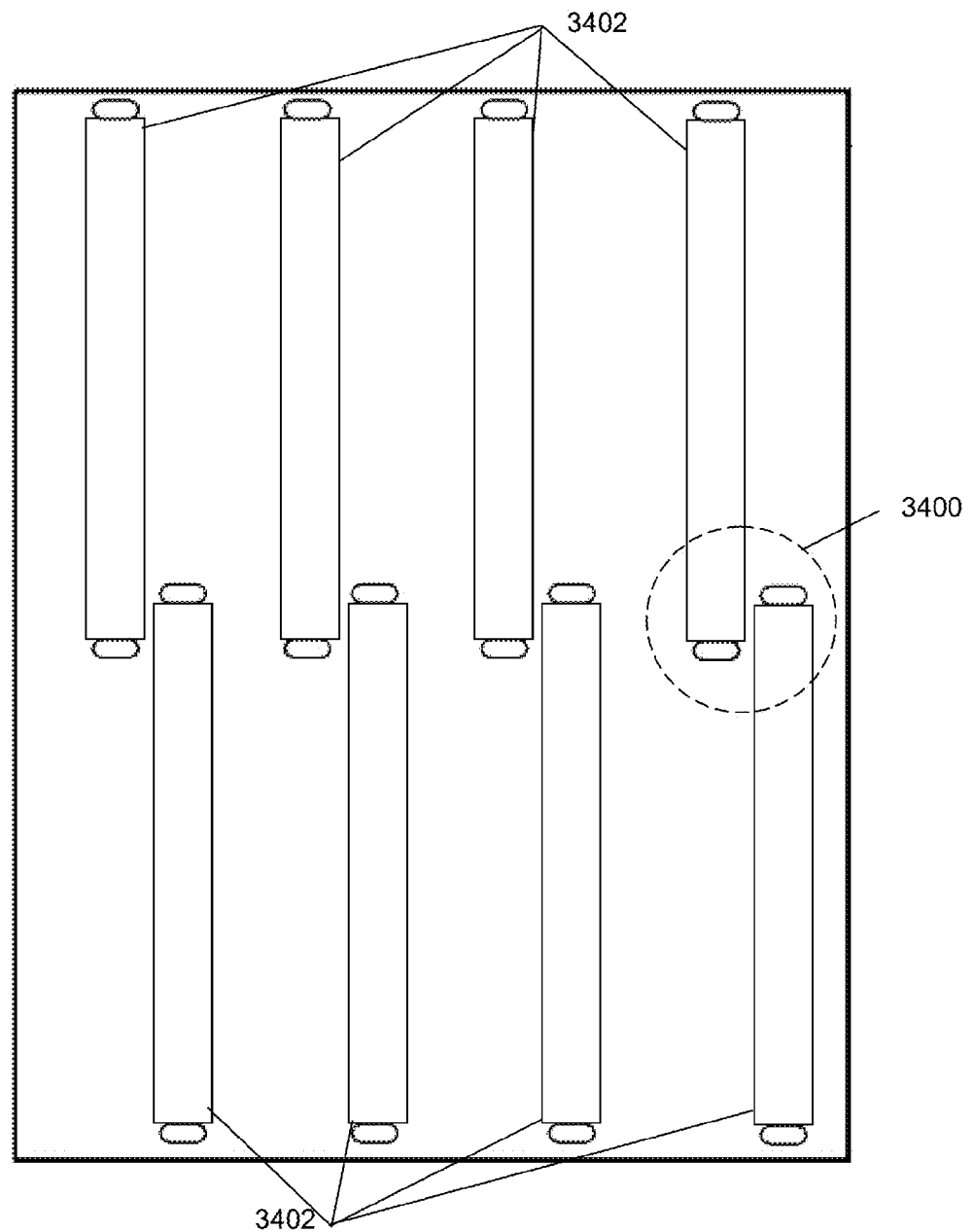
FIG. 34 illustrates, in simplified form, one example prior art attempt to make a uniform brightness lighting display using multiple fluorescent tubes.

FIG. 34 illustrates, in simplified form, one example prior art attempt to make a uniform brightness lighting display using multiple fluorescent tubes 3402. As shown, this configuration includes an area 3400 where the tubes 3402 of the lighting fixtures overlap in order to try to compensate for dark (non-uniform) spots typically created when such lighting fixtures are end butted together. While this configuration may be an improvement over the end butted configuration, overlapping the bulbs overcompensates by creating bright spots, which although more desirable than dark spots, still fails to achieve a truly uniform lighting display.

Figure 35A:
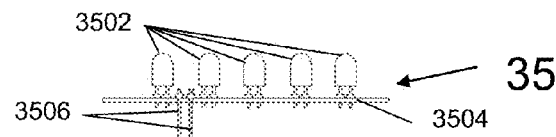
FIGS. 35A-35C illustrate, in simplified form, a prior art alternative attempt to make a uniform lighting display using a standard display matrix.
Figure 35B:
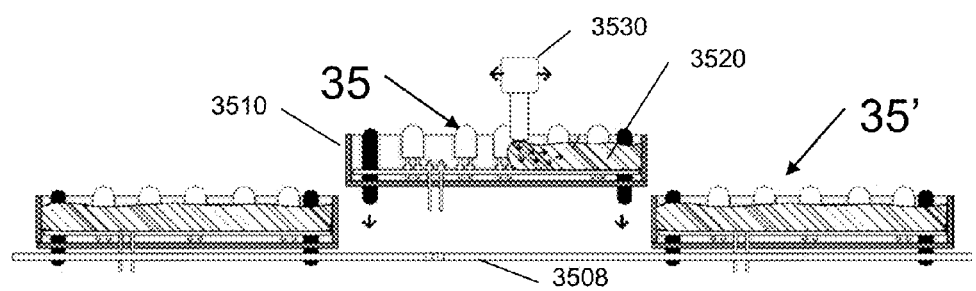
Figure 35C:
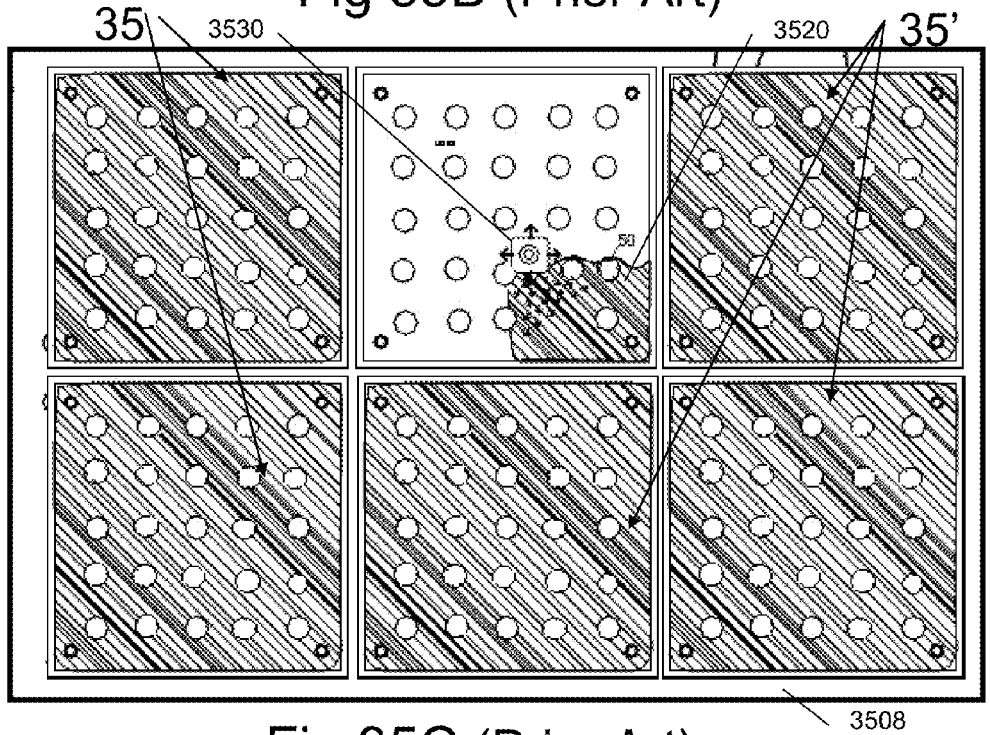

FIGS. 35A-35C illustrate, in simplified form, a prior art alternative attempt to make a uniform lighting display using a standard display matrix. With this prior art approach, as shown in FIG. 35A, a display matrix 35 is created by mounting multiple LEDs 3502 in an array configuration onto a circuit board 3504 such that they are all connected to, and can be powered via, a board connector 3506. As shown in FIG. 35B, the display matrix 35 (as shown made up of a 5×5 array of LEDs) is then inserted into a frame 3510, and an epoxy 3520 is flowed into the frame via a nozzle 3530 to encapsulate the board 3504 and the LEDs so as to form a unitary framed assembly 35'. As shown in FIG. 35B multiple framed assemblies 35' are then attached together via a underlying carrier, circuit board or support 3508 to create a larger display such as shown in front view in FIG. 35C. Alternatively, depending upon the particular prior art approach, the epoxy encapsulation can be held off until multiple boards 3504 have been attached to the underlying carrier, circuit board or support 3508. This alternative is represented in FIG. 35C wherein all but the upper center framed assemblies have already been epoxied and the upper center framed assembly is in the process of being flowed with epoxy 3520 via the nozzle 3530.

As each, or once all, of the assemblies 35' are thus formed, they are individually calibrated and can be used as part of a larger display. In practice, the individual calibration of the frames is a very time consuming and tedious task, adding cost in terms of time and/or manpower. Notably, the need for framing also limits the maximum board density and necessitates additional connectors and adds extra wiring. Not only is this extra wiring expensive, but it can add significant weight to a large display, further necessitating stronger supporting structures (adding additional cost), potentially limiting overall size for a given application or location, and potentially requiring additional manpower and/or expensive machinery to install on location.

While in some respects, the modularity of this prior art approach allows design engineers to approach design of a large system by replicating many smaller systems. The modular approach has disadvantages, particularly where graphical displays for the purpose of displaying video are created, because each module will have to be identical and have its own separate display driver(s) and potentially other circuit elements that add weight, cost, and points of potential failure.

To illustrate this problem inherent in prior art displays, FIGS. 36A-36B illustrate, in simplified form, a prior art attempt to make a uniform 10×50 element lighting display 3600 using a standard display matrix, such as the matrix 35' of FIG. 35B. As shown in FIG. 35A, are arranged in a columnar fashion of two matrix 35' units across and ten matrix 35' units down. FIG. 36B is a right side view of the array of FIG. 36A. In this view, the framed assemblies 35' are visible with the board connectors 3506 of the assemblies 35' for the far column inserted into connectors 3610 of one side of a transformer 3630 and board connectors 3506 of the assemblies 35' for the near column inserted into connectors 3620 on another side of the transformer 3630. Notably, although the prior art display of FIGS. 36A-36B show multiple assemblies 35' sharing an individual transformer 3630, in practice, as the framed assemblies get larger and larger, each framed module may need to have its own transformer 3630. As is well known, transformers are generally heavy, potentially undesirably noisy, and they give off significant heat. In contrast, using the teachings herein, a lighter, more compact display of the same 10×50 size can be created that costs less than its prior art counterpart above and can be assembled faster and easier.

Figures 37A, 37B:
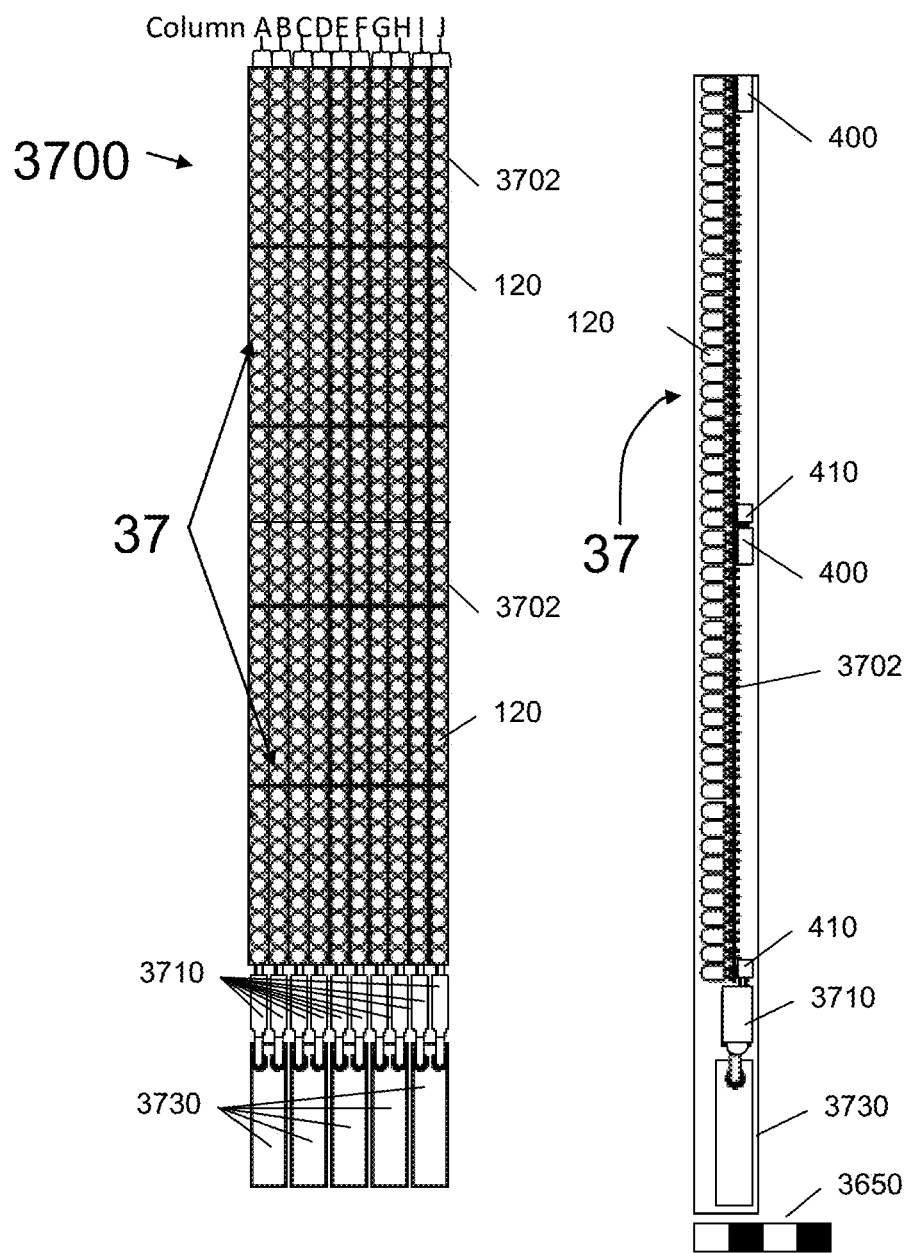
FIGS. 37A-37B illustrate, in simplified form, a front and right side view of a 10×50 lighting display constructed using the teachings contained herein.

FIGS. 37A-37B illustrate, in simplified form, a front and right side view of a 10×50 lighting display 3700 constructed using the teachings contained herein to create a display that is lighter, cheaper, more quickly and easily assembled and produces more uniform lighting than the 10×50 display of FIGS. 36A-36B. As shown in FIGS. 27A-27B, the display 3700 is made up of 10 columns of individual tubes 37 each having therein a set of interconnected base units 3702 with luminaires 120 thereon such that they form linear array of fifty luminaires 120 per tube 37. Consistent with the teachings herein, only the bottom base unit 3702 in each tube 37 is connected to a transformer 3730 via a connector 3710. As a result, even though this figure shows two tubes sharing a single transformer 3730, this configuration uses far less transformers than the prior art configuration of FIGS. 36A-36B for a significant weight savings. Moreover, by using some of the teachings herein, each tube (in its fully functional form) or the entire array could have been more easily constructed off-site of the installation location and then transported to the site for installation. Likewise, from the side view of FIG. 37B, it should be evident that less wiring is required for this configuration due to the use of the board-to-board connectors 400, 410. Moreover, and most advantageously, if a base unit 3702 (or portion thereof) should fail, it can easily and quickly be serviced from an end of its tube 37 and a transformer 3730 failure could be easily serviced without disassembly of any of the lighting portion of the display 3700, whereas, to service a failure of a lighting element or a transformer on any assembly 35' in the display of FIG. 36A-36B, could require access from the back, front, or possibly both. The advantage provided by using the teachings herein could be very significant if such a display was a billboard or wallscape high up on a building. Indeed, with many displays created according to the teachings herein, the transformers could be located inside the building (making them less susceptible to both weather and temperature fluctuations that tend to reduce their life) or in an external cabinet that is readily accessible from inside the building, for example, via a window (making servicing considerably safer and easier). Still further, as should be evident from a comparison of FIGS. 36A-36B with FIGS.

Figure 38:
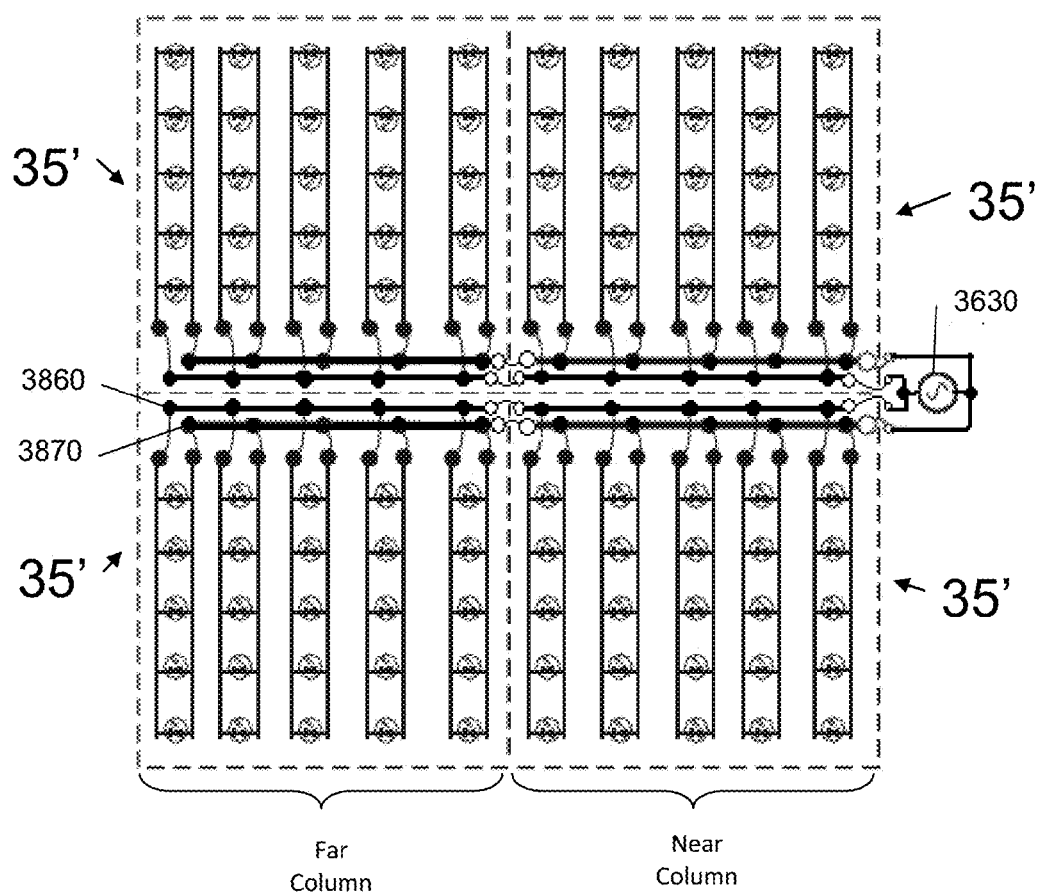
FIG. 38 illustrates, in simplified form, a schematic of a 10×10 lighting display constructed using four of the standard display matrix units of FIG. 35B.

37A-37B, using the teachings herein, an "M by N" array using the same luminaire elements can be thinner in overall depth than could be created using the prior art approach. A further drawback to the prior art modular display creation approach described above, is that it is difficult to efficiently match current draw of individual modules with transformer capability, particularly if one wants to reduce the number of transformers. That is because, using the prior art modular approach, it is not generally possible to fit the number of LEDs in a single module that are needed to take advantage of the full capacity of the associated transformer. Moreover, that problem cannot easily be addressed except by standardizing each particular module size (in terms of number of LEDs and their maximum power draw) as equal to, or some even fraction of, the power capability of the transformer with which it will be used. For example, FIG. 38 illustrates, in simplified form, a schematic of a 10×10 lighting display constructed using four of the standard display matrix units 35' of FIG. 35B. Unless the maximum power that could be drawn by each unit 35' of FIG. 38 was ¼ of the power that could be supplied by the power supply 3630 via the rails 3860, 3870, the transformer 3630 would always be under-utilized. Moreover, the overall display length and width must always be an even multiple of the length and width of the modules. In contrast, as shown in FIGS. 39A-39C, using the teachings herein, since it is possible to make tubes of any length and easy to fill a tube with different length base units having different numbers of luminaires that all share a common set of power rails 3960, 3970 through which a transformer 3930 can supply power, it is easier to create any desired display size while concurrently matching the number of required transformers or their capability to maximize efficiency or minimize unused power supply capability.

Up to now, many of the variant applications involved creating displays that provide uniform light. When creating such uniform lighting displays, such as described above, advantageously, any or all of the base units can be essentially interchangeable. This is not true however, when creating a large graphic display, for example, a digital billboard, that can display a static graphic image that changes or cycles with other images after some period if time, and/or can display video, since each board will potentially be displaying independent content and need to have some form of addressing scheme to enable the proper components to be lit in the proper way at the proper time.

The traditional approach for such displays is to hardwire each board with an address and to provide instructions or data related to what is to be displayed to each board on an address specific basis. While this approach makes sense and can certainly be used to create large graphic displays using tubes constructed according to the teachings herein such an approach requires each base unit to have a fixed or settable address or address range. As a result, if a base unit fails, a new unit must be used that has the same address/address range or can be set to that address or address range.

Alternatively, base units can be created for use as described herein that incorporate self-addressing such that, an individual base unit can be used in any location within the display because, only after the base unit is installed, will it be associated with a particular address or address range. U.S. Pat. No. 8,214,059 and U.S. Reissue application Ser. No. 13/921,907, both incorporated herein by reference in their entirety as if fully set forth herein, disclose systems and methods for creating and using wired and wireless self-addressing control units both with and without feedback. Advantageously, self-addressing control units constructed according to the teachings therein can be used in conjunction with the teachings herein to create graphic displays from identical base units as described herein. In this regard, U.S. Pat. No. 8,214,059 and Reissue application Ser. No. 13/921, 907 both specifically teach a circuit for addressing control units wherein two or three wires are used to control the units and the data flow to the units. Each of the control units self-addresses upon system startup. This is accomplished by each unit checking its ID number by looking at the ID number of the unit in front of it and adding a one to that number and storing that number in a permanent nonvolatile memory establishing its ID. This happens down the line and accordingly, an infinite amount of sequential control units can self-identify within the system. Thereafter, once the unit knows its ID number, it watches a main broadcast wire or fiber optic link or radio link or other communication means for its ID number. When it sees its ID number, it reads and uses the block of data that follows that ID number. Accordingly, if any of the control units should fail, the remainder of the units are able to function independent of the failed unit. Additionally, a failed unit can be replaced by any other operable unit, even one already in the system with another assigned number, and the replacement unit will appropriately address itself and will be active in the system. In this way a system of many control units or parallel computers is created, which units self-address and are able to look to a broadcast line for relevant data directed to them and perform a task as a collective unit.

Some of the immediately following descriptions will now describe various forms of self-addressing and example applications of those approaches. In connection with those discussions and illustrations, reference will be made to wiring representing certain signal lines, e.g. data and/or address lines in the singular for simplicity. However, it is to be understood that the reference to any such signal "line" is intended to encompass a single, serial, path as well as a parallel path, a path configured with a single wire, multiple wires in a ribbon or coaxial form, a wired bus, optical fibers, or any other physical signal transmission path usable under the circumstances through the application of ordinary skill. Likewise, the reference to wireless transmission of information is intended to encompass any wireless transmission method and/or protocol usable under the circumstances through the application of ordinary skill.

Figure 40A:
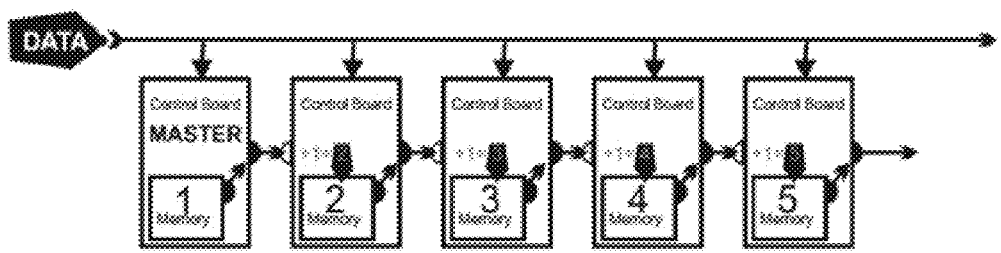
FIGS. 40A-40B illustrate, in simplified form, a self-addressing system as disclosed in incorporated U.S. Pat. No. 8,214,059 and incorporated Reissue application Ser. No. 13/921,907.
Figure 40B:
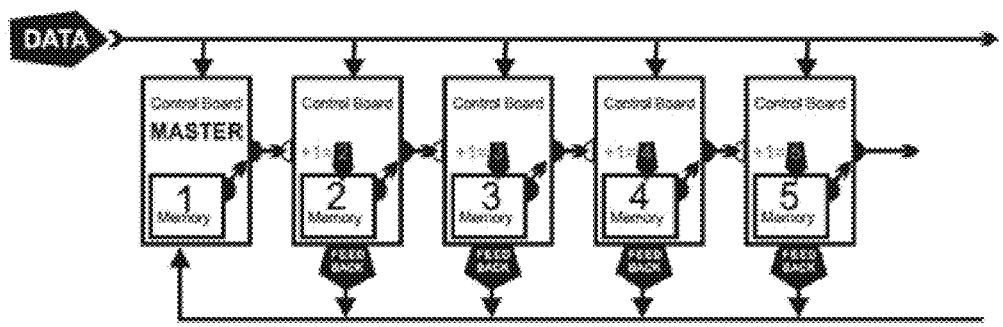
Figure 41A:
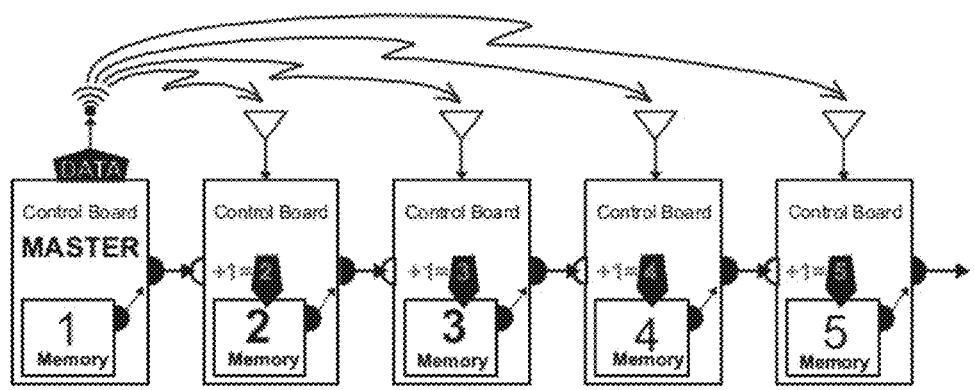
FIGS. 41A-41B respectively illustrate, in simplified form, a wireless version of the self-addressing system, incorporated by reference, both without a feedback line and with a feedback line.
Figure 41B:
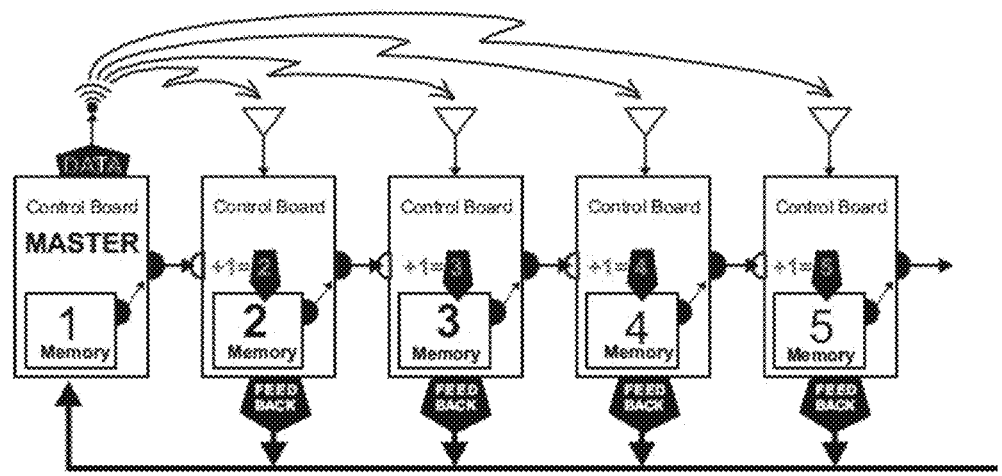

FIGS. 40A-40B illustrate, in simplified form, a self-addressing system as disclosed in incorporated U.S. Pat. No. 8,214,059 and incorporated Reissue application Ser. No. 13/921,907. Specifically, FIG. 40A shows an example implementation a wired version of a self-addressing system having a data line but no feedback line and FIG. 40B shows a similar system having a data line and a feedback line. Similarly, FIGS. 41A-41B respectively illustrate, in simplified form, a wireless version of the self-addressing system incorporated by reference, both without a feedback line (FIG. 41A) and with a feedback line (FIG. 41B).

For use according to the teachings herein, variants of the systems and methods described in incorporated U.S. Pat. No. 8,214,059 and incorporated Reissue application Ser. No. 13/921,907 will be implemented in constructing a base unit but generally, instead of adding "1" to the ID number, adds some constant value to the address, for example a binary value, 1, 2, 4, 8, 16, 32, etc., an octal value, a decimal value, etc. or applies a particular algorithm to or based upon the address, or uses a table search using or based upon the address to obtain its address (i.e. self-address). Depending upon the particular implementation, this will allow for the ID number to serve as an address, with values between one base unit and the next base unit forming a range of on board addresses for each base unit. For example, if a base unit only carries one luminaire made up of 4 LEDs of different colors: red, green, blue and white, and its ID number is "8", a constant of five could be added for the next (and each successive) base unit so that on this base unit, the address "9" could be assigned to the red LED, the address "10" could be assigned to the green LED, the address "11" could be assigned to the blue LED and the address "12" could be assigned to the white LED. In this manner, the control unit would look for either its ID number of "8" or an ID number equal to "8" or less than "13" such that the individual colored LEDs could be directly addressed or addressed as an ID number plus an offset. Alternatively, the incrementing could still be any constant, but data associated with that address would establish which of the LED(s) to turn on.

While the ability described in incorporated U.S. Pat. No. 8,214,059 and incorporated Reissue application Ser. No. 13/921,907 to look to a broadcast line to trap relevant data directed to each of the units is powerful in and of itself, as the size of the display increases, the number of units in series will similarly increase. As the number of units in series increases, at some point this can have a detrimental impact on the system's ability to send all of the instructions necessary for proper display in a timely fashion. For instance, with a large number of base units operating as described in incorporated U.S. Pat. No. 8,214,059 and incorporated Reissue application Ser. No. 13/921,907 or a variant thereof described herein, sending all of the data necessary down a physical data line may be acceptable for a marquee type scrolling display, but is not likely sufficient to display video on a very large display.

In such a situation, rather than just sending the data down one piece at a time to each unit, all of the data necessary to display an entire video (or some portion thereof) could be initially sent down the data line and stored in each unit in associated memory or a suitably sized buffer. Depending upon the particular information, the data could also include additional information such as frame number. Then the addressed base units would either listen for a synchronization pulse and output the graphical display associated with the frames one at a time in sequence or, if available, listen for a frame number and output the graphical display associated with the matching frame number.

As the number of units grows, depending on the frame rate and the length required for a physical data line, it may be necessary or desirable to use the same technique but wirelessly, in order to produce the desired quality due while avoiding the latency caused by physical propagation delays. With wireless data transmission, all units could receive the synchronization or frame number information substantially concurrently (i.e., without experiencing a propagation delay that could have a significant impact on display quality).

The technique of multiple base units making up a graphical display receiving information for which they can establish an initial address, store that address in memory, and then listen for broadcast instructions combined with the sending and storing of video, which may include additional information such as frame number, and then having the self-addressed units either listen for a synchronization pulse and output the graphical display associated with the frames one at a time or, if available, listen for a frame number and output the graphical display associated with the matching frame number is extremely powerful and has numerous applications beyond graphical displays like electronic billboards and wallscape displays and, in some cases, need not require specifically constructed base units. This combined technique will hereafter be referred to as "synchronized stored video" and, depending upon the particular implementation, can be operated wirelessly, through a physical data line, or some combination of both. One example application for which synchronized stored video could be used is in a concert to turn attendee's smart phones into parts of a giant ad hoc graphical display unit. In this particular case, if the seating in the concert location is fixed, then the video could be "overlayed" on top of the seating layout such that each seat would correspond to some known portion of the display "screen." Thus, the address that would be stored by each phone would correspond to the seat number on the ticket (or alternative representation of that location). Prior to the concert starting each attendee would be prompted to download an application (which might be persistent, temporary or concert specific) which would, in turn download some portion of (or the entire) video corresponding to that particular address (e.g. seat location). During the concert, attendees could then be prompted to start the application and hold up their smart phones which would listen for, for example, a synchronization pulse or frame number broadcast, for example, using, for example, the Bluetooth wireless data exchange standard, WiFi, WiMAX, 4G LTE, 5G data, etc. or any other smart phone-implemented data communication approach (the important aspect being the communication of data, not the standard by which it is communicated), and output their associated stored graphic display information.

Note here that the storage of a seat number or other location identifier is a special form of self-addressing not previously disclosed in incorporated U.S. Pat. No. 8,214,059 and incorporated Reissue application Ser. No. 13/921,907, which is independent self-addressing. With independent self-addressing, an actual physical location is able to be independently determined for the unit itself, without reliance on the rest of the components of the system, for example, the physical coordinates may be determined using, for example, built-in or associated GPS capabilities. In the concert example above, it is unnecessary for the units to pass address information between each other in order to establish a self-address. In this case, the self-addressing can be based upon the user inputting a physical location (seat number or other representative location identifier), which may be transitory or only applicable within some limited time period (e.g. during that particular concert for that user's specific location), so it is completely separate from any fixed addressing that has already been established for the phone (e.g. the phone number associated with, for example, its subscriber identity module or subscriber identification module (SIM) card). Advantageously, since the physical location of any particular user can be independently established, without communicating between units, whether or not someone is in the seat next to the user has no bearing on whether self-addressing can occur. Moreover, as opposed to fixed addressing, which, as its name implies, is typically pre-set and fixed, with independent self-addressing, the self-address will change as the location changes.

Further it should be understood that, in general, with the technique of synchronized stored video, the information stored in any individual addressed unit can be, depending upon implementation and/or intended application, any of: only the information that corresponds to a particular address, some portion or the entire video for all addresses, or the information associated with one or more address in close proximity (e.g. the two or three addresses that either proceed or follow it). The latter two can advantageously be useful, in the case of when a board is damaged and needs to be replaced. Adding the ability to not only send information that can be used to establish a new address but also communicating through that same address line what to display when the unit hears the synchronization pulse (or frame information), means that a failure of a given base unit in the system could be repaired without having to rebroadcast the data to all units. Advantageously, following repair/replacement the fixed or replacement base unit could simply receive all the appropriate data it needs from the unit in front of or behind it.

Alternatively, with an implementation variant that uses wireless data transmission, it is also possible to receive live broadcast video data without the need to receive and store the video ahead of time.

Figure 42:
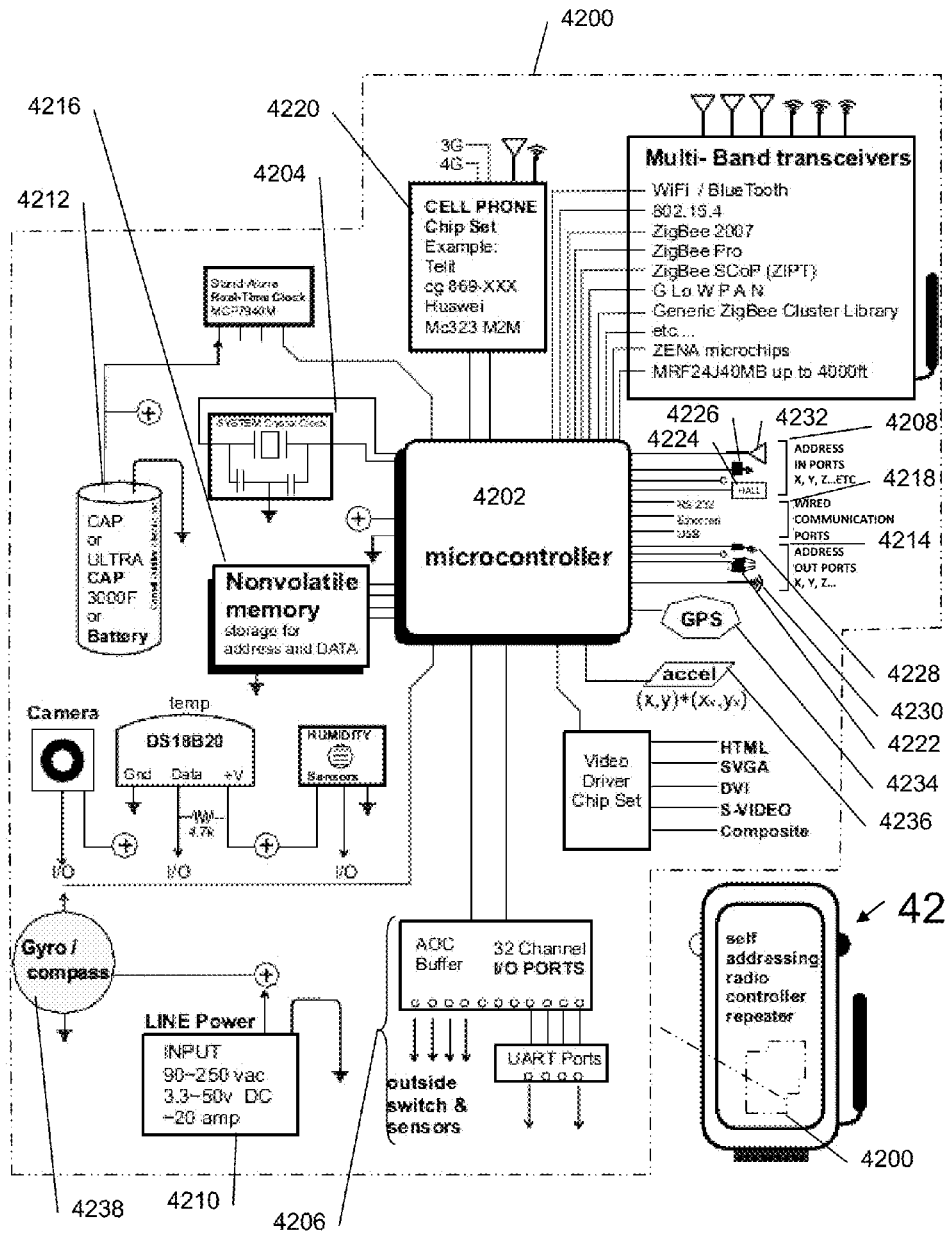
FIG. 42 illustrates, in simplified form, a schematic block representation of one representative example self-addressing radio controller repeater.

FIG. 42 illustrates, in simplified form, a schematic block representation of one representative example self-addressing radio controller repeater 42 capable of either capturing live video data or performing synchronized stored video and its contents, the functions of which are represented in the more detailed expanded representation and which would likely be implemented as a chip set 4200.

As shown, the chip set example representation 4200 includes components capable of performing numerous functions that range from graphical displays to non-display applications like coordinating synchronized movement a swarm of self-controlled or autonomous devices like robots, unmanned aerial vehicles (UAVs), mini or micro UAVs. Depending on the capabilities required for a particular application, it is to be understood that the represented chip set 4200 could be modified, expanded or reduced as necessary. For purposes of understanding the description herein (particularly the operational description that follows), at the very least, the self-addressing radio controller repeater 42 of FIG. 42 needs a microcontroller 4202, a crystal clock 4204, I/O Ports 4206, and a source of power 4210. In the case of the chip set 4200 of FIG. 42, power is shown as coming from two channels: 1) a capacitor or ULTRA CAP or Battery 4212 and 2) LINE Power 4210; however only a single source is necessary and, as previously discussed, power could be supplied by solar cells either on the base units containing a self-addressing radio controller repeater 42, from separate solar cell panels, and/or incorporated into, for example, one or more louvers.

For further purposes of understanding the description herein (and particularly the relevant description that follows) the self-addressing radio controller repeater 42 should also include: address IN port(s) 4208, address OUT port(s) 4214, and memory 4216 capable of storing an address. As shown, the memory 4216 is identified in FIG. 42 as nonvolatile memory. This is because nonvolatile memory allows one to perform repairs without the system needing to readdress itself. However, it is to be understood that the memory 4216 could alternatively be volatile memory or some combination of nonvolatile and volatile memory.

Alternately, for a non-self-addressing chip set (i.e. one with hard (i.e. fixed or physically settable) addressing) these features could be replaced by, for example, physical hard wiring of an address into a data port of the microcontroller, dip switches settable by a field technician wired into a data port of the microcontroller, or a fixed address written into code or burned into some form of Read Only Memory (ROM).

The address OUT ports are labeled as "X", "Y", "Z", etc. ... in FIG. 42. The purpose of this is to indicate both that there are multiple address OUT ports but also that they can individually transmit addresses for different dimensions. For example, with "X", "Y" & "Z" addresses in three-dimensional space can be represented using Cartesian coordinate scheme, or as values according to, for example, a polar, spherical or cylindrical coordinate system or any other coordinate system appropriate for the particular implementation, the only requirement being that sufficient address OUT ports are available to transmit the information needed to represent a given location using that coordinate scheme and that the receivers are capable of understanding information sent out according to that coordinate system. The inclusion of multi-dimensional address transmission allows for the creation of not only linear self-addressing arrays but also multi-dimensional self-addressing configurations.

While there are multiple address OUT ports there does not need to be an equivalent number of address IN ports. This is because, it is generally expected that the address IN information would typically be read from a single direction/channel. However, there is no technical reason why a variant could not be straightforwardly implemented according to the teachings herein that could have multiple address IN ports and receive multiple addresses in different dimensions or according to a defined coordinate scheme. For instance, in addressing a swarm of collectively moving self-controlled or autonomous devices, it may be more efficient to initiate self-addressing with several of the devices simultaneously at different locations around the periphery of the swarm and, as such, having multiple input lines configured as a multi-dimensional address IN could be beneficial. In such a case, the calculated address stored in nonvolatile memory of each device could either be a combination of the address IN information from multiple dimensions or a calculated address could be generated and separately stored from the information received for each dimension.

For configurations of displays or other devices that may be constructed according to teachings herein that use wired self-addressing, that self-addressing could be accomplished, for example through separate address ports, one of the I/O ports, or through wired communication ports 4218 configured according to, for example, a known standard such as RS 232, Ethernet, or USB. In this regard, it should be understood that the wired communication ports of FIG. 42 are representative of typical, known communication channels for purposes of understanding. It is to be understood that other communications schemes, whether standard or proprietary can be used to the same or similar effect for communicating addresses, data and/or feedback, again, the important aspect being the ability to communicate, not the particular connector or protocol used.

At present, if wireless data receipt (or transmission from a master control unit) is to be used, it is accomplished by one or more wireless data transmission channels. In that regard, the chip set 4200 is shown, for purposes of example only, as including a standard wireless communication channel of cell phone implementing, for example, 3G, 4G, 4G LTE, 5G, etc. (e.g. Telit cg 869-XXX Huawei Mc323 M2M), WiFi, BluеTooth, 802.15.4, ZigBee 2007, ZigBee Pro, ZigBee SCoP (ZIPT), G Lo W P A N, Generic ZigBee Cluster Library, ZENA microchips, MRF24J40 MB, ..., etc.) Alternatively or additionally, depending upon the particular implementation, short-range communication technologies, such as infrared, and/or other medium and long-range wireless communication channels and standard or proprietary protocols can be used.

Moreover, by selecting a microcontroller 4202 with appropriate processing power, the chip set 4200 can also straightforwardly be coupled to a camera or other image capture equipment to capture live video data and output it appropriately.

In addition, although wireless data reception is possible through a single wireless data transmission channel, for many implementations constructed according to the teachings herein, it will be desirable to have multiple data channels due to the fact that, in some cases, not all data channels will be available in all locations or, if they are available, there may be, for example, too much external noise on a particular channel to make it usable under the circumstances. Therefore, the ability to select from among multiple wireless data channels can be a desirable additional optional feature and could be accomplished, for example, through channel hoping with parity checks between the slaves and master using a step down hand shaking protocol or any other application-suitable approach, again the important aspect being the availability of different wireless communication channels, not the particular type of channel or protocol that may be used.

In order to perform synchronized stored video on a graphic display, the only change is that the memory needs to be of sufficient size to store the received video data. At this point, it is worth noting that, for this particular application, using nonvolatile memory for address and data is more desirable than using volatile memory from the standpoint of potential base unit repair and/or replacement. If volatile memory is used, powering down of a set of interconnected base units would cause a loss of whatever was in the volatile memory of all the powered-down units, not just the one(s) that needed repair or replacement. As a result, following repair or replacement of a specific base unit, every base unit in the row or column of the display (depending upon how the tubes are oriented to create the display) that lost power would need to have its data re-sent rather than just the repaired or replacement unit being installed. In contrast, by using nonvolatile memory, the address and/or data stored in the adjacent base units would not be affected by the power down to repair and/or replace any failed base unit(s) and the newly repaired or replacement unit could receive the necessary address and/or data from its closest neighbor(s) through the appropriate address IN and/or data port(s).

Figure 43:
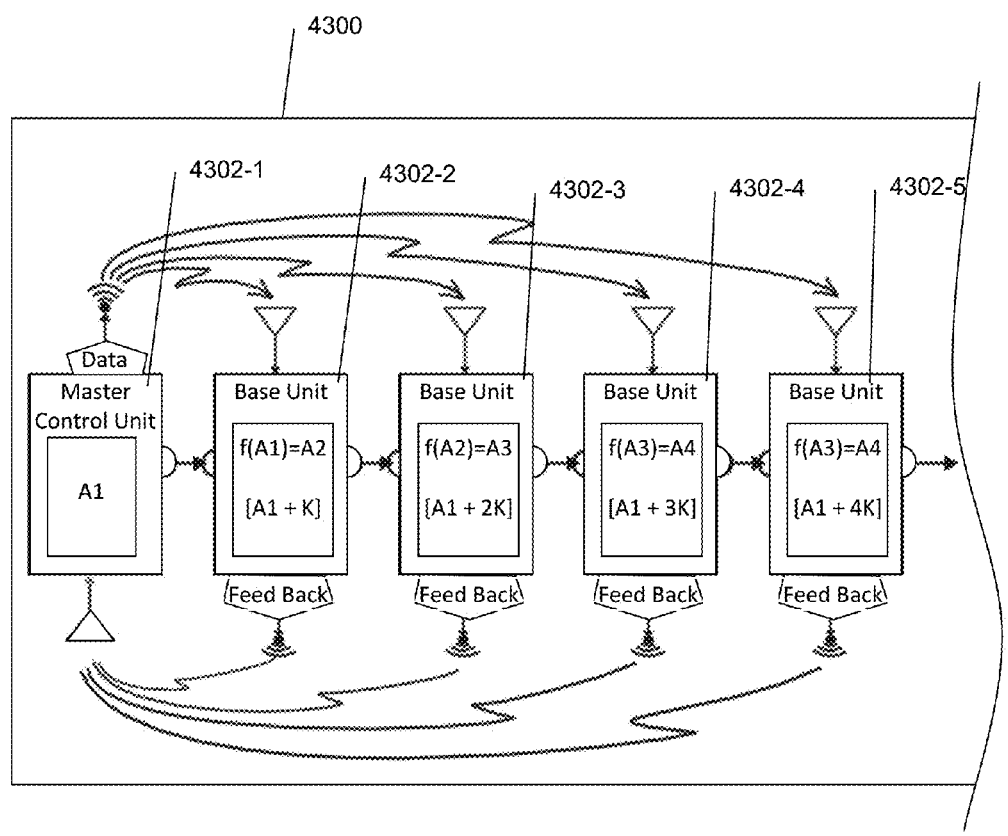
FIG. 43 illustrates, in simplified form, an arrangement of base units within a graphic display constructed according to the teachings herein.

FIG. 43 illustrates, in simplified form, an arrangement of base units 4302-1, 4302-2, 4302-3, 4302-4, 4302-5, within a graphic display 4300 constructed according to the teachings herein. As shown, the first base unit 4302-1 is a master control unit, which is electronically connected to the address port of the next base unit 4302-2 in the series. That base unit 4302-2 is similarly electronically connected to the address port of the next base unit 4302-3 in the series and so forth. As shown, the electronic connection between both the master control unit 4302-1 and the next base unit 4302-2, as well as the connection between subsequent base units 4302-3, 4302-4, 4302-5, is shown as a one-way data connection, as it provides electrical isolation between chip sets. However, for other implementations, this could alternatively be a two-way data connection.

The master control unit 4302-1 has the ability to wirelessly broadcast addressed data packets, receive feedback wirelessly and transmit an address to and from each of the other base units 4302-2, 4302-3, 4302-4, 4302-5.

The other base units 4302-2, 4302-3, 4302-4, 4302-5 each have the ability to wirelessly listen to a data stream transmitted by the master control unit 4302-1 and extract data from within the stream specifically addressed to it (and to follow instructions within that data), as well as the ability to transmit address information, and the ability to wirelessly provide feedback.

When an address "A1" is transmitted from the master control unit 4302-1 to the next base unit 4302-2 in the series (which, as shown in the example of FIG. 43 could be any constant value) that next base unit 4302-2 uses the transmitted address information and a predetermined algorithm f(A1), or lookup table, to calculate or determine its own address, A2, and stores the derived (i.e. calculated or looked-up) address in its memory (again, typically, but not necessarily, nonvolatile memory). In FIG. 43, a specific sample predetermined algorithm that adds a constant "K" to the received address information, [A1+K], is shown, as well as a more generic representation of a predetermined algorithm, f(A1), to indicate that any appropriate algorithm, derived value, or look up approach can be used. After that particular base unit 4302-2 has determined its address, based upon the address it received, that base unit 4302-2 will pass its derived address A2, in this case "[A1+K]" to the next base unit 4302-3 in the series, which will then determine its address in the same way and pass it on, and so forth, until all base units have received an address from their immediately preceding base unit and derived their own address from the one they received.

A less sophisticated alternative variant approach (or one that can be applied if an intermediate base unit has failed) does not require each base unit (or the base unit after the one that failed) to calculate its address and output it, but rather causes the base unit to broadcast its stored address back to a master control unit and either explicitly ask the master control unit for an address to output to the next base unit or to simply know to wait for the master control unit 4302-1 to broadcast an address for that base unit to output to its next neighbor. The waiting base unit would then listen for the master control unit 4302-1 to send a data packet directed to its particular address and then respond accordingly. This technique could be used in any instance were a feedback channel is provided, wireless or otherwise, such as shown, for example, in FIG. 40B and/or FIG. 41B, which would provide a way for the master control unit 4302-1 to know that one or more base units in the series has a failure that creates one or more "gap(s)" in the series. At any point, if a base unit is at the end of the line (or is otherwise unable to transmit an address to the next base unit in the series, due to for example that base unit either being missing or damaged, then after it has determined and stored its individual address, it could simply do nothing or, if there is a feedback channel the base unit can provide feedback to the master control unit that it cannot provide its address to a next base unit or, if it has a way of knowing (like some form of terminator being attached where the next board would be, that it is the last base unit in the series.

Optionally and/or alternatively, if the master control unit knows how many base units there are, the system can be configured so that the master control unit can count when it receives feedback from all of the base units or, if it knows or can calculate all of the addresses that should be calculated by each base unit, then, as each base unit feeds its determined address back to the master control unit 4302-1, the master control unit can delete or mark that address as set, in either case, the master control unit can know whether or not the full contingent of base units have all determined their addresses. In a further alternative approach, based on a pre-established protocol, the master control unit can simply wait for the last base unit in the series to broadcast its address and assume that the address received represents the end of the line.

With wired addressing, another approach that a master control unit can determine that a given base unit is the last in the series is that the base units could have been pre-programmed or have received instruction from the master control unit that, if its calculated address corresponds to a specific value, then it is suppose to be the last base unit in the series. Alternatively, if the address line provides two-way communication, then a base unit could listen for a handshake from the next successive base unit following passing its address to the presumed next base unit in the series. If it does not receive a handshake within a specified timeout period, the sending base unit could assume it is at the end of the series. Finally, depending on the particular variant and its electrical configuration, it is possible to, using known techniques, configure the system to poll information about an I/O port and determine if there is anything connected to the port based on measuring current drain or some other electrical propert(y/ies).

Aside from listening for a broadcast from the last base unit in the series, which may never come in the event of a failure of a base unit, the master control unit could send out addressed instructions to a particular base unit requesting that it provide feedback of either its address or some other requested status information. Depending upon the particular implementation, the addressed instructions could either be targeted information to the base unit anticipated to be at the end of the line, they could be in the form of a "roll call" where each base unit is sequentially requested to provide its address or some status information, or base units can be requested to provide address or some status information according to a standard search algorithm, for example one that could allow the system to identify where a failure occurred.

One representative example of a standard search algorithm uses a type of half interval search. This would be accomplished by sending a request to a base unit in the center of the series for its address or some other information. If it is received, the problem is between the center and the end. If not, the problem is between the master control unit and the base unit in the center of the series. Once the half range where the problem is located is determined, the center base unit in the half range with the problem is the halved in the same manner. The process (halving the bad group with the problem and then checking) repeats until the failed base unit is isolated.

The simplest protocol for wireless feedback, assuming multiple wireless communication channels are available, is to receive data on one channel and to provide feedback through a separate wireless communication channel. However, in the event that the same wireless channel must be utilized for both receipt of data and feedback then a protocol, for example as follows, could be implemented based on the use of base units configured in a master/slave relationship. The protocol would rely upon a base unit slave, knowing that it is a slave, and so it will never broadcast unless it has received specific instructions from the master control unit to provide feedback. Other alternative protocols, such as the slave only providing feedback during pre-established breaks, could also be used. Indeed, any protocol that would allow for ensuring that all good base units have their address and, optionally, allow for the detection of a failed unit can be used.

Since the wireless communications channels of the base unit shown in FIG. 42 allow for two-way communication, it is also capable of wireless self-addressing. Given the capabilities of the chip set 4200 of FIG. 42 as shown, it is possible to use the wireless channels of that chip set 4200 for self-addressing over distances from less than about 2 feet (under normal operation) to across the globe using cell phone technology. In some implementation cases however, with the interlocking base units discussed herein, excessive crosstalk could be a problem. As a result, chip set 4200, as shown, also optionally can include separate wireless addressing channels that can be used for such close quarters circumstances where crosstalk could be a problem. Specifically it optionally could include any one or more of the three wireless transmitter-receiver pairs shown. One such transmitter-receiver pair 4222, 4224 that could optionally be included is a Hall effect transmitter-receiver pair, with the transmitter 4222 indicated by the magnet with a coil wrapped (a magnetic field producer) around it and Hall effect receiver 4224 represented by a box with a small coil on its end. Another transmitter-receiver pair that could be used is an optical transceiver pair 4226, 4228, which could be any pairing that uses electromagnetic waves (in the visible or invisible parts of the spectrum) such as ultraviolet, infrared, visible light, or coherent beams (i.e. laser), etc. to communicate between the two. A third example transmitter-receiver pair that could be used is a broadcast transmitter receiver pair 4230, 4232, illustratively represented by antenna, which could use any conventional broadcast wavelength within the electromagnetic spectrum appropriate for the distance, available power and application.

FIGS. 44A-44F illustrate, in simplified form, a functional example of a sequence of actions making up one method of wireless self-addressing using a wireless transmitter receiver pair and a base unit 4302-1 configured as a master control unit and some of the other base units 4302-2, 4302-3, 4302-4 from FIG. 43. Specifically, FIG. 44A also includes an address signal 4400, FIG. 44B also includes an address signal 4400' and feedback 4410, FIG. 44C also includes broadcast data 4420 and an address signal 4430, and FIG. 44D also includes an address signal 4430' and feedback 4440.

The Master Control Unit 4302-1 has the ability to wirelessly broadcast addressed data packets, receive feedback wirelessly and wirelessly transmit and receive an address.

The base units 4302-2, 4302-3, 4302-4, each listen to the broadcast by the master control unit 4302-1 for their specific address in the broadcast and extract data (which may be true data or data representing instructions for that base unit to act based upon) from within the stream that is specifically addressed to it and act accordingly based upon what is received.

Additionally, in some implementations, a master control unit can also have the capabilities of a base unit (i.e., it can listen to the broadcast from another master control unit (not shown) for its specific address and extract data (which may be true data or data representing instructions for it to act based upon) from within the stream that is specifically addressed to it and act accordingly based upon what is received.

FIG. 44A illustrates the initiation of the addressing process. The master control unit 4302-1 will begin broadcasting an address signal 4400. If the address signal 4400 is insufficient to initiate addressing then nothing will occur and no feedback will be received by the master control unit 4302-1.

If no feedback is received, then the master control unit 4302-1 will broadcast another address signal 4400', which could be the original address signal 4400 simply rebroadcast with increased signal strength trying a different wireless transmission channel, if multiple wireless channels are available, or, if a wired channel is also available, sending the same signal via the wired channel.

FIG. 44B illustrates, in simplified form, the circumstance where the rebroadcast addressing signal 4400' is sufficient to initiate addressing. The first base unit (or next base unit in implementations where the master control unit is also a base unit) receives the addressing signal 4400' and, based upon information contained in that signal 4400', it calculates its address, stores the calculated address in nonvolatile memory, and provides feedback 4410 to the master control unit 4302-1 indicating that it has been addressed.

FIG. 44C illustrates, in simplified form, the next step, in which the master control unit broadcasts data 4420 that then tells the first base unit 4302-2 to transmit its address and instructs all of other currently unaddressed base units 4302-3, 4302-4 to, for example, listen for any address being broadcast, listen only for a specific address being broadcast (which might be useful in a crowded situation where other nearby master and slave base units are also using self-addressing, or listen for an address that meets certain parameters or for a base unit to do so if it meets certain specific parameters.

Examples of specific parameters that could be used in some variants include, to only respond to an address signal broadcast at a specific strength or on a specific wavelength or channel or to only respond if the base unit has specific GPS coordinates or meets some specific criteria.

FIG. 44C illustrates, in simplified form, the next step in which the initially addressed base unit 4302-2 initially transmits its address signal 4430 to the next base unit 4302-3 in the series. As with the master control unit, if there is no response then that base unit can do a rebroadcast. FIG. 44D illustrates, in simplified form, the next step for the case where no response to the initial broadcast was received. As shown, the base unit 4302-2 transmits a new address signal 4430', which, as with the master control unit, could be a rebroadcast of the original signal with increased signal strength or potentially trying a different wireless transmission channel if multiple wireless channels are available, or, if a wired channel is also available, sending the same signal via the wired channel.

When the next base unit 4302-3 has determined its address, it similarly provides feedback 4440 back to the master control unit 4302-1.

FIG. 44E illustrates, in simplified form, the process steps of FIG. 44C and FIG. 44D until all of the base units have provided feedback to the master control unit 4302-1 that they are addressed. FIG. 44F illustrates, in simplified form, that all base units 4302-2, 4302-3, 4302-4, . . . , are addressed and the master control unit 4302-1 can now send data and/or instructions to those base units 4302-2, 4302-3, 4302-4, . . . to effect the desired display.

Figure 45A:
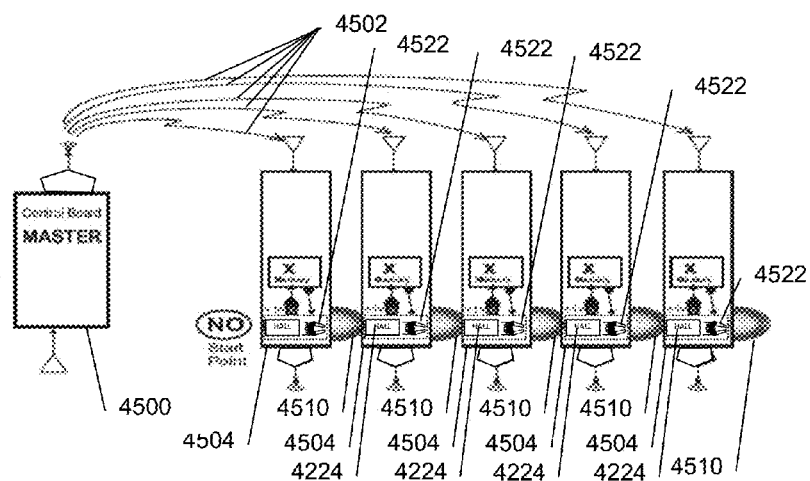
FIGS. 45A-45C illustrate, in simplified form, a functional example of a sequence of actions making up a method of independent wireless self-addressing.
Figure 45B:
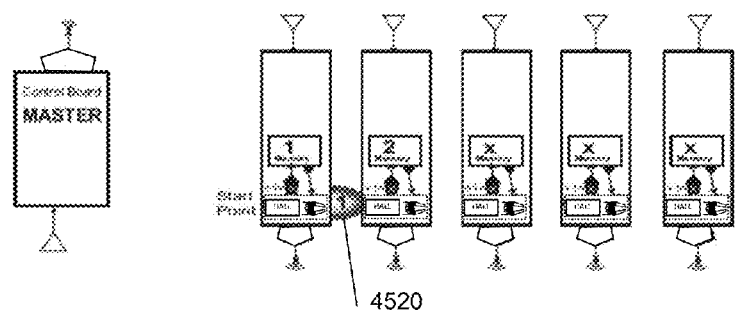
Figure 45C:
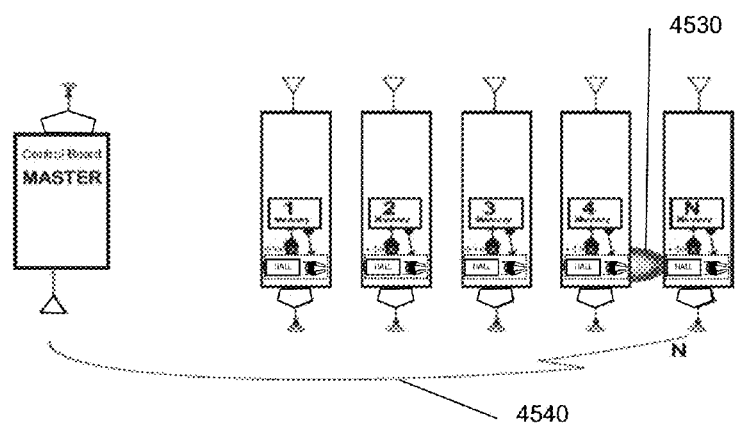

Unlike FIGS. 44A-44F, where the starting address was transmitted by the master control unit 4302-1, FIGS. 45A-45C illustrate, in simplified form, a functional example of a sequence of actions making up a method of wireless self-addressing without needing a master control unit to supply an initial starting address to it. As shown in FIGS. 45A-45C the example transmitter-receiver pair is a Hall effect transmitter-receiver pair. As a side note it should be mentioned that, since a Hall effect transmitter-receiver pair is directional, all of the discussion related to FIGS. 45A-45C is equally applicable to other directional transmitter-receiver pairs including those operating on a purely "line of sight" basis (which is a special, more limited case, of directional transmitters and/or receivers).

Returning to FIGS. 45A-45C, a base unit or other device acting as a master control unit 4500 has ability to wirelessly both broadcast addressed data packets and receive feedback. FIG. 45A illustrates the initiation of the addressing process for this approach. The master control unit 4500 sends broadcast data 4502 to instruct all of the base units 4504 to begin the addressing process. In response, all of the base units 4504 send out an address signal 4510 to their next neighbor base unit in the series, which in its simplest form is simply an "on" pulse but, in more complex implementations, could be one or more instructions and/or particular data. In FIGS. 45A-45C, the base units are configured with a linear alignment of the Hall effect transmitter-receiver pairs 4522. Advantageously, as a result, any base unit 4504 that does not receive an input pulse from a preceding base unit 4504 will be able to determine that it is the first base unit in the series and, thereby establish itself with an address, depending upon the particular implementation which may be part of the initial broadcast data 4502, or may be calculated or predetermined from contents of particular address data in its storage, that corresponds to the address to be used by a first base unit in the series. For example, in a simple example, a internal instruction in each of the base units 4504 might say that the predetermined address that corresponds to the first unit is equal to "1" if (a) the base unit does not receive an input pulse from a preceding neighbor base unit to which it is connected via its hall effect receiver and (b) a master control unit 4500 did not otherwise specify an address to use for the first unit in its initial broadcast data 4502.

While, in general, many independent wireless self-addressing implementations will have some unit 4500, be it a base unit, or something else, which will perform the functions of the master control unit, its presence is not required for all implementations. For some implementations, the functions of the master control unit could also be initiated within the power-up routine built into each base unit so that, for example, upon power-up, after waiting some time interval to allow for stabilization, each base unit 4504 could transmit an address initiation pulse to its next neighbor base unit and at the same time look for the receipt of either an address initiation pulse or an address from its preceding neighbor base unit to determine if it was the first base unit in the series. Depending upon the particular implementation, a base unit could be configured to determine if it is the last base unit in the series based upon some form of detection or feedback, or could simply operate as if there was a next base unit, even though there is no unit to receive anything from it.

Once a specific base unit 4504 determines that it is the first in the series, it will, for example, use a pre-determined address stored within it as a default address or calculate an initial base unit address based upon instructions and/or data contained therein, and if necessary, store that initial address in its memory. Upon completion of determining its address by whatever method, that first base unit can then begin the next step in the addressing process by, as shown in FIG. 45B, transmitting an address signal 4520 to the next base unit in the series so that it can determine its address, and so forth for each base unit down the line.

FIG. 45C illustrates, in simplified form, the case when the last base unit in the series receives an address signal 4530 from its preceding neighbor base unit. After determining and storing its own address, since it has determined on power up that it is the last base unit in the series, that base unit sends feedback 4540 to the master control 4500 that either, it or all, of the base units 4504 have been addressed. This is because, depending upon the particular implementation, each base unit can be configured to, for example, send its own feedback signal to the master control 4500 once it has determined its own address (which is useful for cases where a base unit cannot determine that it is the last in the series or where this action may be used to help identify a failed base unit) or, if a base unit can determine it its the last in the series to minimize the number of feedback signals the master control 4500 must handle.

At this point it should be noted that, in different implementations, it is possible for a base unit to determine that it is the last one in the series through various approaches including, for example, the setting of a dip switch or jumper on a base unit during installation to indicate that it is a last unit, or, if what would be the last address in the series is known, that address value could be set on one or more of the intended last base units so that each can perform a simple "compare" to determine whether its address is that set value and, if it is, then it is the last base unit in the series.

Figure 46A:
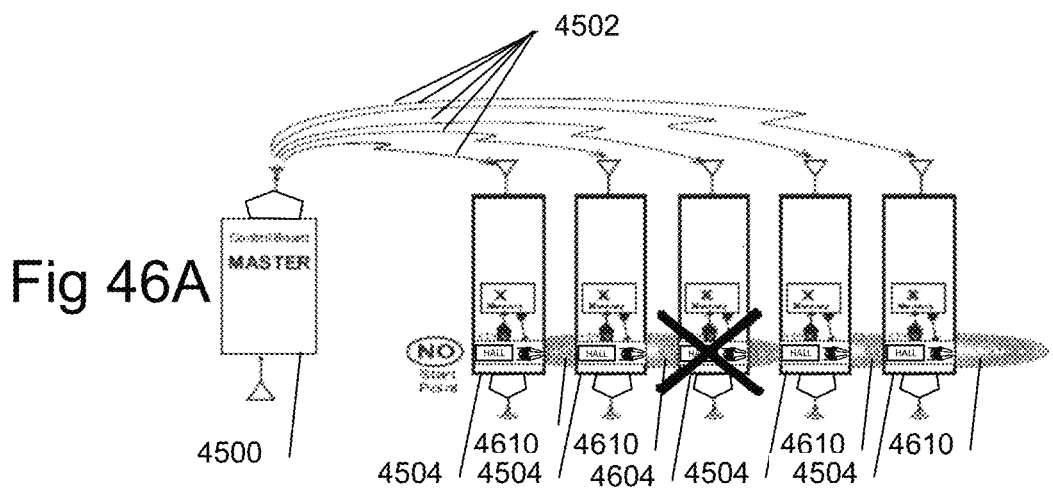
FIGS. 46A-46D illustrate, in simplified form, the functional example of how a failed base unit in the independent wireless self-addressing configuration of FIGS. 45A-45C can be determined and handled.

FIGS. 46A-46D illustrate, in simplified form, the functional example of how a failed base unit in a wireless self-addressing configuration of FIGS. 45A-45C can be determined and handled. The configuration of FIG. 46A-46D is identical to that of FIGS. 45A-45C except that, one of the base units 4504 is now a damaged base unit 4604. As shown in FIG. 46A, the process is initiated according to one of the approaches described in connection with FIG. 45A but, it should be noted that, in this variant configuration, the Hall effect transmitter-receiver pairs, being directional, are configured such that, on the transmit side, the transmitted signal is an "overflow signal" in that it strong enough to reach the receiver of not only the immediately adjacent base unit, but the base unit thereafter (called a "jump" base unit) but no further, but the signal is also weak enough at the jump base unit that it will not interfere with, or be overshadowed by, a similar signal provided by the immediately adjacent base unit. On the receiver side, the receiver is configured to receive the signal from its preceding base unit as described in connection with FIGS. 45A-45C under normal circumstances but detect that it is receiving an overflow signal as a jump base unit if the signal has a strength below a certain level. Returning to the process of FIGS. 46A-46D, due to the fact that there is a failed base unit 4604 in the series (indicated by the "X" over it), which, in this example, is unable to both transmit and receive an address signal, the base unit immediately after the failed base unit 4604 will not receive the address pulse 4610 signal at full strength. Instead, it will receive a reduced strength address pulse from the base unit immediately in front of the failed base unit 4604. As a result, this base unit will be able to establish that it is a jump base unit and not the first base unit in the series. At this point it should be noted that this might not be the case with many implementation involving "line of sight" transmitter-receiver pairs because, the intervening failed base unit 4604 would block the transmission to the base unit that comes after the failed base unit and, thus, both the first base unit in the series and what would be the putative jump base unit would both think they are first base unit in the series unless specific "work around" circuitry was implemented in the base units to deal with this situation. Since the creation of such "work around" circuitry to handle this case in this particular type of implementation is not necessary for understanding the teachings herein and would involve the application of routine skill and general design choice, that aspect is left to the creator of such particular implementation and not discussed herein.

Figure 46B:
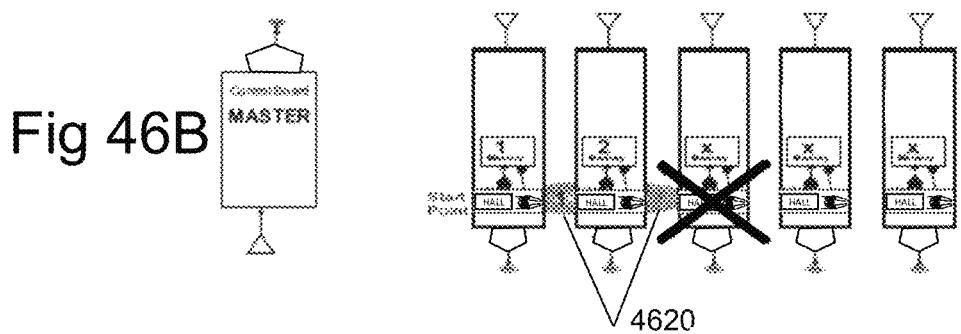

In FIG. 46B, as in FIG. 45B, the first base unit determines that it is the first in the series and the process of addressing all of the base units in the series by transmitting an overflow signal address signal 4620 to the next base unit in the series proceeds.

However, due to the failed base unit 4604 the base unit in the series after the failed base unit will receive a reduced strength overflow address signal 4630 from the base unit immediately in front of the failed base unit 4604 and determine that it is a jump base unit as a result. Once a base unit is a jump base unit, depending upon the particular implementation, the jump base unit could be configured to take any of multiple actions according to, for example, the intended application, the base unit capability or implementer's needs or abilities. By way of a few representative example approaches not intended to be exclusive, the jump base unit could be programmed to do nothing, it could be programmed to send a feedback signal 4640 back to the master control 4500 and wait further instruction, it could use the reduced strength address signal to establish its address (effectively ignoring the intervening failed base unit 4604 and making it the next in the series) and then either continue as normal (and optionally additionally send feedback 4640 to the master control unit 4500), it could send feedback 4640 to the master control unit 4500 indicating that the preceding base unit is a failed base unit and provide the address it received as a reduced strength overflow address signal so that the master control unit 4500 could determine the proper address for the jump base unit to use and transmit it back to the jump base unit so the process could proceed, or it could apply an internally stored alternative determination protocol that would allow it to use the overflow address signal and use it to determine its proper address.

Figure 46C:
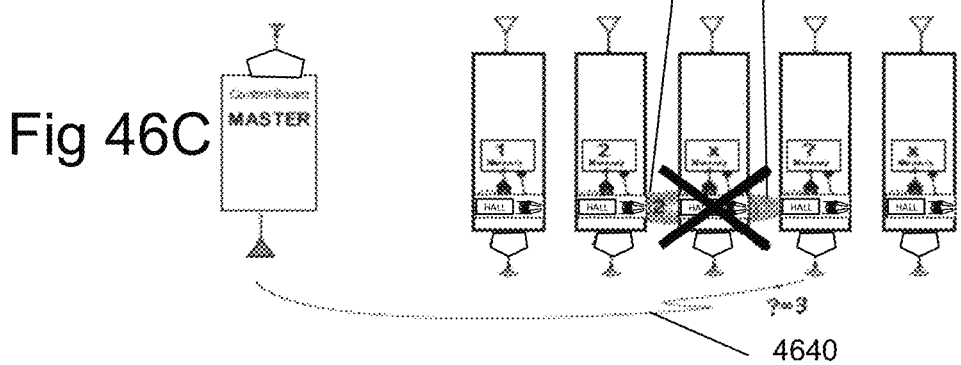
Figure 46D:
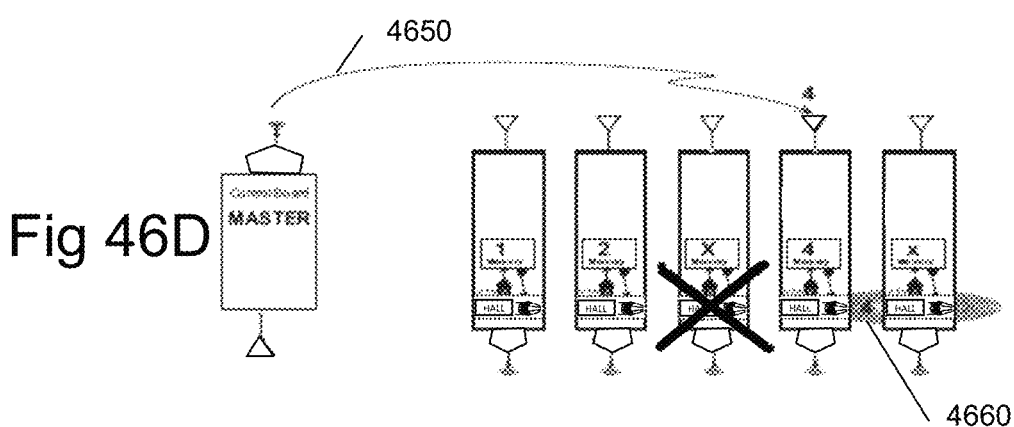

In this manner, as shown in FIG. 46D, having received appropriate broadcast data 4650 back from the master control unit 4500, the jump base unit can continue the process down the line by sending its address signal 4660 out to the next base unit in the series (not shown).

As an aside, in some implementations, once all the base units 4504 have self-addressed, the master control unit 4500 could individually poll the base units to determine whether the purported failed base unit 4604, rather than being completely failed, might just have a weak output, in which case an actual base unit failure may have incorrectly been assumed. In this recovery scenario, there would be two or more addressed base units with the same address, which the master control unit 4500 could then easily correct by sending out instructions to the jump base unit and all base units thereafter in the series to readdress.

Still other forms of handling self-addressing in the face of a failure of a base unit could involve having redundant transmitter receiver pairs that directly bypass the base unit that they are on and are only used as a fallback in a failure case. While this approach allows for an additional level of recovery, it is not as powerful as using multi-dimensional address reception. In the simplest case, with reference to FIGS. 46A-46D, putting a second set of transmitter receiver pairs acting in the same direction would produce a single dimension (X) redundant system. However, reversing the direction of the second set of transmitter receiver pairs (-X) would result in a form of multi-dimensional address reception.

FIGS. 47A-47E illustrate, in simplified form, a representative example of a configuration of base units 4704, of which one is a partially failed base unit 4706, illustrate a system implementing multi-dimensional address reception. As shown, all of the base units 4704, including the partially failed base unit 4706 are constructed like the base units 4504 of the previous figures, except that they also include a second set of transmitter receiver pairs 4708a, 4708b arranged in a reverse direction to establish the second dimension (-X).

As with the examples of the previous two sets of figures, FIG. 47A illustrates initiation of the addressing process. As before, the master control unit 4700 will send broadcast data 4702 to instruct all of the base units 4704, 4706 to begin the addressing of the series along the primary dimension (X). All of the base units 4704 will then send out an address signal 4710 to the next base unit down the line in the primary direction via the first set of transmitter-receiver pairs and, as appropriate, determine if they are the first or last base unit in the series.

Due to the fact that there is a damaged base unit 4706 in the series, which, in this example, is unable to transmit an address signal 4710 to the base unit that immediately follows. However, since the address signal 4710 is an overflow address signal, the base unit immediately after the damaged base unit 4706 will not receive the address pulse 4710 at full strength. Instead, it will receive the overflow address signal 4710 as a reduced strength address and follow the appropriate protocol applicable to jump base units as, for example, described above.

For this example however, and in contrast to the example of FIGS. 46A-46C, presume that the base unit 4704 immediately following the damaged base unit 4706 (indicated in FIG. 47A with "Starting Point?") was unable to determine whether or not it was the first base unit in the series, which could be the case if the Hall effect transmitter-receiver pairs were replaced with "line of sight" transmitter-receiver pairs, or possibly if the signal to noise ratio was insufficient to make the determination.

As a result, as shown in FIG. 47B, addressing in a second dimension (–X) would be triggered (or, in other implementations, initiated as part of a standard addressing protocol). This process could be initiated by the master control unit 4700 sending new broadcast data 4712 for use by the second set of transmitter-receiver pairs (or in some cases, could involve the master control unit sending both sets of broadcast data 4700, 4712 in a single step). The reverse dimension address signal 4720 is then transmitted in dimension –X, starting from the last base unit in the series (illustratively shown as the base unit farthest from the master control unit 4700 and it is assumed for illustration purposes that this base unit can determine that it is the starting point.

At this point, the advantages and power of multidimensional address reception becomes apparent. For example, since this base unit did receive an address signal in the X dimension but did not receive an address IN signal, it can determine, as shown in FIG. 47C, that it is at the end of the line. This means that the end point can be established without requiring either the master control unit 4700 or any base unit 4704 to know ahead of time the total number of base units in the series to determine an end point, which allows for dynamic configurations to be more easily constructed.

As shown in FIG. 47C, with multi-dimensional address reception, the master control unit 4700 sends out broadcast data 4730 to instruct the base units 4704, 4706 to begin transmitting addresses beginning with the first base unit in each dimension. In the case of the X dimension the damaged base unit 4706 would result in two base units initially acting as if they are both starting points and both of them will initially transmit the first addressing signal 4740. In contrast, in the –X dimension there is only one starting location and only one initial address signal 4750 would be transmitted in the –X dimension.

FIG. 47D illustrates, in simplified form, that the addressing signals, to the extent that they can, will continue to propagate in both dimensions. Note here that, for simplicity, the algorithm used for self-addressing in both the X and the –X directions is simply to add the constant value "1" to the previous address; it should be remembered that the value could be any constant and/or the algorithm could have been any algorithm. Ultimately, in the case of the X dimension, two address signals 4760 would propagate due to the multiple start points, but one would make it to the end because one of the base units 4706 is damaged. However, in the –X dimension, the address signal 4770 would propagate all the way through without error. Once a base unit has determined its address in both the X dimension and the –X dimension, it provides feedback to the master control unit 4700 identifying its address in both dimensions. As a result, the mid series base unit that incorrectly thought it was a starting point now has its –X dimension addressed as well and so it provides feedback back 4780 to the master control unit 4700 that its addressing is complete and, for purposes of simplicity in this example, that its address is "1" in the X dimension and "3" in the –X dimension. If the self-addressing was properly performed in the entire series, the highest address received as feedback by the master control unit 4700 for the X dimension would match the highest address received as feedback by the master control unit 4700 for the –X dimension and, if not, the master control unit 4700 would know that there was a problem in one of the dimensions, namely, the one with the lower address. Alternatively, if the master control unit 4700 receives duplicate addresses in a dimension, they will both begin at the same value and propagate in duplicate until the failure point is reached, the master control unit 4700 will know, or can derive, that there is a failure in the base unit, along the dimension where the duplicate self-addressing occurred, immediately following the last duplicate address. With another alternative, if the master control unit knows the total number of base units, or the expected final address, from the feedback it can compare the highest value received in each dimension to that number and, again, if a mismatch occurs, this is indicative of a self-addressing failure and it can use an approach herein to identify the point of failure.

Additionally or alternatively, in some implementations, the master control unit 4700 may or may not know the final base unit count, but, with this approach, at some point it will receive duplicate addresses in one dimension and (unless there is a failure affecting both dimensions on one or more base units) an address that is at least one address higher than in the other dimension, with the higher number indicating, directly or indirectly, the total number of base units. Moreover, with this information and assuming a single failure affecting only one dimension, the master control unit 4700 can readily derive from the highest address it receives in each dimension, how far down the line (i.e. which base unit) has the failure. For example, in FIG. 47E, when self-addressing is complete, the highest address in the X dimension would be "3", whereas the highest address in the –X dimension would be "5". Subtracting "3" from "5" would yield "2" and indicate the failure was in the second base unit in the X dimension. As a result of this new information, the master control unit 4700 can then take action to cause the base units to correctly self-address by sending additional broadcast data (not shown) to tell the base unit immediately following the failure in the particular dimension (and optionally the base unit with the failure) the proper address(es) or by providing information from which the proper address(es) can be determined. In the example of FIG. 47E, it could therefore tell the base unit 4704 immediately following the base unit 4706 with the failure in the X dimension to use address "3" in the X dimension address and trigger a propagation down the line thereafter. Optionally, the master control unit 4700 could tell the base unit 4706 with the failure to use address "2" in the X dimension so that, if it is otherwise functional, it could work properly despite the addressing problem. Notably, the same approach would still work if there is more than one failure in a single dimension (provided there were no failures in the other dimension). In that case, the master control unit 4700 would receive feedback of three or more duplicate addresses and would proceed to handle the first failure in the line as described above. However, since there were multiple failures, then:

1) if the failures existed on two or more adjacent base units, the self-address values would not propagate from the base unit immediately following the first failure, (i.e. the situation would remain unchanged) indicating that the next board likewise had a failure. The master control unit 4700 could then move on to the next successive base unit, and so forth, until there was a proper correlation of end addresses in both dimensions; or 2) if the failures existed on two or more base units with at least one good base unit between any two failures, the single failure approach would be used to account for the first failure. Then, in an iterative fashion, the same approach would be used starting from the base unit immediately after the accounted for failure until the final addresses in both dimensions properly correlated.

Aside from advantageously providing powerful recovery capabilities in the event of one or more failed units, multi-dimensional addressing can also be utilized to self-address very complex systems.

FIGS. 48, 49, and 50A-50C illustrate, in simplified form, representative examples of how to use multi-dimensional addressing to self-address a display, made up of a series base units 4840, each having multiple luminaires 120 thereon, that have been connected together and axially inserted into the board support channels of a set of axially aligned tubes constructed according to the teachings herein, and configured in a two-dimensional matrix for self-addressing using wired (FIG. 48), wireless (FIG. 49) and combination (FIGS. 50A-50C) approaches. While, for purposes of these examples, and simplicity of understanding, a two-dimensional matrix is used, it should be understood that the same teachings can readily be extended to a three dimensional grid, or to any number of dimensions as desired for the particular application. Note here that, for purposes of discussion, the terms "row" and "column" may be used in certain examples. It is to be understood that this usage is intended to only differentiate between orthogonal dimensions (e.g. the X & Y dimensions of a Cartesian coordinate system) and not intended to imply or require any particular orientation of the lighting array or other device within which the self-addressing approach is used. In other words, depending upon the particular display involved, the base units linearly arranged within a tube could be referred to as a "row" or as a "column" irrespective of whether the tube itself is oriented within a plane horizontally, vertically, or at some angle, or, within a three-dimensional system, at some combination of angles defining a complex orientation within a three-dimensional system. Moreover, and likewise, the term multi-dimensional addressing is intended to purely be a reference to addressing within a lighting system independent of the orientation of the display in any given plane or in a three-dimensional space.

Figure 48:
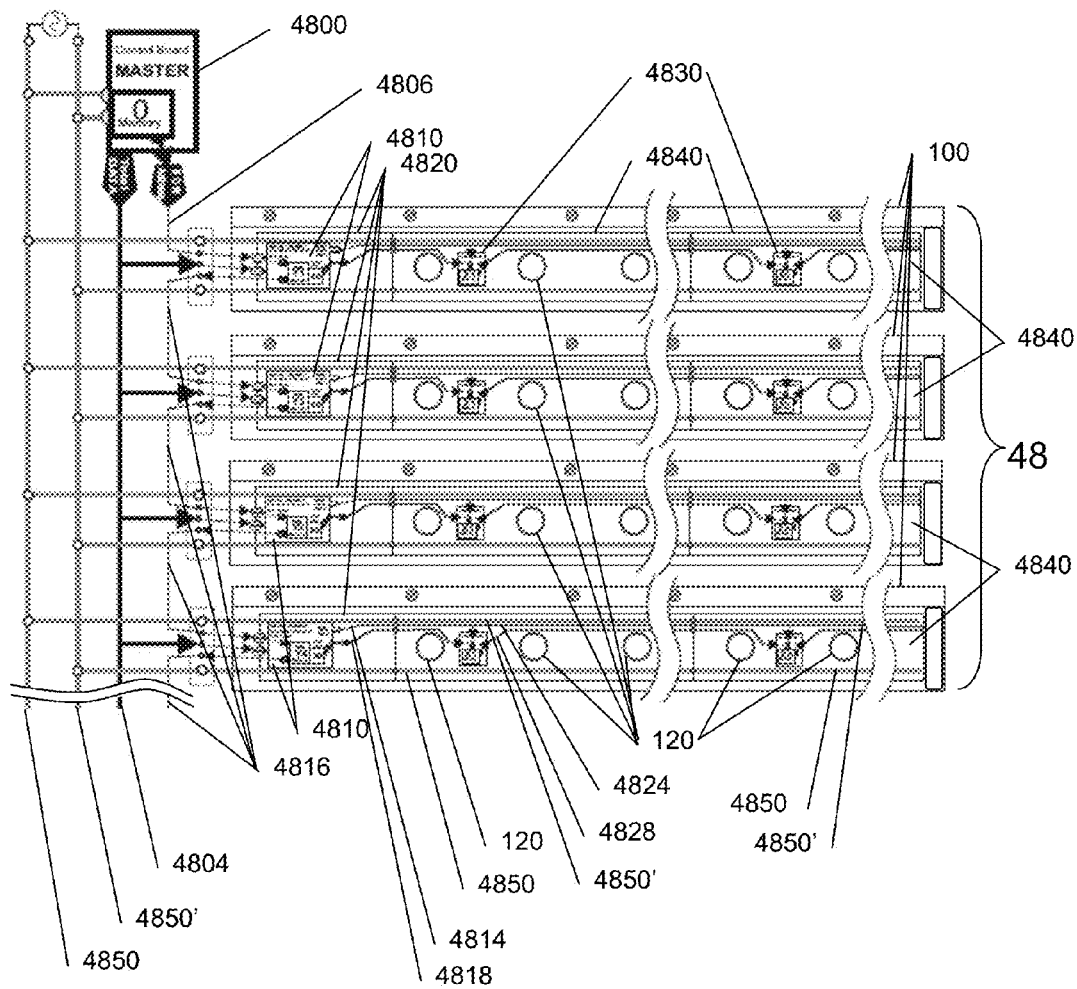
FIGS. 48, 49, and 50A-50C illustrate, in simplified form, representative examples of how to use multi-dimensional addressing to self-address a display.

Specifically, FIG. 48 illustrates, in simplified form, the use of multi-dimensional self-addressing of a two-dimensional matrix (grid) using wired data transmission in connection with a lighting assembly 48. Each tube 100 in the lighting assembly 48 includes, in this example, at one end, a printed circuit board 4820 with a master/slave unit 4810 mounted thereon, a data line 4814 extending to a board-to-board connector element, an address line 4816 wired in between each two printed circuit boards 4820 of adjacent tubes 100 and another address line 4818 connecting the printed circuit board 4820 to a series of interconnected printed circuit boards that are the luminaire-bearing base units 4840. Each of the luminaire-bearing base units 4840 has a chip set 4830 that corresponds to one of the variant chip sets described in connection with FIG. 42, a board-to-board data line 4824 ultimately serially connecting all of the base units 4840 in each tube 100 to the data line 4814 of the printed circuit board 4820, a board-to-board address line address line 4828 ultimately serially connecting all of the base units 4840 in each tube 100 to the address line 4818, and rails 4850 and 4850', which supply power to all printed circuit boards 4820 and base units 4840 within each tube 100.

In addition, the master/slave units 4810 on each printed circuit board 4820 are coupled to a data line 4804 from a master control unit 4800 so that they can receive data and instructions from the master control unit 4800 via the data line 4804.

The master control unit 4800 is interconnected to the first tube 100 of the lighting assembly 48 through an address line 4806, which is propagated to subsequent tubes 100 of the lighting assembly 48 in multi-dimensional manner via each tube-to-tube address line 4816.

Within each tube 100 of the lighting assembly 48, the self-addressing between master/slave unit 4810 and the chip sets 4830 within the tube can be accomplished in a linear address transmission manner as described herein in connection with FIG. 40A or, if a data feedback line is included, as disclosed in incorporated U.S. Pat. No. 8,214,059 or Reissue application Ser. No. 13/921,907. However, the addition of subsequent lines of tubes 100 to form the lighting assembly 48, being multi-dimensionally interconnected through the tube-to-tube address line 4616, renders linear address transmission unsuitable by itself for some implementations. For others, it is possible to first address within a tube 100 of the lighting assembly 48 and then address between the following tubes 100 if the last address within a tube 100 or the total number of addresses that will be used within a tube is known, allowing the master control unit 4800 to sequentially send the proper address to each master/slave units 4810, however, that approach requires additional addressing lines (not shown) to connect the master control unit 4800 to the master/slave units 4810.

The protocol of self-addressing between subsequent tubes 100 of a lighting assembly 48 starts with the master unit 4800 and progresses sequentially through the master/slave units 4810 of each tube 100 as if it was a separate linear self-addressing array as described herein. The initial address is transmitted from the master control unit 4800 to the first master/slave unit 4810 in the series. The initial address transmitted could be any value but for illustration purposes the number 0 will be utilized. The first master/slave unit 4810 then, through a predetermined algorithm, calculates and stores its "row" address in its nonvolatile memory. For illustration purposes the predetermined algorithm will be assumed to be adding a constant value, but the algorithm could be more complex, could involve accessing a lookup table, could involve a combination of those approaches (i.e. apply an algorithm and then use the result as a hash value into a table), or any other suitable algorithm. Once it has self-addressed, the initial master/slave unit 4810 will output its address, using the address line 4816, to the next sequential tube's 100 master/slave unit 4810, which will repeat the process to determine its self-address and then pass it on to the next master/slave unit 4810 of the next tube, and so forth until all of the master/slave units 4818 have been self-addressed. Assuming, merely for purposes of understanding in connection with this example, the predetermined algorithm is to simply add the value of "1" to the previous address, then this will result in the "row" addresses sequentially being (in FIG. 48, from top to bottom) the values of "1", "2", "3", . . . . Once all the rows have been addressed, then self-addressing of the boards 4840 within each tube 100 of the lighting display 48 can proceed.

At this point it should be noted that this example approach requires the self-addressing of all of the master/slave units 4810 of the tubes 100 to be complete before the inter-tube addressing begins. That is because it is presumed that the lighting display 48 incorporates an approach that allows the master control unit 4800 to detect a failed master/slave 4810 unit, for example using teachings contained herein, or some conventional approach for detecting a failed electrical device, and thus, if there is a failure in one of the master/slave units 4810, the master control unit 4800 may need to trigger some of the master/slave units 4810 to repeat the self-addressing process after taking some action. Of course, there is no technical impediment to beginning the self-addressing process within a tube 100 immediately after its master/slave unit 4810 has self-addressed, so it should be understood that this approach (whereby self-addressing may occur within a tube concurrently with ongoing self-addressing by one or more master/slave units 4810) could also be used, although it has drawbacks and could result in erroneous content display if there is a failed master/slave 4810 unit in the lighting display 48.

Assuming however, that the lighting display 48 contains all good components or all the master/slave units 4810 have all properly completed self-addressing, the process of self-addressing within a tube can begin. The initial step in that process begins with each master/slave unit 4810 transmitting its address to the chip set 4830 of the first base unit 4840 in the series of interconnected base units using the address line 4818 on the base unit 4840. As noted previously, the initial address transmitted could be any value. Indeed, that address transmitted with a tube 100 can, but need not be, related to the self-address of the master/slave unit 4810 at all. By way of a few representative examples to illustrate the point, in one example, the master slave addresses could have been values that sequentially incremented by the value of "1" from tube to tube, and the address within each tube 100 might begin incrementing from the number "1" such that the address of any given chip set 4830 could be represented as a value containing both the rows address and column address together (e.g. "1.4" where the number to the left the decimal point represents the "row" number and the number to the right of the decimal point represents the "column" number). In another example, the starting address for each master/slave unit 4810 could be derived using an algorithm such that they begin at the value of "1024" and go up in increments of "2048" such that the self-address for the master/slave unit 4810 in the second tube 100 would be "3072", the self-address for the master/slave unit 4810 in the third tube 100 would be "5110" and so forth, and the first base unit chip set 4830 within a tube 100 would use that master/slave unit 4810 address value to calculate its own, for example by simply adding the value "16" such that the first chip set 4830 in the first tube 100 of the lighting display 48 would have a self-address of "1040" (i.e. 1024+16), the first chip set 4830 in the second tube 100 of the lighting display 48 would have a self-address of "3088" (i.e. 3072+16), etc., a further example could have the first chip set 4830 use the value of the self-address provided by the master/slave unit 4810 of its tube 100 as a hash value into a table, use the value within the table at that location as its self-address, pass that self-address value to the next chip set 4830 within the tube, etc. which will do the same, etc. until all of the self-addressing within each tube 100 is complete. In a final example, the "row" self-address value could simply be passed along and the "column" self-address value (i.e. self-address value within a tube 100 of this example) could be determined in some wholly independent manner using, for example, some value contained in the memory of, or physically set on, the first or each individual base unit 4840 with each tube 100.

As should now be appreciated, base upon the teachings herein, the permutations and combinations of ways that any given component in a display can self-address are vast and provide significant advantages over conventional large display systems that must predetermine and set each component's address individually.

Within each tube 100, it should now be recognized, the process will proceed in the same basic manner that was used for the self-addressing of the master/slave units 4810 of each tube. Advantageously, the same type of failure checking can be employed to identify a failure and/or deal with addressing in spite of a failure.

Accordingly, once all of the chip sets 4830 in all of the tubes 100 of the display 48 have been self-addressed, the master control unit 4800 can begin to transmit display instructions and/or data using data line 4804.

In the row-column based address example above, where each chip set might only know its "column" number, each master/slave unit 4810 would be responsible for parsing data from the master control unit 4800 for its "row" and then transmitting only that data to the chip sets 4830 within the "row" using the data line 4824. On the other hand, if an approach is used whereby the chip sets 4830 know both their "row" and "column" address, then each master/slave unit 4810 in each tube 100 could simply pass on all of the data coming from the master control unit 4800. However, in such a case, most of the data transmitted within a given tube 100 will be for other chip sets in other tubes of the display 48 (i.e. it will be irrelevant to every chip set 4830 within that tube 100). As a result, even if the chip sets 4830 within a tube know both their row and column address, it is likely desirable that the master/slave unit 4810 in each tube 100 still parse the data for its particular rows and only transmit that information on via the in-tube data line 4824.

In the example of FIG. 48, it should now be understood and appreciated that the master control unit 4800 has the ability for wired broadcast of addressed data packets and to transmit an address. Additionally, each master/slave unit 4810 has the ability to listen to a wired data stream and extract data within the stream specifically addressed to it and then transmit that data downstream, receive address information, and transmit address information in a plurality of dimensions.

Finally, chip set 4830 has the ability to listen to a data stream and extract data within the stream specifically addressed to it (and to follow instructions within that data) and the ability to transmit address information. Note further that by including the capabilities of a master/slave unit 4810 into each chip set 4830 it is possible, in some implementations, to eliminate the printed circuit board 4820 in each tube 100 of FIG. 48 that contains the master/slave unit 4810 because the first chip set 4830 in the row would then perform all of the functions specified as being performed by the master/slave unit 4810, as well as those it would normally perform.

Figure 49:
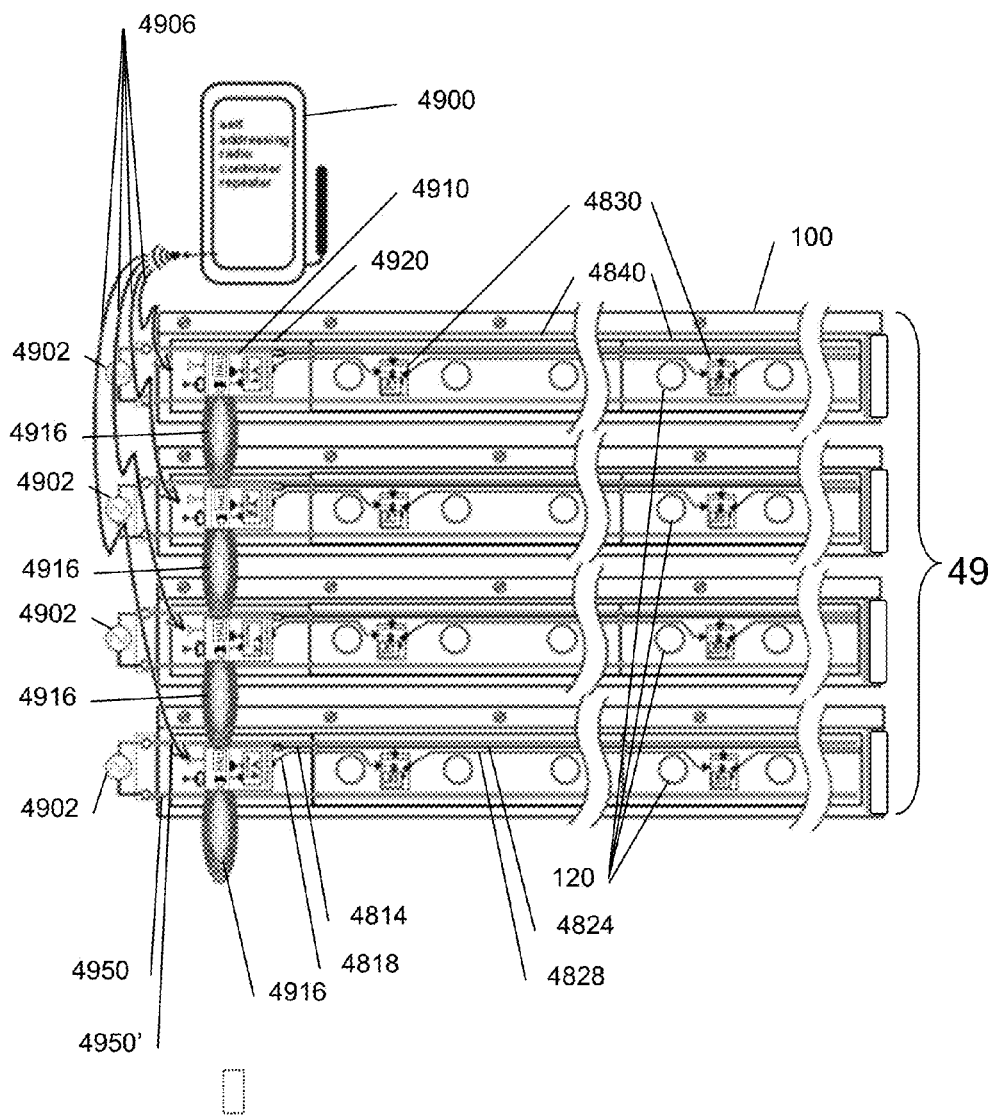

FIG. 49 illustrates, in simplified form, the use of multi-dimensional self-addressing in a two-dimensional matrix (grid) using a combination system of both wired and wireless data transmission and both wired and wireless self-addressing of a plurality of tubes 100 making up a lighting assembly 49 constructed based upon the teachings herein. As shown, because the connections within each tube 100 of FIG. 49 are wired, within a tube the self-addressing can proceed as described in connection with FIG. 48 or according to any other wired in-tube approach. In overview and contrast to FIG. 48, the tube-to-tube self-addressing in FIG. 49 will occur via one of the wireless approach variants described herein or based thereon.

As shown in FIG. 49, each tube 100 in the lighting assembly 49 includes a printed circuit board 4920, which has a master/slave unit 4910, data line 4914, and address line 4918 thereon, multiple printed circuit board base units 4940, which each have a chip set 4930 and multiple luminaires 120, a data line 4924, and an address line 4928 thereon.

Each of the master/slave units 4910 further include one or more wireless transmitter-receiver pairs, such as those described in the chip set 4200 of FIG. 42, and thus is capable of transmitting and receiving an address signal 4916 and wireless data.

In addition, the printed circuit board 4920 and base units 4940 in each tube 100 of the lighting assembly 49 receive power from rails 4950 and 4950' and, in this example lighting assembly 49, the power for each tube is independently supplied by a separate power source 4902, which could be a true power supply, line power, direct power from solar cells, a power storage unit 3130, rechargeable storage 3230, or some other source of power suitable for the application. Of course, in other variants, power could be collectively supplied from a single source and, likewise, power to one or more of the individual tubes 100 in FIG. 48 could have been independently supplied by different power sources. The master/slave units 4910 each receive data and instructions wirelessly from a master control unit 4900 through receipt broadcast data 4906 transmitted by the master control unit 4900, and conduct tube-to-tube wireless self-addressing with each other multi-dimensionally using a wireless address signal 4916.

Within the lighting assembly 49 the self-addressing within each tube 100 between a master/slave unit 4910 and the series chip sets 4930 is accomplished as described, for example, in connection with FIG. 48. However, unlike the approach of FIG. 48, which uses a wired address line 4816 to connect between subsequent tubes 100 of the lighting assembly 48, the lighting assembly 49 is multi-dimensionally self-addressed wirelessly using the wireless address signal 4916. The protocol for wirelessly self-addressing between subsequent tubes 100 of the lighting assembly 49 is accomplished as a separate linear self-addressing array and may be performed according to any variant of the wireless self-addressing approaches of FIGS. 44A-F, FIGS. 45A-C or FIGS. 46A-D.

As with FIG. 48, and maintaining the same "row" and "column" terminology, most implementations constructed according to the teaching illustrated in FIG. 49 would first self-address all the "rows" (i.e. from tube-to-tube) and then self-address all the columns (e.g. the base units within each tube). Then, once all the chip sets 4930 of the lighting display 49 have been self-addressed, the master control unit 4900 could then begin to wirelessly transmit information for parsing and passing on to the chip sets 4930 within their tube 100 using its data line 4814 and from chip set 4930 to chip set 4930 within the tube via the board-to-board data line 4924. In the example of FIG. 49, the master control unit 4900 has ability to wireless broadcast addressed data packets. The master/slave unit 4910 has the ability to listen to a wireless data stream and extract data within the stream specifically addressed to it and then transmit that data downstream, as well as receive address information, and transmit that address information both wirelessly and over an address line. Finally, the chip set 4930 has the ability to listen to a data stream and extract data within the stream specifically addressed to it (and to follow instructions within that data) and the ability to transmit address information to another chip set 4930.

As with the configuration of FIG. 48, by including the capabilities of the master/slave unit 4910 into the chip sets 4930 it is possible to eliminate the printed circuit board 4920 and have the first chip set 4930 in each tube perform all of the functions specified for the master/slave unit 4910, as well as those normally performed by each chip set 4930 as a member of the series within the tube 100.

Figure 50A:
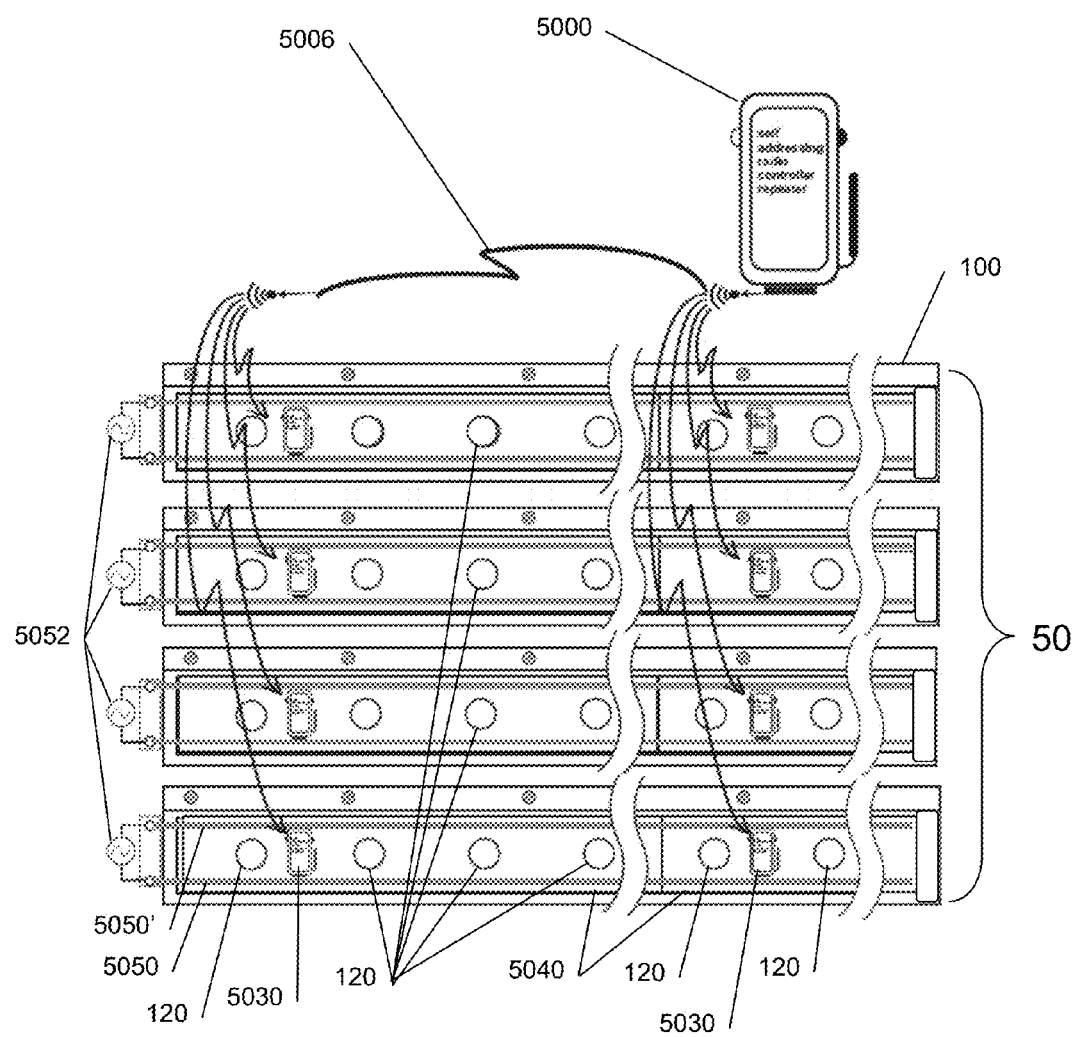
Figure 50B:
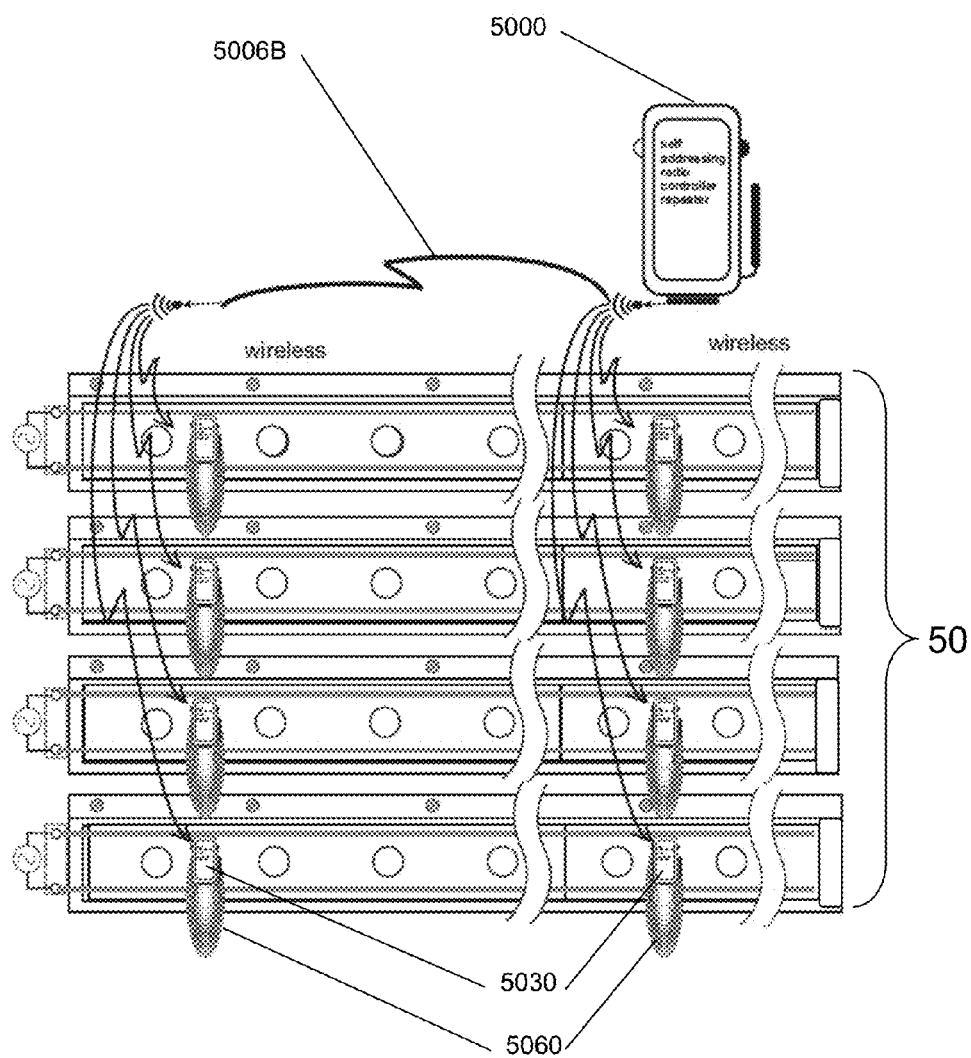
Figure 50C:
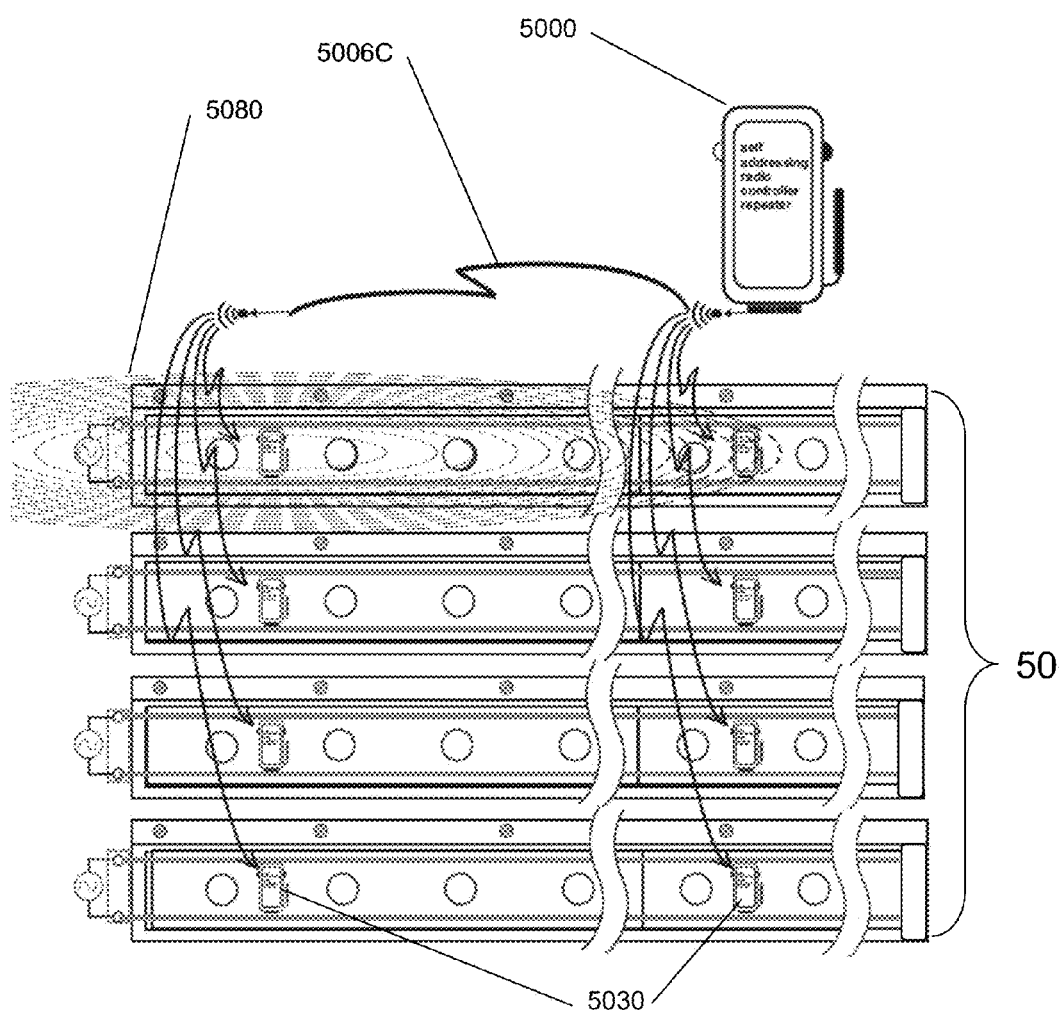

FIGS. 50A-50C illustrate, in simplified form, multi-dimensional addressing of a two-dimensional matrix (grid) using a completely wireless system for self-addressing from tube 100 to tube 100 and within each tube of a lighting assembly 50.

Each lighting assembly 50 is made up of multiple tubes 100 each including multiple interconnected printed circuit board base units 5040, which each has a chip set 5030 and multiple luminaires 120 thereon. Each chip set 5030 within the lighting assembly 50 further includes one or more wireless transmitter-receiver pairs, such as those described in connection with the chip set 4200 of FIG. 42, and thus is capable of transmitting and receiving both a tube-to-tube address signal 5060 and an address signal 5080 within a tube, and one or more means of wireless data reception channel capable, such as also described in connection with the chip set 4200 of FIG. 42.

In addition, as shown in FIGS. 50A-50C, the base units 5040 in the individual tubes 100 of the lighting assembly 50 receive power from one or more power source(s) via rails 5050 and 5050'.

As shown in FIGS. 50A-50C, the self-addressing is performed completely wirelessly. FIG. 50A-50B illustrate, in simplified form how this occurs from tube-to tube based upon the master control unit 5000 initially sending out a broadcast signal 5006 to all chip sets 5030 to indicate that self-addressing is to occur and then, based upon the master control unit 5000 sending out broadcast data 5006B telling all of the chip sets 5030 to self-address from tube-to-tube using a wireless self-addressing protocol such as, for example, any of those described in connection with FIGS. 44A-44F, FIGS. 45A-45C, FIGS. 46A-46D or FIG. 49.

However, unlike as described in connection with FIG. 49, in which there is only one master/slave unit 4910 per tube 100 in the lighting assembly 49, with the lighting assembly of FIG. 50, each chip set 5030 would independently establish its row number within its column, using a predefined protocol, such that all chip sets within a particular tube 100 of the lighting assembly 50 would have the same "row" address value, assuming all chip sets are functioning properly.

Once the "row" addressing (FIG. 50B) is completed, then within each tube 100 of the lighting assembly 50 the "column" address values would then be determined. The protocol for determining the "column" address values (i.e.

within each tube 100) is accomplished as a separate linear self-addressing array and may be according to any of the previous methods described for wireless self-addressing described in connection with FIGS. 44A-44F, FIGS. 45A-45C or FIGS. 46A-46D. However, rather than having self-addressing occur with all the tubes 100 at same time, which is possible with variants created based upon the teachings provided in connection with FIG. 48 and FIG. 49, with fully wireless configurations, there is a possibility of crosstalk between tubes that could result in mis-addressing, particularly if overflow signals are used. As such, it is expected that the protocol for in-tube addressing will involve each tube performing in-tube wireless addressing one tube at a time. Of course, if the tube 100 or lighting assembly 50 construction is such there is sufficient shielding between tubes 100, then in some cases, multiple tubes 100 could conceivably self-address at the same time. Likewise, even without shielding, depending upon the strength and directionality of the transmitter-receiver pairs it may be possible to have base units in two or more tubes 100 perform in-tube self-addressing if they are sufficiently spaced apart such that their respective signals to not interfere. Still further, if the individual tubes 100 of the display 50 are sufficiently long, since in-tube addressing occurs sequentially from base unit to base unit within the tube, with some implementation variants it may be possible, again depending upon signal strength, shielding, directionality, etc., to have adjacent tubes perform in-tube wireless self-addressing on a staggered basis.

FIG. 50C illustrates, in simplified form, the initiation of in-tube self addressing, with the master control unit 5000 sending out broadcast data 5006C telling the rows one at a time to address themselves resulting in the chip sets 5030 issuing an in-tube address signal 5080 to their next neighbor chip set 5030 within the tube.

Figure 50D:
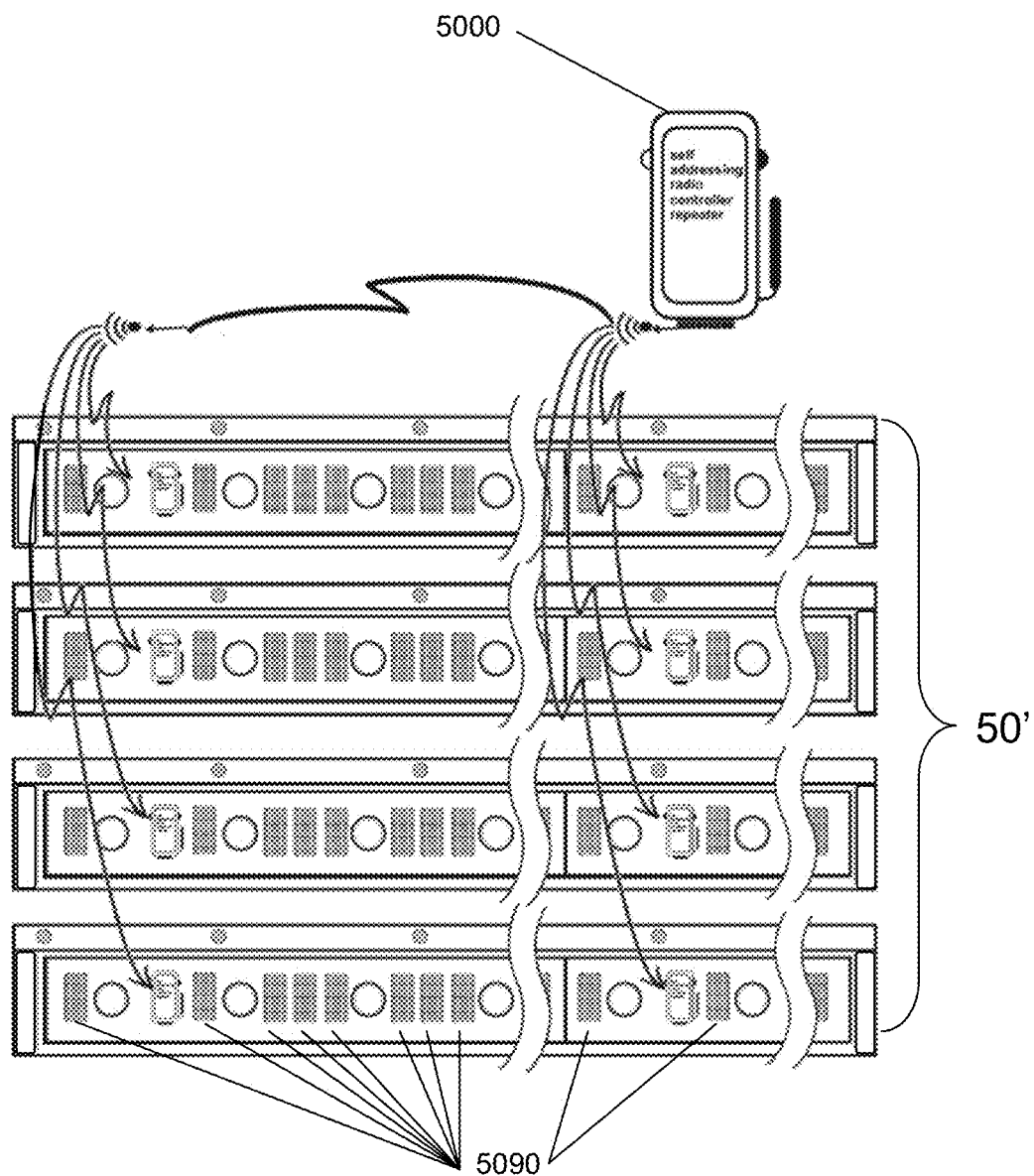
FIG. 50D illustrates, in simplified form, a lighting display that is, in all material structural, functional and operational respects, identical to the lighting display of FIGS. 50A-50C except that power is supplied to each base unit through the use of solar cells.

FIG. 50D illustrates, in simplified form, a lighting display 50' that is, in all material structural, functional and operational respects, identical to the lighting display 50 of FIGS. 50A-50C (so those details are not shown) except that, in FIG. 50D, power is supplied to each base unit (i.e. their chip sets, luminaires, etc.) in the lighting display 50' through the use of solar cells 5090.

In the examples of FIG. 49 and FIGS. 50A-50D, the master control units 4900, 5000 have the ability to wirelessly broadcast addressed data packets and, variants of the chip set 4200 of FIG. 42 are capable of serving as a master control unit 4900, 5000. Each chip set 5030 similarly has the ability to listen to a wireless data stream and extract data within the stream specifically addressed to it (and to follow instructions within that data), and to receive and transmit address information in at least two dimensions. Thus, variants of the chip set 4200 of FIG. 42 are also capable of serving as the master/slave unit 5010.

Up to this point, the discussion has focused on self-addressing uniform/grid type displays such as those in a two-dimensional billboard or wallscape, or higher order displays. Even the example of turning smart phones in a concert venue into a graphical display unit operated according to a known grid space, in that example, based upon seat number. However, that is not typically going to be the case where chaotic systems are involved, such as coordinating a swarm of autonomous self-controlled or autonomous devices or even a strand (or individual) loose lights, for example holiday lights that have been hung in a tree or on a structure and it is desired that they self-address in order to act as a coordinated system. In such a system, it is desirable to base the self-addressing of each on either their absolute or relative positioning, rather just their specified numbers (e.g.: 1, 2, 3, . . . , etc.). Alternatively, if each device in a swarm of autonomous self-controlled or autonomous devices will be fairly stably located in a specific location and includes a chip set (like a variant of the chip set 4200 of FIG. 42) that has GPS 4234 capabilities, (or the equivalent or other variant (e.g. cellular pseudo-GPS, DGPS, GLONASS, COMPASS, Galileo, QZSS, IRNSS, Beidou, DORIS, IRNSS, etc.)) then, in some cases, the GPS resolution may be accurate enough for the specific application that each device could independently self-address using its GPS coordinates. Note here that, GPS has inherent inaccuracies (GPS is typically only specified as being accurate up to about 30 feet) such that, in many cases, it may be desirable to first wait a predetermined amount of time for the device to initialize itself and then average the GPS derived location information over a specified time interval in order to establish the GPS coordinates of a given device.

Given the inherent inaccuracy of GPS, GPS is generally not accurate enough for the example of lights hung in a tree.

For such configurations, if a chip set has the ability to wirelessly listen to a data stream and extract data from within the stream that is specifically addressed to it (and to follow instructions within that data), the ability to wirelessly transmit and detect radio signals, and the ability to wirelessly transmit feedback, then such chips sets would be capable, through the techniques of computational geometry, and in particular the concept of triangulation, determine their position relative to one another. As an example, variants of the chip set 4200 of FIG. 42 could advantageously be used for such an application.

While there are numerous triangulation techniques within computational geometry, one suitable method that can be implemented with variants of the chip set 4200 of FIG. 42 is Delaunay triangulation, which is described in, for example, B. Delaunay, "Sur la sphère vide. A la mémoire de Georges Voronoï", Bulletin de l'Académie des Sciences de l'URSS. Classe des sciences mathématiques et na, no. 6, pp. 793-800 (1934), the entirety of which is hereby incorporated by reference. Since then, there have been many refinements to the technique over the years, including implementation of a divide and conquer paradigm to perform efficient triangulation in any dimension, such as described in Cignoni, P.; C. Montani; R. Scopigno, "DeWall: A fast divide and conquer Delaunay triangulation algorithm in E". Computer-Aided Design 30 (5), pp. 333-341 (1998), which is also incorporated by reference herein in its entirety.

Figure 51A:
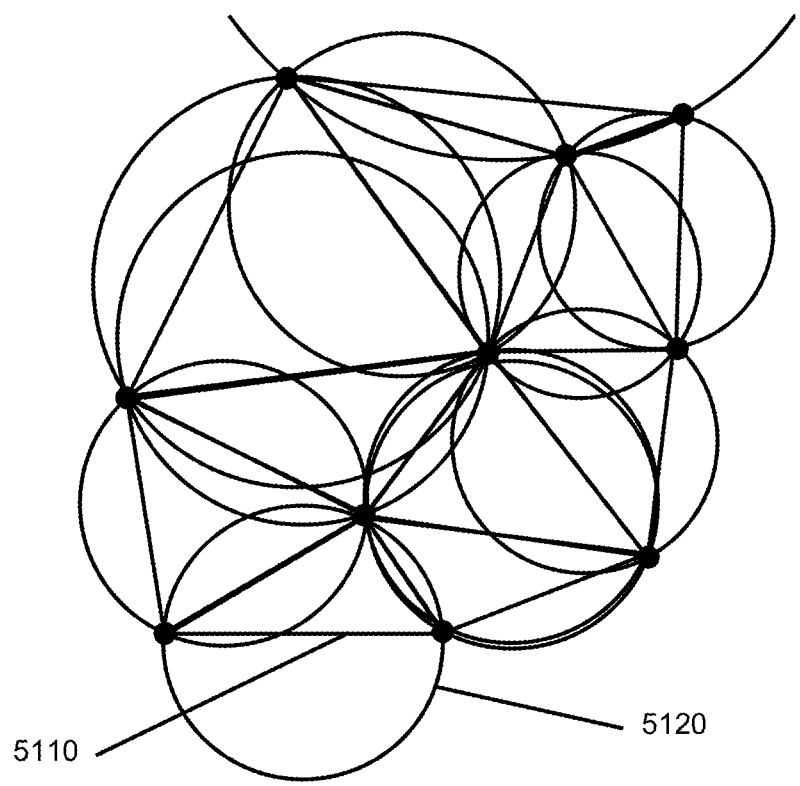
FIG. 51A-51X illustrate, in simplified form, a basic overview of the Delaunay triangulation technique using a two-dimensional example.

While a full explanation of the techniques and algorithms for performing Delaunay triangulation in any dimension space can be found in at least the references above, for purposes of completeness, a basic overview of the technique using a two-dimensional example is illustrated, in simplified form, in FIG. 51A-51X with the understanding that, being a known technique, those of ordinary skill could implement Delaunay triangulation without a rigorous explanation being set forth herein.

Figure 51B:
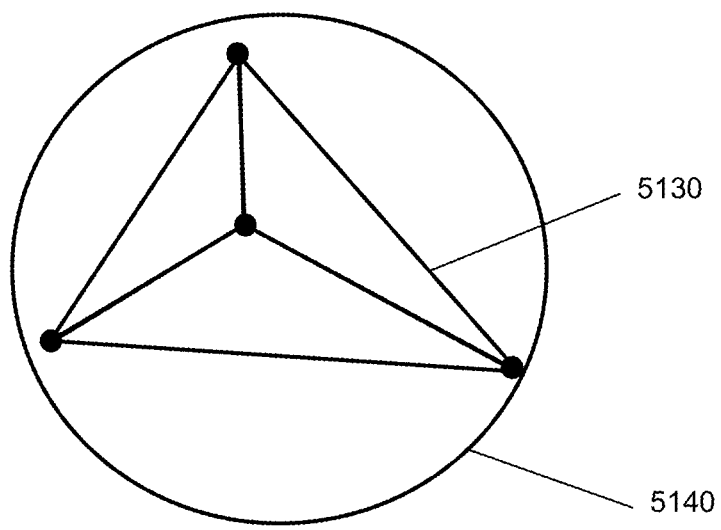

FIG. 51A illustrates, in simplified form, the desired outcome of a Delaunay triangulation, which is to determine a set of triangles 5110 such that no vertex point of one triangle is inside the circumcircle 5120 of any other triangle. This approach is extended to 3-dimensional space in FIG. 51B, where the desired outcome is to determine the set of simplex 5130 such that no vertex point is inside the circum-hyper-sphere 5140 of any simplex. To apply Delaunay triangulation in this context, the goal is for each chip set to be unambiguously located at a vertex of a triangle or simplex and that location to be used by it to self-address, either directly or indirectly through application of some further algorithm.

FIGS. 51C-51X illustratively walks through the preliminary steps in performing Delaunay triangulation in two dimensions according to a variant as described herein that includes chip sets 5102 arranged in an irregular two-dimensional array. For purposes of this example, a variant of the chip set 4200 of FIG. 42 with the appropriate communication capabilities could be used. For purposes of illustration, as an aid to understanding the concept, layman's language will be used, with the understanding that, in doing so, precision and accuracy in the approach as it would have to be implemented in practice may be lost.

As illustrated in FIG. 51C-51X, multiple chip sets 5102, indicated as points, with the previously described capabilities, are dispersed throughout a two-dimension area 5100.

To initiate the Delaunay triangulation process, a single chip set 5102, labeled by box [1], is arbitrarily chosen as the starting point by a master control unit 5104 such as described herein which is capable of wirelessly communicating with each chip set 5102. The master control unit 5104 could be either an external unit (such as shown), or be implemented as a function of one or more chip set(s) 5102 within the group (or switching between chip sets within the group) that has (have) the capabilities to also function as a master control unit 5104.

That chip set 5102 [1], will either receive a starting address from the master control unit 5104 or will use a pre-programmed or other initially specified starting address. While the starting address could be any value (e.g. the units GPS coordinates), for simplicity of explanation the naming convention will be that the chip set name and starting address are the same, in this case the value, "1".

The chip set 5102 [1] will begin broadcasting in order to find the closest other chip set 5102 to it. There are numerous known techniques for determining the distance between two chip sets, such as timing the interval between two pulses or using received signal strength, since it is known that signals decay with distance. The method used in this example, is for the chip set 5102 [1] to begin broadcasting a signal at a specific power level, and which includes within data of the signal, the power level, hereafter referred to as a "radio bubble", a "radio bubble" being indicated in FIG. 51C-51X by dashed concentric circles emanating outward from a point.

In this example, the signal chip set [1] broadcasts out at 3.2 watts is "I am chip set [1] broadcasting at 3.2 watts. Does anybody hear me?" If no chip set 5102 is within range then chip set [1] would increase the power level of the broadcast, for example to now broadcast out a signal at 3.3 watts of, "I am chip set [1] broadcasting at 3.3 watts. Does anybody hear me?" If still no chips set responds then the process could repeat, with chip set [1] broadcasting at higher and higher power levels (and change its associated message) until a chip set is discovered or it receives instruction to stop, either from the master control unit 5104 or based upon some pre-established criteria, for example, reaching a certain power level, elapsed time, number of tries, etc. If a second chip set is within range, meaning that the signal it received was above some predetermined threshold level, it would respond back to the master control unit 5104, "I am chip set [X] and I hear chip set [1] broad casting at 3.2 watts, what should I do next?" The value of [X] in this example, that the chip set uses to identify itself, could be any value, including simply some value or indicator that it is a chip set presently without an address. Alternatively, a variant of the approach discussed in connection with FIG. 45C (where a reduced strength address signal 4630 was received) could be used where the chip set will give itself a temporary address, which includes not only its anticipated address (based on a predetermined algorithm such as adding a constant or applying an algorithm to the address value received, or as instructed by the master) but also a measured distance indicator. By way of example, in this particular case, the value of "X" might be "2.3.2", where the integer to the left of the first decimal point indicates the presumed address (obtained by adding the constant "1" to the address it received) and the numbers to the right of the first decimal indicates the power level as one example of a measured distance indicator. Including a measured distance indicator is particularly helpful in the event that multiple units are responding. Such as, for example, where an approach involving timing the interval between two pulses, rather than radio bubbles, is being used to determine distance. In the case of radio bubbles, since the measured power level is already specified as being included in the message of this example, it is desirable to have the number to the right of the first decimal be an indicator of the trigger threshold level (or the actual calculated distance). For instance, if two chip sets each heard the signal at 3.2 watts, but for one of the two the amplitude of the signal it received was only 0.1 watts, but for the other it was 0.12 watts, the one that received the signal at 0.12 watts is presumed to not only be closer, but the power level above a threshold can be used to more precisely determine its distance. For simplicity of the remainder of the overview explanation being provided herein, only the numbers to the left of the decimal point will be used, with temporary addresses being indicated with a question mark, and the presumption that only one unit at a time will hear a broadcast at a particular power level.

Thus, as shown in FIG. 51C, chip set [1] send out radio bubbles of increasing size until the closest chip set indicated as [2?] responds back that it heard the signal. The measured power level (and threshold level if supplied) can then be used to determine the distance between them and is indicated by the line 5106 between those two chip sets.

The two closest chip sets to a particular chip set are special, in that there is no question that they will meet the criteria for Delaunay triangulation. Therefore, as shown in FIG. 51D, the [2?] has been changed to [2] to indicate that the chip set [2] should use the address "2" until instructed otherwise and, that it is part of the first triangle. Chip set [2] is then instructed to temporarily stop listening for broadcasts from chip set [1] as indicated by the circle 5108 with a line drawn though it.

Continuing with FIG. 51D, chip set [1] then increases the broadcast power (to increase the size of its radio bubbles) until the next closest chip set [3?] responds and its distance to chip set [1] is determined. Since the second closest chip set [3?] to chip set [1] is special in that it will always complete the first triangle, the address [3?] of that chip set in FIG. 51D has been changed in FIG. 51E to "[3]" and a circumcircle 5110 (circle whose circumference contains all three chips) of a first determined triangle 5112 has been added.

However, at this point, only the two distances indicated as straight lines from chip set [1] in FIG. 51D are known. In order to completely determine the triangle then the distance between chip set [2] and [3] must be determined. In order to determine the distance between chip sets [2] and [3] all of the other chip sets, except chip sets [2] and [3], are told to temporarily stop listening, as indicate by crossed-out circles over each chip set. Next, as shown in FIG. 51E, either [2] is told to begin broadcasting until it is heard by [3] or [3] will begin broadcasting until it is heard by [2]. Once, the distance between [2] and [3] is determined then the first triangle 5112 is completely determined.

Once the first triangle 5112 has been determined, as shown in FIG. 51F, the next step is to determine if there are any additional triangles that can be formed that meet the criteria for Delaunay triangulation that include chip set [1]. To do this chip sets [2] and [3] are told to temporarily stop listening and all the other chip sets are told to listen for and respond to a broad cast from chip set [1].

For purposes of this example, it is presumed that eventually chip set [4?] will respond and then the distance 5114 between [1] and [4?] will be determined.

The third closest chip set [4?] is not deemed special and it may or may not form a triangle with chip set [1] that meets the criteria for Delaunay triangulation, so it has to be tested.

Figure 51G:
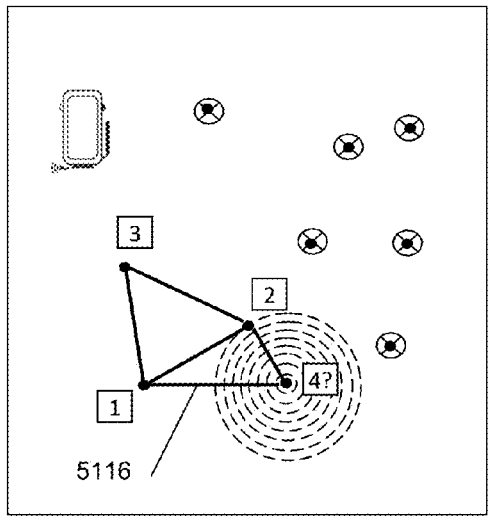

Testing is illustrated in FIG. 51G and involves telling only chip sets that form known triangles with chip set [1], which in this case is chips [1], [2], and [3], to listen for a broadcast from chip set [4?]. Since the nearest chip set to chip set [4?] is chip set [2] in this case, then the distance between [2] and [4?] is determined. However, at this point it is still unknown whether or not a triangle made up of chip sets [1], [2], and [4?] make up a triangle 5116 that meets the criteria for Delaunay triangulation. In order to determine if that triangle 5116 meets the criteria for Delaunay triangulation it must be determined whether the second closest chip set that is currently listening set to [4?] is chip set [1]. If it is not chip set [1] then the criteria for Delaunay triangulation will not be met.

Figure 51H:
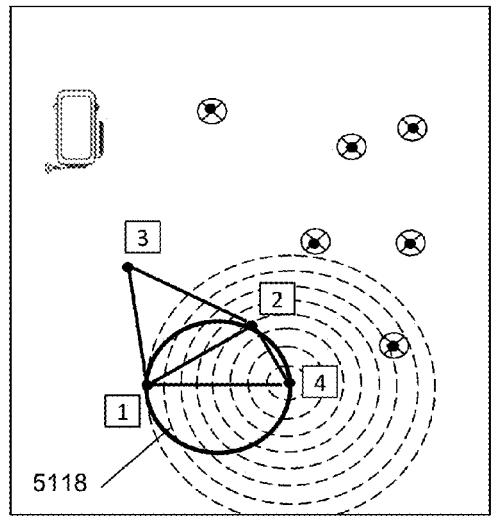

As shown in FIG. 51H, in this case the second nearest chip set to [4?] is chip set [1] and therefore the criteria for Delaunay triangulation has been met and so the address of [4?] has become [4] and a circumcircle 5118 of the second triangle 5116 has been indicated.

Figure 51I:
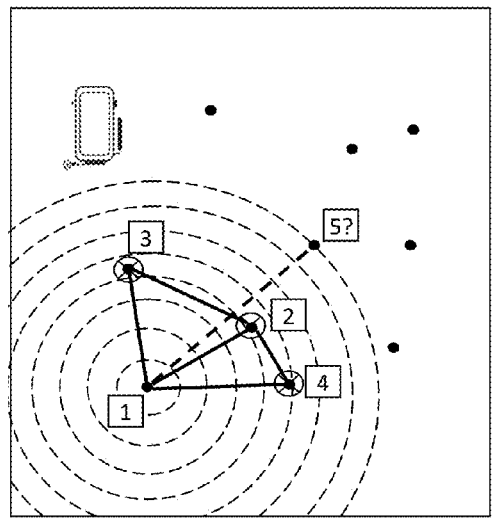

Once the second triangle 5116 has been determined, as shown in FIG. 51I, the next step is to once again to determine if there are any additional triangles that can be formed that meet the criteria for Delaunay triangulation that include chip set [1]. This time chip sets [2], [3], and [4] are told to temporarily stop listening and all the other chip sets are told to listen for, and respond to a broadcast from chip set [1]. At this point, it is presumed that eventually chip set [5?] will respond and the distance between [1] and [5?] will be determined.

This newly found chip set (as with chip set [4?]) is, once again initially not special and may or may not form a triangle with chip set [1] that meets the criteria for Delaunay triangulation, so it too has to be tested.

Testing of chip set [5?] involves telling only the chip sets that form known triangles with chip set [1], which in this case is now chip sets [1], [2], [3], and [4], to listen for a broadcast from chip set [5?].

Figure 51J:
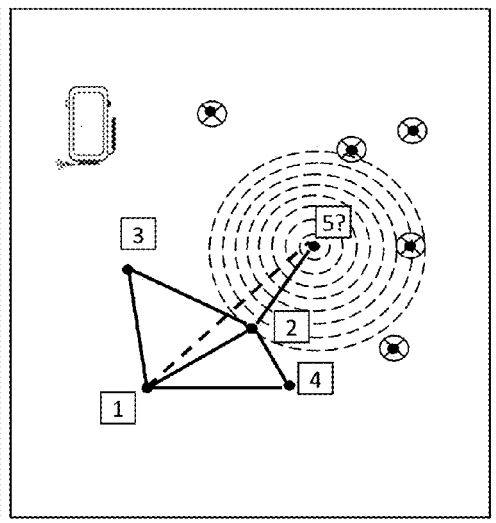

By coincidence, as shown in FIG. 51J, the nearest chip set to chip set [5?] is also chip set [2] and the distance between [2] and [5?] can be determined. However, it is unknown at this point whether or not the triangle made up of chip sets [1], [2], and [5] make up a triangle that meets the criteria for Delaunay triangulation. In order to determine if the triangle meets the criteria for Delaunay triangulation, it must be determined whether the second closest chip set currently listening to chip set [5?] is, in fact, chip set [1]. If it is not chip set [1] then the criteria for Delaunay triangulation will not be met.

Figure 51K:
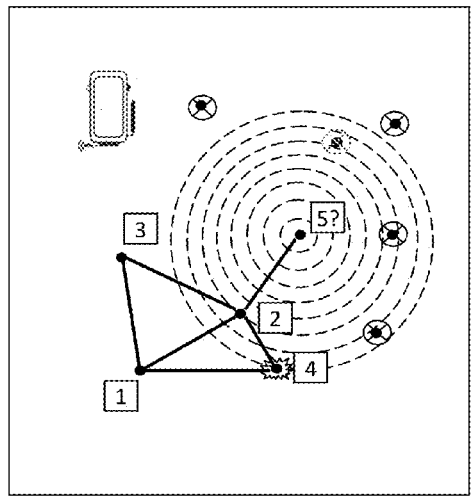

As shown in FIG. 51K, the second closest chip set to chip set [5?] is chip set [4], not chip set [1]. Therefore, it is not possible to form a triangle that includes chip set [1] and chip set [5?] that meets the criteria for Delaunay triangulation.

Figure 51L:
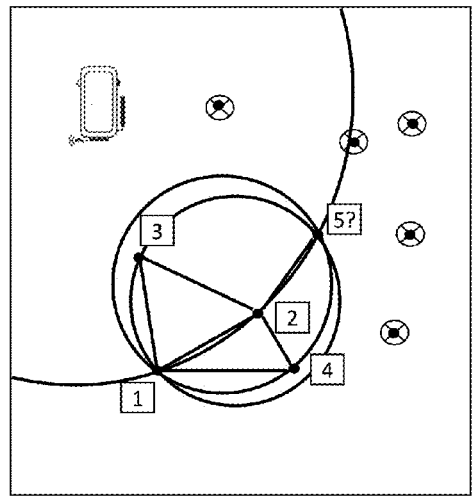

For reference, FIG. 51L shows all of the circumcircles that include chips sets [1], [5?], and one of the other chip sets (i.e. [2], [3] & [4]). In all cases, at least one other chip set falls within the associated circumcircles and, therefore, none of them meet the criteria for Delaunay triangulation.

Once, it is discovered that the next closest chip set, [5?], does not form a triangle that meets the criteria for Delaunay triangulation, the search for additional triangles associated with chip set [1] can halt because it is now known that there are no more valid triangles that include chip set [1] and meet the criteria for Delaunay triangulation. Thus, the next step is to pick one of the peripheral chip sets, either chip set [3] or chip set [4], and start the process all over (i.e. as was done for chip set [1]). A chip set is "peripheral" if it is not included in more than a single triangle. It does not matter which of the chip sets, [3] or [4] is selected, but whichever one must be a peripheral chip set. In other words, chip set [2] cannot be selected because it is not a peripheral point, since [2] is included in more than one of the valid triangles. Actually, in implementation, both peripheral directions (i.e. chip sets [3] and [4]) can (and will likely) be analyzed simultaneously, but for the purposes of this overview, chip set [3] will arbitrarily selected.

Just as was done for chip set [1], the first step is to determine the first and second chip sets that are closest to chip set [3], which just so happens to be the previously established chip sets [1] and [2]. However, they did not necessarily have to be. Once the special case of the first two chip sets is known, the next step would be to look for the third closest chip set just as was done for chip set [1].

Figure 51M:
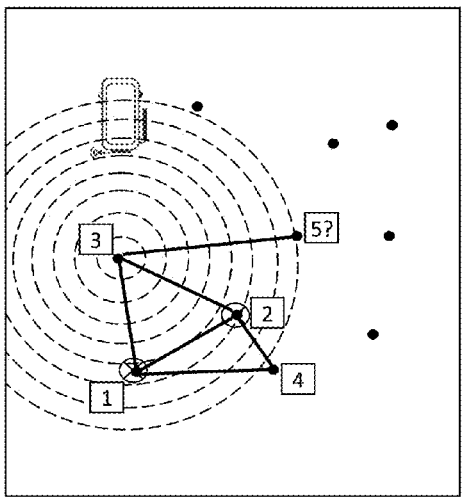
Figure 51N:
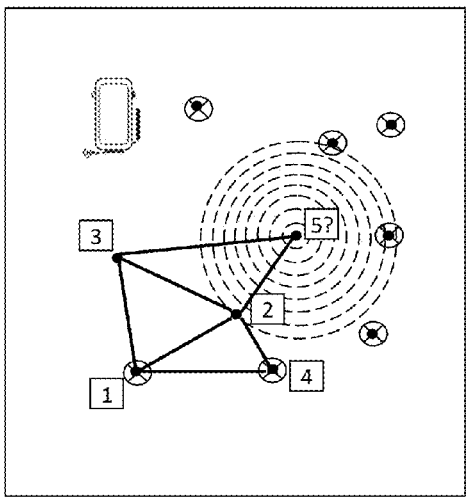

However, since it is already known that chip sets [1] and [2] form a valid triangle that includes chip set [3], a short cut can be taken that speeds up the discovery process. An example of the short cut is illustrated in FIG. 51M, in which chip sets [1] and [2] would be told to temporarily stop listening and all other chip sets would listen for a broadcast from chip set [3]. The closest chip set in this example is, once again coincidentally, chip set [5?] and the distance between chip set [3] and [5?] is determined. Since, following that determination the distance between [3] and [5?] is known to be greater than the distance between chip sets [3] and [1], and also chip sets [3] and [2], it is automatically known that chip sets [1] and [2] are the two closest chip sets to [3]. If this were not the case, for example because [5] was a closer chip than either one or both of chip set [1] or [2] then chip set [3] would use radio bubbles of increasing size as originally discussed in connection with chip set [1] to find the second closest chip sets to it, which would then form the first triangle. However, since this is not the case, once the first triangle is determined for chip set [3], as shown in FIG. 51N, the next step is to test if it is possible to form a triangle using chip set [5?], which was just established to be the third closest chip set.

Figure 51O:
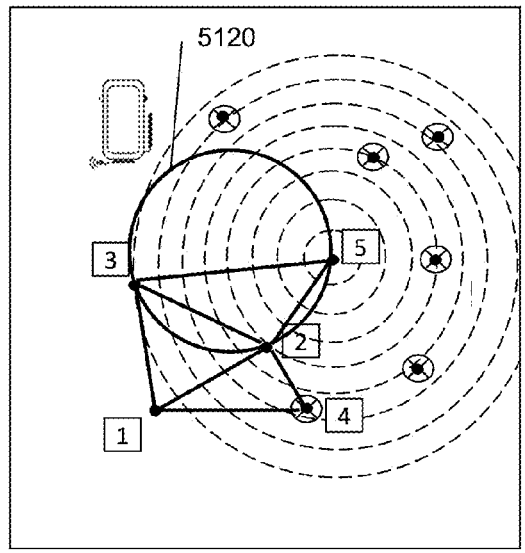
Figure 51P:
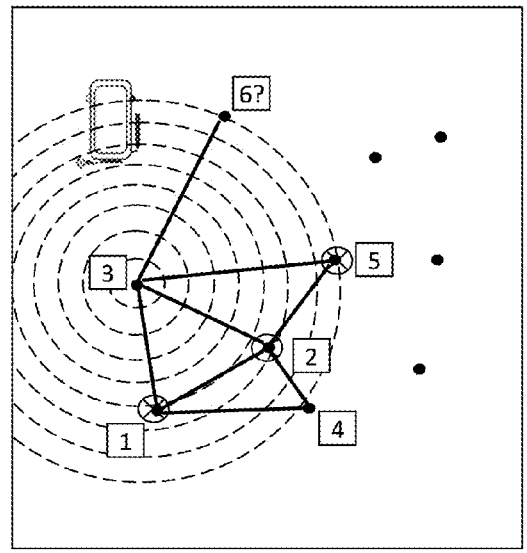
Figure 51Q:
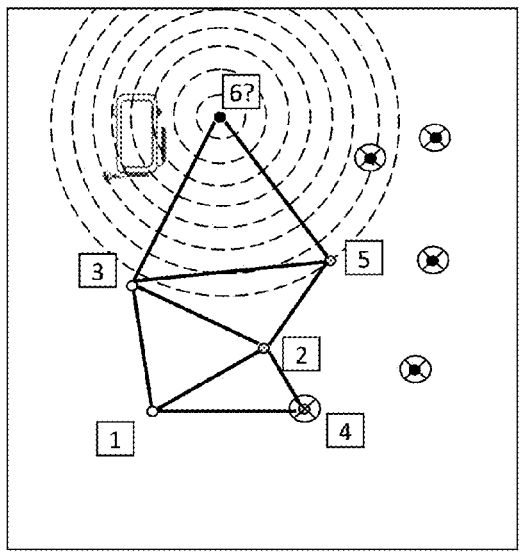
Figure 51R:
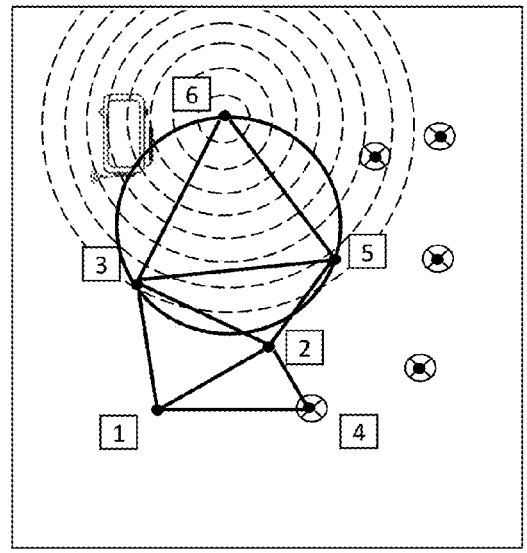
Figure 51S:
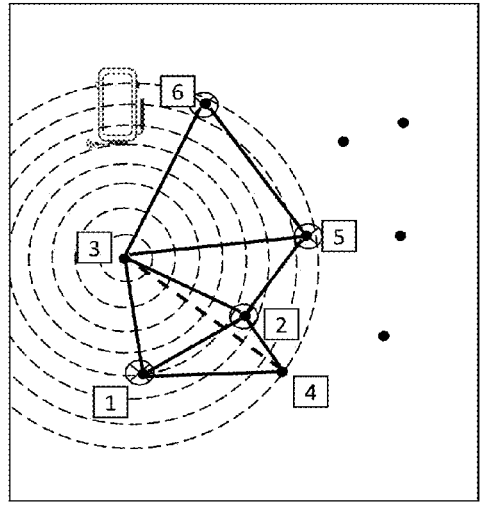
Figure 51T:
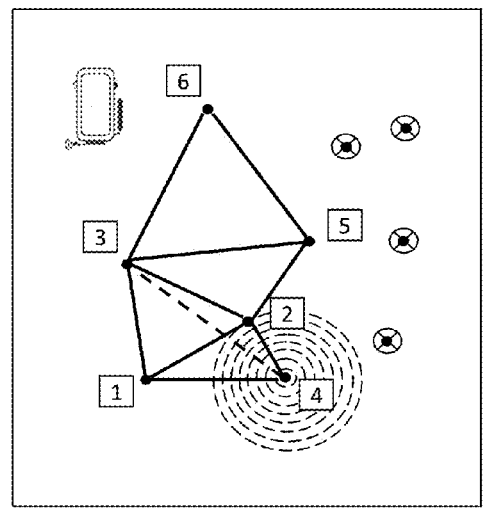
Figure 51U:
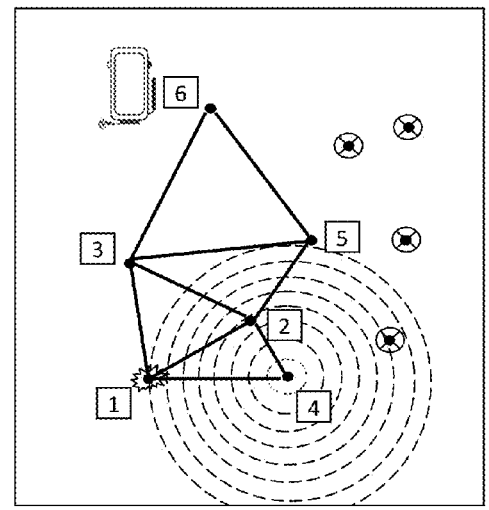
Figure 51V:
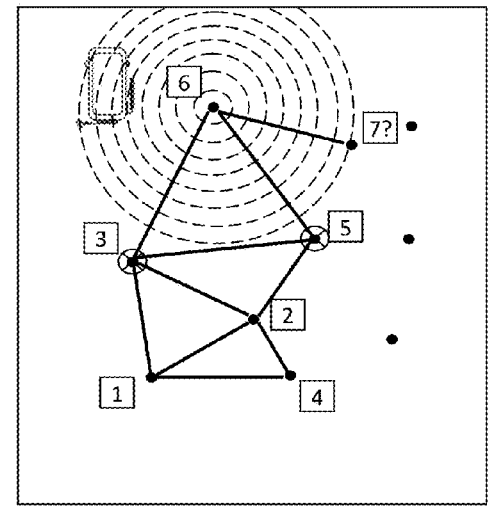

Again, testing involves telling only chip sets that form known triangles with chip set [3], which in this case is chips [1], [2], and [3] to listen for a broadcast from chip set [5?]. The nearest chip set to chip set [5?] is chip set [2] in this case, and the distance between [2] and [5?] is determined. However, it is unknown at this point whether or not the triangle made up of chip sets [3], [2], and [5?] make up a triangle that meets the criteria for Delaunay triangulation. In order to determine if it meets the criteria for Delaunay triangulation it must be determined whether the second closest chip set that is currently listening to chip set [5?] is chip set [3]. If it is not chip set [3] then the criteria for Delaunay triangulation will not be met. As shown in FIG. 51O, chip set [3] was, in fact, determined to be the second closest chip set currently listening, and therefore the criteria for Delaunay triangulation has been met and the address of [5?] changed to [5] and a circumcircle 5120 for the third triangle is indicated.

The process likewise continues in a similar manner, as shown in FIGS. 51P-51X for chip sets [6] and [7] and would t keep being repeated until all of the triangles that meet the criteria for Delaunay triangulation have been identified for all of the chip sets.

Once all of the Delaunay triangles have been determined for all of the chop sets, then an origin and coordinate system can be specified for the chip sets and all of the chip sets can either be interrelated based upon, for example, their relative position or readdressed to an imposed coordinate system position, the benefit of which will be explained below.

At this point, it should be noted that, in the example of FIGS. 51C-51X, the triangulation was performed without respect to a particular coordinate system. This is because, regardless of the rotation of the chip sets in FIG. 51A in the plane, the result of the Delaunay triangulation would be the same. By triangulating one or more chip sets to an external source, or a single chip set to more than one external sources, an actual physical coordinate system can be established such that the relationship or readdressing could reflect the actual, rather than the relative, position of each chip set.

Self-addressing using the actual physical or relative address can make things simpler than simply addressing using numbers 1, 2, 3... etc. and can provide advantageous benefits as well. This can be demonstrated with reference to FIGS. 52A-52B, which illustrate, in simplified form, a display constructed according to the teachings herein incorporating multiple base unit printed circuit boards 5230-1, 5230-2, 5230-3 (only three of which are shown) each having multiple pairs 5240 of luminaires 120 on them. For this configuration, while it is helpful to know, for example, that the base unit 5230-1 is, within the overall display, the third board from the left in the tube forming the second row and has, for example, address 103, and it is even more helpful to know that base unit 5230-1 has the multi-dimensional address of row 2 column 3, it is far more helpful to know that base unit 5230-1 spans physical locations "630" through "739" and that it has been self-addressed with the physical address of its first luminaire, "630", or possibly multi-dimensionally addressed with both its starting and ending address.

Figure 52A:
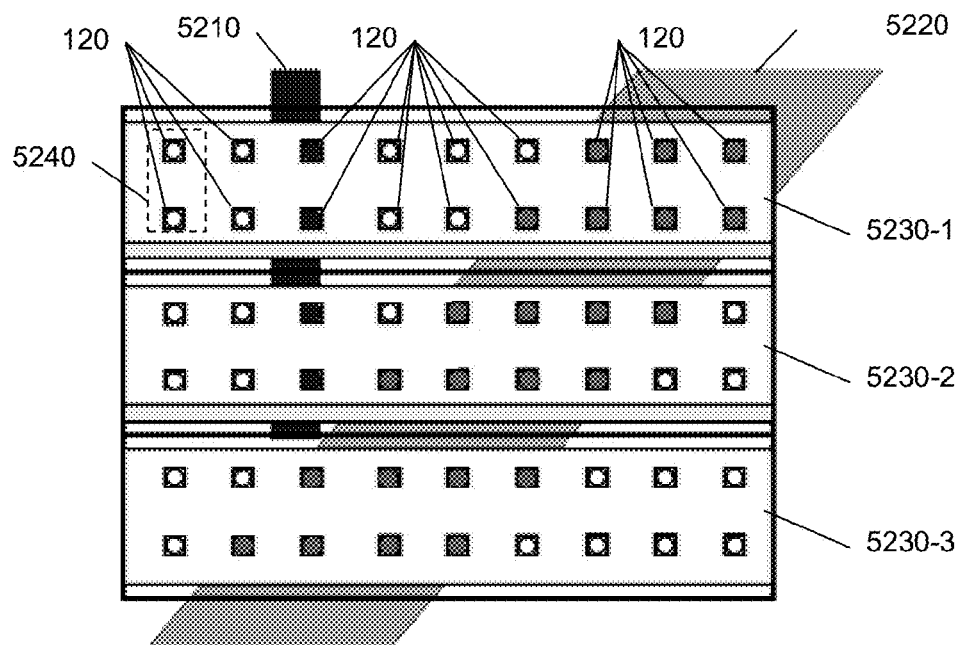
FIGS. 52A-52B illustrate, in simplified form, a display constructed according to the teachings herein.

The most basic reason that the physical address is then more helpful is because, without having to do any sort of translation, each of the base units 5230-1, 5230-2, 5230-3 can now capture specific data directly from the data steam that is related to some individual luminaire 120 in the display within their address range without regard to any data for any other luminaire on any other base unit. However, that is not all. Advantageously, even greater power can be realized when self-addressing that incorporates the actual physical or relative address is used, because it adds the ability to track changes in base unit position. Accordingly, if a chip set on a base unit 5230-1, 5230-2, 5230-3 has the ability to track changes in its position then it can dynamically readdress if the position changes beyond a specified amount. This can allow it to make corrections to what it displays based upon that position change (i.e. that would otherwise detrimentally affect what would be seen on the display). For example, in FIG. 52A, there are two shapes being displayed, a narrow vertical rectangular black bar 5210 displayed by the luminaires on the top two base unit printed circuit boards 5230-1, 5230-2 and a diagonal grey bar 5220 displayed by the luminaires 120 of all three base unit printed circuit boards 5230-1, 5230-2, 5230-3 of FIG. 51A, with then-unused luminaires 120 shown in white. In FIG. 52A, the base unit boards 5230 are all in perfect alignment and the desired display is therefore properly shown on the display.

Figure 52B:
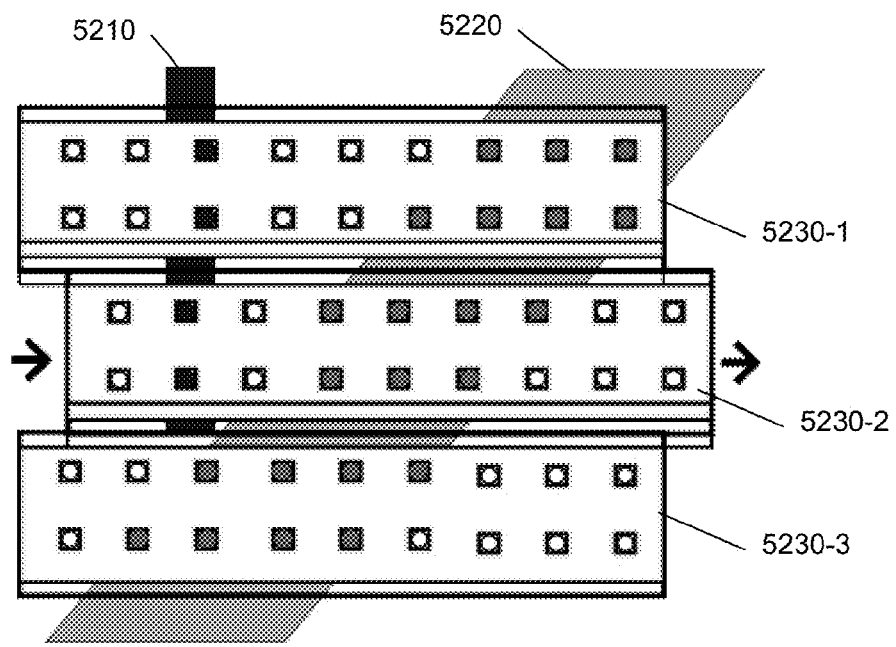

In contrast, for example due to temperature-induced expansion in the second row, the center printed circuit board 5230-2 has been shifted to the right in FIG. 52B. If the printed circuit boards 5230 were to continue to use the exact same luminaires 120 to show the shapes as it did in FIG. 52A, then the desired display would not be accurately shown.

Advantageously, as shown in FIG. 52B, using an approach where the circuit boards 5230-1, 5230-2, 5230-3 know their location in space relative to some fixed point means that the base unit printed circuit board 5230-2 is able to know that it has moved to the right beyond a certain threshold and can readdress such that the data goes to the luminaires 120 in the now-proper position instead of the shifted luminaires 120 that would previously had displayed that data.

Figure 53:
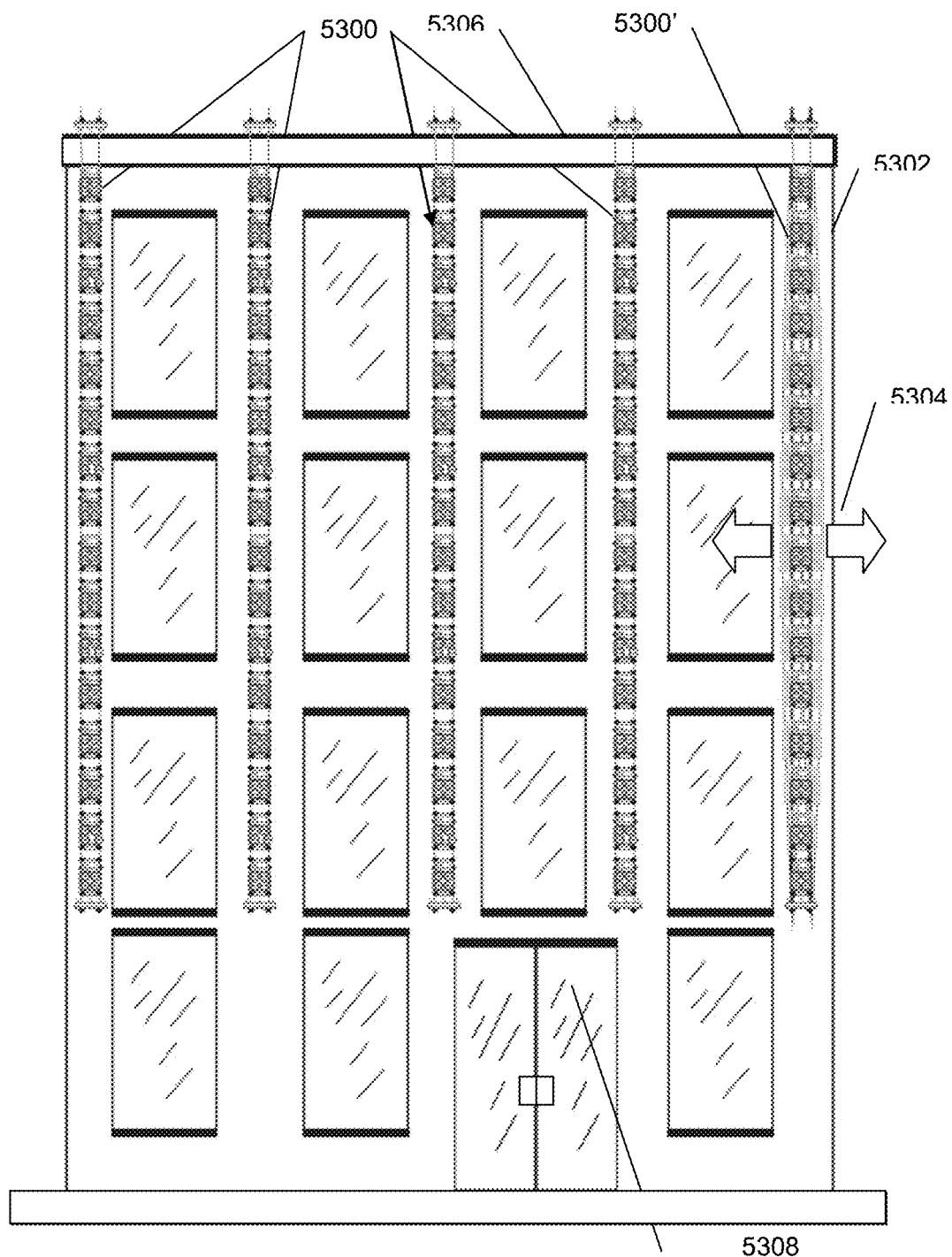
FIG. 53 illustrates, in simplified form multiple light strand-type lighting displays, constructed using tubes and the teachings described herein, hanging in front of a building.

As a second example, FIG. 53 illustrates, in simplified form multiple light strand-type lighting displays 5300, 5300', constructed using tubes and the teachings described herein, hanging in front of a building. At this point, as an aside, it is worth noting that this is a prime example of one advantage of constructing a lighting display using the teachings herein, it can (depending upon the particular implementation) be serviced directly from the roof 5306 or from a height just above entry-door 5308 height, which would be safer (and potentially less costly) than having to service particular parts at whatever height they were located.

In any event, the light strand-type lighting displays 5300, 5300' are, in all material respects, identical except one of the displays 5300' is subject to wind buffeting and, being affixed at only the top and bottom, is shown as being subject to oscillation 5304 in between.

While the use of radio bubbles to determine position and or movement from an initial position may be sufficient for detecting a slow shift over time, as in FIG. 52B, that approach is insufficient for the type of transient and potentially rapid movement exemplified in FIG. 53.

One known method of rapidly calculating displacement of an object is with accelerometers. Using an accelerometer, displacement of the device containing the accelerometer can be calculated based on the fact that acceleration is the time derivative of velocity, and velocity is the time derivative of distance. Therefore, assuming the devices are equipped with triple-axis accelerometers, one can, through the process of double integration, continuously calculate positions in real space as a device is moved. Further, adding a gyroscope allows gravity to be subtracted out, and/or filtering to be performed based on expected movements like ignoring vertical shifts that shift the entire display uniformly, such as due to normal seasonal temperature changes, or filtering out any directional component that is not purely horizontal motion in FIG. 53, can greatly increase the precision of the measurement. Since some variants of the chip set 4200 of FIG. 42 include accelerometer(s) 4236 and a gyroscope 4238, they can be used in this application.

Additionally or alternatively, if two accelerometers are placed at a fixed distance apart, for example at opposite ends of a base unit board, then they can be used to determine rotation, eliminating the need for a gyroscope 4230. Techniques for using two accelerometers, spaced a fixed distance apart, to determine rotation are known in the art and thus need not be described herein. Nevertheless, one example source of that teaching can be found in Tuck, Kimberly. "Tilt sensing using linear accelerometers." Freescale Semiconductor Application Note AN3107 (2007), the entirety of which incorporated by reference as if fully set forth herein.

Thus, if a graphic is shown using the light strand-type lighting displays 5300, 5300', and the overall image is wider than the display, then, using the techniques described herein, the oscillation of a strand 5300' would allow the displayed image to be viewed in a non-jittering fashion, much like what would happen if one were to view a scene through a vertical slit in a piece of cloth from a nominal distance away from the cloth. If the vertical edge(s) of the slit were to jitter slightly, the viewed scene would still be clear to the viewer, by the scenery visible at the periphery of the slit might change slightly.

Figure 54A:
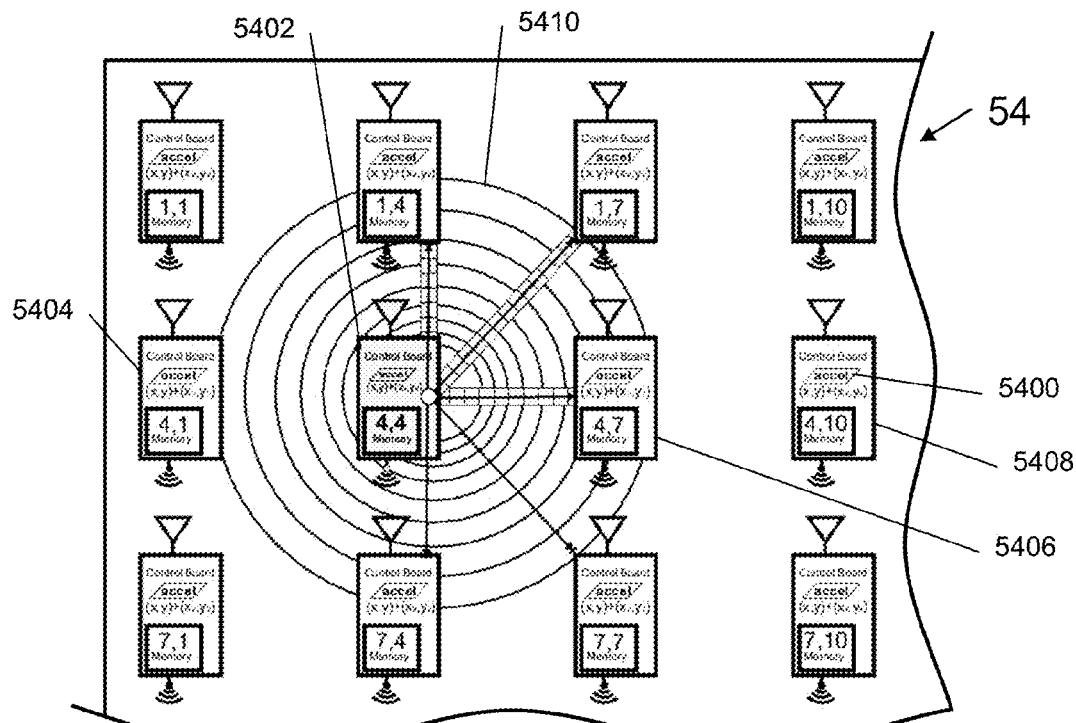
FIG. 54A illustrates, in simplified form, multiple chip sets of a display that use wireless communication to establish their physical distance between one another and then use their relative location within the grid to self address.

Yet another example of an approach for dealing with display changes based upon the components knowing their location is illustrated, in simplified form, in FIG. 54A, which shows multiple chip sets of a display 54 that use wireless communication 5410 to establish their physical distance between one another and then use their relative location within the grid to self address. As a result, one chip set 5402 determines, in an array that addresses from top-to-bottom and left-to-right with address values: 1, 4, 7, 10, etc., that its address is [4,4] and, consequently, each of the chip sets around it then address relative to that chip set 5402 such that they have the addresses as shown, for example, chip set 5408 would self-address with the address [4,10]. Thus, it should be understood that another advantage is that such self-addressing can be performed starting with any chip set.

Figure 54B:
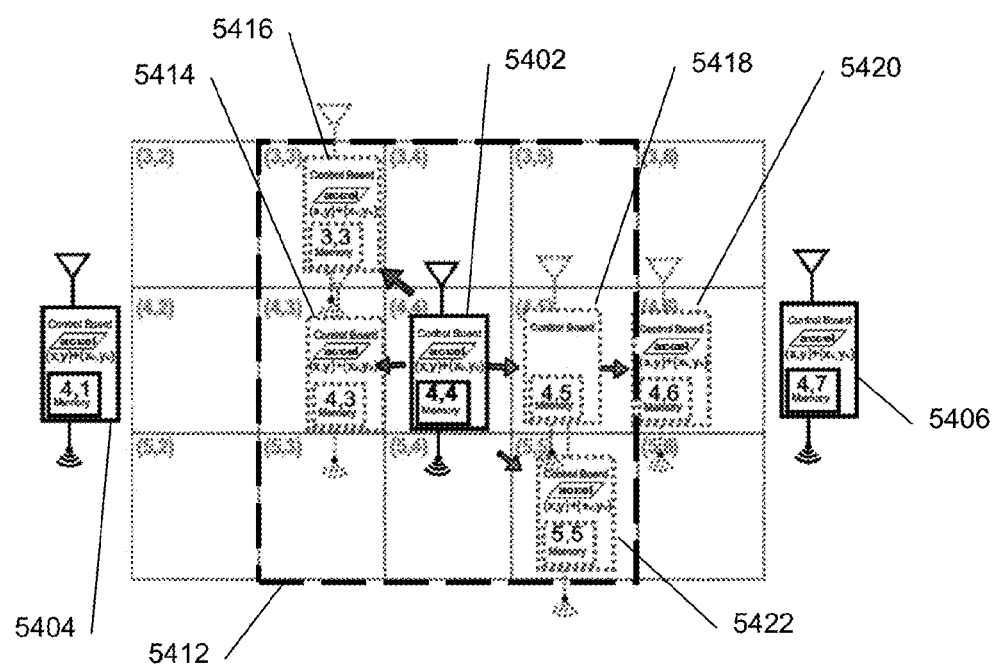

FIG. 54B illustrates, in simplified form, how, by using self-addressing that inherently includes an address gap, positional changes can be accounted for. Specifically, FIG. 54B illustrates this with reference to three chip sets 5402, 5404, 5406 in the same row of the display 54 respectively having starting self-addresses of: [4,4], [4,2], and [4,7] and presuming that each of these chip sets 5402, 5404, 5406 include an accelerometer. For purposes of simplicity of explanation, presume that each chip set in the display controls luminaires 120 (not shown) that display a portion of an image (which may be static like a picture or dynamic like video) initially within the 3×3 grid 5412 indicated by dashed lines and, within the data stream containing the data that would make up the image, data is sent corresponding to a 3×3 grid of addresses corresponding to both the self-addressed addresses and to the addresses within the gaps between chip sets.

Once the initial self-addresses are established for all of the chip sets then an accelerometer 5400 in each chip set is used thereafter to determine any position changes. As a result, if for example, one chip set 5402 moves from location to another there is a corresponding dynamic readdressing of the self-address such that the chip set will always be responding to the information addressed to its current location and display the information appropriate for the corresponding 3×3 grid. As such, with respect to that chip set 5402, in its initial position, it would capture data from the data stream for the portion of the display corresponding to grid locations:
(3,3), (3,4), (3,5)
(4,3), (4,4), (4,5)
(5,3), (5,4), (5,5)

However, if the chip set 5402 were to shift to the left beyond a certain threshold amount, its new position 5414 would result in self-addressing to a new address [4,3] and begin capturing data for the portion of the image corresponding to the 3×3 grid for the portion of the display corresponding to grid locations:
(3,2), (3,3), (3,4)
(4,2), (4,3), (4,4)
(5,2), (5,3), (5,4)

Likewise, if the chip set 5402 were to shift to diagonally from its original position, or from its left-shifted position up, beyond a certain threshold amount, its new position 5416 would now self-address to a new address [3,3] and begin capturing data for the portion of the image corresponding to the 2×3 grid (because it is near the upper edge of the display 54) for the portion of the display corresponding to grid locations:
(2,2), (2,3), (2,4)
(3,2), (3,3), (3,4)
(4,2), (4,3), (4,4)

As should now be appreciated, the same process would occur if the chip set moved right to a new position to the right 5418, then to either a position 5420 further to the right or to a position 5422 that is on a down and right diagonal from the initial position or below the first right position 5418.

At this point it should be noted that the example has presumed a case where all of the other chip sets (i.e. 5404, 5406, 5408, etc.) of the display, or in a common tube shifted homogeneously and the 3×3 grids were non-overlapping. However, advantageously, if the chip sets (for example a variant of chip set 4200 of FIG. 42) include appropriate chip-to-chip communication and programming, then the chip sets could periodically poll their nearest neighbors for their addresses and, according to a specified protocol, if the addresses of two adjacent chip sets result in part of their display areas being overlapping, one of the two can intelligently disregard data for the overlapping area such that proper display registration is maintained.

This aspect will be discussed with brief reference back to the flag-type display 3000 of FIG. 30A. With such a display 3000, it should be recognized that, if the tubes are not rigidly connected together width-wise, it could be irregularly undulating in space. Using the foregoing teachings, it is possible to create such a display 3000 that presented a consistent image (or image stream) when viewed from a particular distance and perspective angle relative to the display 3000. This is discussed with reference to FIGS. 55A-55D, which illustrate, in simplified form, image correction of a moving display constructed according to the teachings herein.

Figures 55A, 55B, 55C:
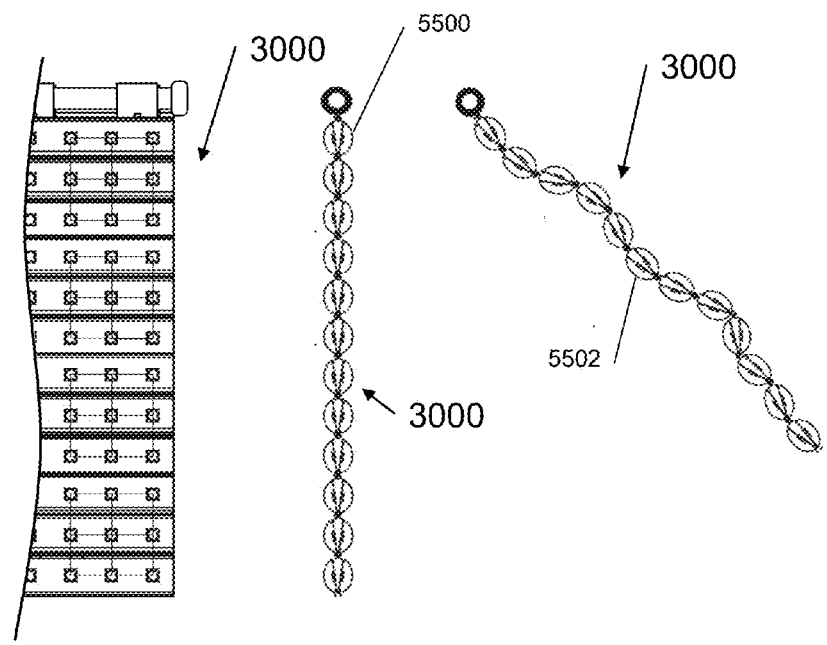
FIGS. 55A-55D illustrate, in simplified form, image correction of a moving display constructed according to the teachings herein.

Specifically, FIG. 55A illustrates, in simplified form, an enlarged section of the flag-type display 3000 of FIG. 30A. FIG. 55B illustrates, in simplified form, is a side view of that flag-type display 3000 in its normal position 5500, which is simply freely hanging vertically. FIG. 55C illustrates, in simplified form, the flag-type display 3000 after it has been temporarily blown to a new position 5502 by the wind.

Figure 55D:
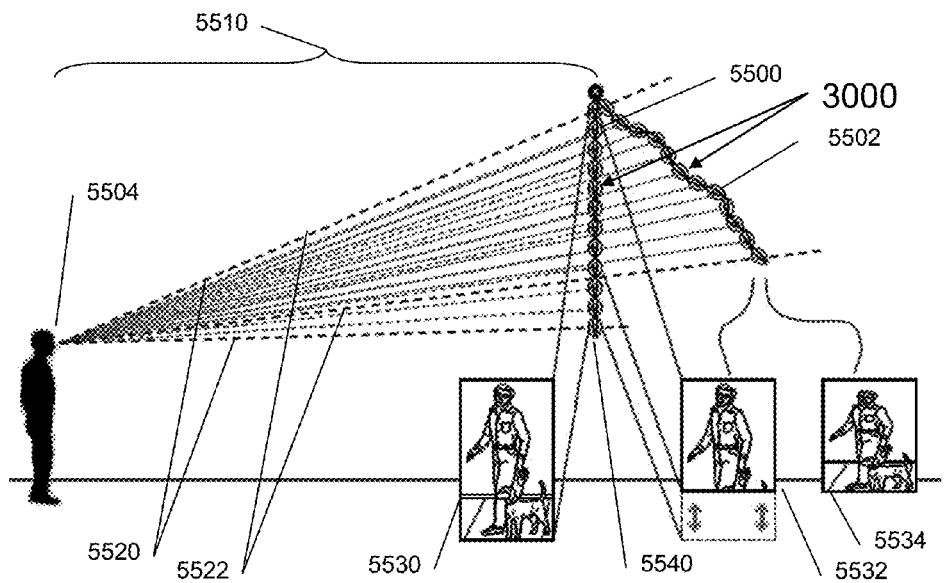

FIG. 55D illustrates, in simplified form, how the shift from one position 5500 to another 5502 can be handle in the manner described in connection with FIG. 54B. This is shown in FIG. 55D, wherein the flag-type display 3000 includes base units with controllers that can self-address relative to a fixed point and is designed such that the fixed point is a position at some distance 5510 and particular angular perspective 550, and the image that will be displayed is optimized so that the entire image 5530 is visible from that distance and perspective.

Accordingly, by having base units in the display 3000 that readdress as their position changes due to the wind, a truncated version 5532 of the image 5530 would be visible from the fixed point as the new view 5522 instead of a distorted/compressed image 5534 that might otherwise be seen from that fixed point. In order to perform image correction, the three-dimensional changes in position are tracked by the base units, for example, as described above in order to correct the image such that an uncompressed and undistorted image is always displayed on a two-dimensional grid 5540, corresponding to the normal position 5500 of then display, when viewed from that distance 5510 and angular perspective 5500.

As such, when viewed from that point, as the display 3000 moves back and forth in the wind, the image will not appear to move, but the amount of the image shown at bottom of the display will simply move up and down (i.e. be truncated or "obscured" to varying degrees) rather than the whole image becoming compressed and distorted.

Moreover, this technique for correcting a graphical display back to a two-dimensional grid when viewed from a particular distance and perspective is exactly the same technique that can be used to dynamically correct the image produced by the previously mentioned strand of lights hung in a tree that is being blown in the wind.

A further example of application of three-dimensional dynamic self-addressing would be the application involving attendees at a concert. Recall that approach used independent self-addressing to turn smart phones in the venue into a single graphical display based upon a fixed position involving, for example, the person's seat number as the self-address. However, if the person changes position between sitting/standing, are particularly tall or short, raises their phone high above their head, or moves their phone back and forth swaying to the music, either alone or along with others nearby, simply using seat might number might not be sufficient to create the desired display in an undistorted way. Again, using the teachings herein regarding three-dimensional dynamic self-addressing, those situations and positional changes can be accounted for to varying degrees, depending upon the particular device each individual has and its capabilities.

Figure 56:
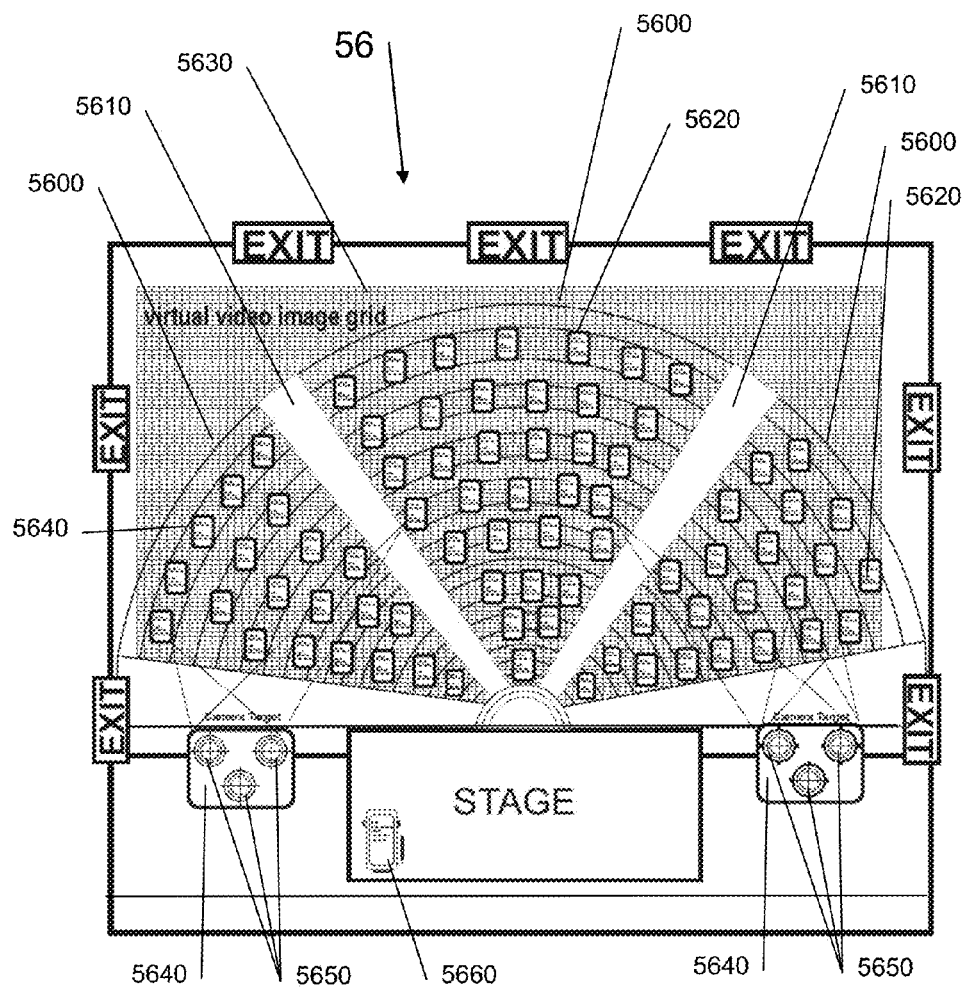
FIG. 56 illustrates, in simplified form, an example of a concert venue configured to take advantage of the teachings herein.

FIG. 56 illustrates, in simplified form, an example of a concert venue 56 configured to take advantage of the teachings herein. As shown, the venue 56 has both seating areas 5600 and non-seating areas 5610, which may be aisles or areas, where attendees with general admission tickets can be located, from which the concert can be viewed. Presuming that most of the attendees have smart phones 5620 that internally incorporate positioning capabilities of some form (e.g. accelerometers, GPS, etc.), that they have an appropriate application running on the phone that has stored, or can receive display image data, and are located throughout the seating areas 5600. In addition, presume that the mesh 5630 overlaying the seating areas 5600 represents the area for the entire desired three-dimensional graphical display 5630 and is broken up into appropriately addressed sub grids. Depending upon the particular implementation, smart phone(s) and image, data for the entire mesh or some portion thereof (perhaps based upon ticketed seat location) could be, for example, pre-loaded prior to the concert, it could be automatically downloaded following entry into the concert venue, it could be downloaded once the user triggers a position identification action or following self-addressing, it could be dynamically received during the concert.

Rather than the smart phones 5620 triangulating their position relative to one another, which is possible, in actual practice it may be simpler for the event goers to aim the smart phones camera at a known target 5640, equipped with indicators 5650 and situated in known locations, and to triangulate the exact physical location of each smart phone 5620 within the venue 56 and respectively use, a value representing each's location relative to the target 5640 as the starting self-address. As should already be understood from the preceding examples, the use of triangulation is a much more robust form of independent self-addressing than simply using the seat number. Additionally, the venue would have a master control unit 5660 that would be configured to functionally interact with the application on the smart phones, according to the teachings herein.

Thus, once the initial self-address had been determined by each of the smart phones, the accelerometers and other position indicators within each smart phone would take over and, working in conjunction with the application as the smart phone was moved within different cell locations within the three-dimensional graphical display 5630, the smart phones would dynamically readdress themselves using their new physical location. Therefore, regardless of movement of a particular smart phone, that smart phone would always be able to display the proper graphic information for it as instructed by master control unit 5660. Advantageously, by applying the teachings herein, even if the movement was such that the potential error in determining location was above some predetermined threshold, such as if an attendee moves to a new section, leaves the seating area to go to the bathroom and then returns, or simply wanders to a non seating area to get a better view, wherever they are in the venue, their phone could dynamically adjust the display of data to properly correspond to the new or changing location (if slow enough) by automatically re-self-addressing or following some action by the user in response to a prompt, for example, a message whereby the user is instructed to retarget from their new location using one of the targets 5640 in the venue.

Further refinements of dynamic readdressing within the concert display include not only tracking displacement but also orientation using information from the smart phones gyroscope so that, unless the display of the smart phone is pointed in the general direction of the stage, based upon some pre-established criteria, then the display would not be shown (e.g. it could temporarily go dark). For example, if the concert goer turned around to see what was behind them, as it would not be desirable for the people behind them to see that person's display, as they would ideally be trying to view the display on, for example, the opposite side of the arena.

Figure 57:
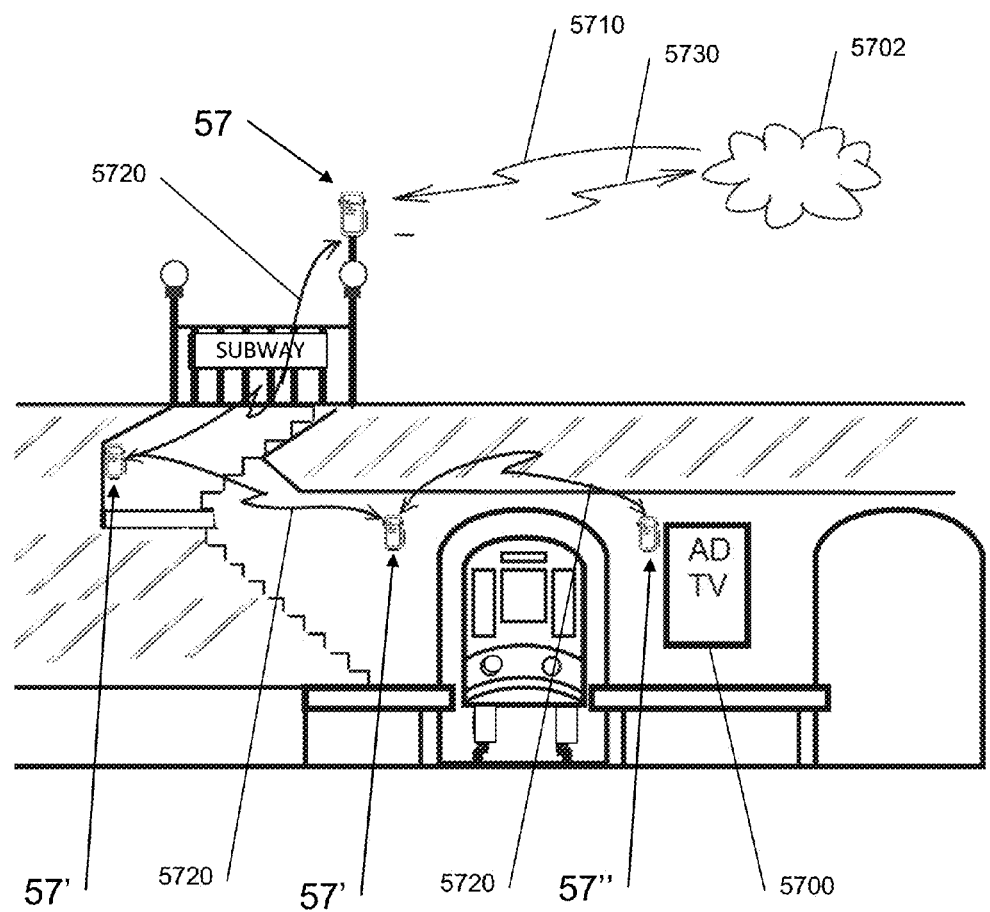
FIG. 57 which illustrates, in simplified form, an example application of complex self-addressing.

The use of independent self-addressing, where a smart phone, base unit/chip set is able to independently determine its physical location, such as in the concert venue example just discussed, it should now be recognized, is incredibly powerful, particularly when paired with multi-dimensional self-addressing, where one dimension is the physical address and another dimension is the self-address generated from being a known part of the system, referred to herein as "complex self-addressing". This pairing makes applications possible that go beyond mere graphical displays, for example, as shown in FIG. 57, which illustrates, in simplified form, an example application of complex self-addressing. As shown in FIG. 57, there are a plurality of units 57, 57', 57" that have functional capabilities consistent with the teachings herein and, at the very least could correspond to the functions of base units described herein that include a variant of the chip set 4200 of FIG. 42. The chip sets 57, 57', and 57" are assumed to be the same and have the same capabilities, however, they will perform different functions based upon the signals that they are able to receive and what they are connected to. In this particular case, it is presumed that instructions and/or data (hereafter an "instruction set")

will originate from a remote source 5702, for example a computer or server, and be transmitted via a communication network (which may be the internet, a cellular network, or some other source (the particular source being unimportant to understanding these teachings)) wirelessly. In this example, it is desired that the remote source 5702 be able control, through the instructions set 5710, an AD/TV display 5700 within a below ground transit system that cannot directly receive the instruction set 5710. However, through radio bubbles, or other wireless (or wired) communications techniques, the unit 57" is presumed able to communicate with a series of units 57', using a repeated signal 5720, but is assumed to not be able to directly communicate with a unit 57 that can receive the instruction set 5710 from the source 5702, nor is it assumed to be able to determine its physical location through using GPS or other methods of physical location determination, but it is assumed that at least one unit 57' is able to communicate with the unit 57 that receives the instruction set 5710 from the source 5702 using the repeated signal 5720 and at least one unit 57' is able to communicate with the destination unit 57" using repeated signal 5720. Additionally, it is also assumed that none of the units 57' are able to determine their physical location through using GPS or other methods of physical location determination.

Since the unit 57 is the only chip set that can both receive the instruction set 5710 and determine its physical location using GPS or other methods of physical location determination it will independently self-address, for example, using its physical coordinates based on start up instructions or based on instructions provided within the instruction set 5710.

As sent, the instruction set 5710 is intended for the unit 57" connected to the AD/TV display 5700 to provide image information that the AD/TV display 5700 is intended to show. This will initially involve a broadcast from the source 5702 that is looking for a chip set with an independent self-address located in the vicinity of a physical location that is connected to the AD/TV display 5700. Since the only unit 57" that fits the requirement cannot receive the signal because it is underground, there will be no response. The source 5702 will then broadcast that it is looking for a unit in the vicinity of that location that is able to act as a repeater, and is able to connect to one or more other units in the vicinity.

In this particular example, a single unit 57 would be the only one to respond, by providing a feedback transmission 5730 back to the source, which includes its physical location. As an aside, if more than one unit responded to the source 5702, then the source 5702 could select the most appropriate unit, for example, by using the physical location data or according to some protocol whereby all would try to establish a connection to the ultimate destination as described below and, according to some criteria, for example, the first one to do so, the one that does so with the fewest "hops" or lowest latency, etc.

Returning to the example, since only one unit 57 responds to the source 5702, that unit 57 would then be instructed to act as a master control unit as described herein and to begin the process of creating a self-addressed communication network to a unit that is connected to the AD/TV display 5700 using a second dimensional address, assuming that the independent self-address is the first dimension. The units 57' would then be self-addressed, for example, using the protocol in FIG. 44A-44F (or its equivalent) or through triangulation or other techniques of computational geometry in order to establish a communication path to the unit 57", which is connected to AD/TV display 5700.

As another aside, it is to be noted that, in a situation like the one described, in establishing a connection to the end point, it may be necessary to have the units invoke a "transferring master control" procedure since a single master control unit may not be able to reach all the way to the intended destination. In such a case, once the first master control unit reaches out as far as it can go and has still not discovered the intended destination unit at the end point, that master control unit would then instruct one or more of the units it had discovered to take over the role of a master control unit and to continue to build a self-addressing communication network looking for the destination unit at the end point (which will typically, although not necessarily, transfer all of the information to the secondary master control unit regarding the unit(s) that the first master control unit had already discovered). The self-addressing of this secondary master control unit could either be a continuation of the current dimensional self-addressing or involve self-addressing on a new dimension. Once the new master control unit has either discovered the intended destination unit at the end point or reached the end of the line without success, then the secondary master control unit would communicate back to the original master control unit all of the resulting information regarding further units it discovered (or, in aggregate, all of the information for all discovered units it had, even if some were transferred to it by a master control unit). The original master control unit would then either take further action by appointing another secondary master control unit or provide feedback transmission 5730 back to the source 5702 and wait for additional instructions.

Once the intended destination unit at the end point 57" has been discovered and self-addressed, an indication of that fact, in some fashion, will be transmitted back to the master control unit (potentially through a secondary master control unit, or a further removed tertiary, etc. master control unit) using a repeated signal 5720 transferred from the end unit 57" via each intermediate unit 57' to the initial unit 57. Once that initial unit 57 receives the indication, then it will transfer the address information of the end unit 57" back to the source as a feedback transmission 5730. In other words, once this happens, it is the simple equivalent of directing data to a specific base unit within a specific tube of a display as described above.

Thus, when the instruction set 5710 is directed to the unit 57" associated with the display 5700, it can simply say to the unit with a physical dimension address that corresponds to that previously stored for the unit 57, to please repeat the following instructions to the chip set at the network dimension address that corresponds to the previously determined address for the end point unit 57" (which may include several other dimensional addresses if secondary master control units or greater relationships were utilized).

It should now be noted that the use of multi-dimensional addressing not only allows a message to be efficiently repeated in order to be passed onto their intended target, but it also allows intervening base units to be replaced, for example in the event of a failure, relocation of a unit, or some other action, without any knowledge of any other base unit with which it may interact. The new or relocated unit can then be self-addressed using information provided by its neighbors and, therefore, the system can begin working (or, to the extent self addressing can establish an alternate path through the techniques described herein, will continue to work) without any special address setting effort or knowledge of the location(s) and/or address(es) of nearby base units on the part of the technician installing it.

It should also be noted that, in the example of FIG. 57, the units 57' may or may not be acting as simply a repeater. They could, for example, have also had their own AD/TV display 5700 attached to them and been previously self-addressed. In this circumstance the instructions to create the communication network would have been to look for "an unaddressed" unit that is connected to the AD/TV display 5700, rather than simply "a" unit that is connected to the AD/TV display 5700.

It should be further noted that the display itself 5700 could be a display constructed and/or self-addressed according to then teachings herein, or it could be a conventional display operating in a conventional manner.

In this example, the units 57, 57', and 57" are assumed to be purely reactionary (i.e. they cannot initiate the discovery process. However, that is not necessarily the case. With some implementations, the units could be "smart" and the self-addressing process could work in reverse. For example, upon power up, one unit 57" could recognize that it is connected to AD/TV display 5700 and know that it is supposed to communicate with a source 5702 using a feedback transmission 5730, but its attempts prove to be unsuccessful. It would then initiate a protocol whereby it will try to form a communication network back to the desired source 5702. To do so, it would broadcast out using a repeater signal 5720 that it is a currently unaddressed chip set, since it was not even able to independently self-address, and that it is looking to join a communication network that has the ability to communicate, using a feedback transmission 5730, back to the source 5702 and, thereby, receive an instruction set 5710 directed to it. The first unit 57' that it discovered may already be a part of a communication network that has the appropriate capabilities, in which case the initiating unit 57" at the display 5700 would become addressed as part of that communication network.

However, if the first unit 57' discovered was not already a part of the network, then it could either (a) begin to form a self-addressed communication network with those units 57' in close proximity to it, or (b) try to reach out farther and farther until it found one that was already in a communication network connected to the source 5702.

In implementations using the reverse process, the most common protocol is expected to be to try to establish a self-address by first using the most direct means of communication available, which is wired communication, if available. If wired communication is not available then to proceed up the line and try wireless transmitter receiver pairs and if still unsuccessful to use two-way wireless communication channel. However, any other protocol appropriate for the particular application and implementation can be used, the particular protocol or hierarchy being unimportant to understanding the teachings herein.

It should now be understood that independent self-addressing, especially when paired with a self-addressing repeater communication network is a powerful tool that can have applications and be extended beyond display technology.

Using a unit employing, for example, the chip set 4200 of FIG. 42 as a universal self-addressing unit capable of performing the functions of a master, slave, and/or repeater according to the teachings herein, diverse non-display-related networks can advantageously be created on an ad hoc basis.

One representative example application is monitoring. FIG. 58A illustrates, in simplified form, an independent self-addressing "geo" stick 5800 configured for self-addressing, and communicating with a master control unit, according to teachings herein that can monitor for, for example, seismic, weather, climate or other activity. FIG. 58B illustrates, in simplified form, internal sensors 5802, 5804 of the geo stick 5800, and FIG. 58C illustrates a solar array 5806, on the cap of the geo stick 5800 that, in this example, allows it to be self-powered. In use, multiple geo sticks 5800 are placed into the ground at various locations and take readings using its sensors 5802, 5804, 5808 (e.g. motion, temperature, humidity and/or other sensors) through various I/O channels and report back to a master control unit sensor-measured related to seismic activity or electrical discharge indicative of an earthquake or other weather or climate phenomena.

Figure 59A:
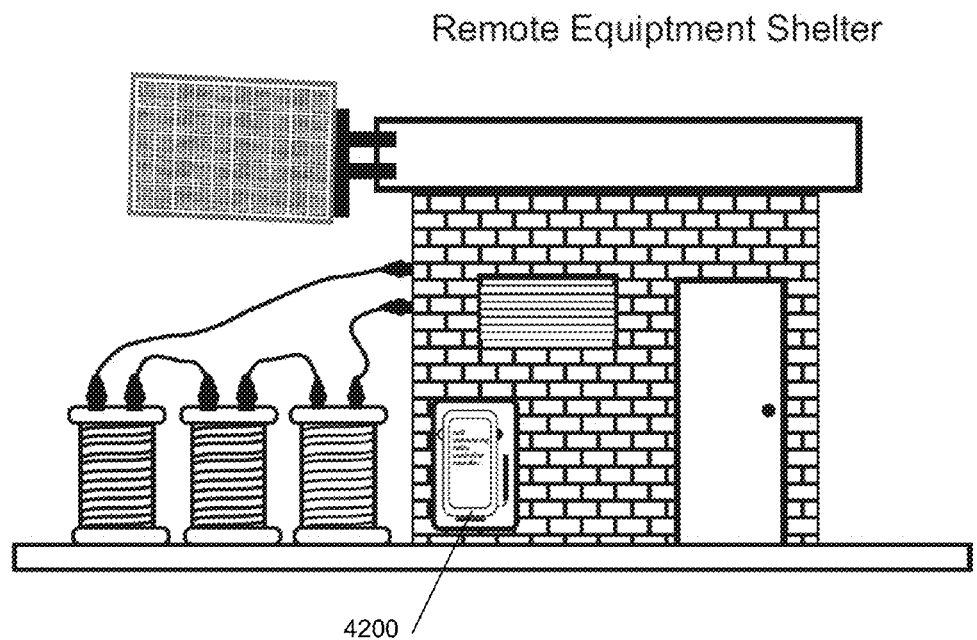
FIGS. 59A-59B illustrate, in simplified form, another example application for monitoring remote equipment according to the teachings herein.
Figure 59B:
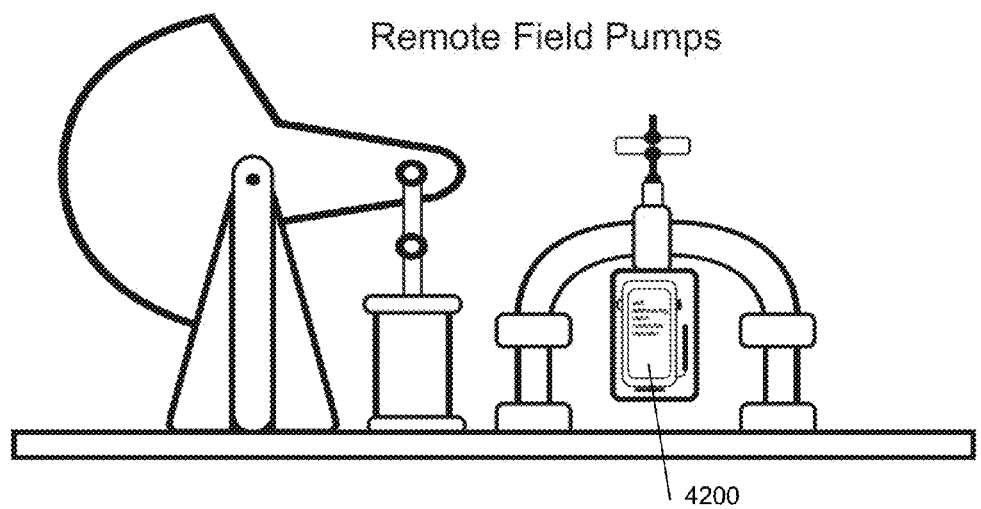

FIGS. 59A-59B illustrate, in simplified form, another example application for monitoring remote equipment according to the teachings herein. As shown in FIG. 59A, the remote equipment shelter can be configured with the chip set 4200 to take local readings relating to the equipment there and, as shown in FIG. 59B, using self-addressing according to the teachings herein to discover other remote equipment in the field that may be suitably equipped with another chip set 4200 and report resulting monitoring information back to a master control unit. Advantageously, as new equipment is deployed or equipment is taken off line, goes down or is moved, through implementation of self-addressing according to the teachings herein, monitoring can adaptively continue.

Figure 60:
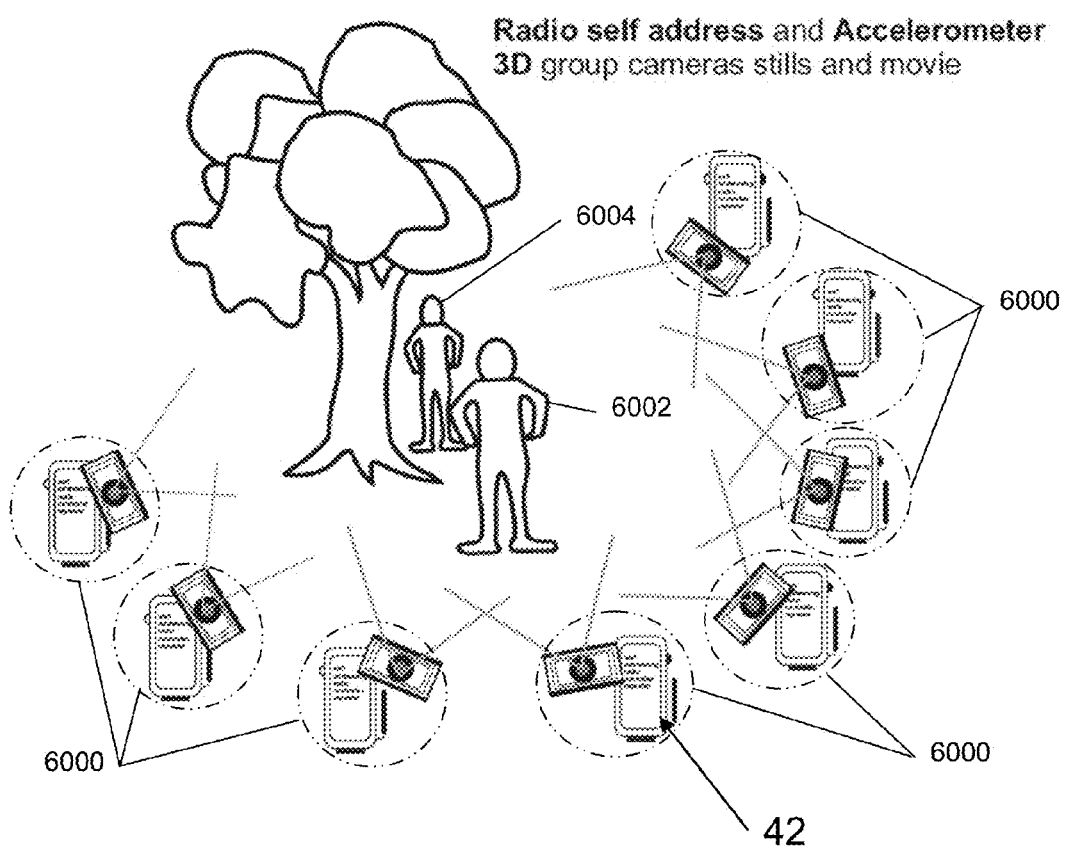
FIG. 60 illustrates, in simplified form, yet another application of the teachings herein.
Figure 61:
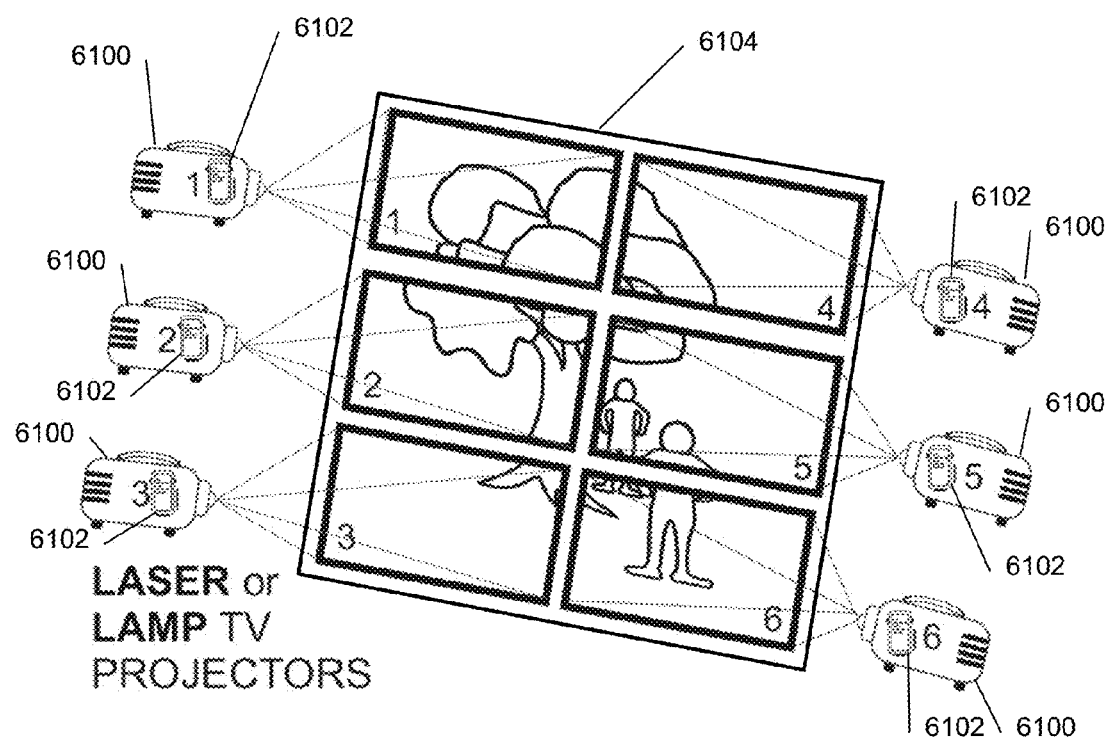
FIG. 61 illustrates, in simplified form, essentially a reversal of the process of FIG. 61.
Figure 62:
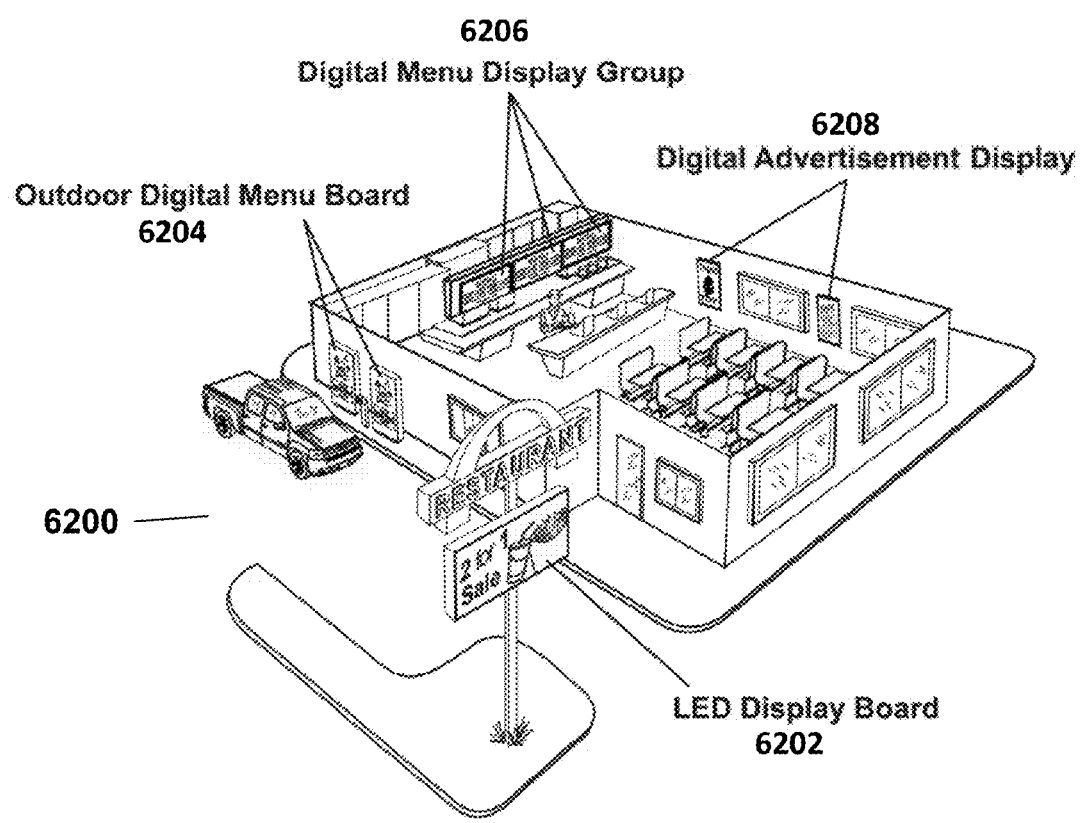
FIG. 62 represents a restaurant and the coming together of many of the teachings herein and/or extensions thereof.

Other applications of the self-address techniques discussed include those represented in FIG. 60-FIG. 62, which also use chip set 42 of FIG. 42 as a universal self-addressing unit capable of performing the functions of a master, slave, and/or repeater.

FIG. 60 illustrates, in simplified form, yet another application of the teachings herein that allows for more simplified 3D image capture of objects 6002, 6004. With this application, multiple cameras 6000, incorporating appropriate capabilities as described for variants herein, for example, one variant of chip set 4200 of FIG. 42, are deployed about the object 6002 to be imaged and wirelessly self-addressed using either their physical or relational address to one another. Advantageously, due to the self-addressing, the cameras can be deployed by relatively unskilled technicians without rigorous consideration of the terrain. The cameras 6000 take synchronized pictures based upon instructions of a master control unit (which may be either one of the chip sets 4200 in a camera (as shown) or separate master control unit located somewhere nearby (not shown). By using the teachings herein, knowing the exact location of the camera is possible and dynamically re-addressing due to any small changes in position that occur, the photographs taken could then be used for creating three-dimensional images of the objects in the photographs. Moreover, since the cameras can re-self-address, it is even possible to do this with only two cameras, by having one remain in a fixed location and having the other self-address and take new pictures each time it is moved. Still further, this approach allows for 3D imaging of objects in areas that are not readily accessible for that purpose, for example, in relatively inaccessible rugged terrain. In such a case, the cameras could be placed at locations about the object to be imaged by simply lowering them, for example using a helicopter, to points where they can be steady. Then, they can be instructed to self-address, take pictures and be removed or moved to a new location.

FIG. 61 illustrates, in simplified form, essentially a reversal of the process of FIG. 60. As shown in FIG. 61, instead of multiple cameras, multiple projectors 6100 that incorporate wireless self-addressing technology and techniques as described herein use either their physical or relational address to one another and produce a synchronized display 6104 through the instructions of a master control unit (which, as in the previous examples) may be an integral part of the capabilities 6102 of a projector 6100 or it may be a separately located master control unit as described herein (not shown). Alternatively, the same graphical display could have been created by a bank of monitors or TVs that were all wirelessly self-addressed using either their physical or relational address to one another in order to produce a synchronized display.

FIG. 62 illustrates, in simplified form, a restaurant 6200 bringing together many of the teachings herein and/or extensions thereof. In FIG. 62, an external LED Display Board 6202, constructed using one of the variants herein, is independently self-addressed using its GPS or other physical positioning device capabilit(y/ies) and is configured to be able to wirelessly receive instructions from a regional headquarters regarding what to display. In addition, it not only determines its own display, it is also configured to act as a repeater for the rest of the control units in close proximity to it and, in this case, to other branches of the same restaurant within range.

The rest of the control units of the restaurant 6200 include outdoor digital menu boards 6204 that are both self-addressed, as part of the system controlled by the instructions repeated by the LED Display Board 6202, and are self-addressed on a separate dimension to differentiate among themselves. Inside the restaurant there is a Digital Menu Display Group 6206, that can similarly be self-addressed and receive instructions repeated by the LED Display Board 6202, and are also self-addressed on a separate dimension, presumably based upon either their physical or relative location to one another, so that a set of images (static or dynamic) appear to periodically rotate through the displays in round-robin fashion. Finally, there are two independent Digital Advertisement Displays 6208 located in the restaurant 6200, which are also self-addressed but may or may not be displaying content specific to that restaurant 6200, for example, one or more may be paid advertising from a related partner or local community-related information provided by the local camber of commerce, town hall or school system.

Note here that, while the LED Display Board 6202 was specified as the repeater, advantageously, if one (or more) of the digital menu boards 6204, a display the Digital Menu Display Group 6206, and/or one or more of the Digital Advertisement Displays 6208 contained suitable control unit capabilities, any of those control units capable of wirelessly receiving the instructions from the regional headquarters could have functioned as a repeater. Alternatively, with suitable capabilities presumably all of the units could have independently received their respective instructions without the need for a repeater.

According to an atypical variant approach to the techniques described herein different control units can be allowed to self-address with the same address value. This will allow a subset of the control units to act in "party line" fashion. In this manner, if it is known that it will always be desired that such a subset will always need to receive the same data a single address could be used to do so instead of redundantly sending the same data to each's discrete address. Alternatively, or additionally, if there was some need to communicate with only one, if feedback from each is separate and two way, a simple command could be sent via the feedback line to specific units to "ignore" information addressed to them and those that did not receive the "ignore" command would receive the data. Depending upon the particular implementation, the feedback line could then again be used to stop the ignoring or the units could be placed in a state whereby receipt of an address to them following the "ignore" command would un-set the ignore, meaning that unit it would not see the packet addressed to it that un-set the ignore, but would see each thereafter again.

Finally, it is to be understood that various different variants of the invention, including representative embodiments and extensions have been presented to assist in understanding the invention. It should be understood that such implementations are not to be considered limitations on either the invention or equivalents except to the extent they are expressly in the claims. It should therefore be understood that, for the convenience of the reader, the above description has only focused on a representative sample of all possible embodiments, a sample that teaches the principles of the invention. The description has not attempted to exhaustively enumerate all possible permutations, combinations or variations of the invention, since others will necessarily arise out of combining aspects of different variants described herein to form new variants, through the use of particular hardware or software, or through specific types of applications in which the invention can be used. That alternate embodiments may not have been presented for a specific portion of the description, or that further undescribed alternate or variant embodiments may be available for a portion of the invention, is not to be considered a disclaimer of those alternate or variant embodiments to the extent they also incorporate the minimum essential aspects of the invention, as claimed in the appended claims, or an equivalent thereof.

What is claimed is:

1. A method performed by a control unit in an array of multiple self-addressable control units arranged in at least two dimensions, wherein one of the multiple self-addressable control units in the array is located within a first longitudinal tube of a lighting display having a first attachment extension on an outer surface thereof, and another of the multiple self-addressable control units in the array is located within a second longitudinal tube of the lighting display having a second attachment extension on an outer surface thereof, and wherein the first and second attachment extensions are configured to attach to each other, the method comprising:

attaching the first longitudinal tube of the lighting display to the second longitudinal tube of the lighting display by connecting the first and second attachment extensions to each other;

obtaining information to be used to determine a self-address;

determining a self-address value based upon the information;

storing the determined self-address value;

based upon the self-address value, specifying first data to be provided to a next self-addressable control unit in a first group of self-addressable control units for a first dimension of the array;

providing the first data to the next self-addressable control unit in the first group;

based upon the self-address value, specifying second data to be provided to a different self-addressable control unit in a second group of self-addressable control units for a second dimension of the array different from the first dimension of the array;

providing the second data to the different self-addressable control unit in the second group; and identifying when the one of the multiple self-addressable control units in the array has moved from a location within the first tube by more than a specified threshold amount and dynamically re-addressing at least the one of the multiple self-addressable control units in the array to account for the movement.

2. The method of claim 1, wherein the determining comprises:
generating the self address value as a function of the information.

3. The method of claim 1, wherein the obtaining comprises:
receiving the information to be used to determine the self-address value from a master controller.

4. The method of claim 3, further comprising:
providing self-addressing completion feedback to the master controller.

5. The method of claim 1, wherein the obtaining comprises:
receiving the information to be used to determine the self-address from a preceding self-addressable control unit in the second dimension of the array.

6. The method of claim 5, wherein the operational action comprises:
transferring at least some of the specific data to at least one other control unit in the array.

7. The method of claim 1, wherein the receiving occurs over one of a wired connection or a wireless channel.

8. The method of claim 1, wherein at least one of the providing the first data or the providing the second data occurs over one of a wired connection or a wireless channel.

9. The method of claim 1, wherein the obtaining comprises:
executing a startup routine that makes the information obtainable.

10. The method of claim 1, wherein the information to be used in the determining includes location information.

11. The method of claim 1, wherein at least one of the first data or the second data comprises:
at least one of the self-address value or location-related information.

12. The method of claim 1, further comprising:
identifying at least one of a physical location or a relative location that is relative to a target.

13. The method of claim 12, wherein the determining the self-address value includes:
employing a computational geometry triangulation method.

14. The method of claim 1, wherein the obtaining the information to be used to determine a self-address includes at least one of:
a) receiving the information from a master control unit;
b) receiving the information from a base unit; or
c) acquiring location-related information and using the location-related information as the information.

15. The method of claim 1, wherein other units of the multiple self-addressable control units are correspondingly associated with at least one of:
a) an array of smart phones;
b) an array of geo sticks;
c) an array of cameras;
d) an array of projectors;
e) an array of base units within a display; or
f) an array of display devices.

16. The method of claim 15, wherein the other units of the multiple self-addressable control units are configured for:
dynamically re-addressing in response to a location change.

17. The method of claim 1, further comprising:
detecting change from a first location to a second location; and
in response to the detecting, performing a dynamic self-addressing operation in order to determine a new self-address value.

18. The method of claim 1, wherein at least some of the multiple self-addressable control units in the array are physically located such that they have one of:
a substantially uniform spacing relative to each other; or
a varied spacing relative to each other.

19. The method of claim 1, wherein, following the providing, the method comprises:
receiving a data stream; and
selecting from the data stream, specific data directed to the self-address, and using the specific data to effect an operational action.

* * * * *